US010999226B2

(12) United States Patent
Cohen

(10) Patent No.: US 10,999,226 B2
(45) Date of Patent: *May 4, 2021

(54) APPARATUS AND METHOD FOR MESSAGE IMAGE REFERENCE MANAGEMENT

(71) Applicant: Wrinkl, Inc., Sands Point, NY (US)

(72) Inventor: Marc A. Cohen, Blue Bell, PA (US)

(73) Assignee: Wrinkl, Inc., Sands Point, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,412

(22) Filed: Jan. 17, 2020

(65) Prior Publication Data

US 2020/0153768 A1 May 14, 2020
US 2021/0044550 A9 Feb. 11, 2021

Related U.S. Application Data

(63) Continuation-in-part of application No. 16/712,952, filed on Dec. 12, 2019, now Pat. No. 10,728,192, which is a continuation of application No. 16/376,427, filed on Apr. 5, 2019, now Pat. No. 10,547,575, which is a continuation-in-part of application No. 16/014,578, filed on Jun. 21, 2018, which is a continuation-in-part of application No. 15/858,696, filed on Dec. 29, 2017, now Pat. No. 10,025,475, which is a continuation-in-part of
(Continued)

(51) Int. Cl.
*H04L 12/58* (2006.01)
*H04L 29/06* (2006.01)

(52) U.S. Cl.
CPC ............ *H04L 51/046* (2013.01); *H04L 51/12* (2013.01); *H04L 51/16* (2013.01); *H04L 51/18* (2013.01); *H04L 51/36* (2013.01); *H04L 65/1069* (2013.01); *H04L 65/1093* (2013.01); *H04L 65/4015* (2013.01)

(58) Field of Classification Search
CPC ..................................................... H04L 51/046
See application file for complete search history.

(56) References Cited

U.S. PATENT DOCUMENTS 7,164,781 B2   1/2007   Kim et al.
7,809,722 B2  10/2010   Gokturk et al.
(Continued)

OTHER PUBLICATIONS

Whatsapp—2016.*
(Continued)

*Primary Examiner* — David E Choi
(74) *Attorney, Agent, or Firm* — Caesar Rivise, PC

(57) ABSTRACT

A method for referencing an image comprises the steps of displaying the image on a first display device, receiving selection of at least a portion of the image via the first display device, receiving content, wherein the content is associated with and digitally linked to at least the portion of the image for which selection was received, transmitting the image as part of a message included in a continuous stream of messages from the first display device to a second display device, displaying at least a portion of the message on the second display device as part of the continuous stream of messages, and displaying the content on the second display device and indicating that the content is associated with the specific portion of the image.

19 Claims, 96 Drawing Sheets

Related U.S. Application Data application No. 15/431,077, filed on Feb. 13, 2017, now Pat. No. 9,860,198, application No. 16/746,412, which is a continuation-in-part of application No. 16/376,427, filed on Apr. 5, 2019, now Pat. No. 10,547,575, which is a continuation-in-part of application No. 16/014,578, filed on Jun. 21, 2018, which is a continuation-in-part of application No. 15/609,663, filed on May 31, 2017, now Pat. No. 10,009,300, which is a continuation of application No. 15/293,620, filed on Oct. 14, 2016, now Pat. No. 9,712,466, application No. 16/746,412, which is a continuation-in-part of application No. 16/376,427, filed on Apr. 5, 2019, now Pat. No. 10,547,575, which is a continuation-in-part of application No. 16/014,578, filed on Jun. 21, 2018, which is a continuation-in-part of application No. 15/858,696, filed on Dec. 29, 2017, now Pat. No. 10,025,475, which is a continuation-in-part of application No. 15/431,077, filed on Feb. 13, 2017, now Pat. No. 9,860,198, application No. 16/746,412, which is a continuation-in-part of application No. 16/376,427, filed on Apr. 5, 2019, now Pat. No. 10,547,575.

(60) Provisional application No. 62/666,137, filed on May 3, 2018, provisional application No. 62/783,410, filed on Dec. 21, 2018, provisional application No. 62/446,067, filed on Jan. 13, 2017, provisional application No. 62/358,719, filed on Jul. 6, 2016, provisional application No. 62/253,229, filed on Nov. 10, 2015, provisional application No. 62/518,905, filed on Jun. 13, 2017.

(56) References Cited

U.S. PATENT DOCUMENTS

| | | | |
|---|---|---|---|
| 7,945,620 B2 | 5/2011 | Bou-Ghannam et al. | |
| 8,832,569 B2 | 9/2014 | Chen et al. | |
| 9,218,603 B2 * | 12/2015 | Kumar | H04L 65/4038 |
| 9,235,782 B1 | 1/2016 | Zomet et al. | |
| 9,262,455 B2 | 2/2016 | Palay | |
| 9,426,102 B1 | 8/2016 | Wong et al. | |
| 9,645,127 B2 | 5/2017 | Amin et al. | |
| 9,712,466 B2 | 7/2017 | Cohen et al. | |
| 9,860,198 B1 | 1/2018 | Cohen et al. | |
| 9,971,500 B2 | 5/2018 | Yang et al. | |
| 9,996,248 B2 | 6/2018 | Park et al. | |
| 10,009,300 B2 | 6/2018 | Cohen et al. | |
| 10,025,475 B1 | 7/2018 | Cohen | |
| 2002/0095465 A1 | 7/2002 | Banks et al. | |
| 2005/0198584 A1 | 9/2005 | Matthews et al. | |
| 2006/0031361 A1 | 2/2006 | Bailey et al. | |
| 2007/0815961 | 8/2007 | Perlow et al. | |
| 2008/0080748 A1 | 4/2008 | Sukegawa et al. | |
| 2009/0094288 A1 | 4/2009 | Berry et al. | |
| 2009/0119371 A1 * | 5/2009 | Chang | H04L 12/1827 709/206 |
| 2010/0299599 A1 | 11/2010 | Shin et al. | |
| 2011/0047227 A1 | 2/2011 | Arthurs et al. | |
| 2011/0289406 A1 * | 11/2011 | Wassingbo | G06F 3/0488 715/256 |
| 2012/0017149 A1 | 1/2012 | Lai et al. | |
| 2012/0198360 A1 | 8/2012 | Wanderski et al. | |
| 2013/0247175 A1 | 9/2013 | Nechyba et al. | |
| 2014/0040784 A1 | 2/2014 | Behforooz et al. | |
| 2014/0059040 A1 | 2/2014 | Cha et al. | |
| 2014/0067977 A1 | 3/2014 | Rasmussen et al. | |
| 2014/0096033 A1 | 4/2014 | Blair | |
| 2014/0143684 A1 | 5/2014 | Oh et al. | |
| 2014/0195621 A1 * | 7/2014 | Rao DV | H04L 12/1827 709/206 |
| 2014/0219433 A1 | 8/2014 | Pai et al. | |
| 2014/0298210 A1 | 10/2014 | Park et al. | |
| 2015/0188928 A1 | 7/2015 | Shapiro | |
| 2016/0179773 A1 * | 6/2016 | Shen | H04M 1/72552 715/753 |
| 2016/0294742 A1 * | 10/2016 | Weaver | H04L 67/306 |
| 2016/0330147 A1 | 11/2016 | Antebi et al. | |
| 2017/0163594 A1 | 6/2017 | Anderson | |
| 2018/0159812 A1 | 6/2018 | Sarafa et al. | |
| 2018/0300341 A1 * | 10/2018 | Hadar | G06F 16/51 |
| 2020/0153768 A1 * | 5/2020 | Cohen | H04L 51/12 |

OTHER PUBLICATIONS

"Top 50 Features of Slack to Boost Your Productivity", Blog. standuply.com, Sep. 11, 2016, retrieved from: <https://blog.standuply.com/50-additional-features-of-slack-to-boost-your-productivity-959ee56f7893>, retrieved on Dec. 11, 2019.

"How to Retweet With a Comment, aka Use the Life-Changing Feature Twitter Just Added," Bustle.com, Apr. 7, 2015, retrieved from: URL<https://www.bustle.com/articles/74648-how-to-retweet-with-a-comment-aka-use-the-life-changing-feature-twitter-just-added>, retrieved on Dec. 11, 2019.

"Narwhal: The Best Reddit Client-Apps (App Walkthrough," Corban Tech, Dec. 16, 2016, retrieved from: URL<https://www.youtube.com/watch?v=78wgtwP1hKE>, (Video Submission), retrieved on Dec. 11, 2019.

"WhatsApp Can Quote Messages You Want to Respond to," Engadget.com, Jun. 2016, retrieved from: URL<https://www.engadget.com/2016/06/12/whatsapp-quote-messages/>, retrieved on Dec. 11, 2019.

"How to Retweet Anything iPhone iPad iPod Mac," Tech & Design, Jul. 18, 2015, retrieved from: URL<https://www.youtube.com/watch?v=6D_MkQO0zjY>, (Video Submission), retrieved on Dec. 11, 2019.

"How to Retweet the Right Way (With a Comment) on Twitter," HubSpot.com, Apr. 15, 2015, retrieved from: URL<https://blog.hubspot.com/blog/tabid/6307/bid/27675/how-to-retweet-the-right-way-in-4-easy-steps.aspx>, retrieved on Dec. 11, 2019.

"Twitter Updates TweetDeck, Allows Users to Edit and Retweet," Mashable.com, Mar. 22, 2012, retrieved from: URL<https://mashable.com/2012/03/22/tweetdeck-rt-updates/>, retrieved on Dec. 11, 2019.

"Outlook for Android: Swipe Options, Swipe Left for Reply, Swipe Right for Forward. Please Add These Options," Outlook.uservoice.com, Sep. 30, 2015, retrieved from: URL<https://outlook.uservoice.com/forums/293346-outlook-for-android/suggestions/9992319-swipe-options-swipe-left-for-reply-swipe-right-f>, retrieved on Dec. 11, 2019.

"How to Use the New Retweet Function on Twitter-Social Media Solutions," Plexus Worldwide, Apr. 7, 2015, retrieved from: URL<https://www.youtube.com/watch?v=Ji9mAP8vwiQ>, (Video Submission), retrieved on Dec. 11, 2019.

"Using Slack," Slack.com, 2019, retrieved Thorn: URL<https://slack.com/help/articles/203274767>, retrieved on Dec. 11, 2019.

"Sharing Messages in Slack," Slackhq.com, May 2016, retrieved from: URL<https://slackhq.com/sharing-messages-in-slack>, retrieved on Dec. 11, 2019.

"Share Messages in Slack: From Channels to Search—Learn How Slack Works From Top to Bottom!," Slack.com, retrieved from: URL<https://slack.com/help/articles/203274767-Share-messages-in-Slack>, retrieved on Dec. 16, 2019.

"Free Open-Source Distributed Alternative to Twitter. Mastodon," T5 by Robin Good, Oct. 10, 2016, retrieved from: URL<tools.robingood.com/site/contents/content/765621/2016-10-06/free-open-source-distributed-alternative-to-twitter-mastodon>, retrieved on Dec. 11, 2019.

"WhatsApp Quietly Introduced a Brand-New Way to Reply to Your Messages," Express.com.uk, Jun. 13, 2016, retrieved from: https://www.express.co.uk/life-style/science-technology/679325/WhatsApp-How-To-Quote-Message-In-Reply-iOS-Android-Chat, retrieved on Dec. 16, 2019.

International Search Report and Written Opinion for PCT Application No. PCT/US2018/13462 dated Apr. 4, 2018.

(56) References Cited

OTHER PUBLICATIONS

Written Opinion of related PCT Application No. PCT/US2018/13462 dated Apr. 4, 2018.

* cited by examiner

Figure 9

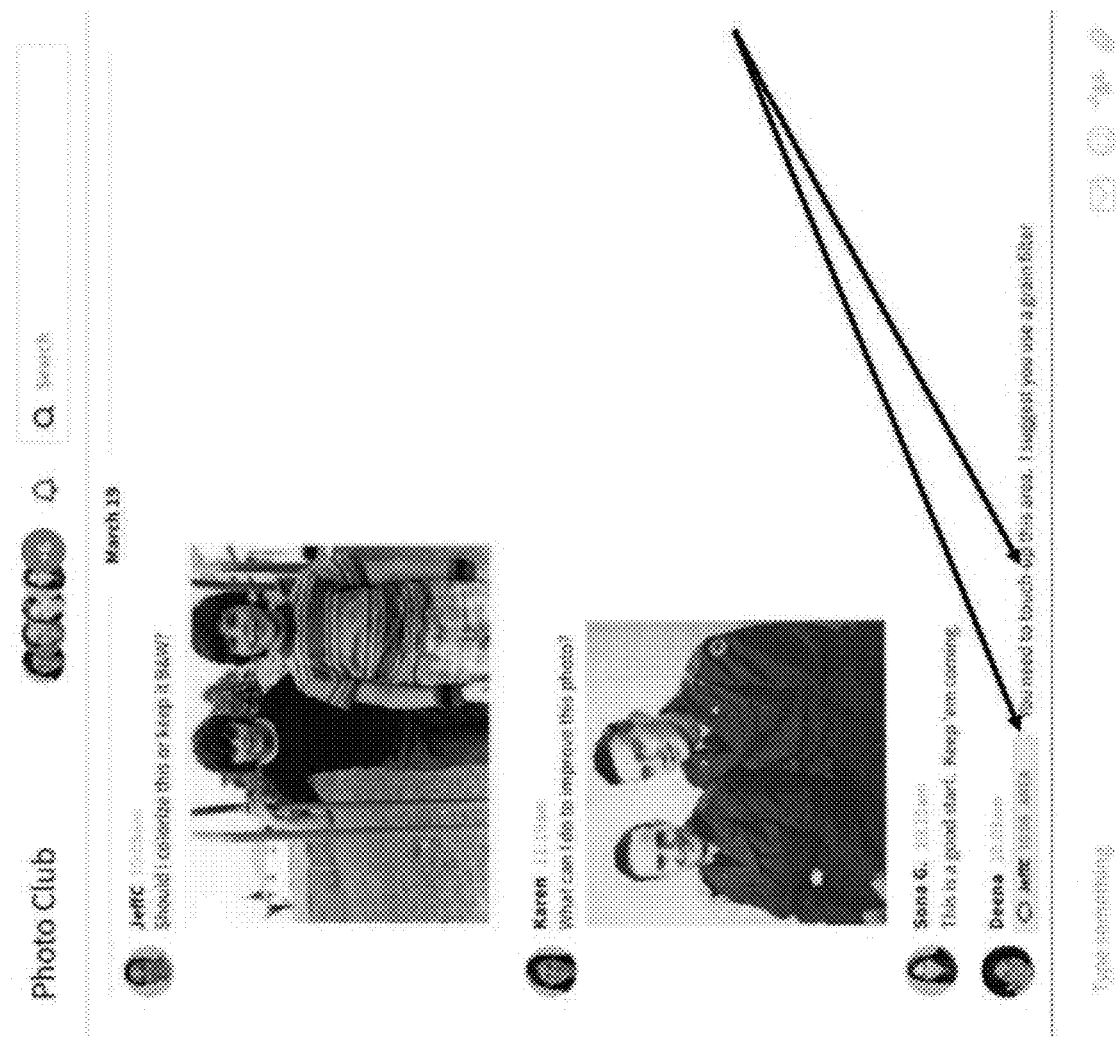

―― Wednesday, January 18th ――

 ErikKatz 10:10AM
On my way. See you soon.

 Chipotle 10:12AM
Get and Give! Reference this message and get a free burrito

 MarcCohen 10:18AM
Waiting for Ali to circulate it. If we don't have it soon, we'll skip for today.

 ErikKatz 10:19AM
Oh okay, that's fine, thanks!

 MarcCohen 10:22AM
Anything you want to review with me?

 FREE Chipotle
They got me ☺ I'm going to Chipotle for lunch. Anyone want to join me?

Figure 13B

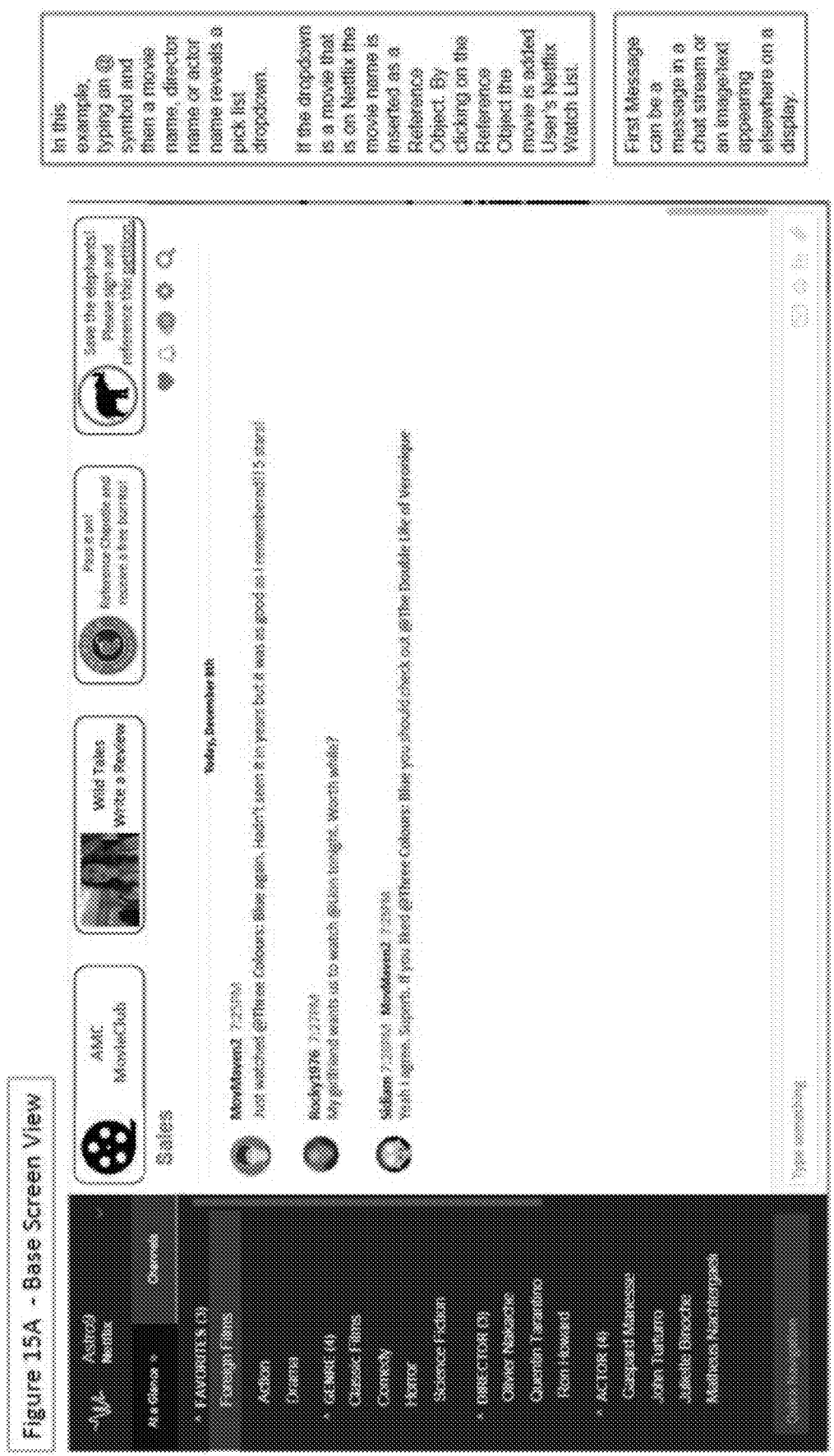

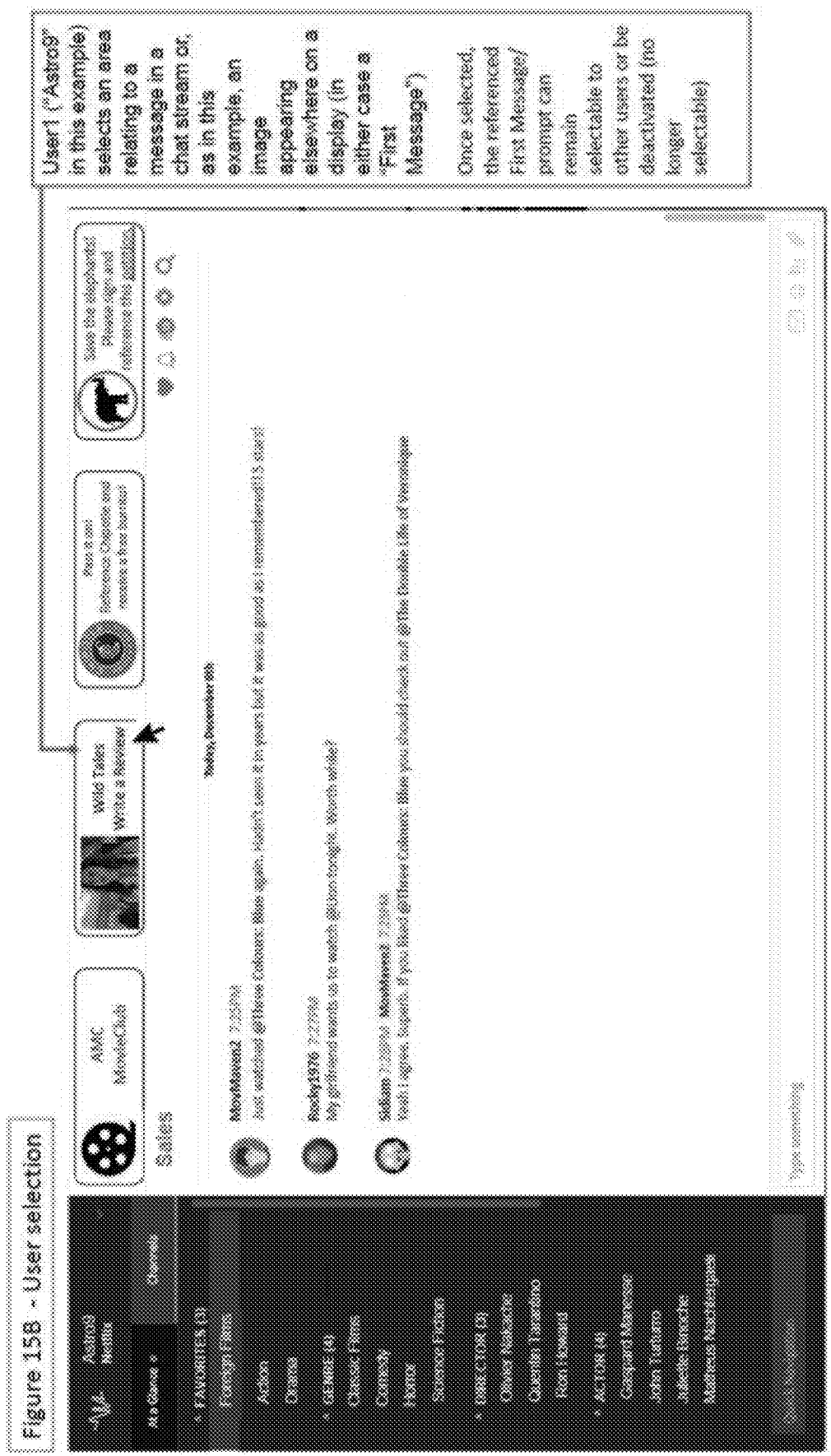

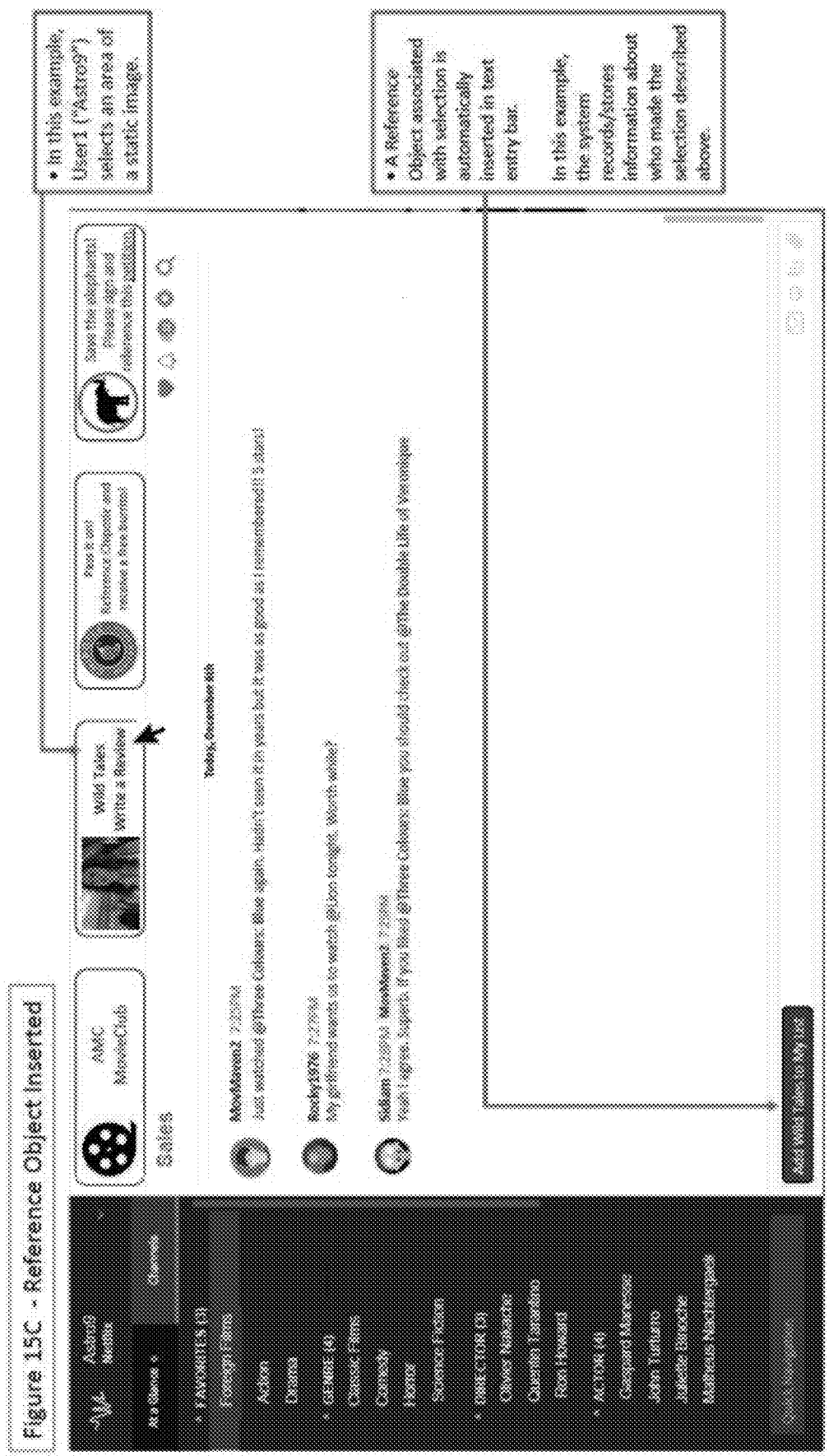

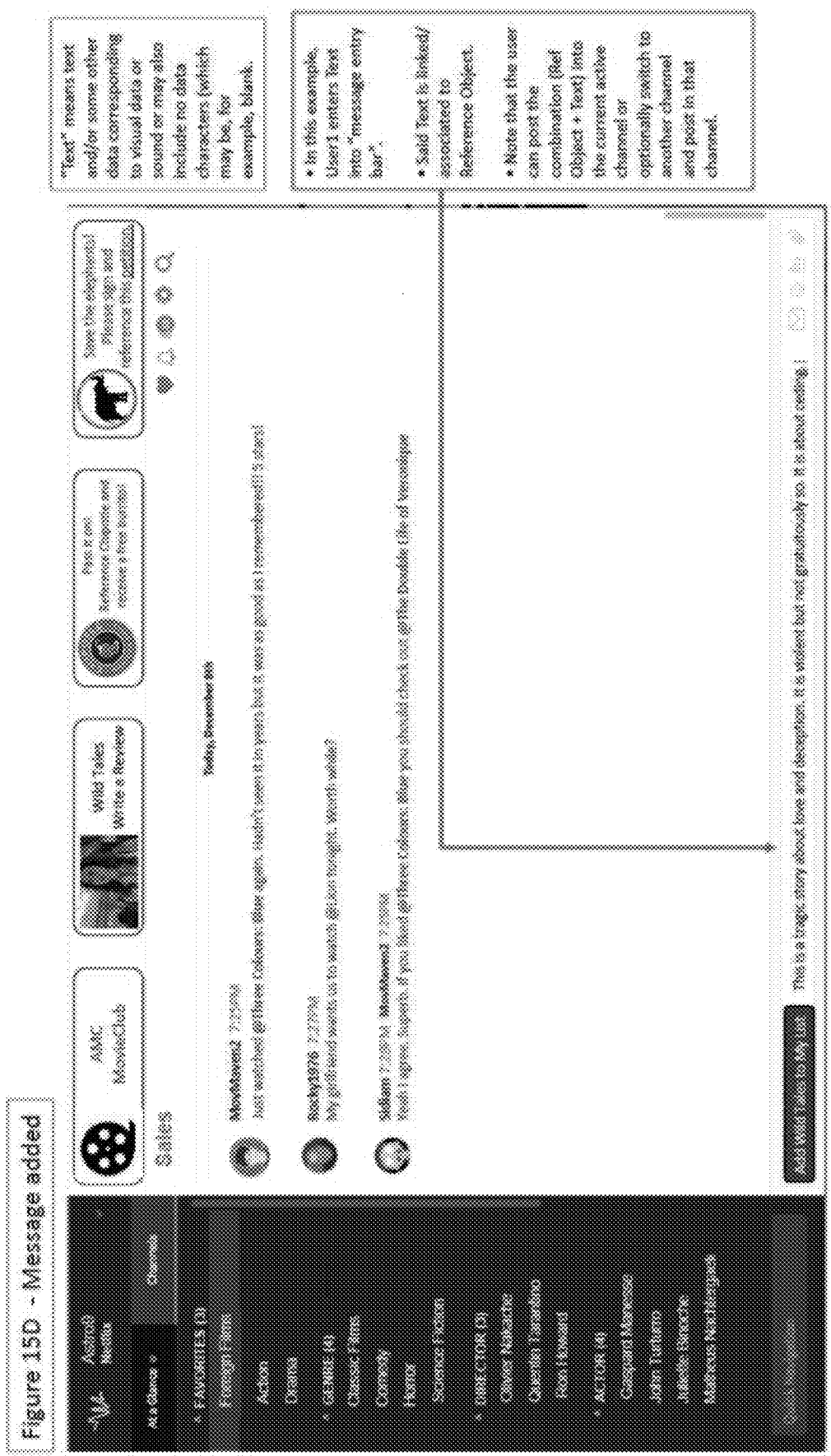

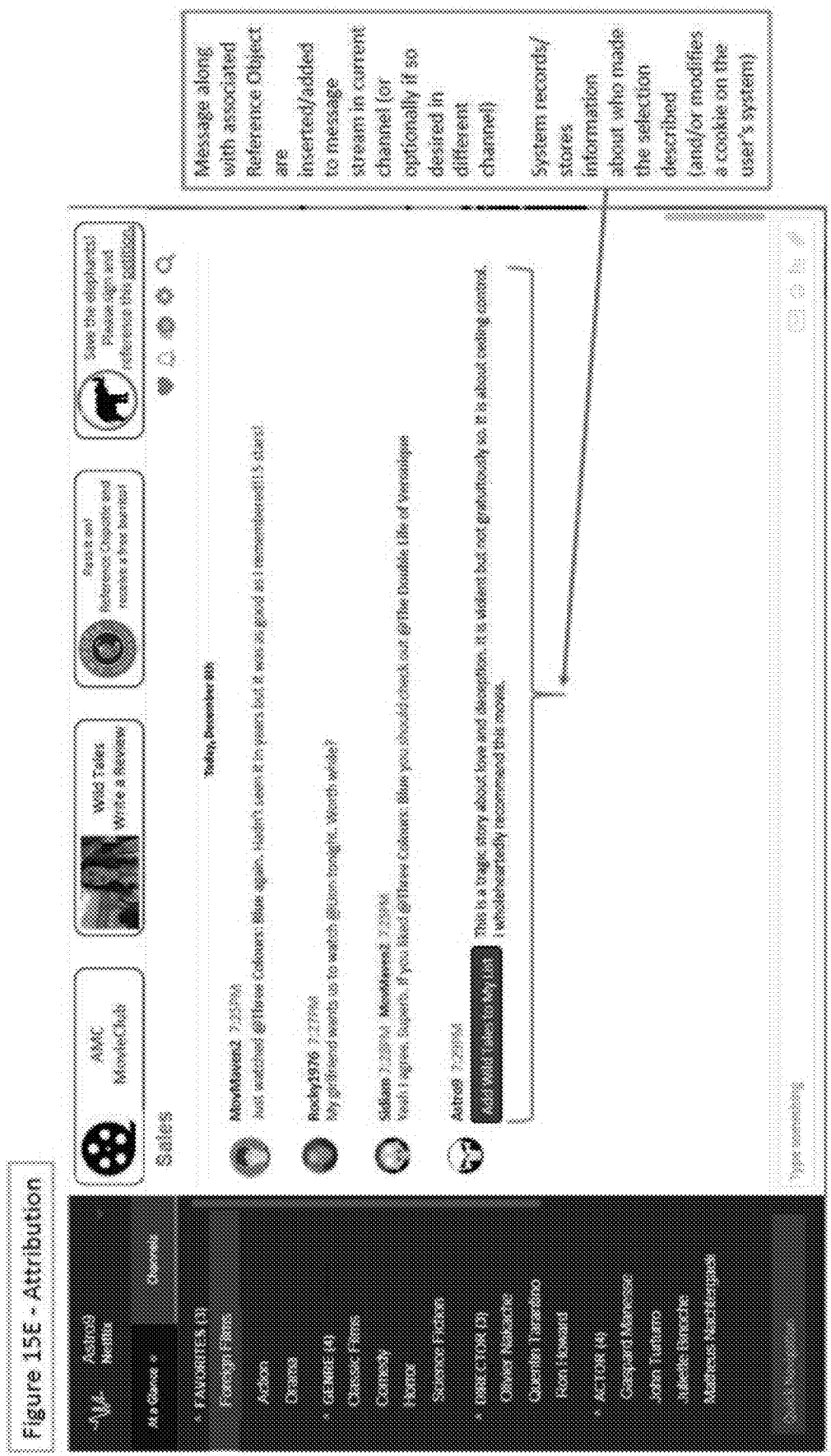
Figure 15E - Attribution

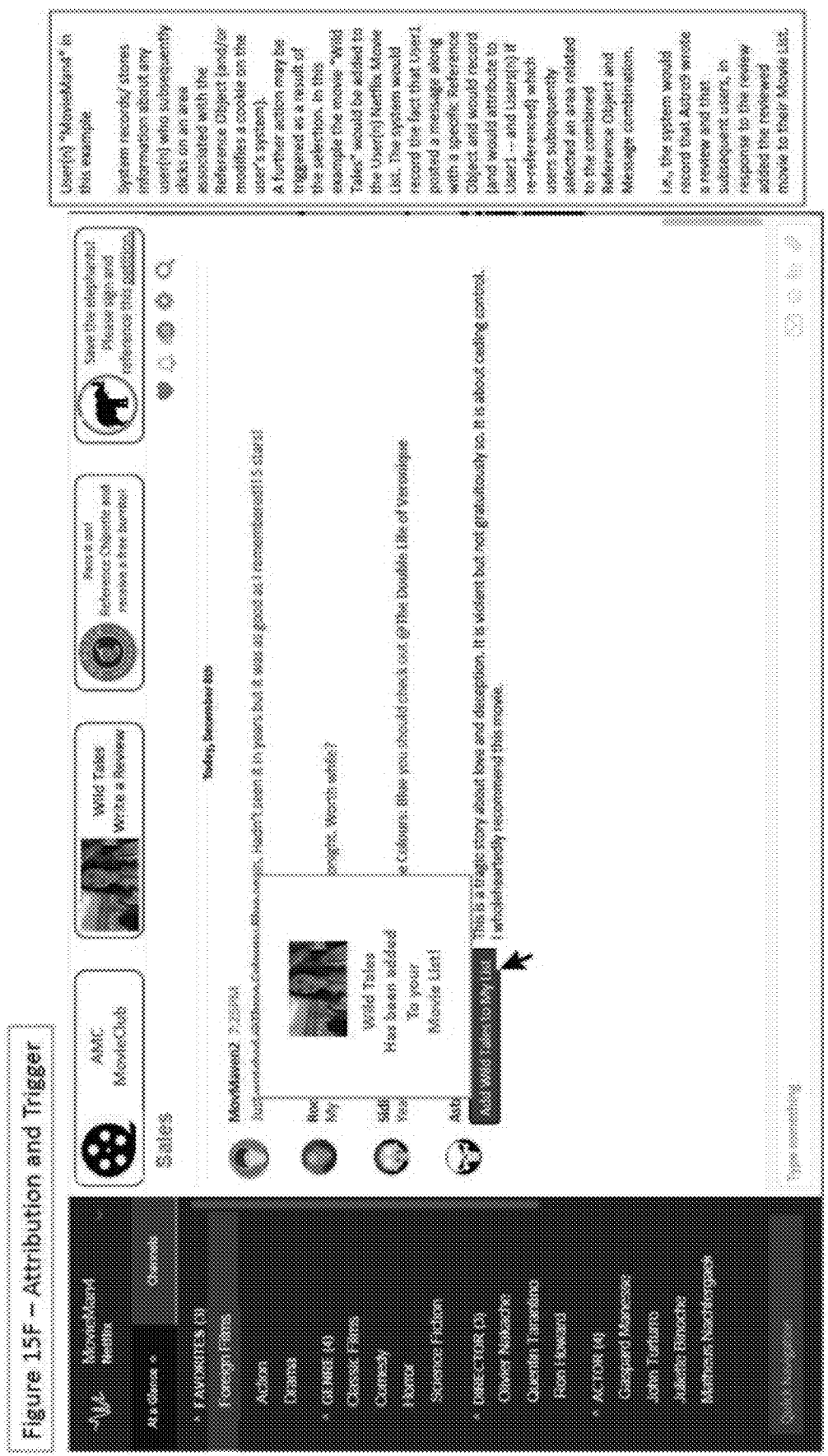

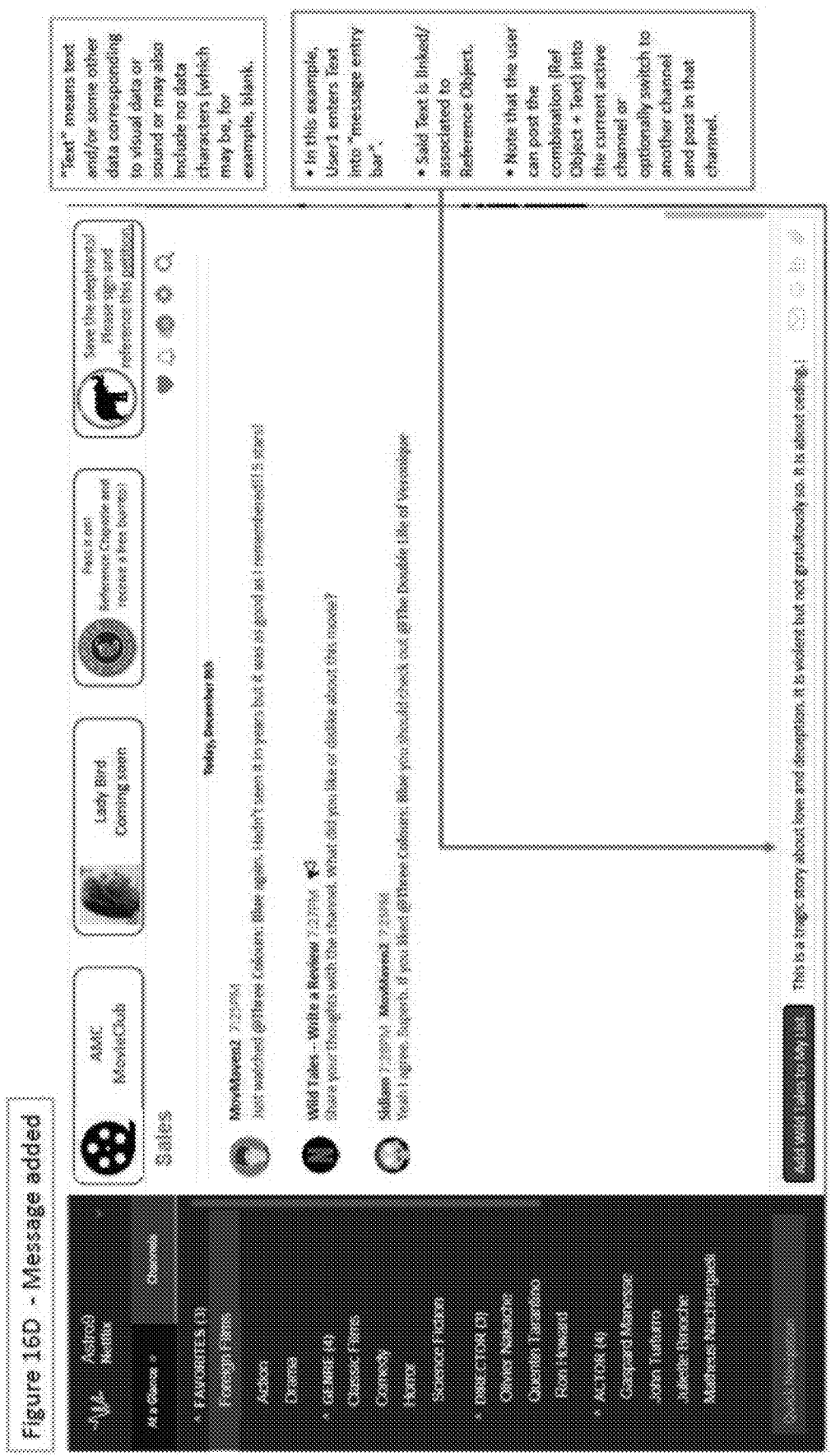

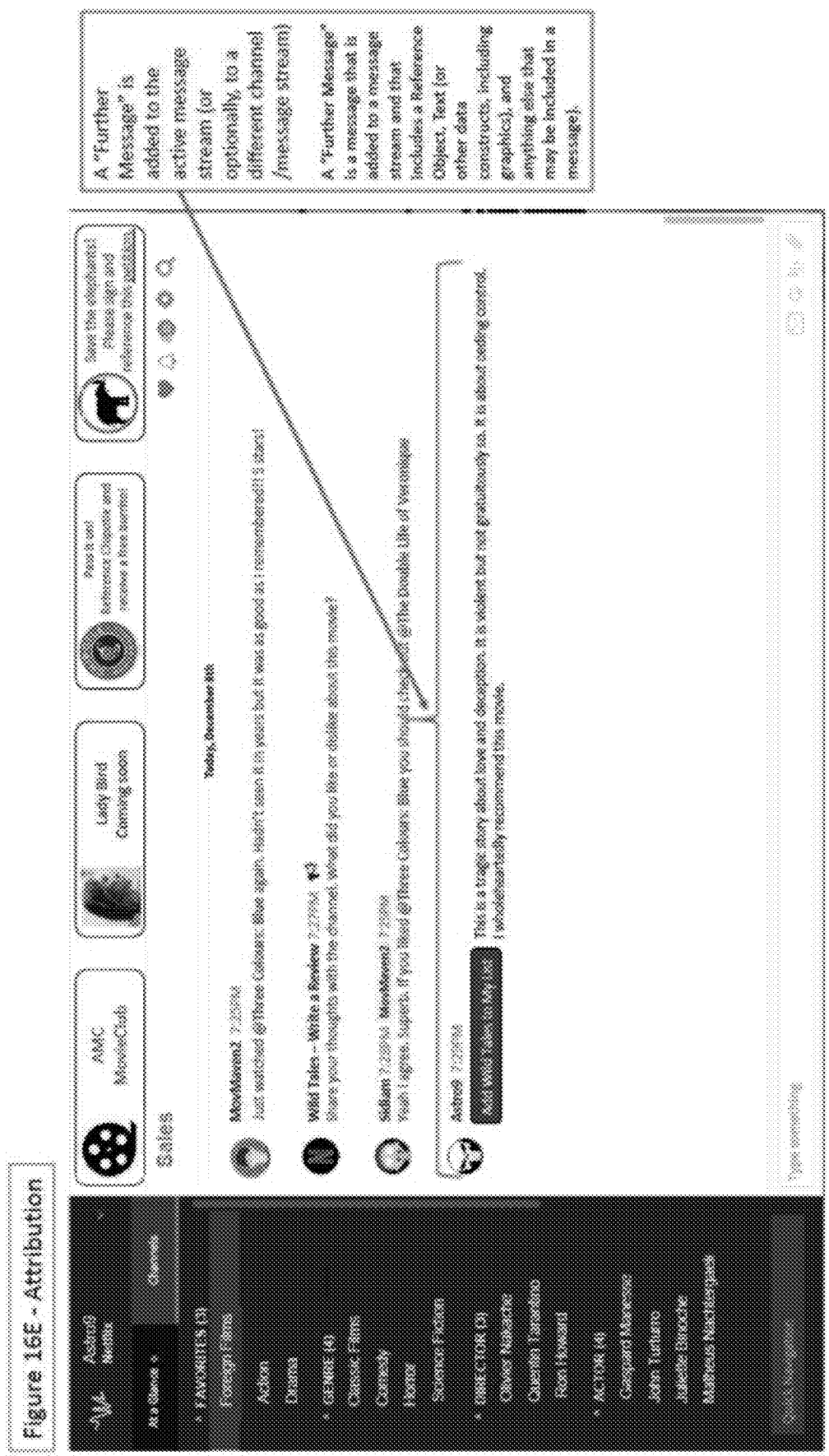
Figure 16E - Attribution

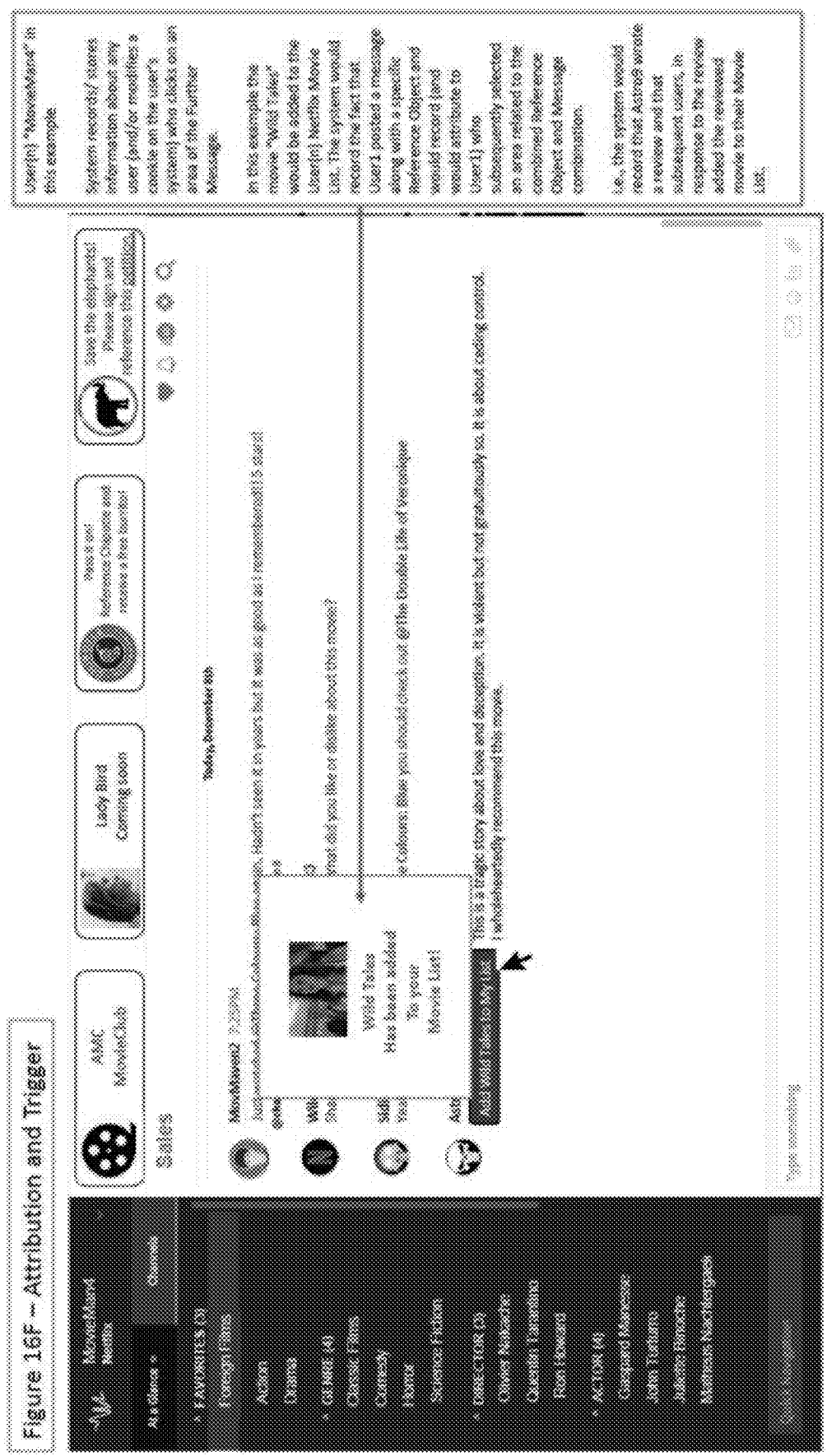

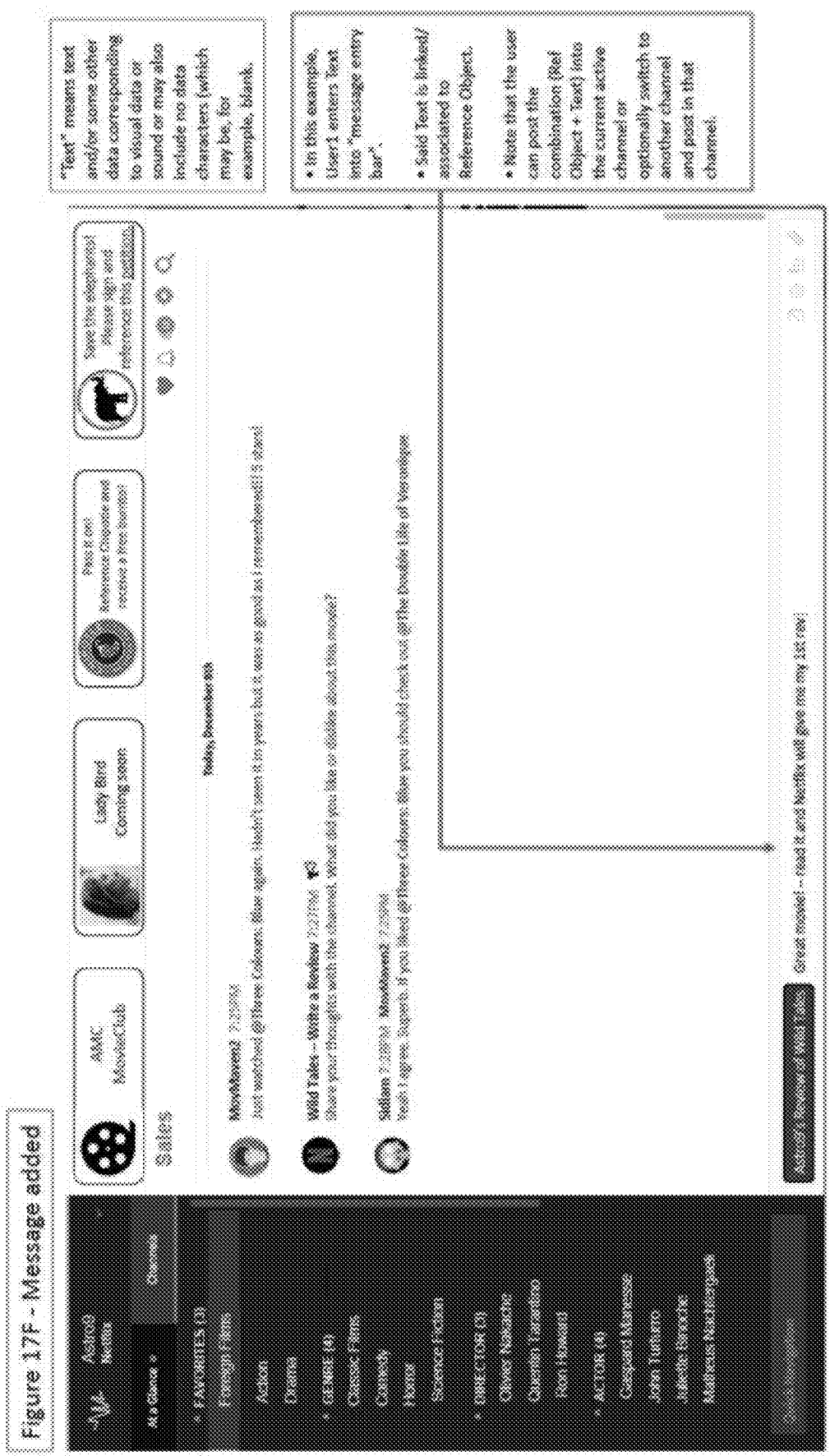

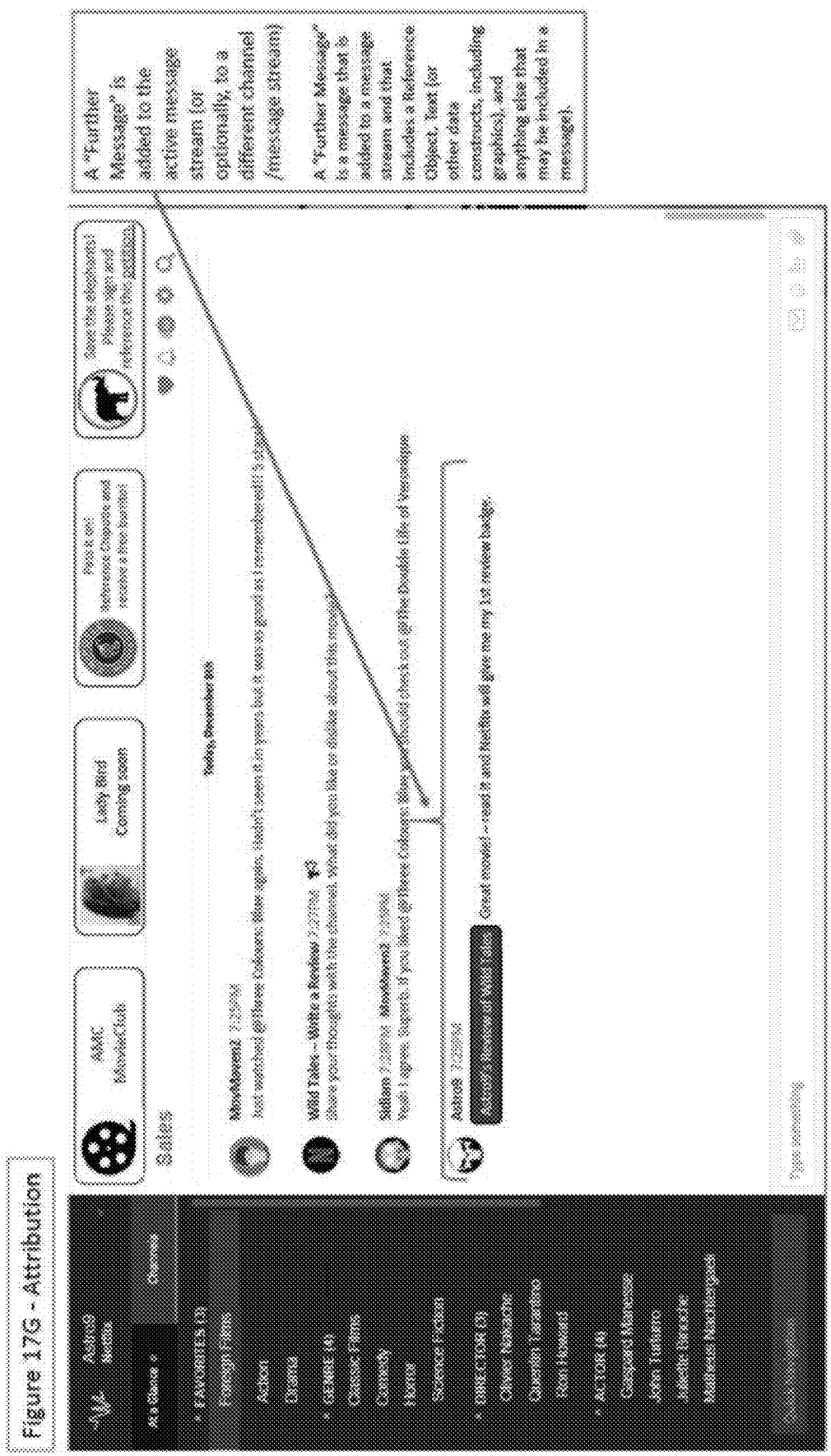
Figure 17G - Attribution

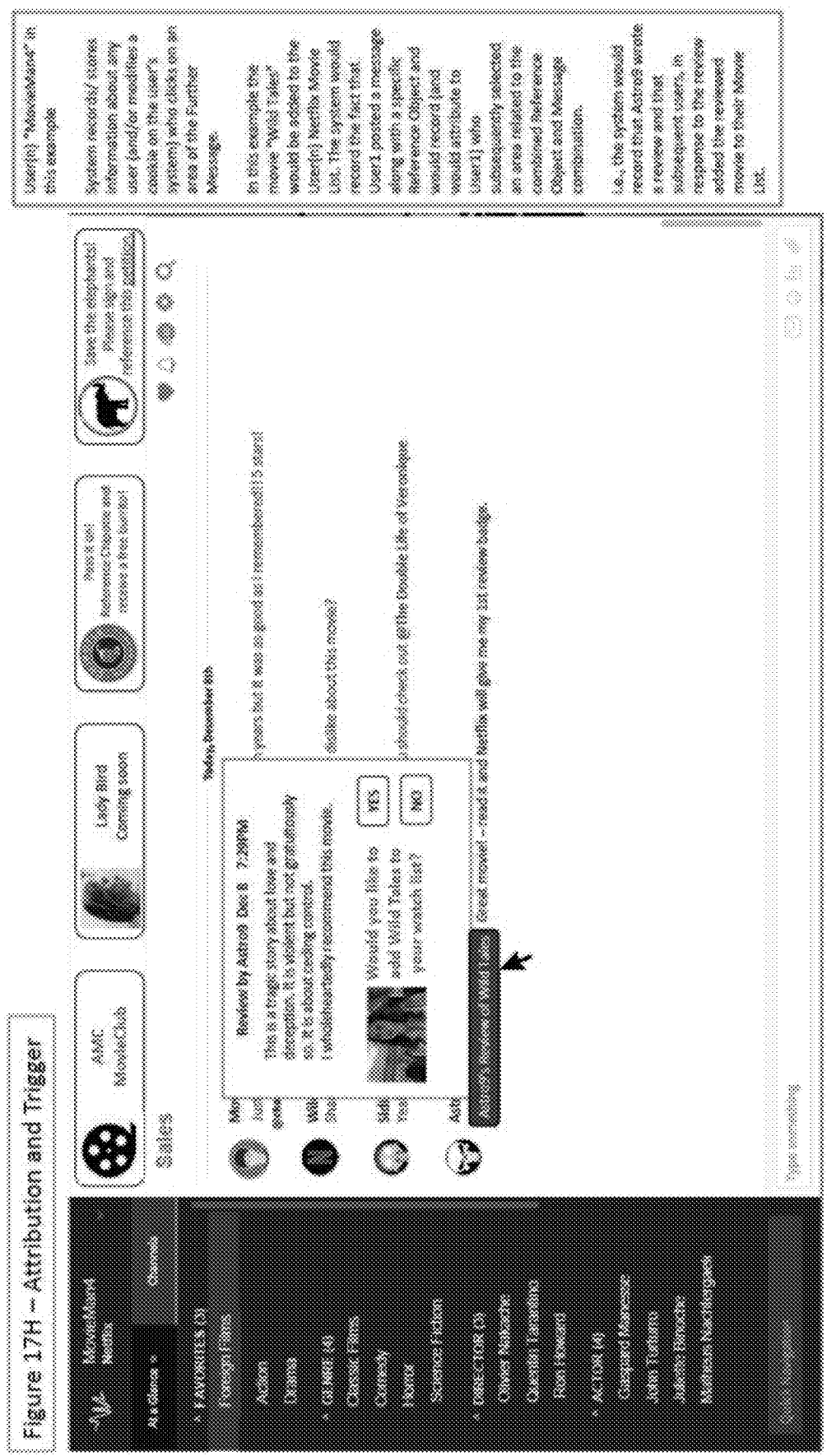

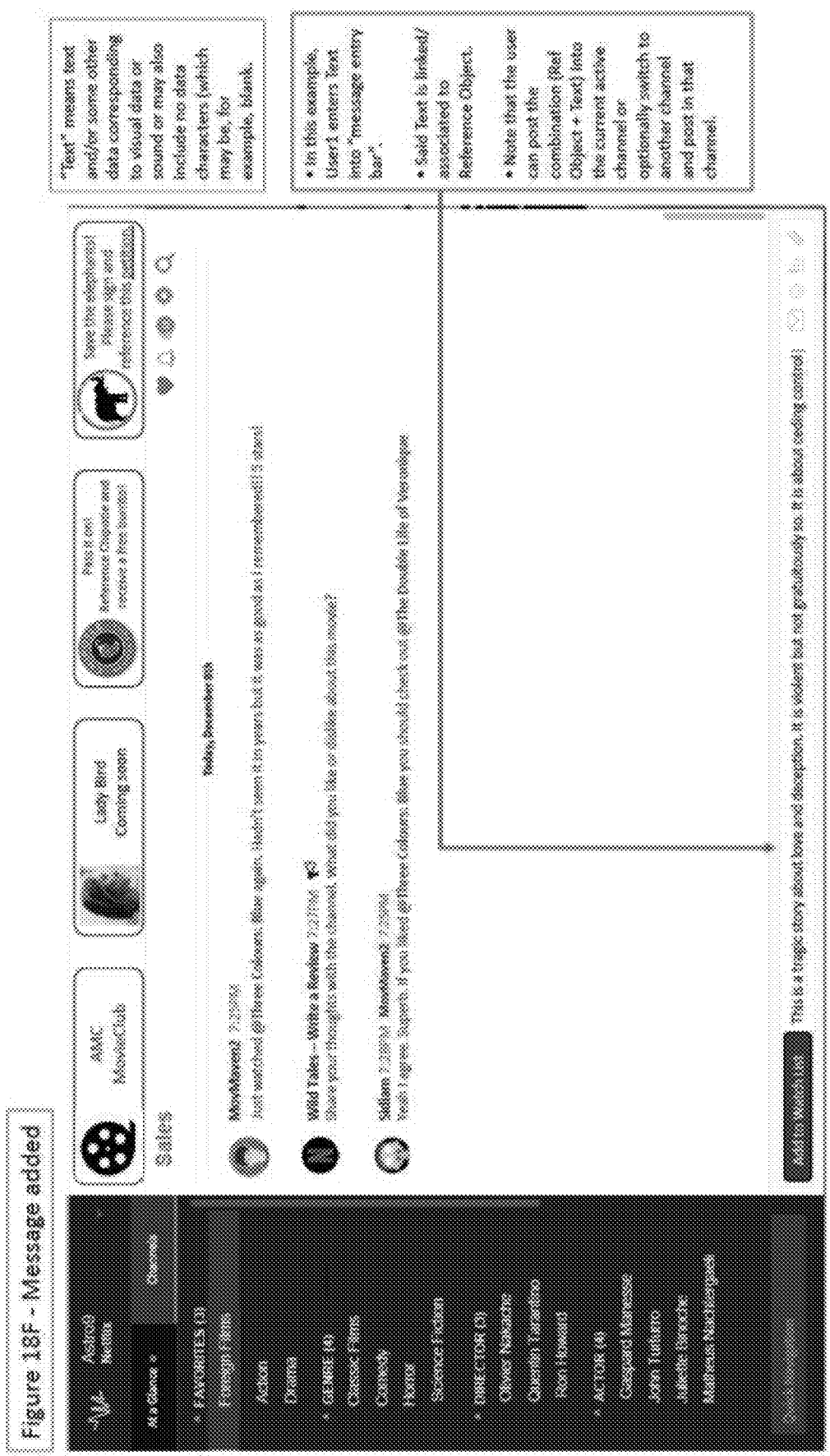
Figure 18F - Message added

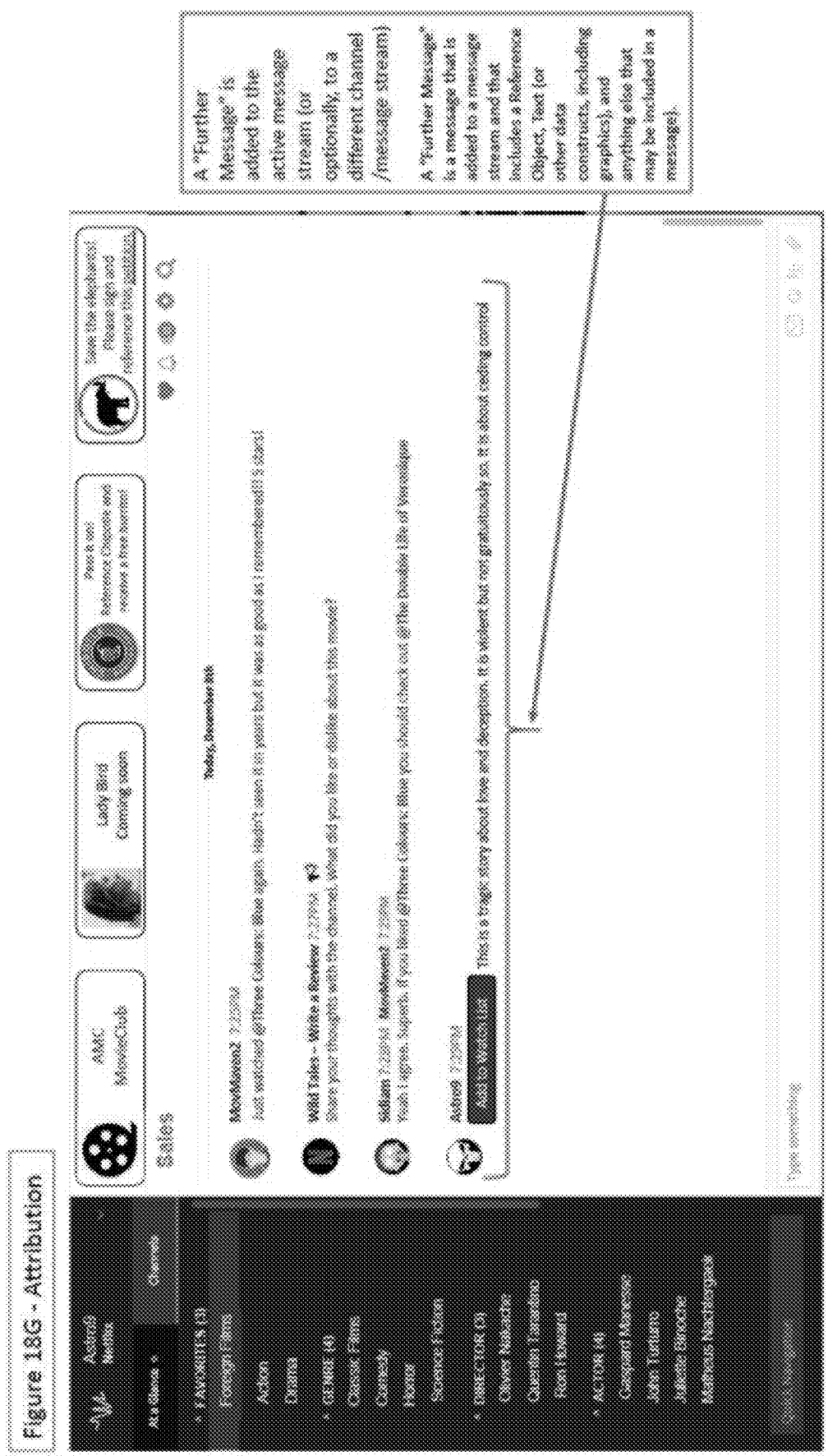
Figure 18G - Attribution

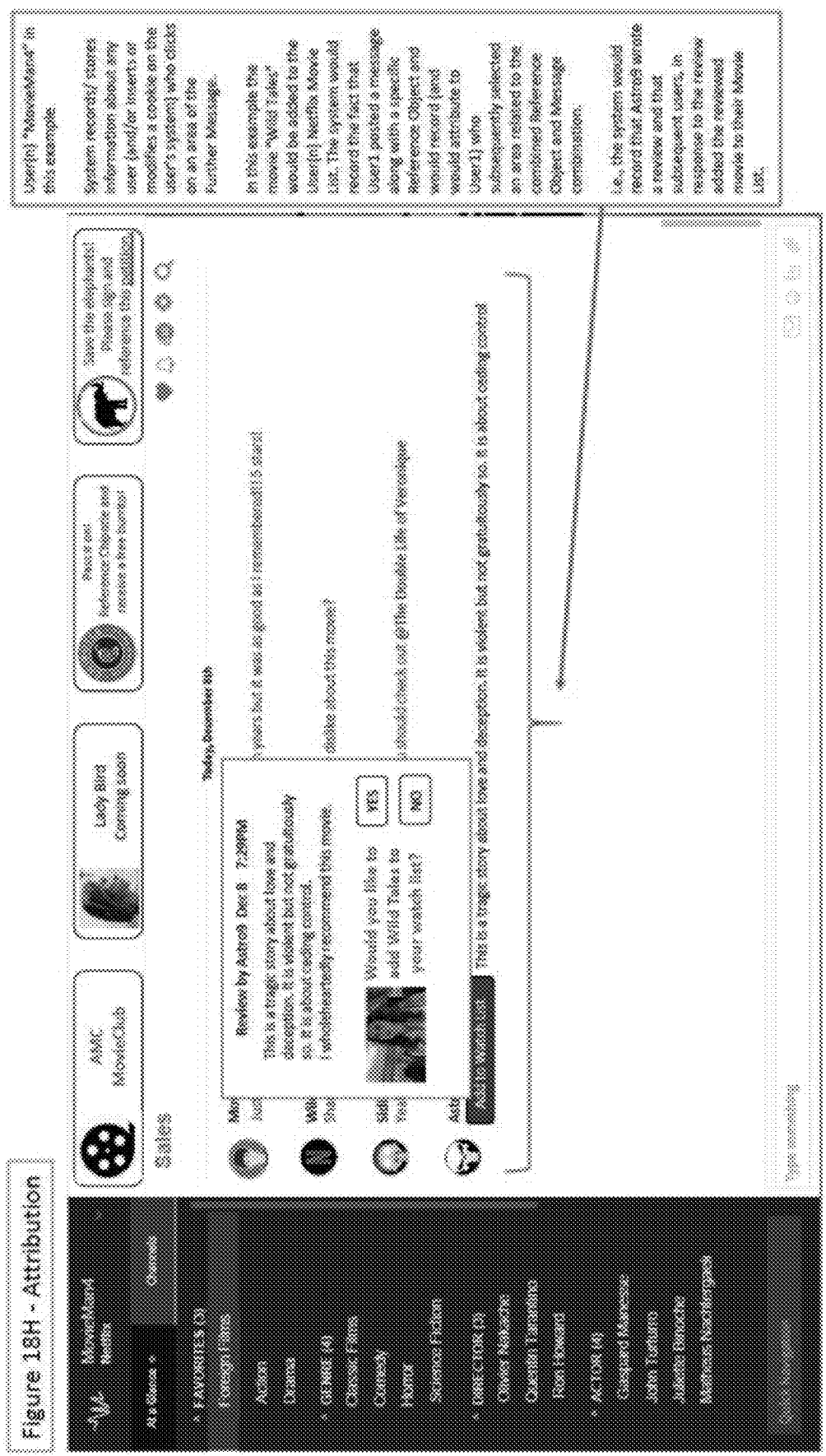
Figure 18H - Attribution

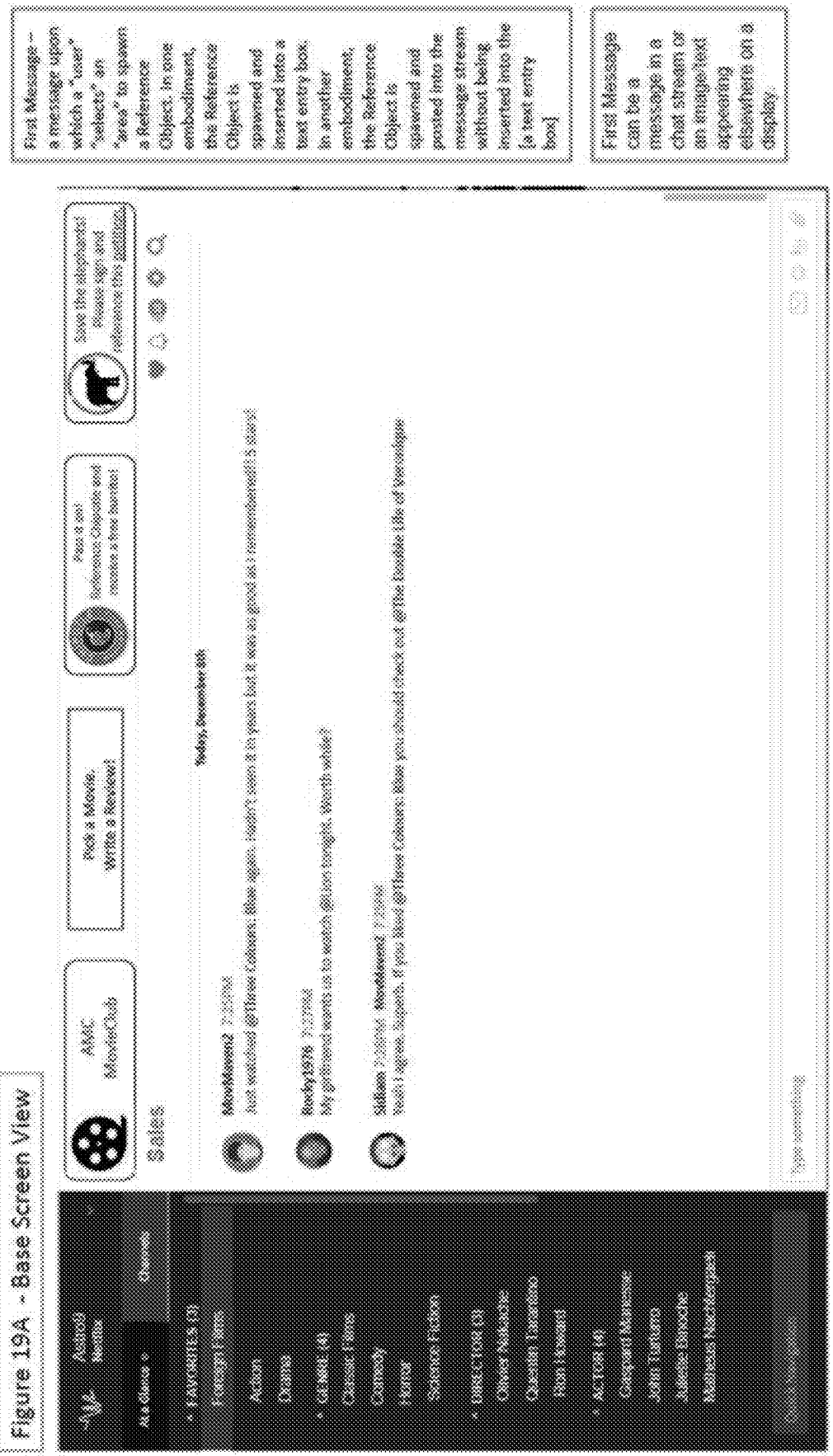
Figure 19A - Base Screen View

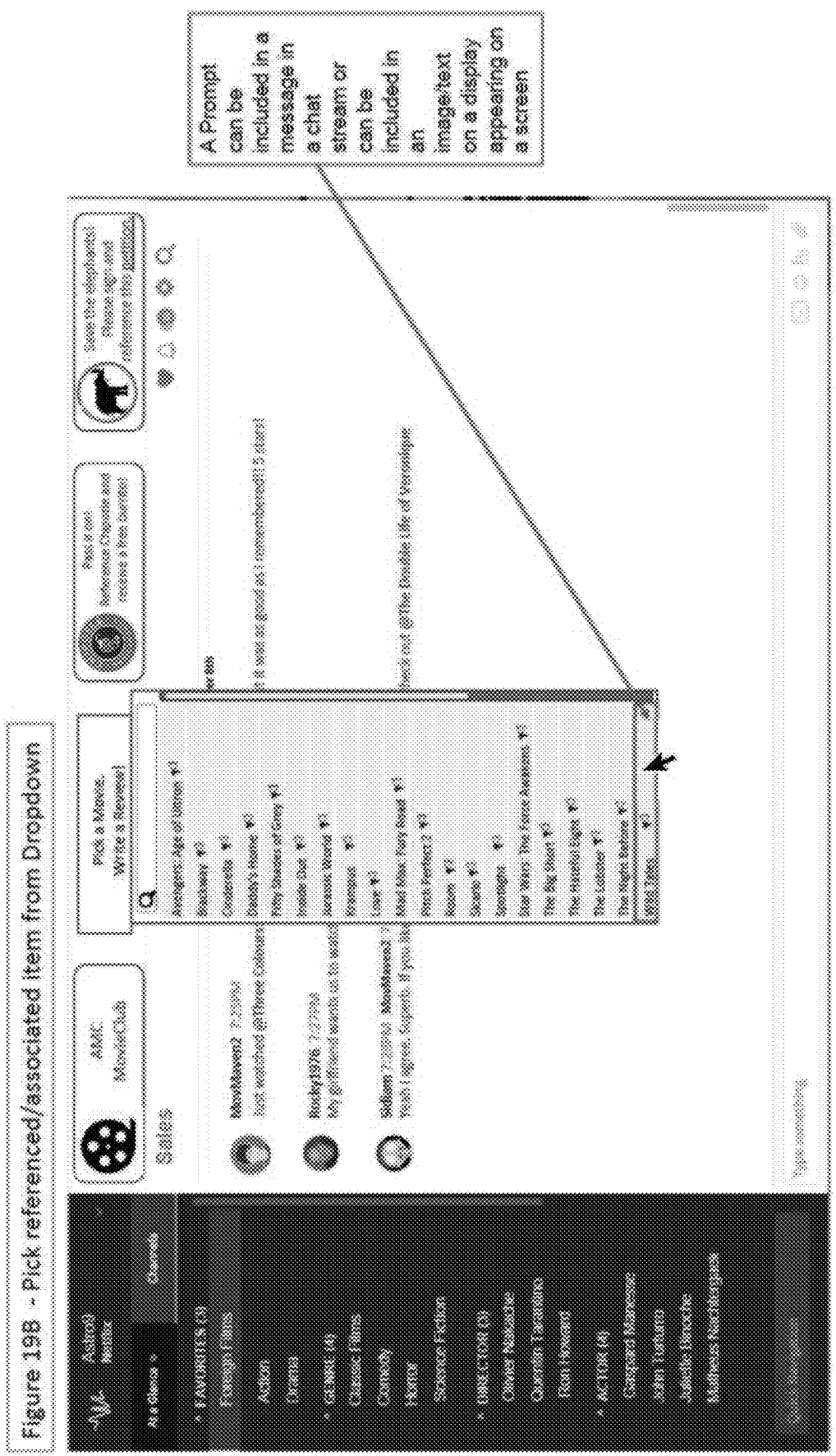

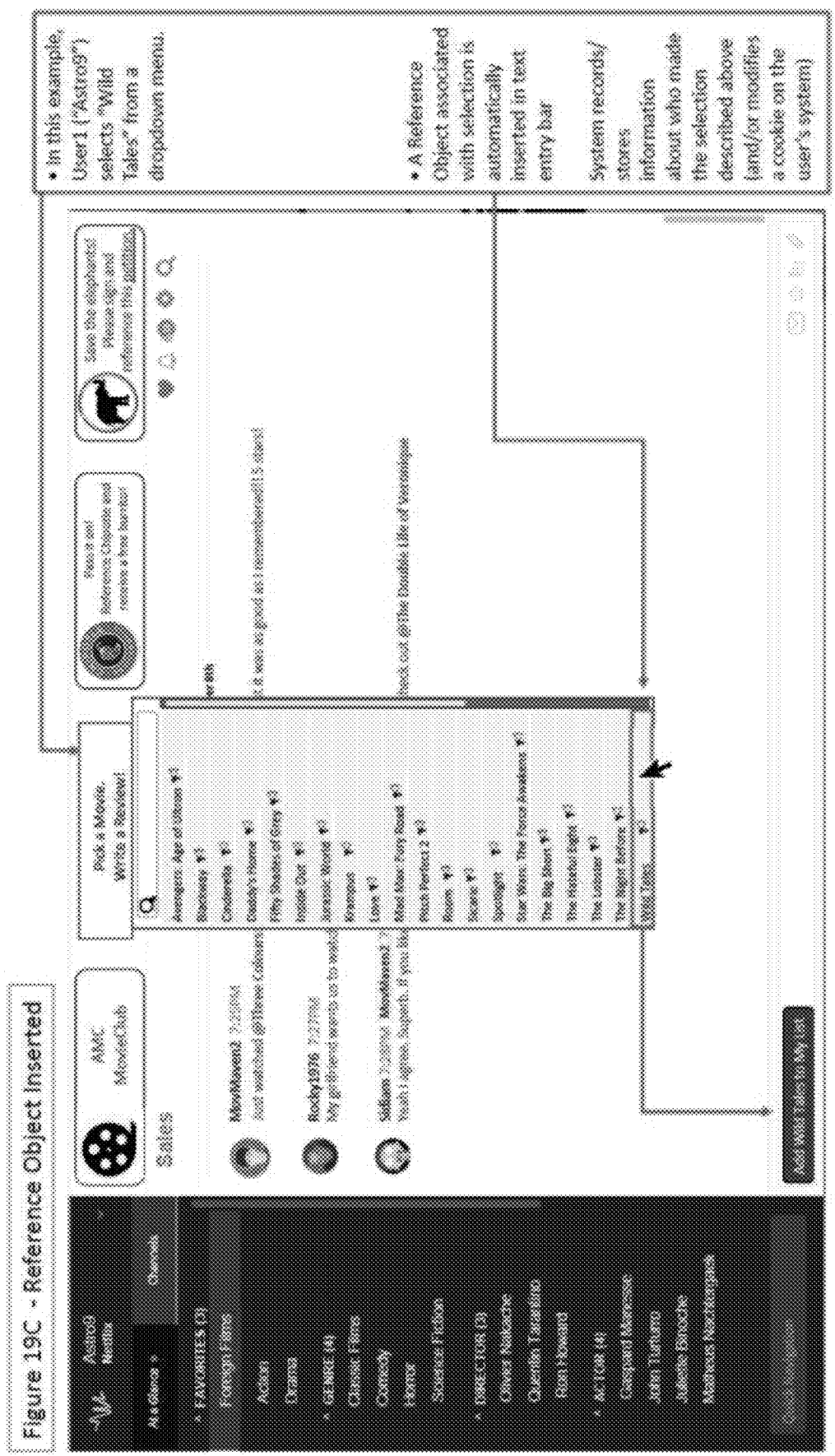
Figure 19C - Reference Object Inserted

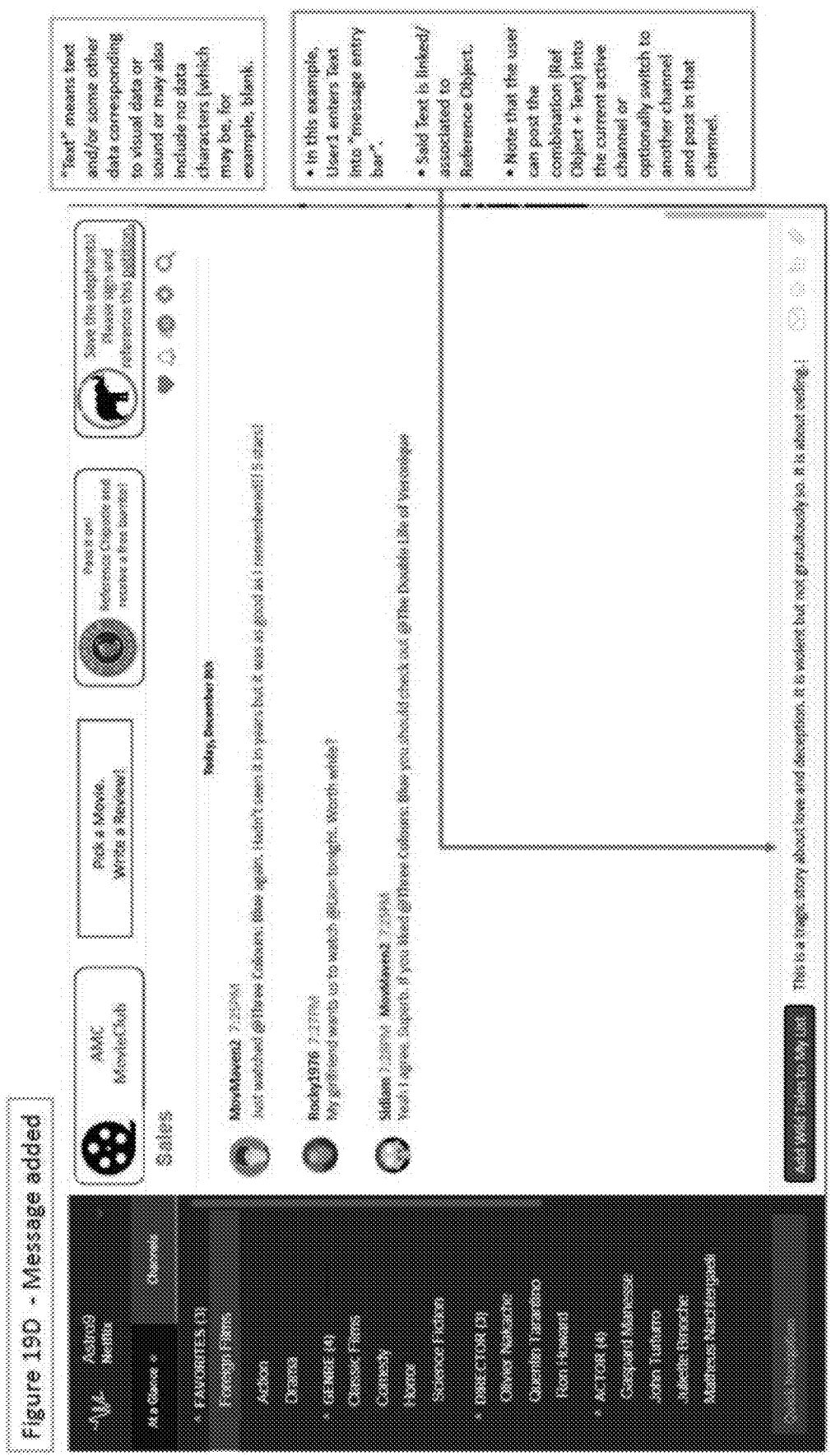

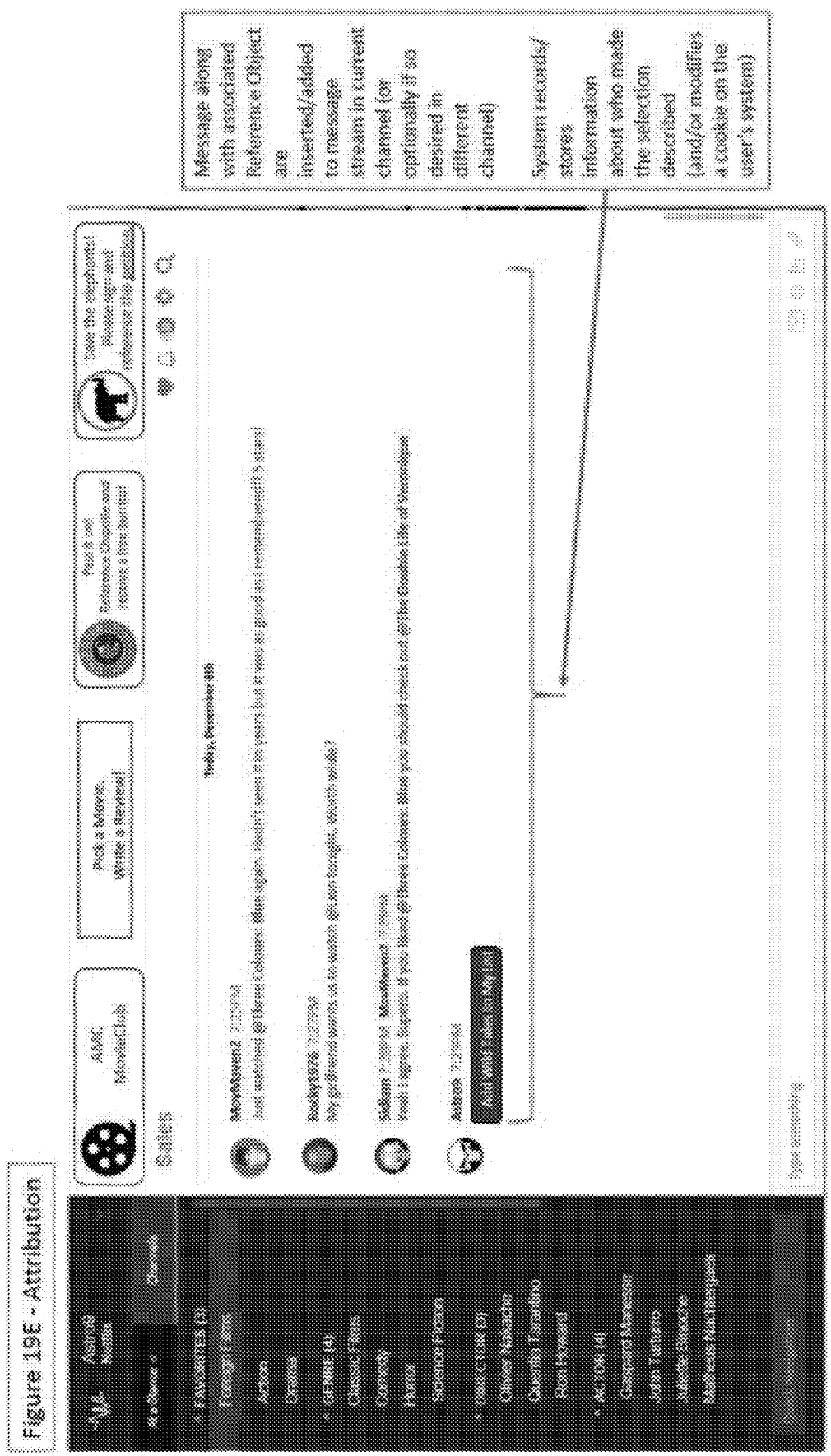
Figure 19E - Attribution

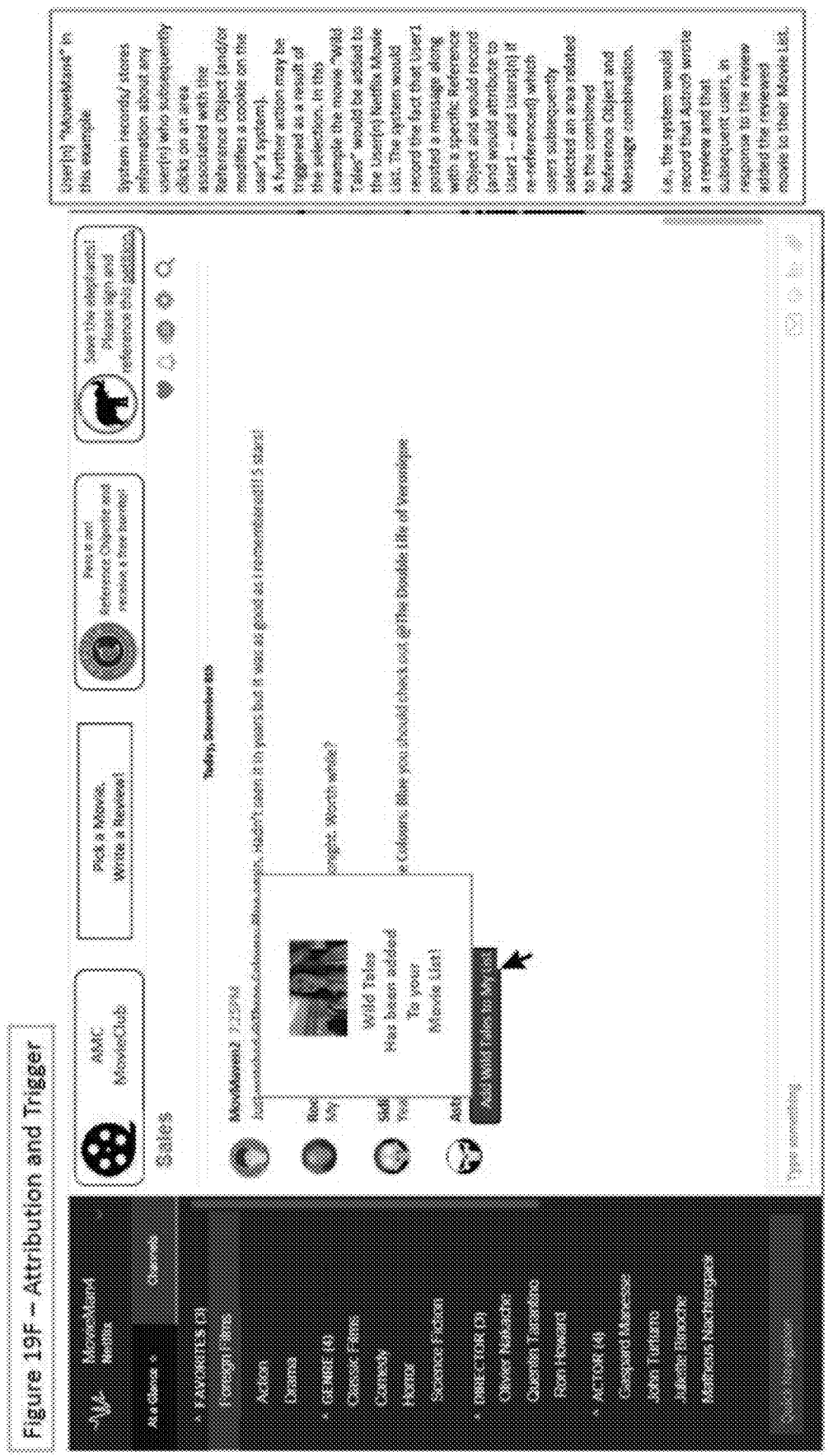
Figure 19F – Attribution and Trigger

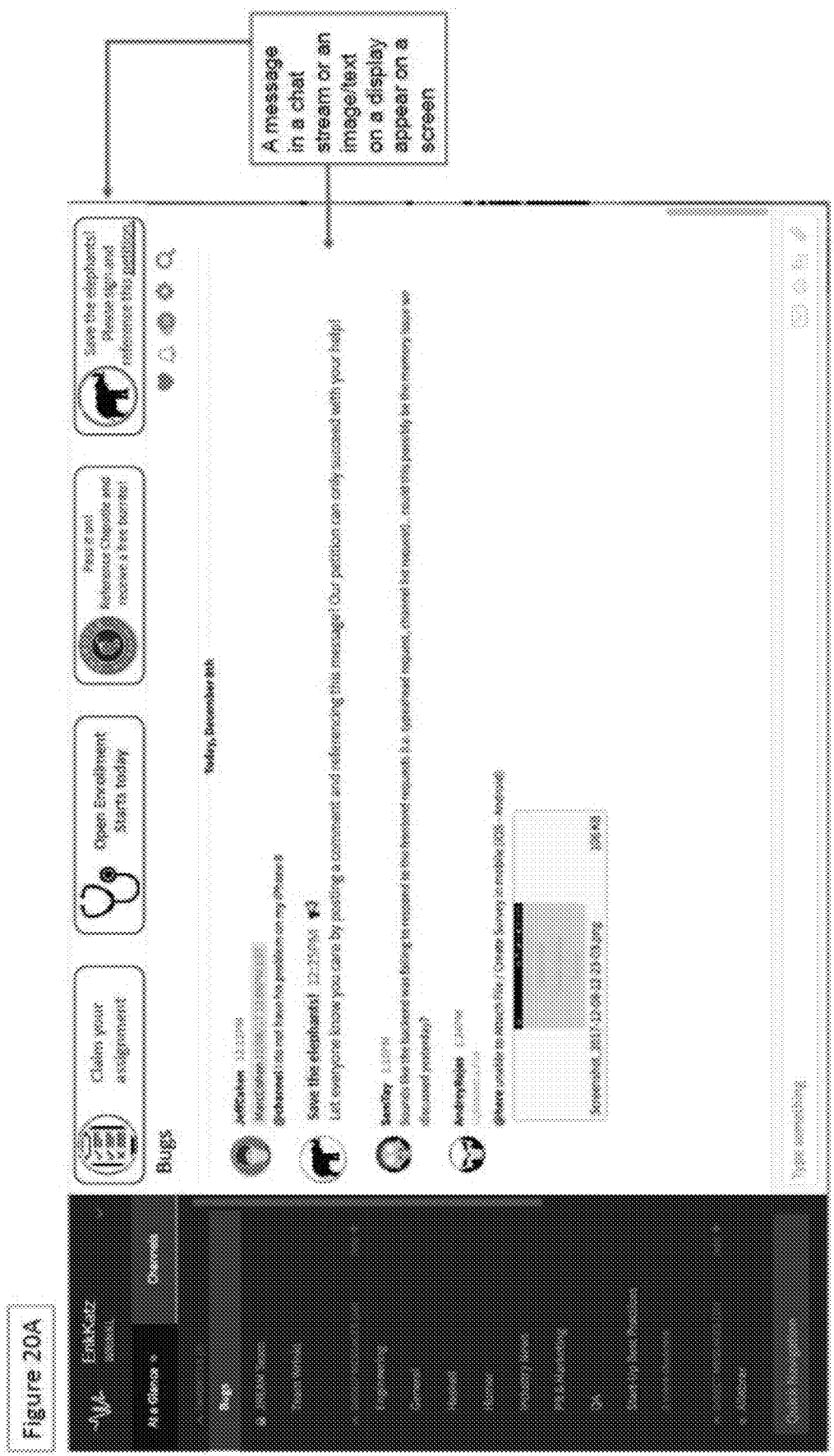

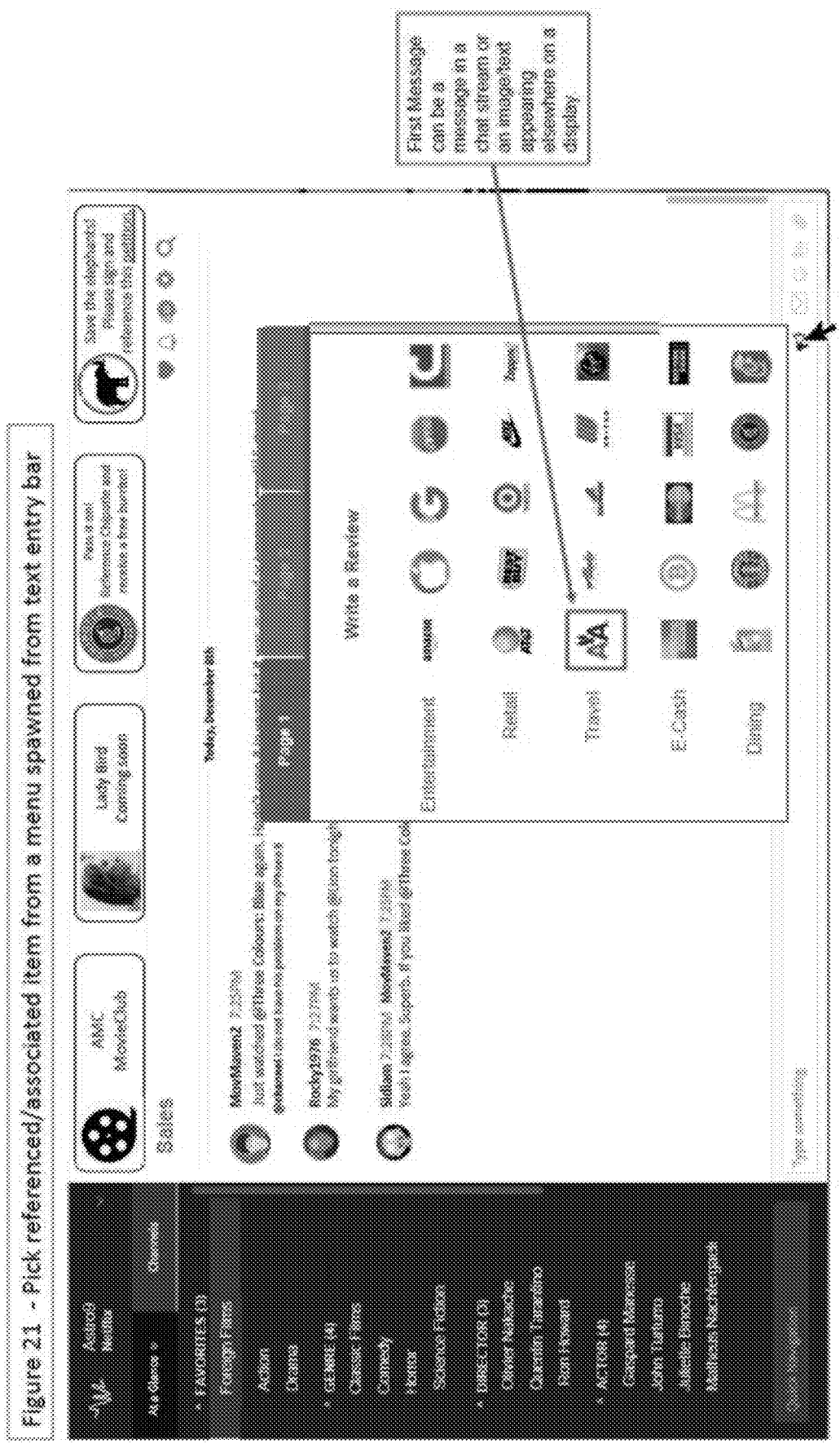

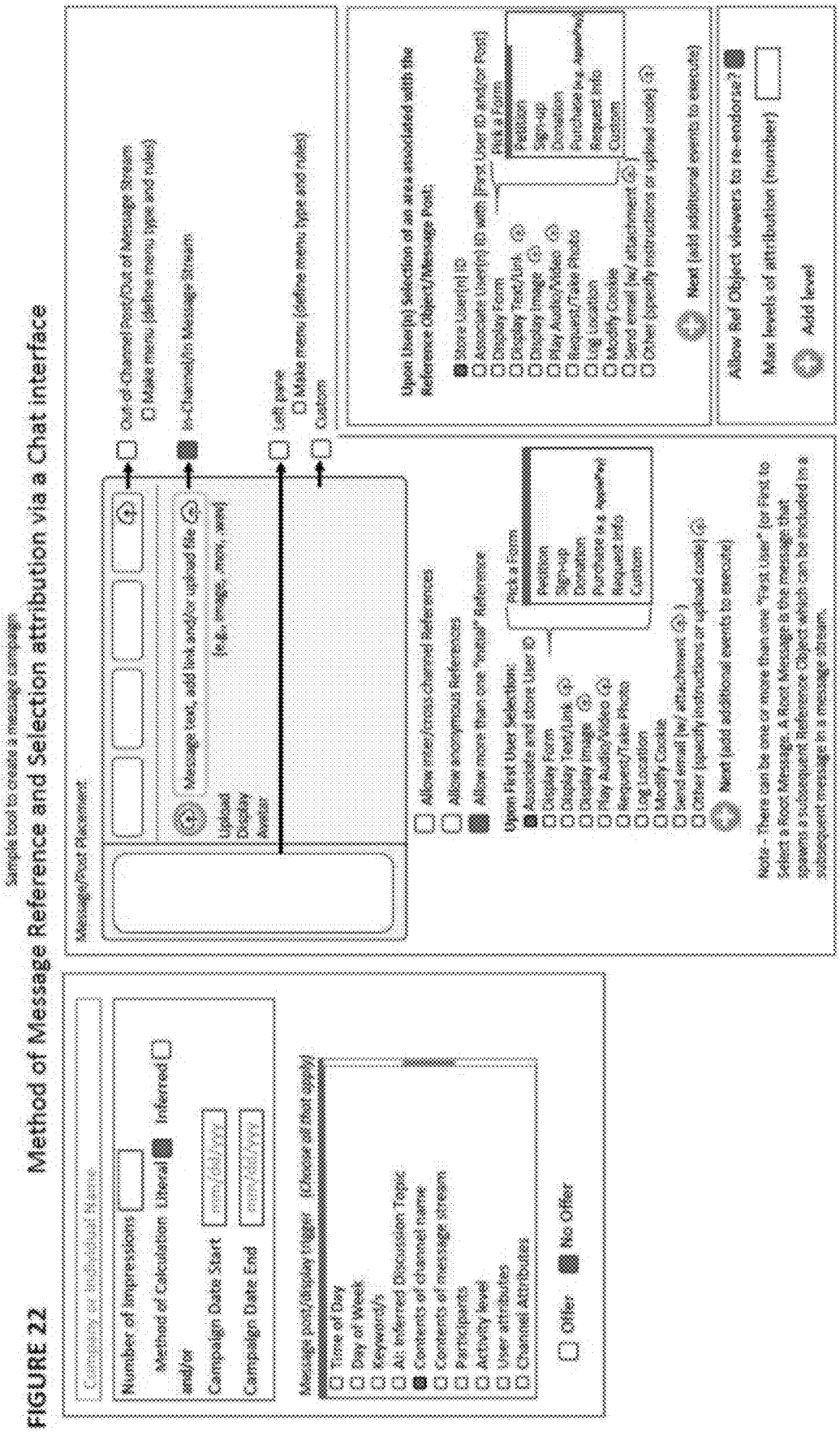
FIGURE 22  Method of Message Reference and Selection attribution via a Chat interface

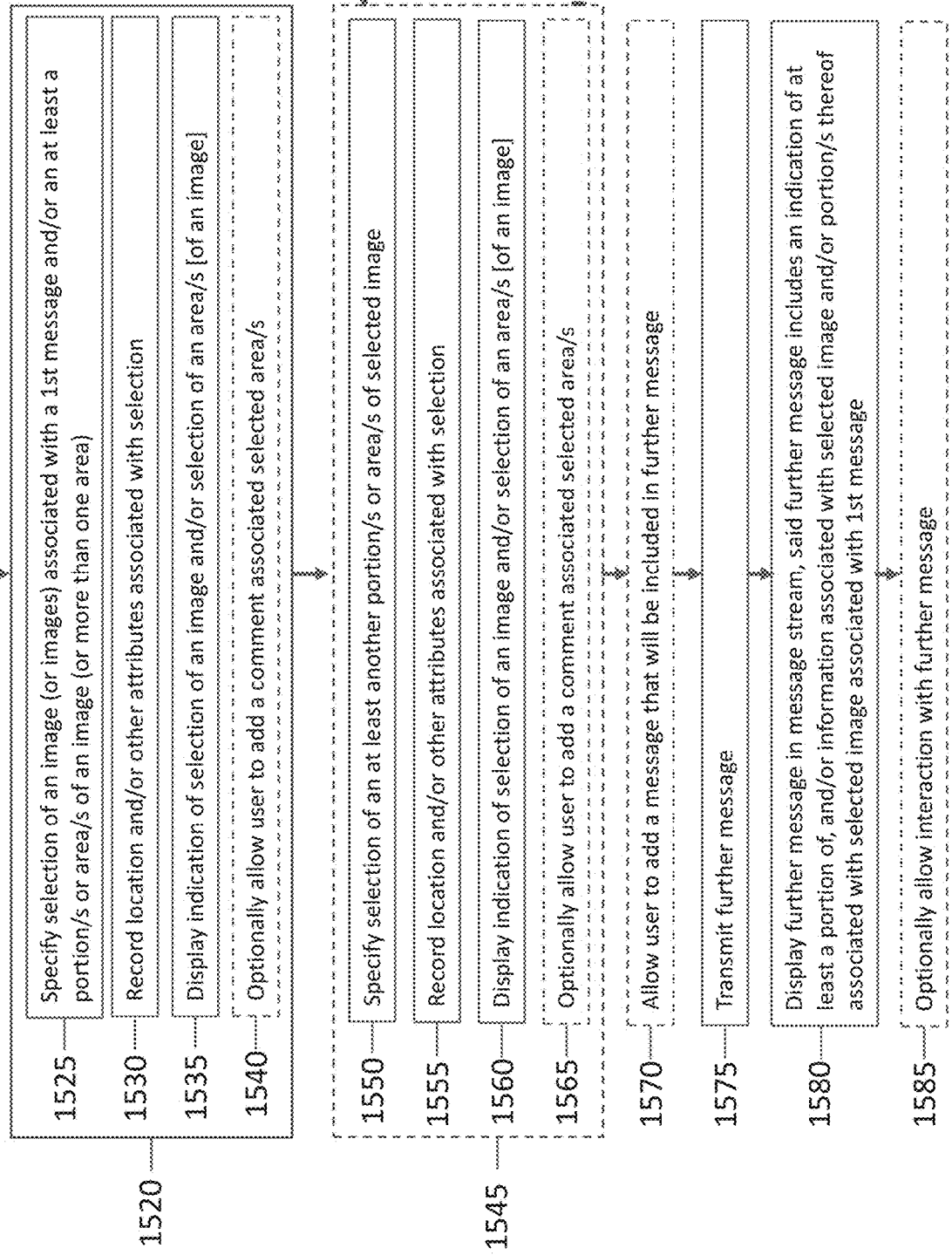

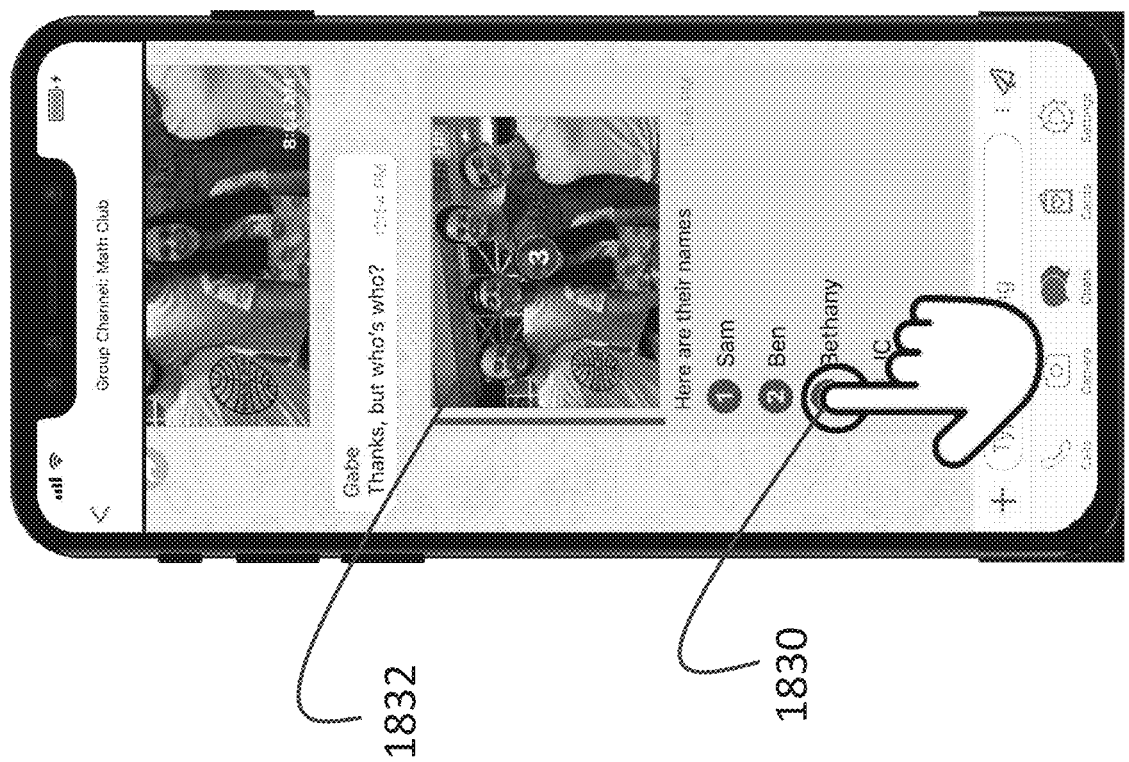

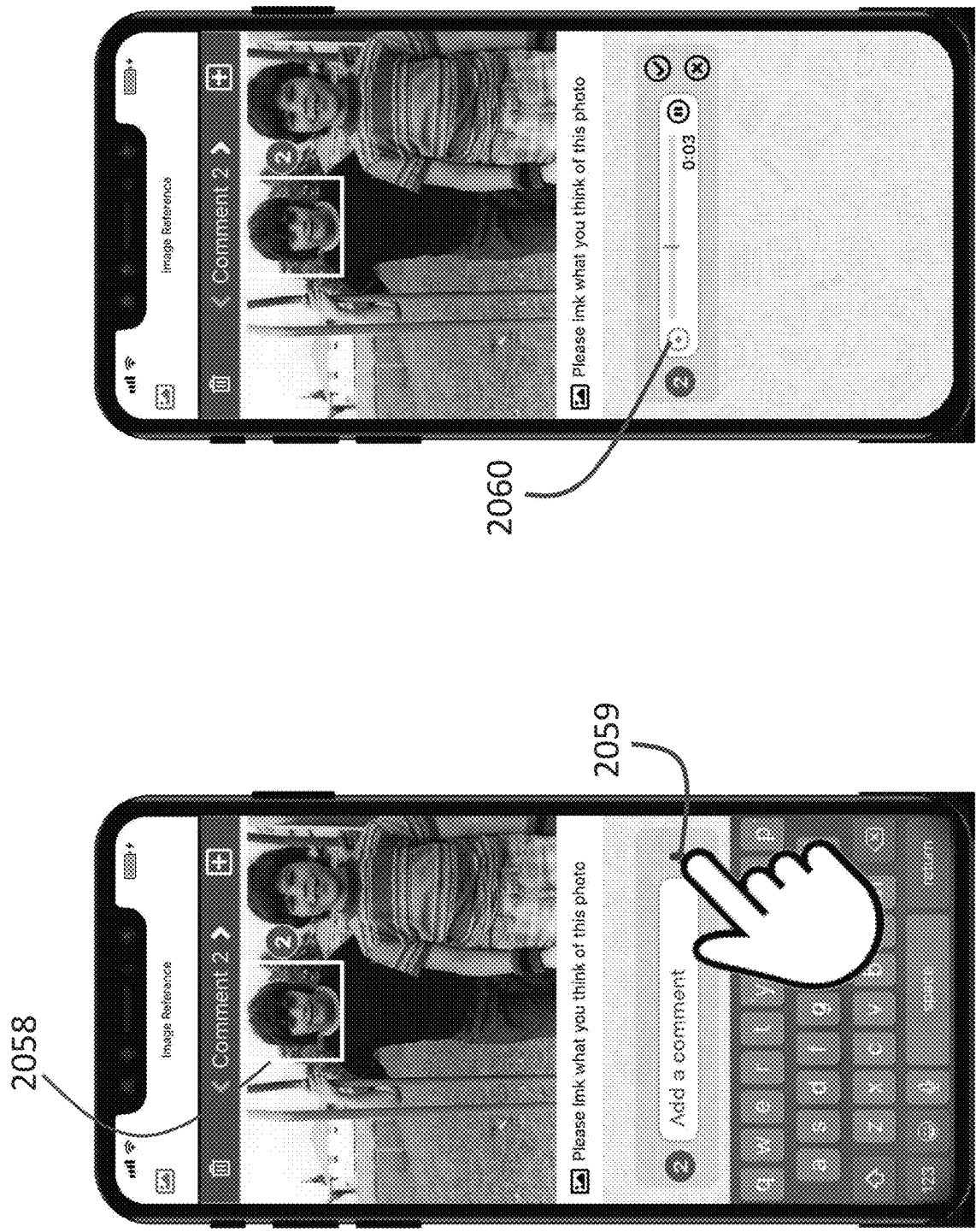

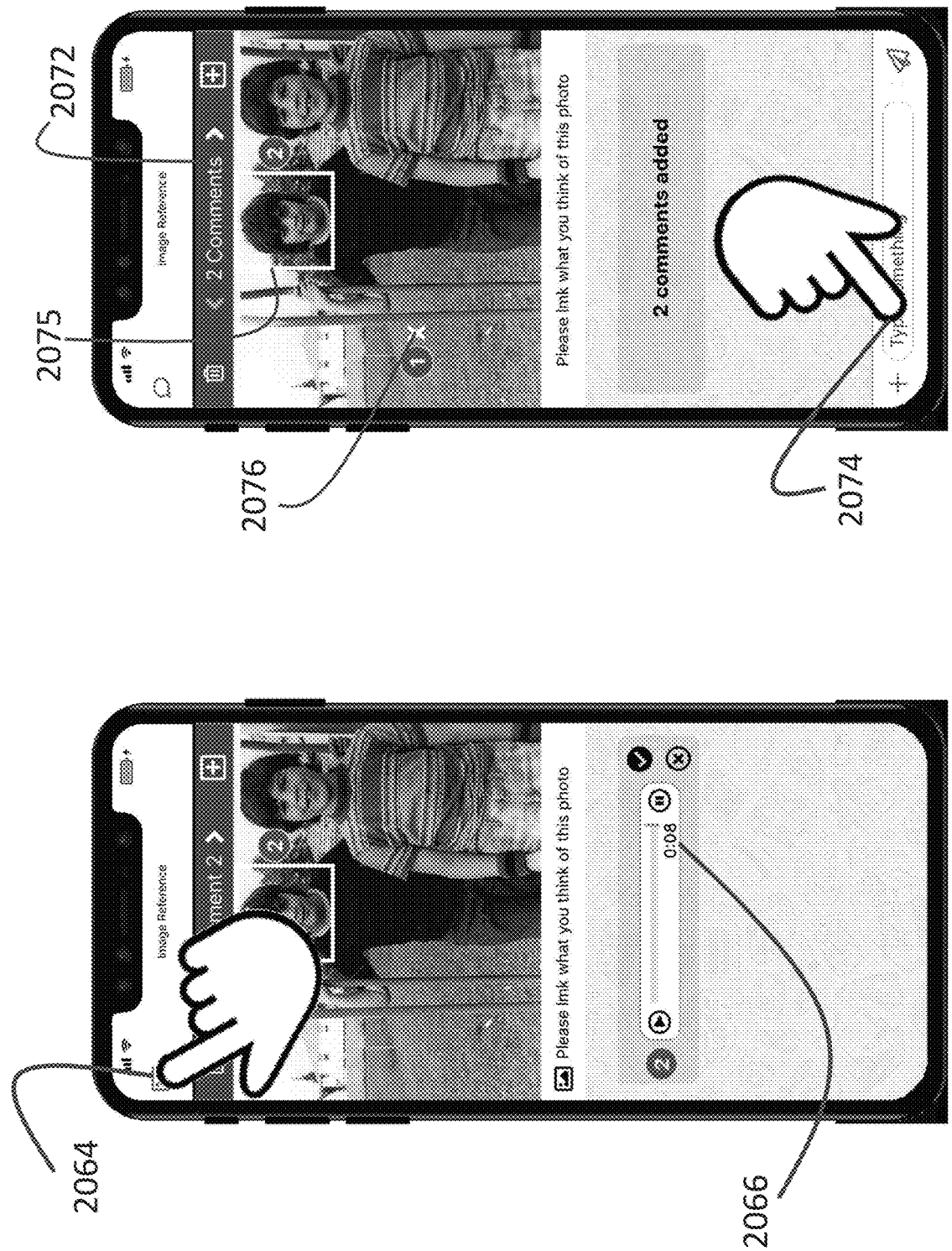

(detail view of Figure 66A step 1664 segment)

Doppelgänger (Match and Find)

APPARATUS AND METHOD FOR MESSAGE IMAGE REFERENCE MANAGEMENT

CROSS REFERENCE TO RELATED APPLICATIONS

This application is a Continuation-In-Part of U.S. patent application Ser. No. 16/712,952 filed Dec. 12, 2019, which is a Continuation of U.S. patent application Ser. No. 16/376,427, filed Apr. 5, 2019, which is a Continuation-In-Part of U.S. patent application Ser. No. 16/014,578, filed Jun. 21, 2018, which is a Continuation-In-Part of U.S. patent application Ser. No. 15/858,696, filed Dec. 29, 2017, now as U.S. Pat. No. 10,025,475, issued Jul. 17, 2018, which is a Continuation-In-Part of Ser. No. 15/431,077, filed Feb. 13, 2017, now as U.S. Pat. No. 9,860,198, issued Jan. 2, 2018. U.S. patent application Ser. No. 15/431,077, filed Feb. 13, 2017 claims the benefit of U.S. Provisional Patent Application No. 62/446,067, filed Jan. 13, 2017.

This application is also a Continuation-In-Part of U.S. patent application Ser. No. 16/376,427 filed Apr. 5, 2019 which is a Continuation-In-Part of U.S. patent application Ser. No. 16/014,578 filed Jun. 21, 2018, which is a Continuation-In-Part of U.S. patent application Ser. No. 15/609,663, filed May 31, 2017, now U.S. Pat. No. 10,009,300, which is a Continuation of U.S. patent application Ser. No. 15/293,620, filed Oct. 14, 2016, now U.S. Pat. No. 9,712,466, which claims the benefit under 35 U.S.C. § 119(e) of U.S. Provisional Patent Application No. 62/358,719, filed Jul. 6, 2016, and U.S. Provisional Patent Application No. 62/253,229, filed Nov. 10, 2015, the disclosures of all of which are incorporated by reference herein in their entireties.

This application is also a Continuation-In-Part of U.S. patent application Ser. No. 16/376,427 filed Apr. 5, 2019 which is a Continuation-In-Part of U.S. patent application Ser. No. 16/014,578 filed Jun. 21, 2018, which is a Continuation-In-Part of U.S. patent application Ser. No. 15/858,696 filed on Dec. 29, 2017, now U.S. Pat. No. 10,025,475, which is a Continuation-In-Part of U.S. patent application Ser. No. 15/431,077 filed Feb. 13, 2017, now U.S. Pat. No. 9,860,198, and which claims the benefit of priority under 35 U.S.C. § 119(e) to U.S. Provisional Patent Application 62/446,067 filed Jan. 13, 2017, and U.S. Provisional Patent Application 62/518,905 filed on Jun. 13, 2017, the disclosures of all of which are incorporated by reference herein in their entireties.

This application is a Continuation-In-Part of U.S. Ser. No. 16/376,427 which claims the benefit under 35 U.S.C. 119(e) of U.S. Provisional Patent Application 62/666,137, filed May 3, 2018, and U.S. Provisional Patent Application 62/783,410, filed Dec. 21, 2018, the disclosures of all of which are incorporated by reference herein in their entireties.

FIELD OF THE INVENTION

The present invention relates to computer messaging and more particularly to management thereof. In particular, an apparatus and method are disclosed for improving computer operational efficiency through message management.

BACKGROUND OF THE INVENTION

Electronic communication, including messaging, provides a very efficient manner of information exchange. In such forms of electronic communication, messages are exchanged between multiple parties in order to convey information. In one known form of messaging, two users operate respective client devices and effectively engage in conversation by transmitting messages between each other. Such communication may be in the form of a single continuous stream of back and forth messaging. Also, in some situations, more than two users (operating, for example, more than two respective client devices) may be communicating in a single continuous stream. While a single stream of messages may be transmitted in an ongoing sequence, it is also possible to have multiple channels, each with their own respective stream of messages.

A "conversation" of messages may be short or it may occur over an extended period of time. Such a period of time can last for hours, days, or even years. During the process of such a conversation, a large quantity of messages may be transmitted between multiple users. As an example, these messages may contain images. It is known to scroll through (or otherwise visually traverse) messages to view an image associated with an earlier message.

BRIEF DESCRIPTION OF THE DRAWINGS

FIG. 9 is an exemplary screen shot that illustrates exemplary operation of an exemplary embodiment of the present invention.

FIGS. 11A-11D are exemplary screen shots that illustrate exemplary operation of an exemplary embodiment of the present invention.

FIGS. 13A-13D are exemplary screen shots that illustrate exemplary operation of an exemplary embodiment of the present invention.

FIGS. 15A-15F are screen shots that illustrate operation of an exemplary embodiment of the present invention.

FIGS. 16A-16F are screen shots that illustrate operation of an exemplary embodiment of the present invention.

FIGS. 17A-17H are screen shots that illustrate operation of an exemplary embodiment of the present invention.

FIGS. 18A-18H are screen shots that illustrate operation of an exemplary embodiment of the present invention.

FIGS. 19A-19F are screen shots that illustrate operation of an exemplary embodiment of the present invention.

FIGS. 20A-20E are screen shots that illustrate operation of an exemplary embodiment of the present invention.

FIG. 21 is a screen shot that illustrates operation of an exemplary embodiment of the present invention.

FIG. 22 illustrates an exemplary user interface.

FIG. 23 is a flowchart diagram that illustrates exemplary message referencing in accordance with one or more exemplary embodiments of the present invention.

FIGS. 24-34 are exemplary screen shots that illustrate exemplary operation of one or more exemplary embodiments of the present invention.

FIGS. 35-60 are exemplary screen shots that illustrate examples of the operation of one or more exemplary embodiments of the present invention.

FIGS. 66A and 66B are exemplary flowchart diagrams that illustrate exemplary embodiments of the present invention. FIG. 66B illustrates a detailed view of a portion of FIG. 66A.

Figure 1:
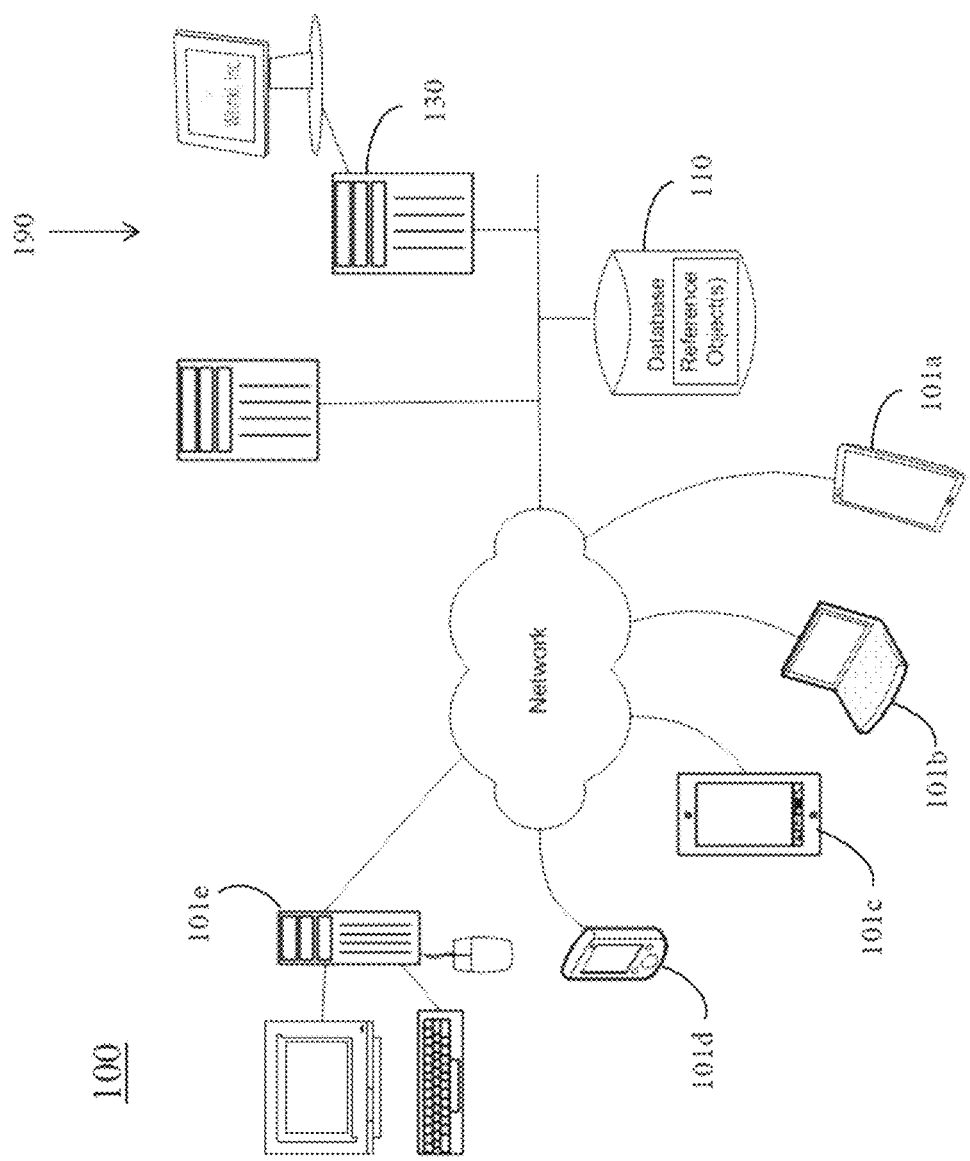
FIG. 1 is a block diagram that illustrates an exemplary network with associated computing devices in accordance with an exemplary embodiment of the present invention.

The above Figures may include accompanying text that provides explanation regarding what is shown. It is understood that the accompanying text is being provided merely for explanatory purposes, is with regards to exemplary embodiments of the present invention, and should not be construed as limitations on the scope of the present invention.

SUMMARY OF THE INVENTION

A method for referencing an image comprises the steps of displaying the image on a first display device, receiving selection of at least a portion of the image via the first display device, receiving content, wherein the content is associated with and digitally linked to at least the portion of the image for which selection was received, transmitting the image as part of a message included in a continuous stream of messages from the first display device to a second display device, displaying at least a portion of the message on the second display device as part of the continuous stream of messages, and displaying the content on the second display device and indicating that the content is associated with the specific portion of the image.

Overview

The present invention relates to a method and apparatus with regard to management of communications. This overview is being provided to set forth an abbreviated explanation of the present invention, and is being provided for illustrative purposes only. Various technical features have been omitted. This overview merely describes one exemplary embodiment of the present invention, to enable partial understanding of the invention, and should not be construed as a limitation on the scope of the present invention. The Detailed Description should be carefully reviewed to obtain a more comprehensive explanation of the present invention.

Names of people and the action of commenting regarding a portion of an image are described below merely as an analogy, to facilitate an understanding of digital communications management in accordance with an exemplary embodiment of the present invention.

An exemplary embodiment of the present invention relates to the ability to comment on a portion of an image within a message stream. While a group of users may exchange comments regarding an image, it may be preferable for a comment to be digitally linked to the image (or portion thereof) being described. In this manner, a user reading a comment about an image (or portion thereof) may be able to quickly and easily see the image being commented on. Without such digital linking, a user may need to physically scroll and visually search through one or more message streams to locate the image being commented on.

Assume, for example, that Deena and Jeff are exchanging messages in a message stream. Jeff has sent Deena a photo (as part of a message exchange) using their respective display devices (e.g. smartphones) and Deena wishes to comment regarding an area of the photo. Deena selects (e.g. on her smartphone) the area of the photo about which she wishes to comment. She also enters her comments about the area (into her smartphone). She hits "send" and the photo appears on Jeff's smartphone with the selected area of the photo indicated. In particular, the photo appears in the message stream in which Jeff and Deena are participating. Deena's comments also appear on Jeff's smartphone as part of the message stream. Deena's comments and the selected area of the photo are digitally linked together. Jeff is thus able to easily change the view on his smartphone, viewing the image with the selected area and viewing the comments.

Again, the above description is merely an example. The "selected area" may be the entire image. The "comments" may not necessarily be text. Jeff's image may initially appear to Deena outside of the message stream. Other differences are described for example in the following detailed description.

DETAILED DESCRIPTION

The present invention relates to messaging and in particular to the ability to select an image and/or area of an image on a display, to digitally link content to the selected image and/or image area, to display the selected image and/or image area on a display device as part of a continuous stream of messages, to display the content on the display device, and to indicate that the content is associated with the selected image and/or image area. In one embodiment, the selected image and/or image area is selected from a message in a message stream (which may be the same "continuous stream of messages" referred to above or a different continuous stream of messages). With regard to messaging, what is referred to is the ability for one or more users to provide a series of messages. Messages typically occur in a stream, wherein each message comprises one or more elements of data. The data included in a message is often text, but this is merely exemplary as messages can include other data elements, including possibly any kind of data (e.g. audio, video, animation, applications, 2D images, 3D images, web links, photos, stickers, gifs, etc.).

In one or more exemplary embodiments of the present invention, a method and apparatus improves the operation of a computer device, by providing links that enable a computer device to operate with greater efficiency. In particular, in several exemplary embodiments, when one message references an image (and/or area thereof), and time has elapsed between the two messages, the invention enables a computer device to operate with advantages over the prior art. For example, in the prior art, to enable one message to reference an image (and/or area thereof), a search for the image can be inefficient, time consuming, can delay message response while an image is located, and can request that data stored in memory be duplicated. Attempting to reference a specific area of an image (for example associated with an earlier message) leads to other, additional, inefficiencies. For example, in the prior art, to enable one message to reference an area of an image (for example, associated with an earlier message), a description of the area may be input into the system along with a possible request that data stored in memory (such as the image be referenced) be duplicated. By contrast, in accordance with exemplary embodiments of the present invention, the use of a visual display of an image (associated for example with an earlier message, or portions or elements thereof) and selection (in various manners to be described below), enables message referencing and image element referencing in particular. This approach enables faster computer processing and more efficient use of computer devices for exemplary forms of communication (such as messaging).

The above explanation has been with regard to referencing an image, for example, located in a message stream, but images can be referenced from other sources such as a camera roll (for example).

Messaging (such as chat messaging) has become a very popular form of electronic communication due to its affordability and ease of use. On any given day, users may exchange numerous messages regarding a diverse range of topics. It is known that images such as photos and other forms of information are included in a message. The users may use the messages to discuss, for example, group activities, to solicit opinions about various topics, post photos, or simply exchange short conversations with friends or co-workers. One of the drawbacks to using typical chat messaging systems is the sequential nature of the messages sent and received. For example, messages often appear in a channel or log in chronological order. If a user in a group chat session comes back from a meeting after several hours, they may be confronted with a bunch of messages. In this regard, the group chat sessions are often characterized by short bursts of dialog around a given topic. By the time a user views the messages, the topic may have changed several times. This makes it difficult for a user to post a response to a previous message that is within context of the ongoing message conversation.

One of the drawbacks to using typical chat messaging systems when messages include images is that other users may find it difficult to efficiently or effectively direct comments or questions at a specific area or aspect of an image. This drawback is due to an inability for a user to directly highlight, point to or reference specific areas or elements of the image. For example, a class photo may have been transmitted to a group in a channel as part of an earlier message (for example) but one of the message stream recipients is curious to know the names of a few of the individuals pictured in the photo. It would be easier to send a reply asking "Who are these people?" along with a copy of the photo with specified areas indicated then it would be to try to describe the location in the photo or other attribute of each individual (e.g., the guy in the back row, second from the left).

Methods and systems for providing references to images and to areas of images are disclosed herein. This allows a user to specify and comment on selected areas associated with an image or other forms of media and to generate and insert a (reference) object into a (chat) message stream that links or otherwise references an image and/or portion thereof (e.g. from a prior chat message). The image may be, for example, still or video (i.e. moving). It is contemplated that the techniques disclosed herein may be particularly beneficial in certain types of communication platforms. However, so as to illustrate the method and system functionality, and not by way of limitation, the communication platform described herein is an exemplary chat messaging platform. It is envisioned that one skilled in the art could make and use the methods and systems described herein with other types of communication platforms. Some of these communication platforms may include, for example, text messaging, short message services (SMS), Rich Communications Services (RCS), e-mails and other types of similar on-line communication platforms for facilitating electronic information exchanges between client devices of a plurality of users. The use of chat messaging described herein is merely exemplary, as other forms of messaging may also be used in accordance with exemplary embodiments of the present invention.

With respect to chat messaging platforms, an image element of a message (for example in a chat message session) that a user wishes to question, address, respond to or reference occurred as a standalone image or as an image associated with a part of a previous and possibly unrelated (to a most recent discussion chain) discussion. A chat message session, as used herein, refers to a series of messages that are exchanged between one or more users, wherein for more than one user the users are in a group of users. When one of the users in the group adds a new message to a chat message session, the new message is sent to other users in the group. For example, if a first user adds a new message to the chat message session between three users in a group, then the new message may be sent to other selected users of the group, such as the second user and/or the third user. Thus, the chat message session may simulate a real-life conversation because users may communicate to the group at large, or to a specific person or a subset of the people in the group.

In some situations, a user may want to add a new message in response to, or that is related to an image element (for example, associated with a previous message in the chat message session). When attempting to reply to, reference or address an image or an area or aspect of an image (for example, associated with the previous message), the reply, query, comment, etc. may appear out of context and directing the users' attention to the intended area of the image being referenced could be confusing to other users in the session. Some group messaging users employ various strategies to minimize the effort necessary to refer to or reply to a previous message and/or to refer to an image element or area of an image element associated with a prior message in the session. In one example, a user may copy and paste the prior image and/or message into the text message entry bar and then add desired responsive or other additional text. In another example, the user may include language or addition information in the new message to try to make it clear what area (e.g., the person standing 2nd from the left) of an image is being questioned, referenced, commented on, or responded to. In yet another example, the user may specify an area of an image being referenced by identifying and referencing something unique about a specific area of the image such as a general location relative to the image or attribute of some aspect of the image. One problem with using these types of techniques is the difficulty and sometimes inexact nature of such description. In some cases, extra text entry space may not be available in a chat message system that limits the amount of data that can be entered into a given message. In some examples, more than one image and/or area is intended to be referenced making it difficult, time consuming and cumbersome to accomplish. Moreover, the user may miss some important information if they cut and paste only a portion of the associated image and/or previous message or the identifying information regarding the previous message may not be complete or accurate. In some examples, users use messaging systems as a medium through which they exchange photos, images, but they refrain from using messaging to do any real or detailed work related to these photos or images. This is due to the fact that they do not consider messaging systems as a suitable medium to specify and comment on, reference or converse about specific areas or aspects of images. In other examples, the image being referenced is not from a stream of messages, but from a collection of images, such as, for example, images that are logically stored together in a smartphone camera roll).

With regard to improving users' ability to follow a conversation in a message stream where messages appear sequentially (often chronologically) but may be interspersed with other messages associated with other conversations occurring in the same message stream and at the same time, a better way of following and understanding the context of messages is desirable. A first message ("message") may be one of several messages. A second message ("further message") may also be one of the several messages. It may be desirable for the second message to reference the first message. By "reference" what is meant is that there is a connection between the second message and the first message (and/or image associated with the first message). The connection may be for example a link. Alternatively, a message may be linked to an image not (or not yet) included in a message stream. With such a link, while the second message is being viewed, some aspect of the first message may also be viewed. The aspect of the first message may be, for example, all of the first message, part of the first message, an image element of the first message, a modified form of all or part of the first message, and/or data associated with the first message. Exemplary associated data may include a user (or some form of identification of the user) associated with the first message, a date and/or time associated with the first message, and/or some other data associated with the first message.

In one exemplary embodiment of the present invention, a "reference object" is inserted into a text entry box that is being used to form a second message so that (after the second message is transmitted) a "display object" can be displayed (with the second message) that references the first message. In one embodiment of the present invention the reference and display object are the same while in another embodiment of the present invention the reference and display object are different. The reference object, or the display object, or both, references the first message as more clearly described below.

Chat messages (as an example of messages) are thus beneficially enhanced to provide users with additional information related to the meaning of their electronic conversations without introducing expensive overhead or burdensome retrieval mechanisms. For example, a user may make a selection associated with a first message which then automatically inserts a reference object into a text entry bar of a chat message system. The reference object may provide a link to automatically identify and access data from the first message. The user may then add additional text in the text message box before or after the reference object. When the message is sent, a display object associated with the first message is included in the newly posted second message. If multiple messages are referenced then one or more of the display objects are displayed in the newly posted message. It is also possible for the same message to be referenced multiple times by different new messages at any time in the chat message session, e.g., multiple images or areas of an image element associated with a first message could be referenced. In addition, computer processing efficiency is improved through the use of links and without simply duplicating previously inputted data. Efficiency is also improved by enabling access to at least a portion of previously available data without a need to manually locate the previously available data.

Each display object can then be activated in the chat session in several ways. For example, by hovering over and/or selecting the display object, image, text data (or other data or portions thereof) associated with the referenced first message may be displayed (e.g., above, to the side of, below, on a separate screen) with respect to the newly posted message. The information thus provides the reader with immediate and useful context relating to the message they are reading by allowing them to see the message (or for example, image element associated with the message) that is referenced. In some implementations, other visual or audio mechanisms can be added to highlight the display object. For example, the display object may be displayed in a different text color, font size, or a change to a portion or all of the background of the referred message or include various type of animation effects.

While the above description is with regard to first and second messages, it is understood that "first" and "second" (or "message" and "further message") are merely being used to identify two messages that have been separately entered into a computer system (and then, for example, sent). In one embodiment of the present invention, the first message is sent before the second message, although this merely exemplary (i.e. the order may be reversed). Also, the "second" message may be linked to an image (or portion) itself (in or not in a message stream), as opposed to being linked to a first message in particular.

In one implementation, a computer program product may be installed and/or a service may be selected from a cloud-computing environment in order to obtain the benefits of the techniques described herein. In an implementation, the computer program product may be downloaded onto a client device. For example, a user may elect to download the computer program product from a service associated with an online server. The client device may transmit a request for the computer program product over a network and, in response, receive the computer program product from the service. The computer program product may be installed locally on the client device or stored at the service and may be accessed through the client device, for example, via a mobile web browser. In one exemplary embodiment, software to achieve the above results is stored in a cloud computing environment. In another exemplary embodiment, the software is stored in local client devices. In a further exemplary embodiment of the present invention, the software is stored in a combination of a cloud computing environment and (one or more) local client device(s).

FIG. 1 is a block diagram that illustrates an exemplary network with associated computing devices in accordance with an exemplary embodiment of the present invention. In an exemplary embodiment of the present invention, two or more computing devices (e.g., client devices) may engage in an electronic communication session (e.g., chat session) with each other. In some implementations, a first participant/client device may engage in a chat session with a second participant/client device via a network. As shown, communications network 100 includes a plurality of computing devices such as client devices 101a-101e which may include for example, a base station, a personal data assistant (PDA), a laptop/netbook and a tablet as well as computing server devices and (e.g., computing devices that can be located at a number of different receiving stations). The various devices may be interconnected via a network or direct connection and/or may be coupled via a communications network (e.g., a LAN, WAN, the Internet, etc. that may be wired or wireless). In some implementations, the computing devices may communicate with each other before accessing the communication network. In some implementations, the network may include a database running on or in communication with the server device and/or the client devices or some combination thereof. In some implementations, the database may store reference objects and/or display objects related to one or more chat messages. Server 190 is also illustrated. Server 190 includes computing device 120, computing device 130, a terminal for data input and/or display, etc. Communication may occur via network 140. While client devices such a devices 101a and 101b are shown, it is understood that fewer or more client devices such as client devices 101x and 101z (not shown) may also be included). Memory for storing data that is useful in accordance with an exemplary embodiment of the present invention may be included in the form database 110.

The above description is with regard to at least two users (or more) communicating with each other with respective client devices. In a further exemplary embodiment of the present invention, the "first message" and the "second message" are both entered into the same computing device. In a further exemplary embodiment of the present invention, further messages may or may not be included from a source outside of the computing device from which the "first message" and "second message" are entered. In yet another exemplary embodiment of the invention, a single user may enter the "first message" on one computing device and the "second message" on another computing device.

Figure 2:
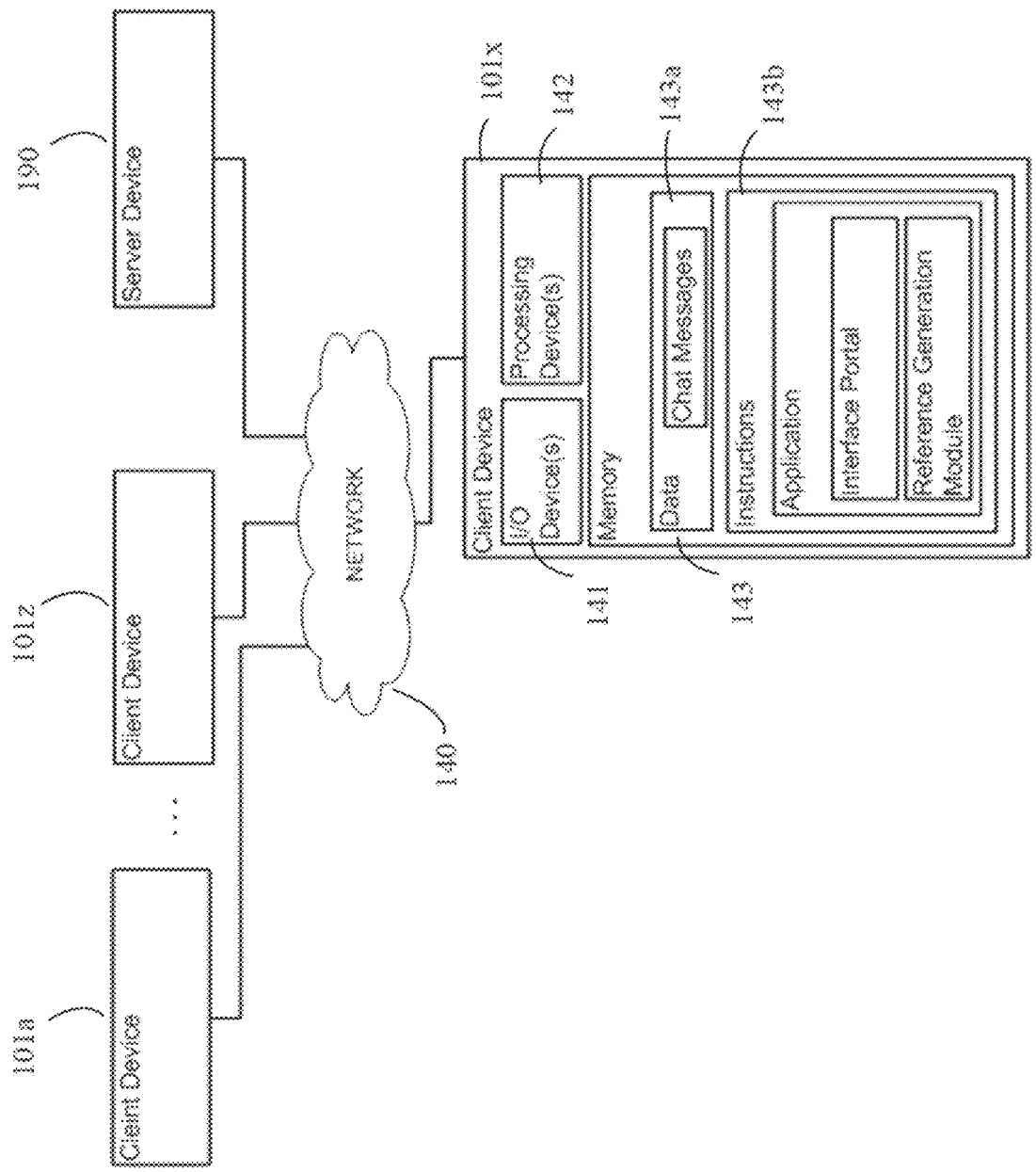
FIG. 2 is a block diagram that illustrates details of an exemplary client device in accordance with an exemplary embodiment of the present invention.

FIG. 2 is a block diagram that illustrates details of an exemplary client device in accordance with an exemplary embodiment of the present invention. In one or more exemplary embodiments of the present invention, the system may facilitate the transfer of electronic communications between computing devices of two or more users or participants over a communication network. The system can include one or more servers (e.g. a server device), which provide access or a communication link between a plurality of client devices in order to facilitate communication between two or more client devices over a network. In some implementations, the system may include an interface portal that provides for the display of network content, such as chat messages of a chat message session or any other type of network data received in response to a transmitted chat message.

FIG. 2 illustrates a plurality of client devices 101a-101z. In an exemplary embodiment of the present invention, features of the invention may be included on a server 190 (shown in FIG. 1) or on a client device 101a-101z. Exemplary client device 101x is illustrated. Client device 101x may include I/O device driver(s) 141 (and/or related database structures), processing device(s) 142 (and/or related database structures) and memory 143. Memory 143 may include data memory 143a and instruction memory 143b. One or more drivers may include a message engine and/or a link engine as more fully described below. To facilitate integrating context-based references into a chat session, the system may include a reference generation module by itself or part of the engines described below. The reference generation module may generate and transmit the references (or links) in a chat session that can be perceived by users of the client devices of the system (i.e. visual objects). The functionality of the reference generation module can exist in a fewer or greater number of modules than what is shown, with such modules residing at one or more computing devices, which may be geographically dispersed.

Figure 3:
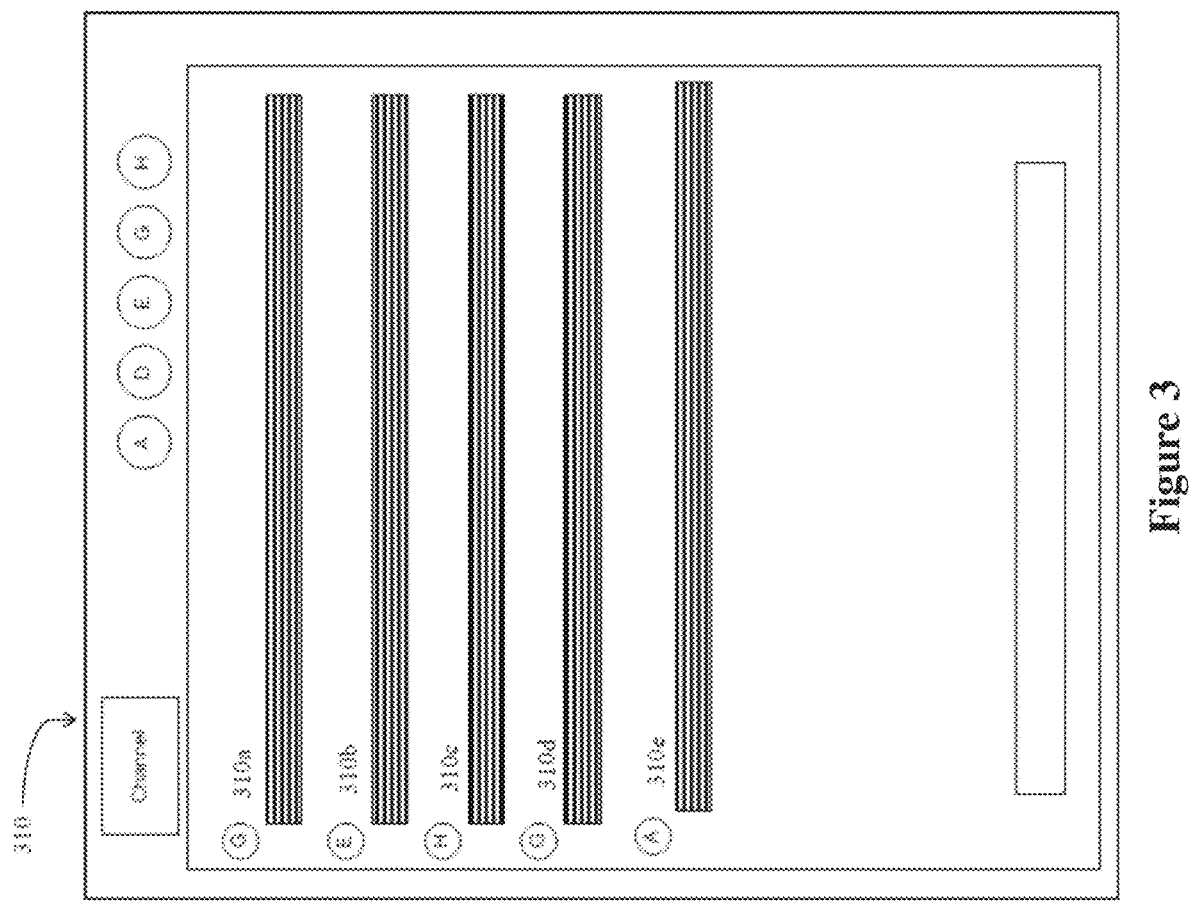
FIG. 3 illustrates an exemplary interface portal of a client device in accordance with an exemplary embodiment of the present invention.

FIG. 3 illustrates an exemplary interface portal 310 of a client device 101x in accordance with an exemplary embodiment of the present invention. The interface portal provides an example interface in which a chat messaging session can be engaged by a number of users that are represented by the participant icons 310a-310e on the portal. In some implementations, the interface portal may include several panels that include a channel/dialog panel that displays the different chat session groups that a particular user has joined. The interface portal displays a plurality of chat messages exchanged by the users. In some implementations, the interface portal includes a message window panel that may include a count of the current participants and a text entry region that allows the participants to insert and reformat the text (i.e., bold, italics, color), add a link (hypertext link) or other type of data into a chat session. Each message that is entered into the text entry region is displayed in the message window panel. In some implementations, the messages can be augmented with one or more references to a previous message in the chat session.

Figure 4:
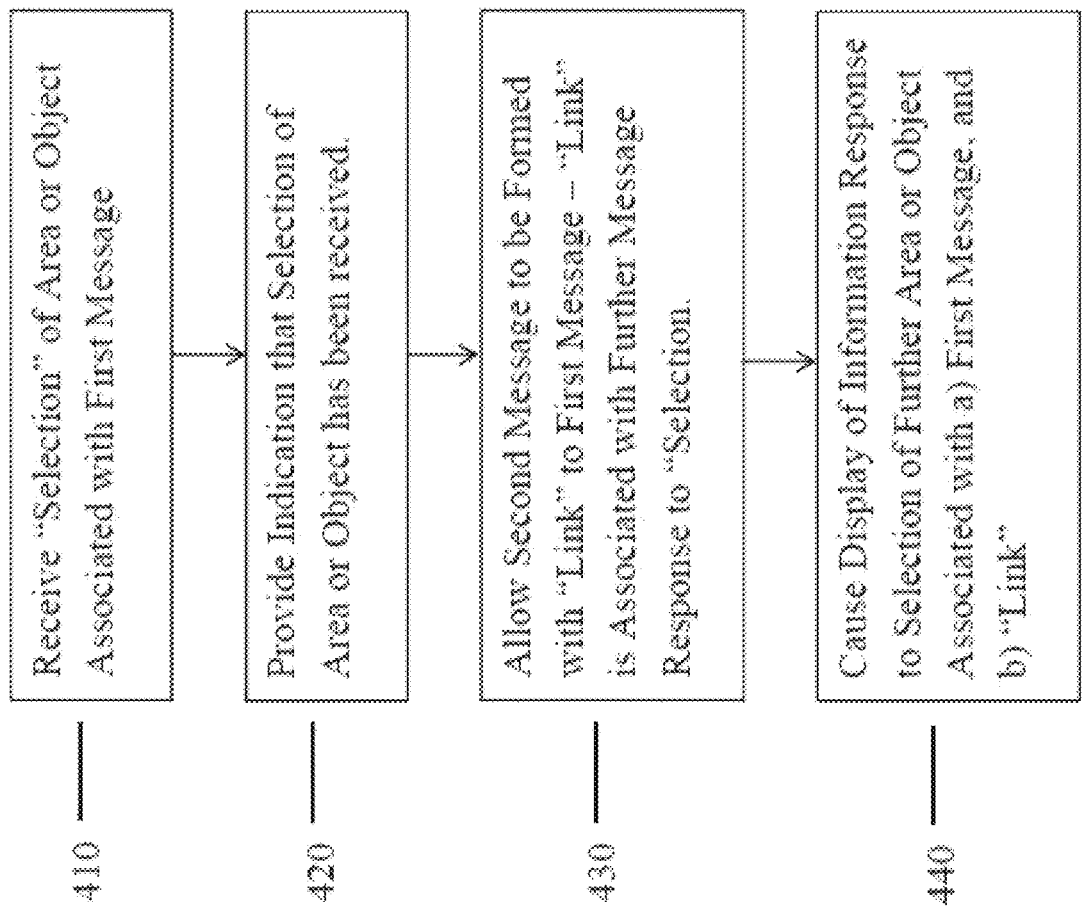
FIG. 4 is a flowchart diagram that illustrates exemplary message referencing in accordance with an exemplary embodiment of the present invention.

FIG. 4 is a flowchart diagram that illustrates exemplary message referencing in accordance with an exemplary embodiment of the present invention. At step 410, "selection" of an area or object associated with a 1st message is received. The selection may be accomplished through different mechanisms. Selection can be accomplished with a click, a hovering, with the cursor, the finger, etc. For example, the selection may entail moving a cursor or some other indicator over to a 1st message or an area associated with a 1st message so that an object or area associated with the 1st message can then be selected. In one exemplary embodiment, the object being selected is a display object, an area with defined limits. The area may have an exemplary shape, size, color, pattern, identification, etc. Alternatively, the text of the 1st message or portion thereof may be selected. One exemplary method of selection is moving a cursor and then subsequent selection using an I/O device such as a mouse that is controlling the cursor. In another exemplary embodiment, a touch sensitive screen may be used. Selection may then be accomplished by touching the touch sensitive screen in some manner including the use of a finger, stylus, etc. A cursor, finger, or stylus are examples of a "further object" and where the "further object" is placed is a step in the process of obtaining selection by placing the further object over where the area associated with the message or the object is displayed.

Optionally, with (or thereafter) the selection of the area or object associated with the 1st message, other action(s) may also be taken. The additional action(s) may be, for example, sending communication (i.e. a message or other data) to a location that is predefined or defined by data associated with the 1st message. The action may occur with the selection, at optional step 420 (below), or at other times.

At optional step 420, an indication is provided that the selection of step 410 has been received. The indication may be in many exemplary forms including a visual indication. The visual indication may include for example the display of a dot on a screen. Alternatively, for example, the indication of receipt of the selection may include the insertion of a reference object in a text input box. This will be further described below.

While step 420 is included in some exemplary embodiments, it may be omitted (or temporarily omitted) in other exemplary embodiments. Thus, for example, in one exemplary embodiment, no visible indication is provided that the selection of step 410 has occurred (or has been received).

At step 430, a 2nd message is allowed to be formed with a link to the 1st message. The link may be a reference object, a display object, or a reference object which is the same as the display object. The link is associated with the 2nd message and references the 1st message. Furthermore, the link is created responsive to the receipt of the selection of step 410. This link is further described below.

In a further exemplary embodiment of the present invention, a text entry box is provided. Although the text entry box is optional, the text entry box may appear on a screen as a place where the second message is formed before transmitted. Selection of the area or object (i.e. display object) associated with first message may result in the visual indication described with reference to step 420, or may result in another indication. For example, the indication may be (or additionally may be) insertion (and/or display) of the reference object into the text entry box.

At step 440, display of information is caused responsive to selection of a further area or object associated with a) the 1st message and b) the link. Thus, for example, the 2nd message may be displayed with a display object (i.e. the area associated with the second message and associated with the link to the first message) after the second message is transmitted. Selection of the display object will cause information to be displayed. The information may be some or all of the 1st message, or some type of identifying information or user information associated with the 1st message, for example.

Figure 5:
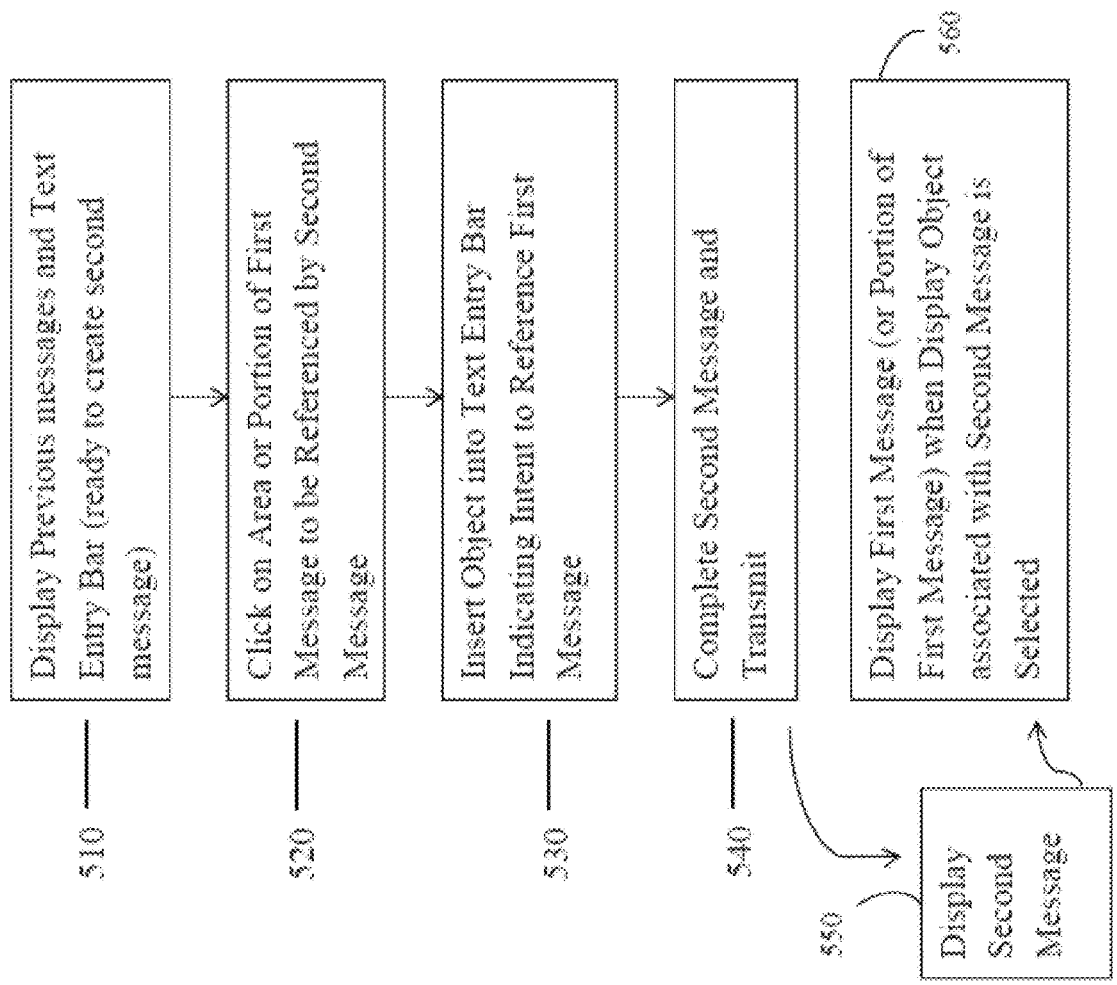
FIG. 5 is a flowchart diagram that illustrates exemplary message referencing in accordance with a further exemplary embodiment of the present invention.

FIG. 5 is a flowchart diagram that illustrates exemplary message referencing in accordance with a further exemplary embodiment of the present invention. At step 510, previous messages are displayed. In addition, a visual structure to facilitate text entry may be included. The visual structure may be a text entry bar. As characters are typed using an I/O device, for example, the characters may appear in the text entry bar. After the typing of the message has been completed, in one exemplary embodiment of the present invention, the text entry bar may be optionally hidden, the text may be sent, and the text that was inputted into the text entry bar may be repositioned so that it appears with other messages that have been sent and received. In any event, by displaying the text entry bar, for example, a visual indication is provided to the user that the client device that will transmit the completed message is ready for the completed message to be created.

Next, at step 520, a user clicks on an area or portion of a 1st message to be referenced by a 2nd message. The area may include a display object as more fully described below. A "click" may refer to some sort of selection. The area being clicked may include text that is included in the 1st message itself, and area occupied by the 1st message as it appears on a screen, a display object with a defined border, a display object where the border is not clearly defined, etc. The process of clicking or selection will cause the 2nd message to be able to reference the 1st message.

At step 530, a reference object is inserted into a text entry bar. By inserting the object into the text entry bar, intent to reference the 1st message is indicated. This step is optional.

In one exemplary embodiment of the present invention, the "selection" described in step 520 causes automatic insertion of the reference object into the text entry bar in step 530. In other words, in response to a selection (such as clicking on a display object in the first message), the reference object that includes the link to the first message appears in the text entry bar. This "one click" process of having the reference object be displayed (or be inserted) into the text message bar enables advantageous computer processor performance. By contrast, one could manually insert a link to the first message in the second message, but creation and insertion of such a link is time consuming and subject to errors. The inventors have determined that such a link could be created by selecting (i.e. highlighting) data (i.e. a link to the first message) associated with the first message, copying the selection (performed for example with a mouse right click), moving a cursor to the text entry bar, selecting a location in the text entry bar, and pasting the selection (of the link) into the text entry bar. This procedure assumes that a link (that references the first message) is visually displayed in some manner so that the above procedure can be performed. One advantage of exemplary embodiments of the present invention is that the process has been automated, so that selection of a display object (as it appears or may be selected on the display) causes the reference object to appear in the text entry bar, preferably with no other steps performed by the user (or with fewer steps performed by the user than with the select/copy/select/paste procedure outlined above).

At step 540, the 2nd message is completed. Subsequently, an instruction is provided to transmit the 2nd message.

At step 550, the 2nd message is displayed. The 2nd message may be displayed in various places including, for example, a client device from which the message was transmitted, a client device to which the message is transmitted, a device where a message is displayed without being transmitted outside of the device, etc.

At step 560, after the 2nd message is displayed (with the display object), selection of the display object causes display of the 1st message, a portion of the 1st message, data associated with the 1st message, etc.

Generation of a reference object, and subsequent generation of a display object, may be accomplished in accordance with a further exemplary embodiment of the present invention. For example, a unique identifier may be assigned to each message. There are numerous ways to generate unique identifiers, including sequential numbering, numbering based on a system clock, numbering based on a chronological clock, etc. Generation of a reference object may be initiated by an event that occurs and is detected by software (that is causing or related to the display of the messages on the client device). Put another way, for each display object on a plurality of messages that are displayed, an event "listener" is waiting for an interaction with the display objects. When a particular display object is selected (i.e. clicked, hovered, etc.), the selection of the display object is routed to software that will create a reference object, and ultimately a display object. Furthermore, selection of the display object causes the unique identifier of the message associated with the display object to be stored in a database. That unique identifier will then be associated with the reference object as the reference object is created. When the reference object is indeed created, a visual icon (for example) that represents the reference object may be inserted in a place to indicate that that the display object has been selected. The visual icon that represents the reference object is thus inserted, for example, into the text entry bar. Furthermore, the reference object is linked to the identifier that has been stored for the message associated with the display object that has been selected. After the message (i.e. the "second message" described above) has been transmitted, the display object is created and, again, the display object may be associated with the identifier that has been stored in the database for the message associated with the earlier display object that has been selected.

The above description has been with regard to a display object. It is understood that the display object may be represented by a visual icon with defined borders, or it may be represented by some other visual method, such as text associated with a message or space (i.e. space that appears on a display) that overlaps or is adjacent to a message.

Figure 6:
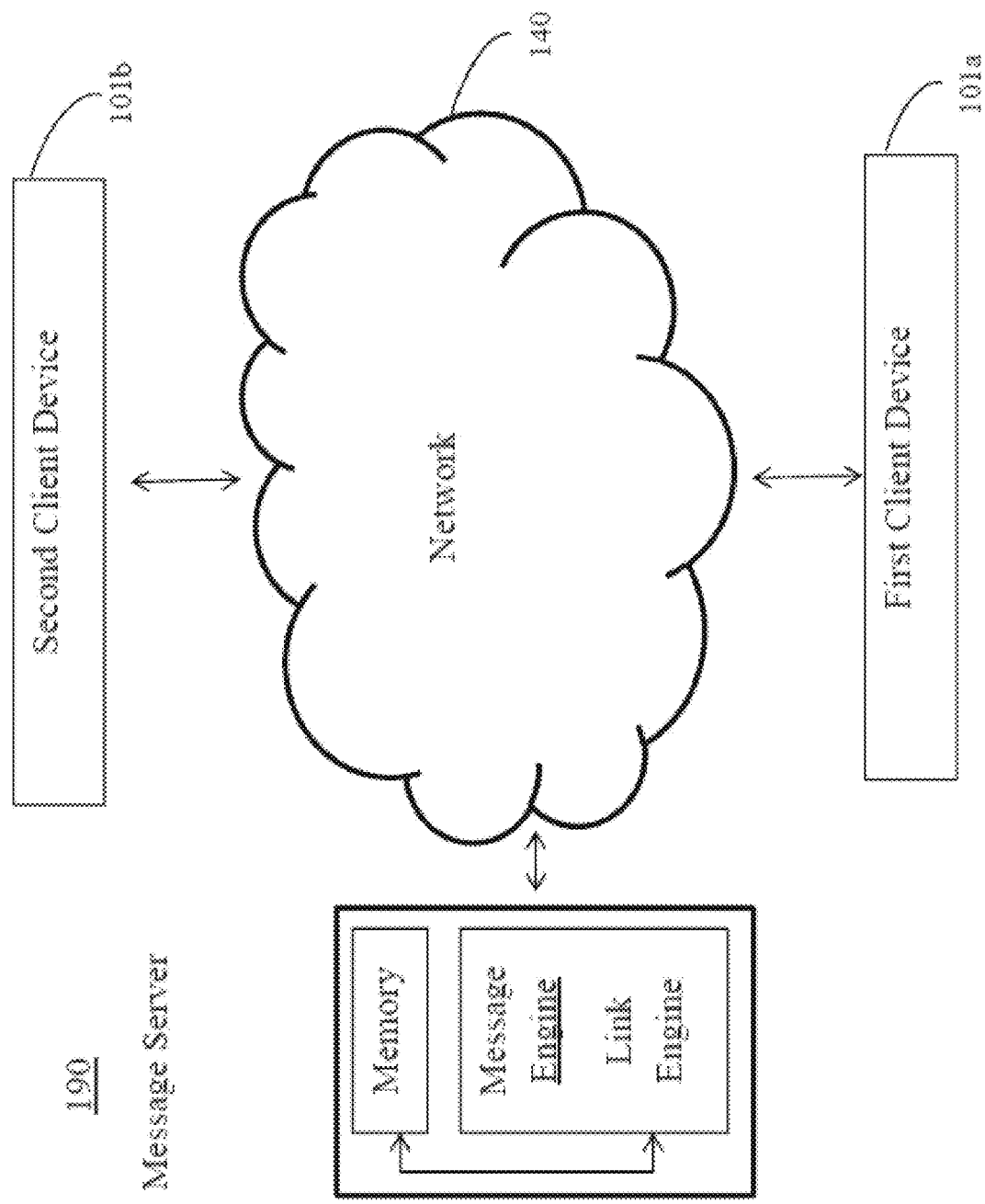
FIG. 6 is a block diagram that illustrates an exemplary network with associated computing devices in accordance with a further exemplary embodiment of the present invention.

FIG. 6 is a block diagram that illustrates an exemplary network with associated computing devices in accordance with a further exemplary embodiment of the present invention. FIG. 6 illustrates that 1st client device 101A and 2nd client device 101B are coupled to network 140. Network 140 may be, for example, the Internet. Message server 190 is also shown coupled to network 140. In the exemplary embodiment shown in FIG. 6, message server 190 includes a message engine and a link engine. A memory is also included. The message engine is for a) receiving selection of an area or object associated with a message on a display; and b) providing an indication that selection of area or object associated with the message has been received. The link engine is for a) allowing a further message to be formed with a link to the message, wherein the link is associated with the further message responsive to the selection; and b) causing display of information associated with the message responsive to selection of a further area or portion associated with i) the further message; and ii) the link.

Figure 7:
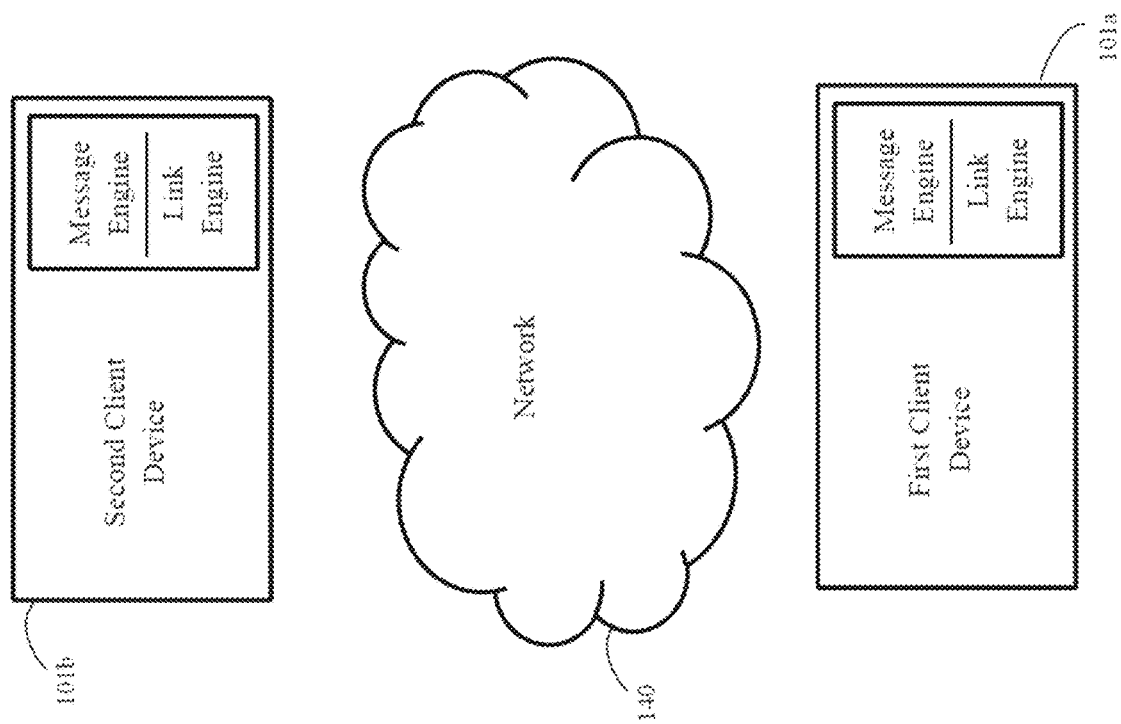
FIG. 7 is a block diagram that illustrates an exemplary network with associated computing devices in accordance with yet another exemplary embodiment of the present invention.

FIG. 7 is a block diagram that illustrates an exemplary network with associated computing devices in accordance with yet another exemplary embodiment of the present invention. FIG. 7 differs from FIG. 6 in that, in FIG. 6, the message engine and link engine are included in message server 190. By contrast, in FIG. 7, 1st client device 101a and 2nd client device 101b each includes a respective message engine and link engine.

FIGS. 8 through 11 are exemplary screen shots that illustrate exemplary operation of an exemplary embodiment of the present invention.

Figure 8A:
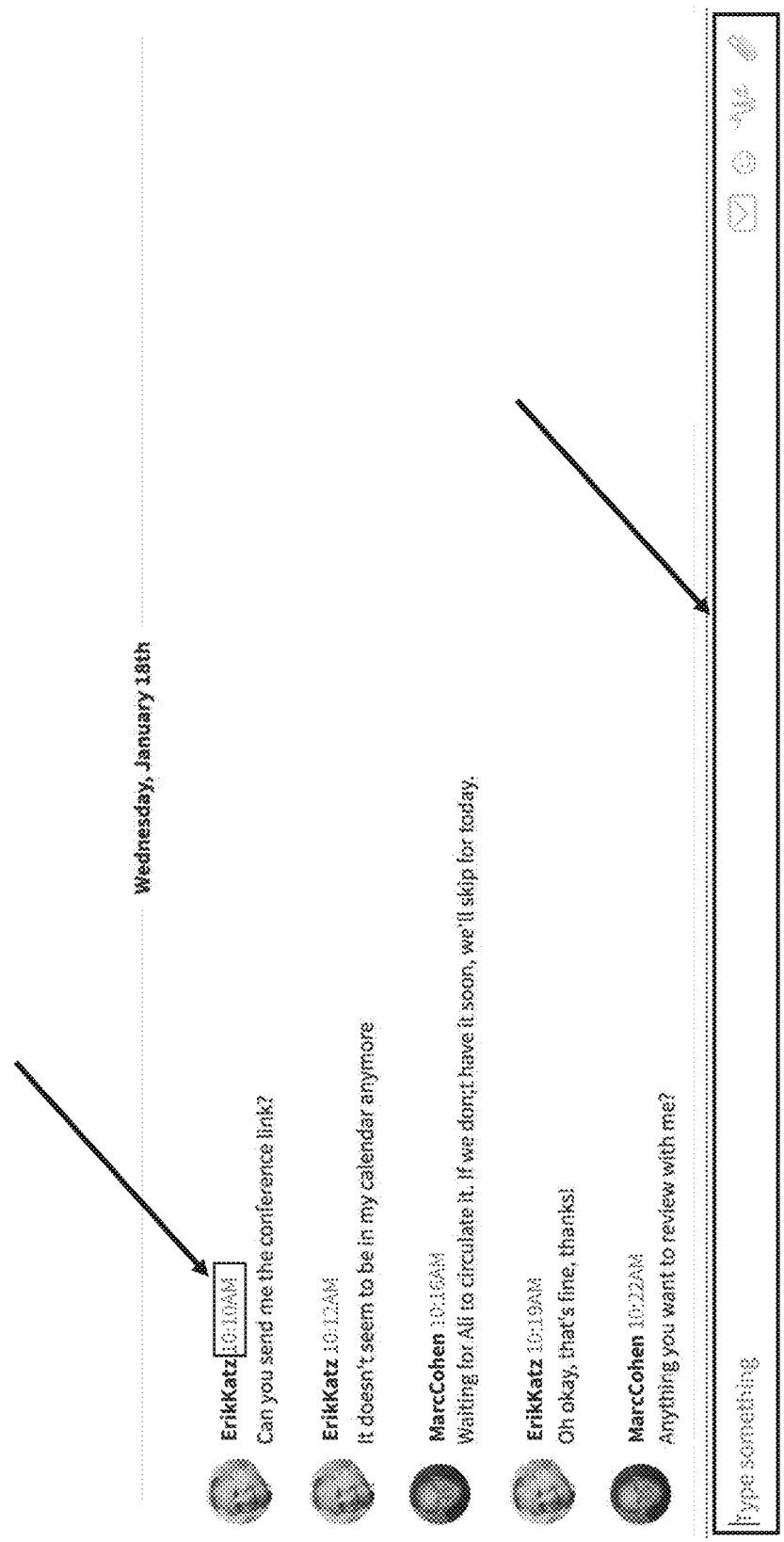
FIGS. 8A-8D are exemplary screen shots that illustrate exemplary operation of an exemplary embodiment of the present invention.

FIG. 8A-8D illustrates operation of an exemplary embodiment of the present invention. As shown in FIG. 8A, a plurality of messages have already been sent so that, in effect, a conversation (or chat) is occurring between 2 users. In the messages shown in FIG. 8A, two users ErikKatz (hereafter "EK") and MarcCohen (hereafter "MC") are having a chat. MC has sent a message to EK: "Anything you want to review with me?" MC now wants to send EK another message in which MC responds to EK's message "Can you send me the conference link?" (hereafter, "first message"). It is noted in the example, however, that four messages have been sent between the first message and when MC is ready to send the second message (in response to the first message). The question then becomes, how does MC answer the first message without confusion because four messages have been sent in the interim? One solution identified by the inventors would be to copy the first message and transmit an answer to the first message along with a copy of the first message. There are difficulties with this approach. For example, copying a previous message and inserting the previous message can entail multiple steps including highlighting, selecting, copying, selecting and pasting. Also, when the copy of the first message is transmitted as part of the second message, the recipient of the second message may be required to see more information than is desired. In accordance with an exemplary embodiment of the present invention, a text message box is displayed to the person who is sending the response to the first message—the response being the "second message". For purposes of this explanation, the person sending the first message (and receiving the second message) will be referred to as the 1st user and the person sending the 2nd message (and receiving the 1st message) will be referred to as the 2nd user. In FIG. 8A, the text message box is displayed to the 2nd user so that the 2nd user can enter the message (i.e. the second message) that will be transmitted to the 1st user. As part of the 2nd user constructing that 2nd message, the 2nd user wishes to reference the 1st message. The 1st message is shown with a display object, namely 10:10 AM. The 2nd user will select the display object. Selection of the display object is accomplished by various techniques including positioning a cursor over the display object and clicking, placing a finger over the display object on a touch screen, etc. These forms of selection are merely exemplary because selection can also include selecting another area associated with the 1st message, and object associated with the 1st message, text associated with the 1st message, etc. It is also noted that selection is accomplished by viewing whatever is to be selected on a display and by physical movement (or virtual movement) of what is being used to perform the selection. FIG. 8 also illustrates that once the display object is selected, part of the selection process may include changing how the display object is displayed.

While FIG. 8A illustrates a user clicking on the time, this is merely exemplary as other areas of the object (or associated with the object) may be selected for initiating creation of the reference object during the process of creating the second message.

Figure 8B:
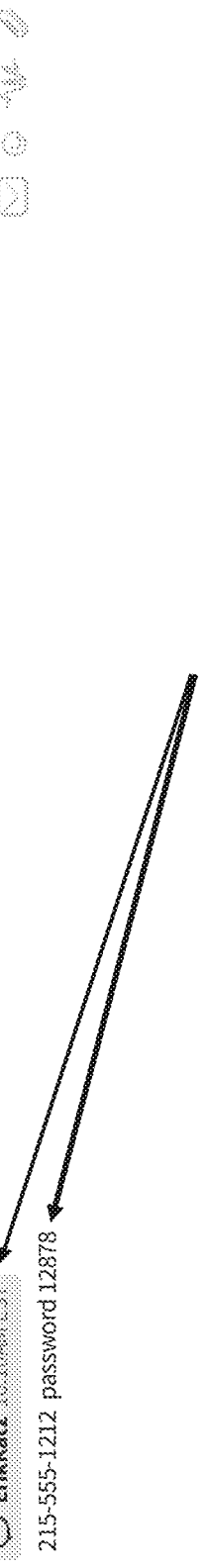

FIG. 8B illustrates what occurs after the display object associated with the 1st message has been selected. Thus, for example, FIG. 8B illustrates that a reference object has been inserted into the text entry box. The reference object shown of example in FIG. 8B is "ErikKatz 10:10 AM EST". The manner in which the reference object (i.e. name and time) is merely exemplary. The reference object shown in FIG. 8B includes a link to the 1st message. Thus, after the 2nd message is transmitted, the 1st user will receive the 2nd message and the 2nd message will include a display object. Selecting the display object in the 2nd message by the 1st user will cause the 1st message, or some aspect of the 1st message to be displayed.

It is noted in this explanation that a reference object is inserted into a message when a message is created and a display object is displayed after the 2nd message (or any message) is received and displayed to the 1st user (or any user). Both the reference object and the display object reference the 1st message. For example, the reference object and the display object may both be a link to the 1st message. In one embodiment, the reference object and the display object both include the same link to the 1st message. In another exemplary embodiment, the reference object may include a 1st link to the 1st message, wherein the 1st link is replaced in the display object with a 2nd link to the 1st message. Alternately, or in addition, the reference object and the display object both link to the 1st message but differ in how they appear on a display. This is further described below.

FIG. 8B also illustrates that once the reference object has been inserted into the text message box, the 2nd user can continue to add text into the text message box. FIG. 8B illustrates additional text added into the text message box after the reference object has been inserted into the text message box. It is understood, however, that in some exemplary embodiments text can be added into the text message box before the reference object is added into the text message box.

Figure 8C:
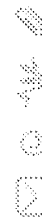

After user 2 has completed entering text into the text message box and causing the reference object to be added into the text message box, the 2nd user is then able to transmit the 2nd message. After transmitting the 2nd message, the 2nd message will then appear as part of the chat. This is shown in FIG. 8C. In FIG. 8C, the 2nd message appears as part of the chat and the reference object has been replaced with a display object. In FIG. 8C, the visual appearance of the display object is somewhat different than the visual appearance of the reference object that appeared in FIG. 8B. This variation in visual appearance between the reference object and the display object is merely exemplary.

FIG. 8C illustrates how the 1st user is able to view the chat (although the view being seen by the 2nd user might be similar or identical). The 1st user is then able to view the 1st message, or a portion thereof, or data associated therewith, by selecting the display object. Selection, again, can include touching of a touchscreen above where the display object is displayed, virtual selection with a cursor, etc.

Figure 8D:
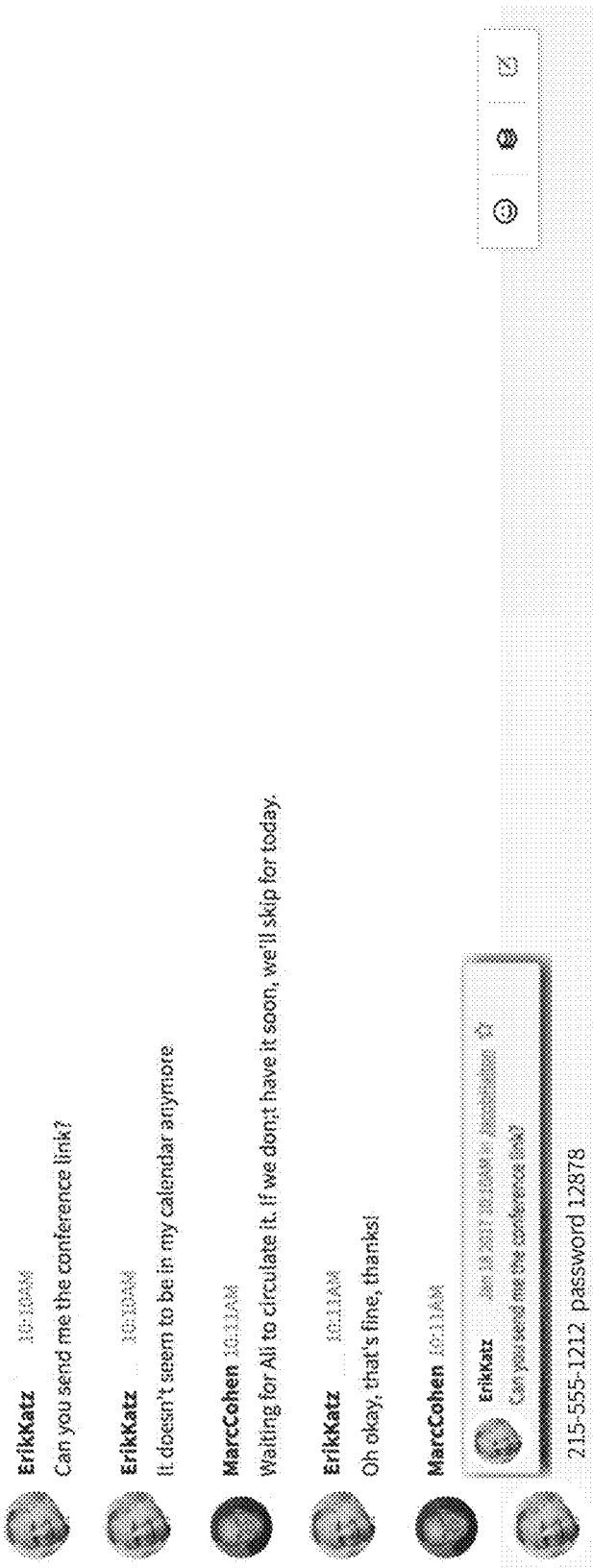

By selecting the display object, the 1st message (or portion thereof, or data associated therewith) may appear on the screen. This is illustrated in FIG. 8D. The 1st message, or portion thereof, appearing on the screen may appear by the 1st user selecting the display object, the 2nd user selecting the display object, or both.

The above examples have included illustrations and descriptions of illustrative reference objects and display objects. It is understood, however, that the displays associated with reference objects and display objects are not limited to the examples provided above.

Assume, for example, that a reference object has the visual appearance "Sona G. 10:15 am" in the text entry box. In this regard, the label portion "Sona G." represents identifying information of the user that entered the previous chat message and the label "10:15 am" identifies the time the message with entered into the chat messaging system. In some implementations, other identifying information, such as the date in which the chat message was sent, can be included in the reference object display label. It should be noted that the above described visual appearance is merely an illustrative example. The identifying information for the reference object may include various other types of information, for example, plain text, images, audio/video mediums and other types of identifying information. The identifying information can also be inferred, derived or looked-up info. For example, the link could provide information over and above that which was included in the actual message—i.e., address and phone number—or even an advertisement or coupon based on the content or some known attributes of the 1st message. Ex. "First 10 people who Reference this message get 25% discount coupon good for admission" the Ref Pop can be an ad—this is a desirable way to have an ad embedded by known users into messages other users will see.

The reference object, in one or more exemplary embodiments, can be inserted anywhere in the text entry box. For example, the reference object can be inserted to the left or right of the text entry box cursor either initially or at any time after the user has initiated their message. In this regard, the location of the insertion of the reference object is controlled by the location of the text box cursor. The reference object can also be in another form, such as a highlighted background color that serves to indicate that the second message is linked to the first message (i.e. clicking anywhere the background color appears) would reveal the popup message. In some exemplary embodiments, the user may include additional text that can be entered into the text entry box either before or after the placement of the reference object.

In one or more exemplary embodiments, multiple previous messages can be referenced and included in the message stream. If multiple messages are referenced, then one or more of the reference objects are displayed. For example, the user may select a display object associated with the date/time filed of a second chat message. The interaction of the user with the display object may activate the reference generation module of the chat messaging system for the second chat message. A second reference object noting certain identifying information of the chat message may be inserted in the text entry box of the interface portal. The second reference object, in one or more exemplary embodiments, can be inserted anywhere in the text entry box. As noted above, the user may include additional text that can be entered into the text entry box either before or after the placement of the second reference object. It is possible for the same message to be referenced multiple times by different new messages at any time in the future (or in the past).

FIG. 9 illustrates an exemplary embodiment in which two previous messages are being referenced. As shown, two display objects have been selected. Therefore, two different reference objects have been inserted into the text entry box. The resulting message, once sent will include two different display objects.

Figure 10A:
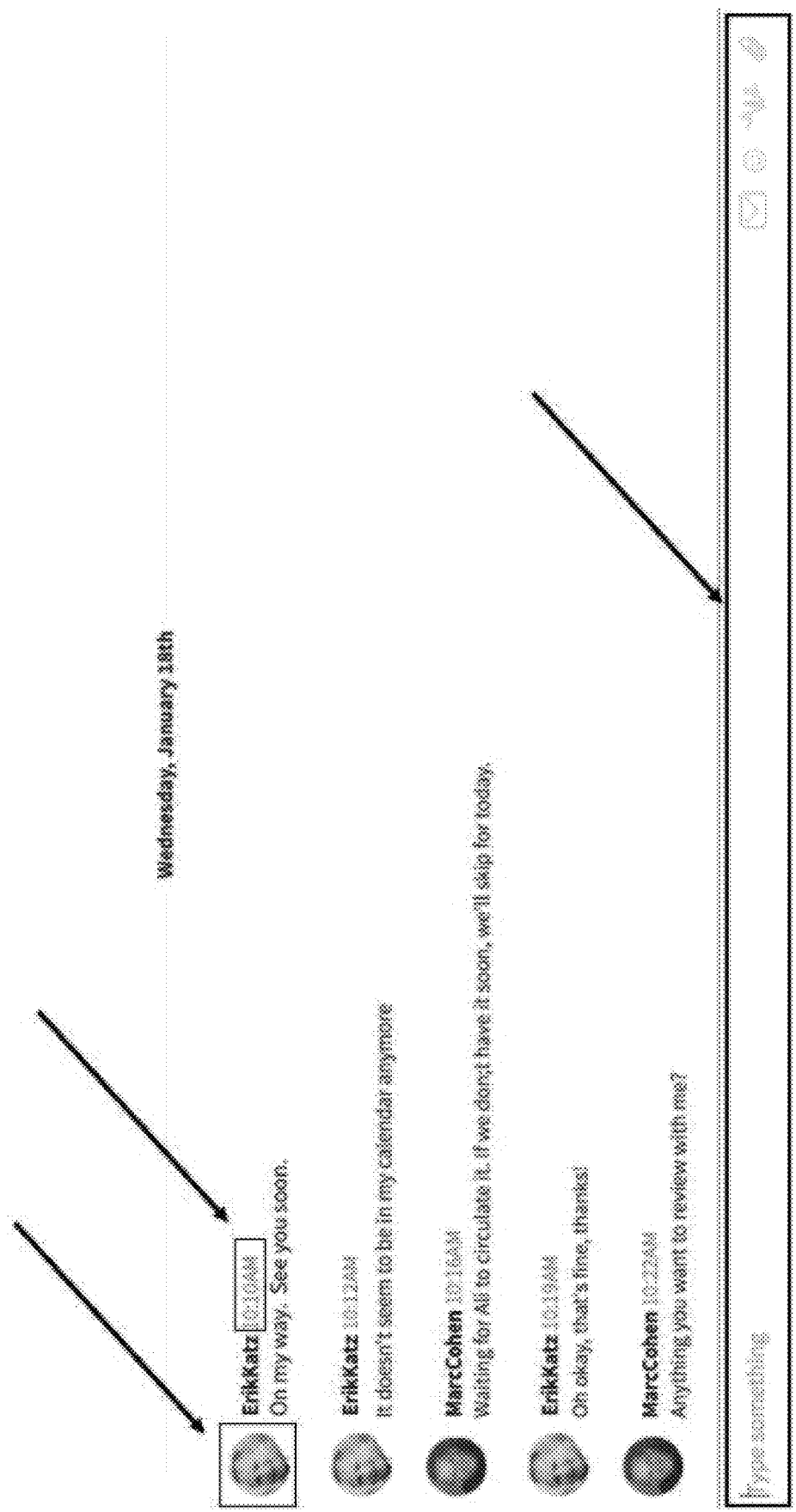
FIGS. 10A-10C are exemplary screen shots that illustrate exemplary operation of an exemplary embodiment of the present invention.
Figure 10B:
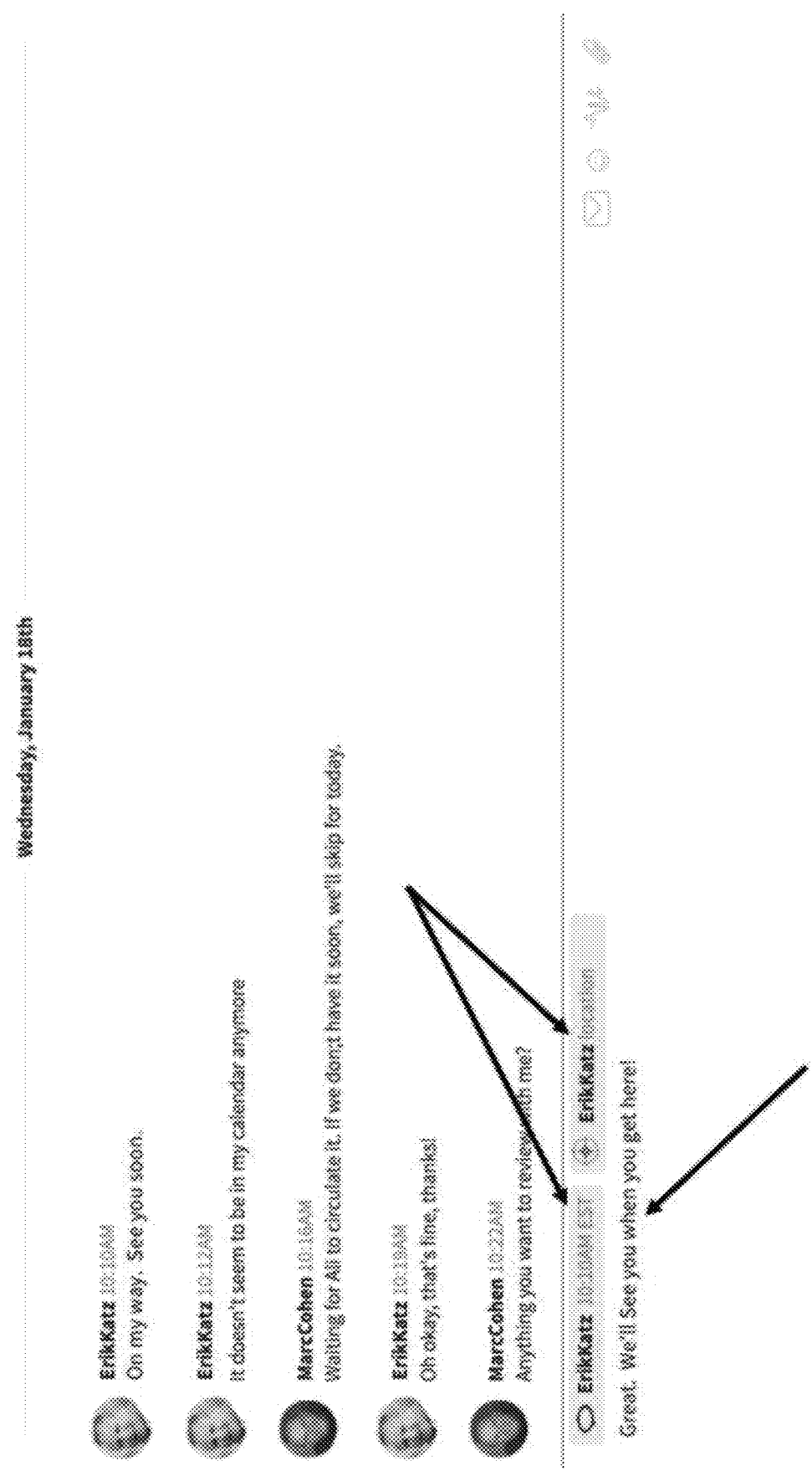
Figure 10C:
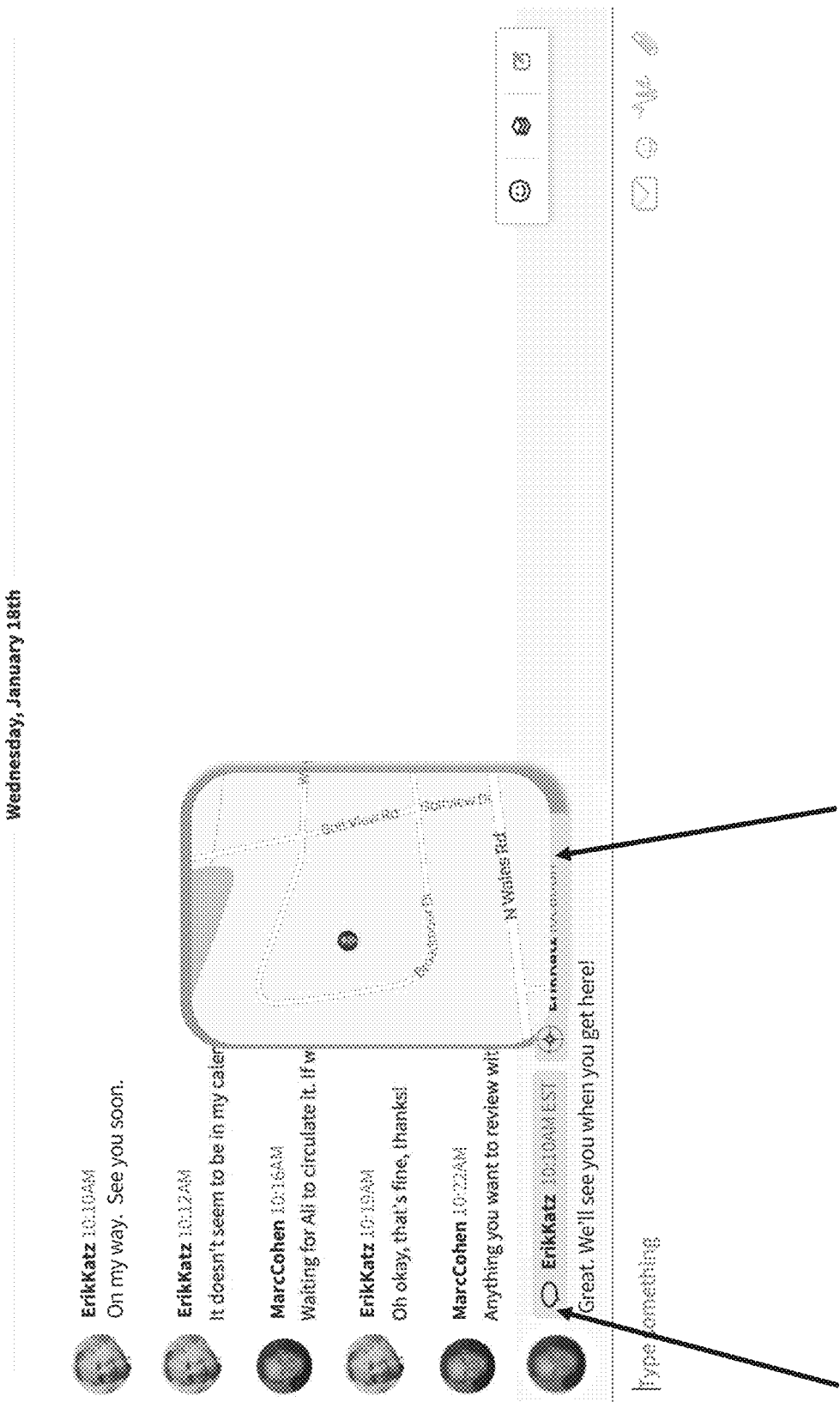

FIGS. 10A-10C illustrate a further exemplary embodiment of the present invention. As illustrated in FIG. 10A, a message may include two different display objects, and a different action occurs depending upon which display object is selected. To put it another way, a different action may occur depending upon which part of a message is selected for creation of a reference object. In the example shown, in FIG. 10A, selection of the display object 10:10 AM results in the display of the message associated with the display object 10:10 AM. Furthermore, selection of the display object that is represented as the person's face results in the display of location (e.g. GPS information) of that person. The display of contact information is merely exemplary as any other type of data may also be displayed (e.g. contact information, a hyperlink, etc.). In the illustrated exemplary embodiment, display of location information (e.g. GPS information) is the result of set up information that is pre-stored prior to selection of the display object. In FIG. 10B, as a result of the selection of the two display objects in FIG. 10A, two corresponding reference objects are inserted into the text entry box. FIG. 10C illustrates that after the message that has been entered in FIG. 10B is transmitted, the message then appears with two corresponding display objects. Furthermore, FIG. 10C illustrates that by hovering over (i.e. selecting) the right-most display object, a map showing the location of ErikKatz appears. This map is merely exemplary.

Figure 11A:
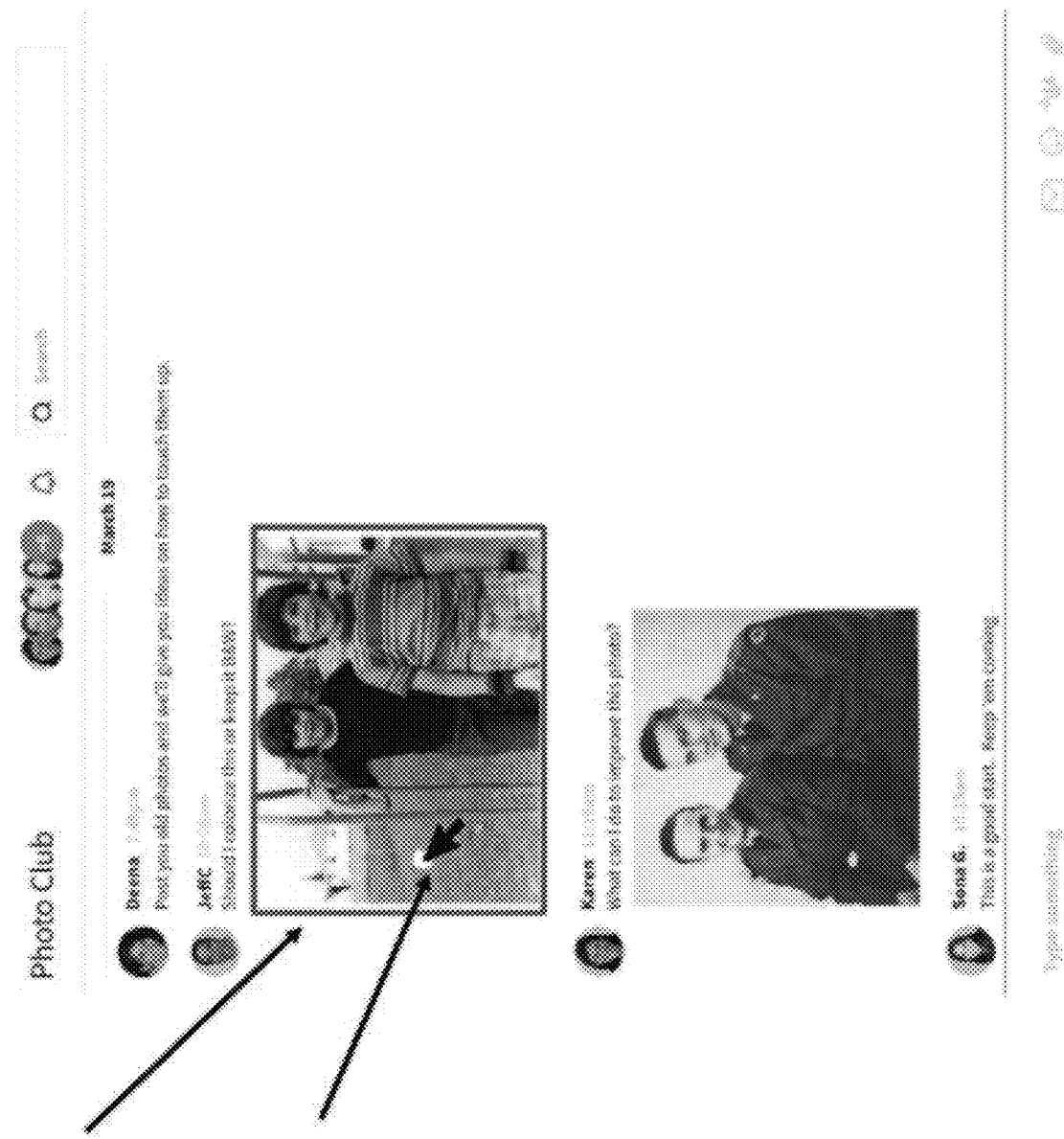
Figure 11B:
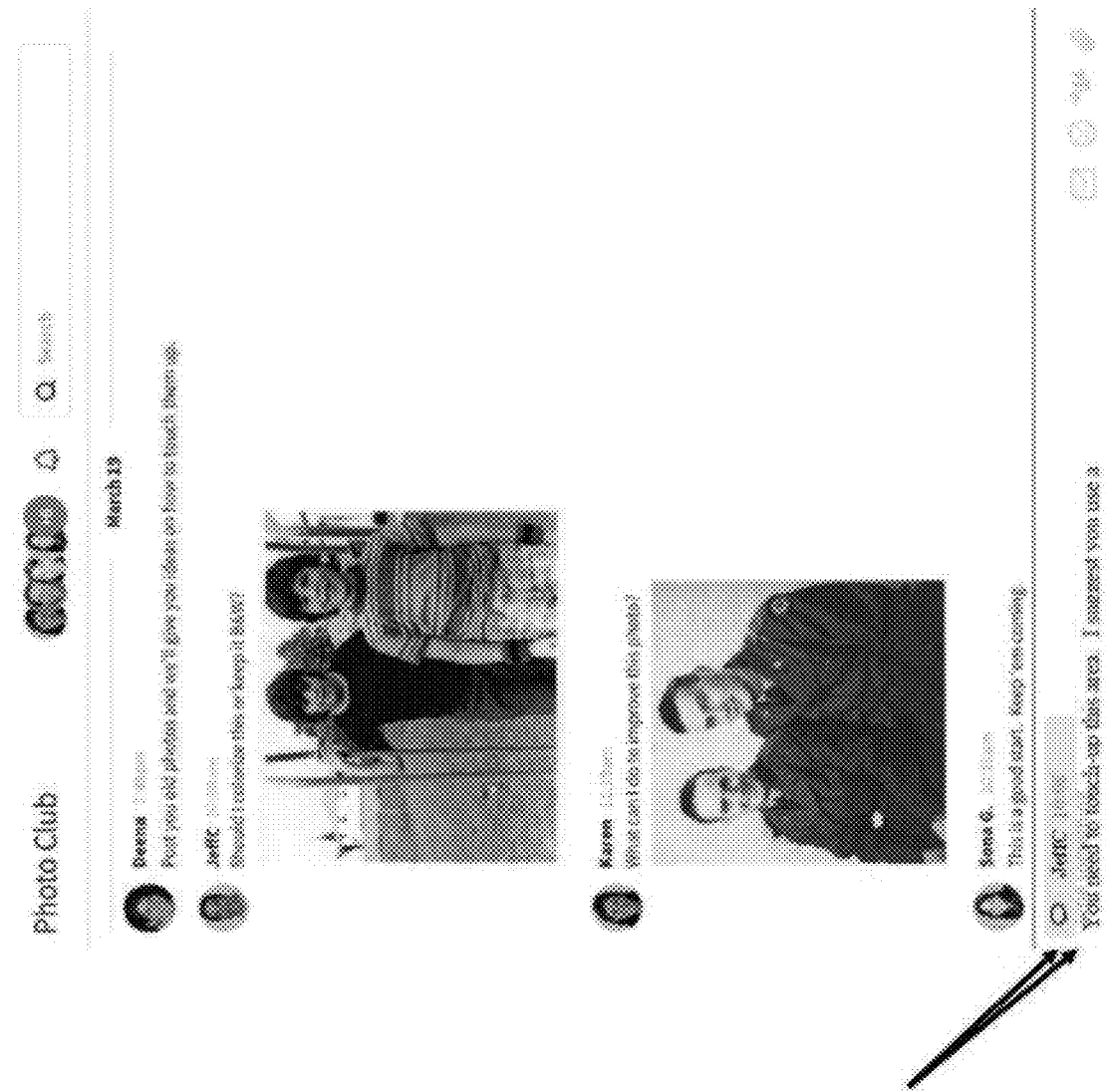
Figure 11D:
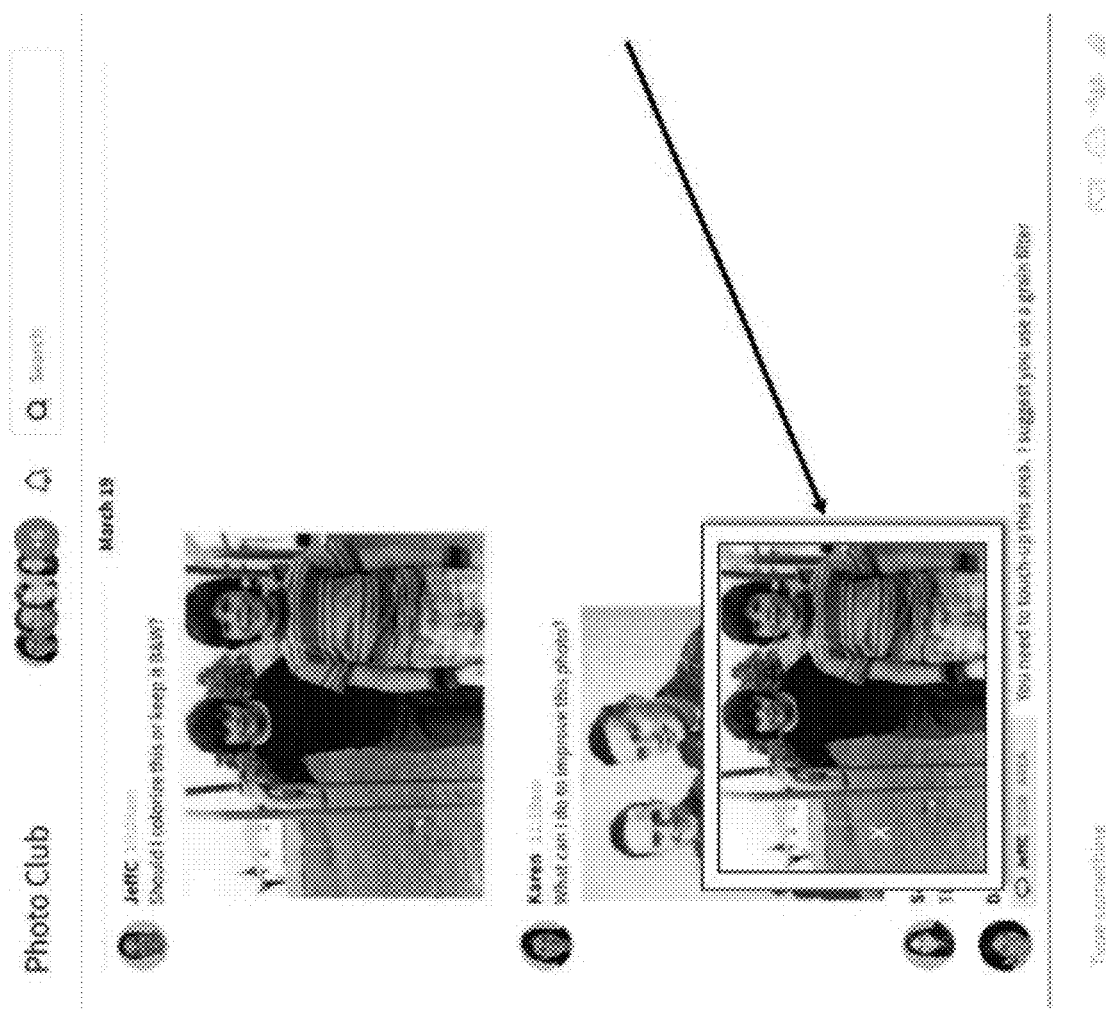

FIGS. 11A-11D illustrate a further exemplary embodiment of the present invention. These figures illustrate how it is possible to reference something other than a text message. In this case a photo is being referenced. Furthermore, the referenced photo optionally indicates an area of interest that has been indicated by a user. As illustrated in FIG. 11A, a stream of exemplary messages include photographs. Furthermore, in this example, Deena wishes to give advice regarding JeffC's photograph. Deena selects JeffC's photograph so that a reference object (and subsequent display object) can be created that references JeffC's photograph. But, Denna has also selected a portion of JeffC's photograph (shown in the figure by a white circle). FIG. 11B illustrates that a reference object has been inserted into the text entry box that references JeffC's photo with the white dot selected portion. In FIG. 11C, Deena has sent the message, which now appears with a display object that corresponds to the reference object that was inserted into the text entry box in FIG. 11B. In FIG. 11D, when the display object is selected, the photo (with the indicated portion—indicated by an "x") appears (in this embodiment as a pop up).

Figure 12:
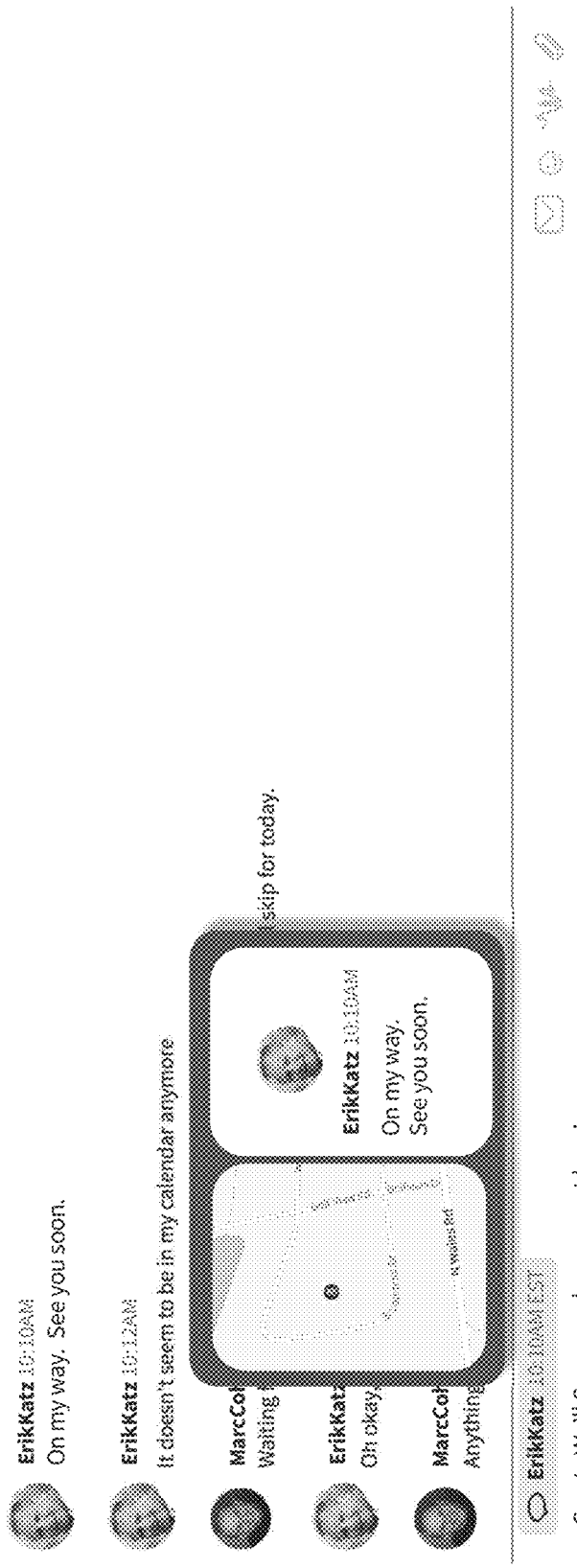
FIG. 12 is an exemplary screen shot that illustrates exemplary operation of an exemplary embodiment of the present invention.

FIG. 12 illustrates an exemplary embodiment of the present invention in which, when a display object is selected, an image based on additional data appears based on predefined rules. In FIG. 12, for example, the predefined rule is that when a display object for ErikKatz is selected, an image showing the location of ErikKatz (based for example on GPS data) also appears. While the image shown in FIG. 12 is a map with location data, this image is merely exemplary.

Figure 13A:
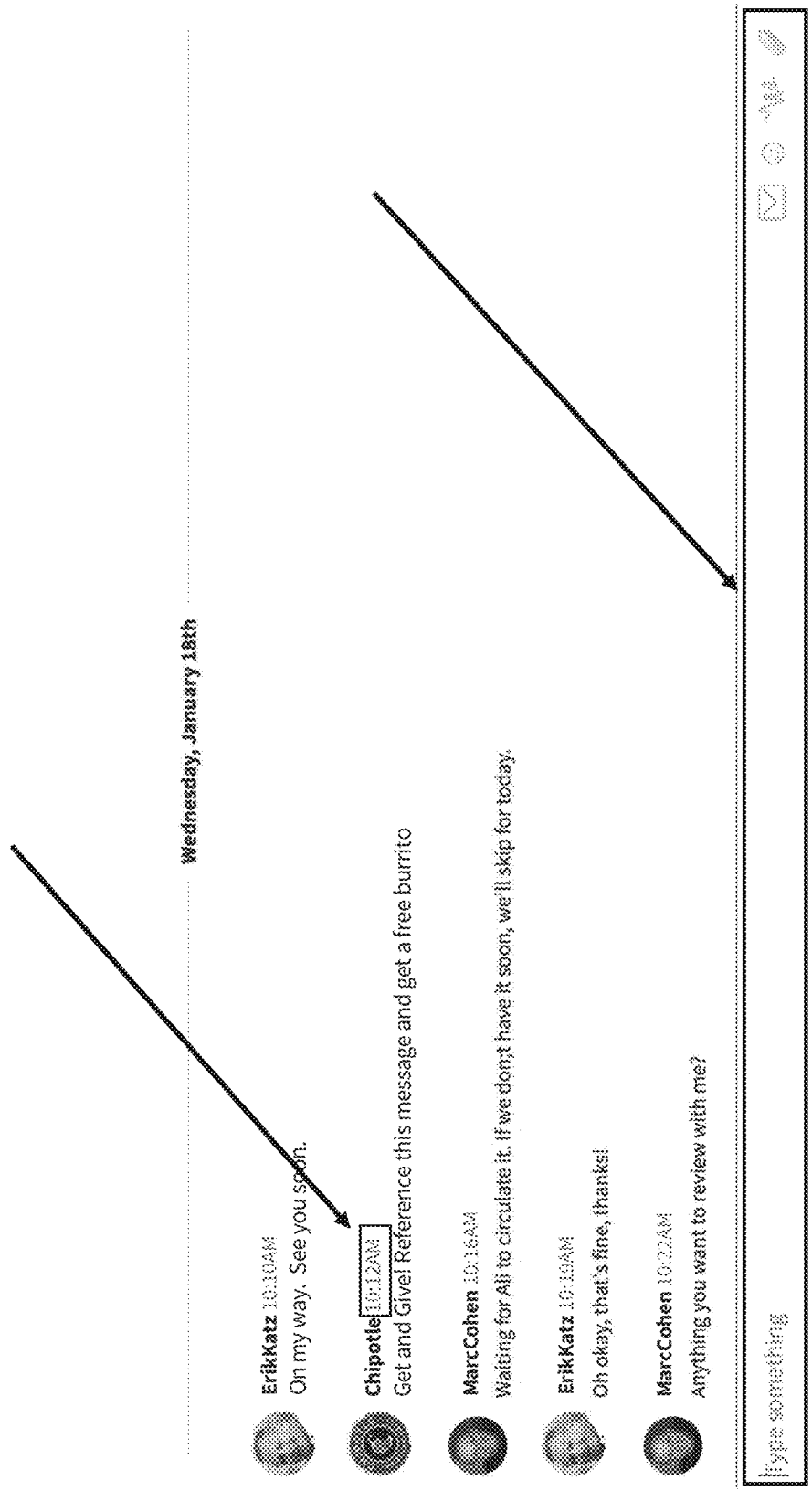
Figure 13C:
Figure 13D:
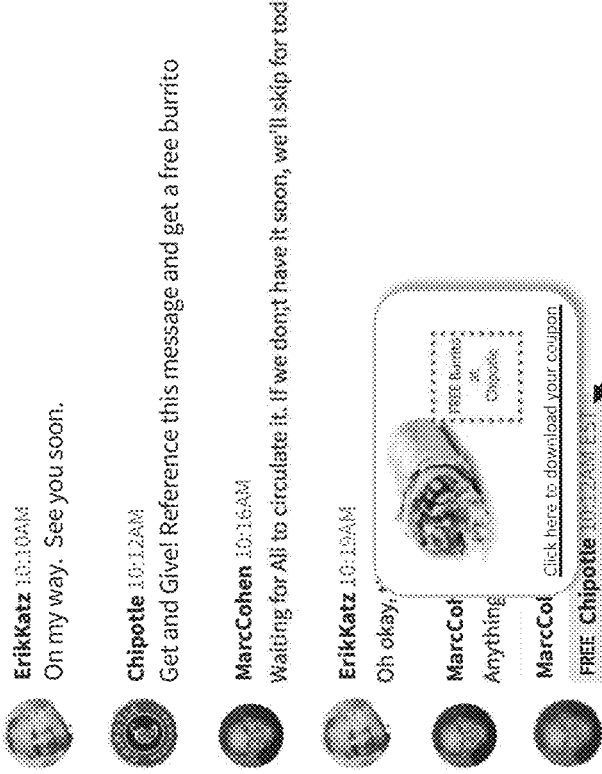

FIGS. 13A-D illustrate a further exemplary embodiment of the present invention, in which selection of a display object does not reference a previously displayed (or later displayed message) but instead references other data—in this example an advertisement. In FIG. 13A, the display object for the Chipotle message has been referenced. Thus, in FIG. 13B, a reference object corresponding to the display object referenced in FIG. 13A is inserted into the text entry box. Once transmitted, a message appears in FIG. 13C that includes a display object corresponding to the reference object inserted into the text entry box in FIG. 13B. FIG. 13D illustrates an exemplary image that appears when the display object illustrated in FIG. 13C is selected. The exemplary image may appear as a popup, but this is merely exemplary as the image may appear using other display mechanisms. Selection, as in the other embodiments can be in the form of hovering, a click (form an I/O device such as a mouse), or some other action. As shown in FIG. 13D, the exemplary image in the popup includes a link that can be selected for a further action to occur. In this example, clicking the link results in the user (i.e. the user that created the message with the display object) receiving a promotion (i.e. free food). The promotion can be sent as a data transmission in a variety of manners including text, email, a popup, etc. The text can be sent, for example, simultaneously with the display of a popup on the screen where the display object has been selected.

In the above explanation, the result of the actions described is the display of a popup that includes a link which, when clicked results in a data transmission with a discount coupon (for example). This is merely exemplary. Other actions may occur upon selection of a field in such an exemplary popup, or instead of or in addition to display of the popup. Exemplary actions include initiation of an SMS text message, saving messages to an application (such as Evernote), popping up an additional window (which may also include a link that can be selected for further action to occur), and/or other actions.

In several exemplary embodiments, a first message is displayed before a second message is formed with a reference object (that may be converted to a display object). In those embodiments, after the second message is formed, when the display object associated with the second message is selected, the information associated with the first message that is displayed is at least a portion (e.g. text) of the first message that was displayed. The examples illustrated in FIGS. 13A-D show a feature in place of, or in addition to the above feature. In the examples illustrated in FIGS. 13A-D, again a first message is displayed before a second message is formed with a reference object (that may be converted to a display object). After the second message is formed, however, when the display object associated with the second message is selected, information associated with the first message that is displayed is other than any portion of the message that was displayed (e.g. an advertisement).

In an exemplary embodiment of the present invention, the first message and the second message are part of a stream of messages. A stream of messages includes a plurality of messages sent one after another, i.e. one message appears, another message appears after the earlier message, etc. Multiple messages may exist between the first and second messages, or the first and second messages may be adjacent to each other in the stream. The stream of messages may exist, for example, in a single channel of communication (although messages across multiple channels of communication are also contemplated). In at least one exemplary embodiment, a display can be (continuously) scrolled from the earlier message to the later message.

In one or more exemplary embodiments of the present invention, it may be possible to remove a reference object; various techniques may be implemented. For example, the reference object may be removed from the text entry box in response to a user interaction with the reference object. If the user is using a touch screen display, the reference object may be removed by pressing on that area of the display. In other implementations, the reference object may be removed by the user clicking on the reference object with, e.g., a mouse. In some exemplary embodiments, the reference object may be deleted by using the text entry cursor back space over/ delete the object.

In an exemplary embodiment of the present invention, when the message is sent via a network as shown in FIGS. 1 and 2, the display object is included in the newly posted message. In some implementations, the display object is visually distinguishable from text entered by the user along with the object. For example, the display object may be a different text color, font size or include animation to distinguish it from the normal text data.

After the reference object is entered into the chat message session, and the display object appears in the chat message session, the user may still be able to edit or remove the display object. To edit the display object in the chat session, the user may first select the object by, for example, clicking on the object. A window or other kinds of display may appear at the interface portal with respect to the reference object. The user may then delete the display object using any of the techniques described above. The user, in an exemplary embodiment of the present invention, may replace or add one more different display objects, by selecting a display object associated with a different previous chat message. After the user has completed their edits, the window may be closed and the interface portal will be automatically updated with the new or deleted display objects. This update is also transmitted to the other user that received the newly posted message so that their respective interface portals likewise reflect the current state of the newly posted message.

In a further exemplary embodiment, a previously (or later) sent message can be edited to include a display object that was not previously associated with the sent message.

A user may enable the reference object in several ways. For example, the user may move a mouse over a portion of the display object. As shown in FIG. 8D, a popup window (or view) may be shown that displays the data from the previous chat message that is referenced by the display object. By hovering over and/or selecting the display object the text of the referenced message is displayed [above, to the side of, below] the chat message. Optionally, the user may toggle through successive display objects when more than one is added to the chat message. In this regard, the display object can serve a dual purpose of a control which, when activated, toggles through successive previous chat messages appearing in the popup window. Thus, the display objects provide a reader with immediate and useful context relating to the message they are reading. In exemplary embodiments of the present invention, the popup window (or any view that appears responsive to selection of a display object) may include hyperlinks, attachments (e.g. documents, photos, movies), or other embedded actionable items (such as "print" or "share"). The popup window can be passive or active. Thus, for example, clicking on a hyperlink that appears in a popup window can result in viewing of the target to the hyperlink, downloading an embedded attachment, etc. As a further example, it may be possible for a user to "star" (i.e. tag) the message referenced by the popup window. As a further example, a user can "jump" to the original referenced message (and thus locate and change a display to the original placement of a message within a stream of messages).

To clarify, the display object or link object can be embedded in the "REF Pop." A REF Pop refers to a window that is displayed in response to a user hovering or clicking on a display object. In some cases, the user may click on hypertext or another object and that object will launch an action such as a jump to the original message (e.g., the message being referenced). This and other actions may be launched from the REF Pop as well as following a hypertext link or perhaps even launching a form or listening to an audio recording or viewing an image. In other words, the REF Pop may be more than a passive read only display—in some cases a user can interact with it for deeper/further functionality.

In an exemplary embodiment of the present invention, various other types of visual or audio mechanisms can be activated in response to the user enabling the reference object. For example, when the user directs a mouse to hover over the reference object, the display label associated with the object may change in text color, font size. In some implementations, an animation may be displayed at the reference object. The changes can be to the referenced object "in place" or elsewhere on the interface portal. In other implementation, if the user is using a mobile device that enables the touchscreen to distinguish between different levels of force being applied to their surfaces, the reference object may be enabled depending on the amount of force applied. For example, if the user presses on the touchscreen at the reference object, the popup window may be shown that displays the previous chat message, which provides the reader with context to the chat message that is currently being read.

In a further exemplary embodiment of the present invention, the invention may be useful across multiple channels. Assume, for example, that one conversation is occurring in one channel and another communication is occurring in another channel. Thus, a "second message" can be created in one channel based on a "first message" that appears in another channel.

In a further exemplary embodiment of the present invention, nested references may be available. For example, if a reference is made to a prior message which also contains a display object (and so on), a feature may be available to view all nested messages together. In other words, assume one display object references a message with a display object, and that display object references another message with a display object. In this exemplary embodiment, all the messages referenced by display objects (in nested formation) may be displayed together.

FIGS. 14-22 are illustrative of further exemplary embodiments of the present invention. Before discussing each figure, several definitions with regard to these figures may be helpful.

Prompt—a form of electronic generated output that is receptive to interaction therewith. Examples of prompts include clickable (or otherwise selectable) areas associated with displayed messages located in message streams and clickable (or otherwise selectable) areas associated with areas (e.g. banners, menus, etc.) outside of message streams. The prompt may have, for example, a "click me" invitation implied (or explicitly communicated).

First Message—A message that includes a prompt and upon which a "user" "selects" an "area" associated with a prompt to spawn a Reference Object. In one embodiment, the Reference Object is spawned and inserted into a text entry bar. In some cases, the area associated with the prompt extends beyond the physical boundaries of a physical display of the prompt. In another embodiment, the Reference Object is spawned and posted into the message stream without being inserted into a text entry box.

Reference Object—An object representative of data spawned by a "user" that "selects" an "area" associated with a prompt. The term "Reference Object" is otherwise undefined, except that it is associated with the prompt (that may be included in a "First Message") in some way.

Note that text (or other data constructs, including graphics) can be added into a text entry bar before or after the Reference Object is spawned and inserted into the text entry bar.

Further Message—a message that is added to a message stream and that includes a Reference Object, text (or other data constructs, including graphics), and anything else that may be included in a message.

First Action Object—an optional action which occurs as a result of an area associated with a prompt (in a First Message, for example) is "selected." This can be a simple "thank you", a counter that records the fact that a selection has been made, or an action that is more complex. In one exemplary embodiment, the First Action Object includes an image. In another exemplary embodiment, the First Action Object simply records and stores the identity of the User who made the selection.

Display Object—what occurs when [as a result of] an area of the Further Message is "selected." This can be a simple "thank you" or an action that is more complex. In one exemplary embodiment, the Display Object includes an image. In another exemplary embodiment, the Display Object includes a request for data input where subsequent to said data being input a series of computational steps occurs.

User—an entity (person, organization, computer, algorithm, etc.) that plays a role in having a message displayed in a communications channel. The user may not necessarily be the person that directly caused the message to be displayed, but may have a more indirect influence on causing the message to be displayed. The user, for example, may not necessarily be a member of a network or a channel in which messages are posted on the user's behalf. Thus, while a user may play some role in a message being posted to a channel, the user may not have access to that channel, i.e. the user may not be able to see messages in a channel (the user's messages or other channel participant's messages).

Select—Some form of [automated or physical] interaction with a display. Examples include: click, hover, movement, biometrics, touch sensitivity, voice.

Area—This is an area associated with something that is displayed. The area may be directly on top of what is displayed, or in a nearby location which is associated with what is displayed. Note that the word "area" is also used with regard to other exemplary embodiments of the present invention, with regard to the "area" of an image that is selected for the purpose of being digitally linked to content. The word "area" is used below, for example with regard to the flowchart of FIG. 23, and will be described in greater detail in the related description.

Figure 14:
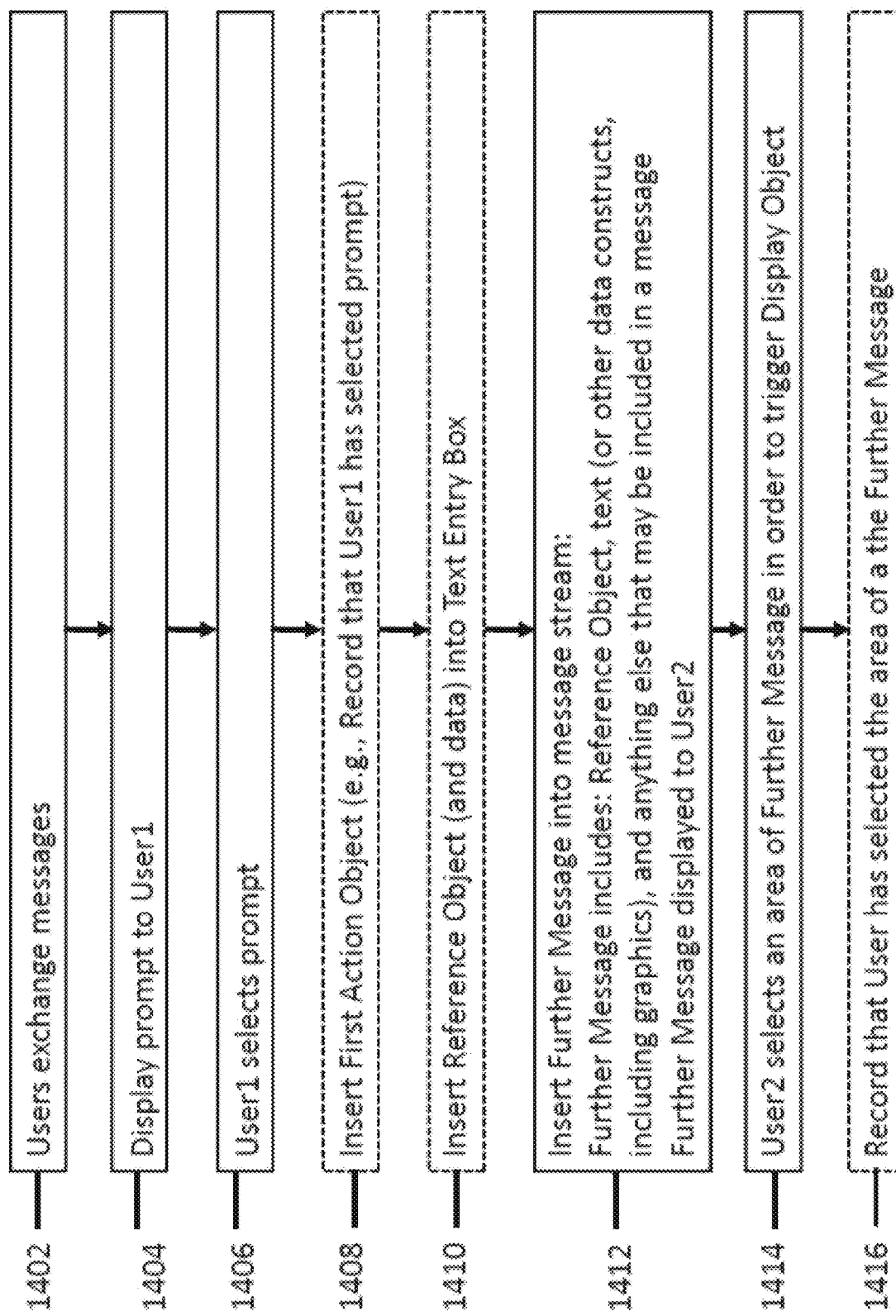
FIG. 14 is a flow chart diagram that illustrates operation of an exemplary embodiment of the present invention.

A further exemplary embodiment of the present invention is illustrated with regard to the flowchart diagram of FIG. 14. Generally speaking, FIG. 14 is with regard to one user taking an action, and the display of another user (or at least another user) being changed as a result.

At step 1402, users are exchanging messages. In one exemplary embodiment of the present invention, a plurality of users exchange messages within a channel. The messages appear on multiple displays as a message stream.

At step 1404, a prompt is at least partially displayed to User1 (for purposes of this explanation a plurality of users will be identified as User1, User2, . . . User(n)). The word "prompt" includes any image or area displayed on a screen which, when User1 responds (or interacts) thereto (or therewith) by taking a certain action, a subsequent action occurs. In one exemplary embodiment, the prompt encourages User1 to "select" the prompt. Such encouragement can be explicit or implicit. Furthermore, selecting the prompt may entail selecting an area on the screen associated with the prompt. Thus, for example, if the prompt is an image, selecting the prompt may entail taking a certain action with regard to that prompt, such as a click, a hover, touching on a touch sensitive device, etc. Furthermore, the action may occur directly on the image or at an area adjacent to, nearby, or somehow associated with the image. In some embodiments the images are displayed, while in other embodiments, portions of the images or a further image(s) associated with the images is/are displayed.

At step 1406, User1 selects the prompt, and again the selection may entail some sort of manner of performing interaction with the prompt or an image area associated with the prompt.

At optional step 1408, the fact that User1 has selected the prompt is recorded. Recording may entail detecting the fact that the prompt has been selected, and by whom (i.e. which user—in this example, User1). Recording may alternatively (or in addition) entail use of a tracking mechanism, such as a cookie. If a cookie is being used, the optional recording step may include depositing a cookie on a user's computer or modifying a cookie that has previously been placed on a user's computer (or associated with a user's cloud account). Stated another way, and without limiting the foregoing description, recording may be accomplished by inserting a First Action Object.

At optional step 1410, a Reference Object is inserted into a text entry bar. This step will eventually lead to the creation of a Display Object (see below). In one exemplary embodiment of the present invention the Reference Object is associated with the user that spawned it. In other words, examination of the Reference Object will provide information regarding the user that spawned it. In another exemplary embodiment of the present invention the Reference Object is associated with the message that spawned it, and includes an association to additional information that may have been added (through some means such as a data collection form) by the user. In other words, examination of the Reference Object will provide information regarding the contents of the message that spawned it. A Reference Object may, in some embodiments, also be associated with one or more other actions, such as a visual display (of a coupon, a form, or some other type of image, or in some cases an image, possession of which provides value for example), an audio output, or the initiation of some other action (such as a data collection and transmission, for example). In a further exemplary embodiment, the Reference Object is not associated with the user that spawned it. In other words, examination of the Reference Object may not provide identification of the user that spawned it. For clarity, such as Reference Object may be called an "Orphan" Reference Object. Optional step 1410 may also include the step of inserting text (or some other data corresponding to visual data or sound) into the text entry bar. "Text" may also include no data characters (which may be, for example, blank).

At step 1412, a Further Message is inserted into the message stream. The Further Message may include a Reference Object (as described with regard to step 1410) and may include something in addition such as text (or other data constructs, including graphics), and anything else that may be included in a message. In some cases, nothing else is included in the message, i.e. the contents are blank. If optional step 1410 is performed, the Reference Object (or more than one Reference Objects may be obtained from the text entry bar. The Further Message that is displayed in the message stream is displayed to a further user, which for this description will be referred to as User2.

At optional step 1414, User2 selects an area associated with the Reference Object in the Further Message. As previously explained, "select" is accomplished in several different ways. When the area associated with the Reference Object is selected, the Display Object is triggered, which may result in a visual display, an audio output, or initiation of another action.

At optional step 1416, if the selected area associated with the Reference Object is a User Reference Object, the fact that User2 has selected the Reference Object is recorded. There may be several areas associated with respective Reference Objects and a recording may be made of the specific one or more Reference Objects that have been selected. Recording, as previously described, may entail detection and/or some other action such as the use of a cookie in combination with User2's computer (or cloud computing, for example), namely providing User2 a cookie or updating a cookie that has already been associated with User2.

The above steps may be illustrated with several exemplary embodiments.

FIGS. 15A through 15F are screenshots that illustrate an exemplary embodiment of the present invention applied to an illustrative theme.

FIG. 15A illustrates multiple users exchanging messages in a channel. FIG. 15A illustrates a Reference Object included in Sidiam's 7:28 PM message. The Reference Object references MovMaven2 and references MovMaven2's 7:25 PM message.

FIG. 15A illustrates an optional feature, namely the use of an @ symbol (or any other special symbol or unique character string), that reveals one or more "prompts" as described with regard to step 1404. In this example, typing an @ symbol and then a movie name, director name or actor name (for example) reveals one or more prompts. In an exemplary embodiment, a selected movie may be entered as a Reference Object. Selecting the Reference Object may add the movie to a watch list, for example.

Referring to FIG. 15B, writing a review for Wild Tales appears as a prompt near the top of the screen. As previously explained, User1 (Astro 9 in this example) selects an area associated with the prompt. In one exemplary embodiment, the area associated with the prompt is in the message stream. In the example illustrated in FIG. 15B, the prompt is a combination of image and text which is displayed outside of the message stream. The combination of image and text shown in FIG. 15B is merely exemplary.

Once the prompt has been selected, the (area associated with the prompt) can remain selectable to other users or may be deactivated (i. e. no longer available to be selected).

In FIG. 15C, the area associated with a prompt has been selected (by User1-Astro9). A Reference Object associated with the selection is then automatically inserted in the text entry bar. This is merely one exemplary embodiment and in this example the Reference Object is a User Reference Object (i.e. a record will be made that User1 made the selection). In another exemplary embodiment, the Reference Object is inserted directly into the message stream. As shown, the Reference Object includes an image ("Add Wild Tales to my list" in white text on a black background). As an optional step, the fact that a user has made the above selection (so that the Reference Object will be included in a message stream) is recorded. In this example, the fact that Astro9 made the selection is recorded. As will be explained below with regard to FIG. 15F, in an optional step, when User2 selects the Reference Object that was inserted into the message stream, the selection may be recorded as well.

While these examples use the descriptors "User1" and "User2", in exemplary embodiments actual user names may be hidden from you, either through anonymity or the use of aliases.

As shown in FIG. 15D, User1 (Astro 9) can optionally enter additional information in the message entry bar. The additional information may include text, audio, a link, file, etc. The combination of the text that has been entered into the message entry bar and the Reference Object may be used to form a Further Message. The additional information may be linked/associated with the Reference Object. The user can post the combination (Reference Object+additional information) into the current active channel or optionally switch to another channel and post in that channel.

In FIG. 15E, the Further Message is inserted into the message stream of the current channel. In this example, the Reference Object is clickable, although this is exemplary. As previously described, selection of the Reference Object is accomplished by interaction with an area on the screen associated with the Reference Object. The Reference Object may be visible in this example by the image "Add Wild Tales to My List." Who made the selection may be recorded/stored (e.g. with a cookie). Although the Further Message is posted into the current active channel, the channel may be optionally switched so that the Further Message is posted in another channel.

FIG. 15E shows the Display Object displayed within the message stream and being displayed to Astro9 (User1). However, when the Display Object is inserted in the message stream, the Display Object may be displayed to another user, such as MovieMan4, as shown in FIG. 15F.

In FIG. 15F, User2 sees the Reference Object that has been placed into the message stream by User1. User2 may then select the Reference Object by selecting an area associated with the image that corresponds to the Reference Object. Again, the term "selection" may have several definitions as explained above. In FIG. 15F, selecting of the Reference Object has caused another action to occur. In FIG. 15F, for example, several actions occur, including display of a photographic image along with the text "Wild Tales Has been added to your Movie List!" and the addition of Wild Tales to a movie list. Optionally, the fact that User2 has selected (an area associated with) the Reference Object is recorded. "Recording" may be simple detection (which can be stored), the providing of a cookie, the modification of a cookie, etc. Optionally, the fact that a (area associated with a) Reference Object that User1 has placed into the message stream has been selected by another user (in this case User2) is recorded. Optionally, if User2 places the same Reference Object into the message stream (again), or into another message stream, and if a further user (a User3) selects the Reference Object, the fact that a (area associated with a) Reference Object placed into a message stream by User1 has again been selected is recorded, and/or the fact that a Reference Object placed into a message stream by User 2 is recorded.

FIGS. 16A through 16F illustrate a further exemplary embodiment of the present invention. FIG. 16A through 16F also relates the ability to provide a movie review, but this is again exemplary.

FIG. 16A again illustrates a User Reference Object inserted into Sidiam's 7:28 PM message. The use of a specialized symbol or string to reveal several prompts is also illustrated. Further illustrated is a prompt provided within a message stream (as opposed to, or in addition to prompts in other places, such as along the top of the screen as illustrated in this example). This may be a First Message, i.e. a message upon which a "user" "selects" an 'area" to spawn a Reference Object. In one embodiment, the Reference Object is spawned and inserted into a text entry bar. In another embodiment, the Reference Object is spawned and posted into the message stream without being inserted into the text entry bar.

Figure 16A:
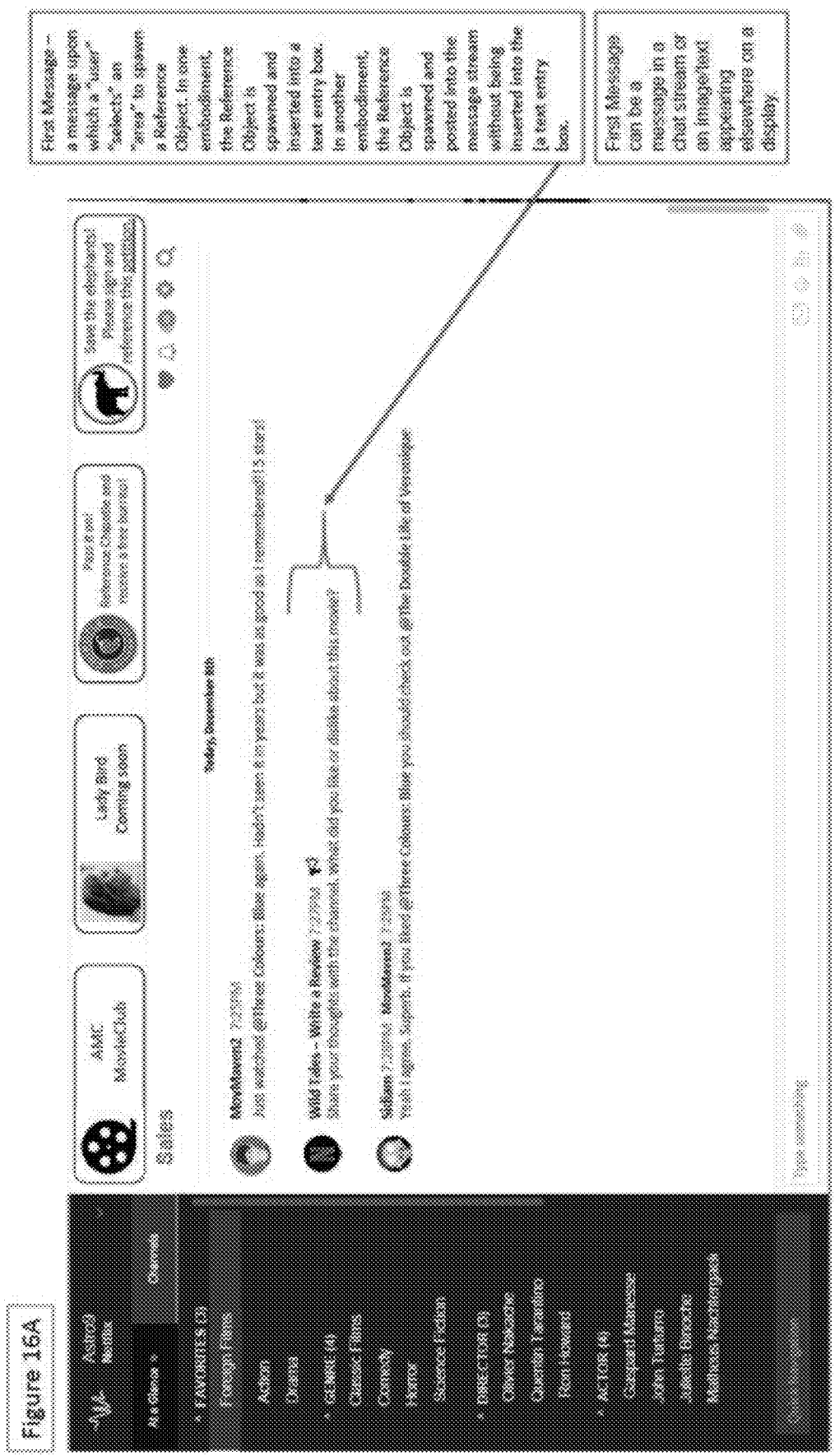
Figure 16B:
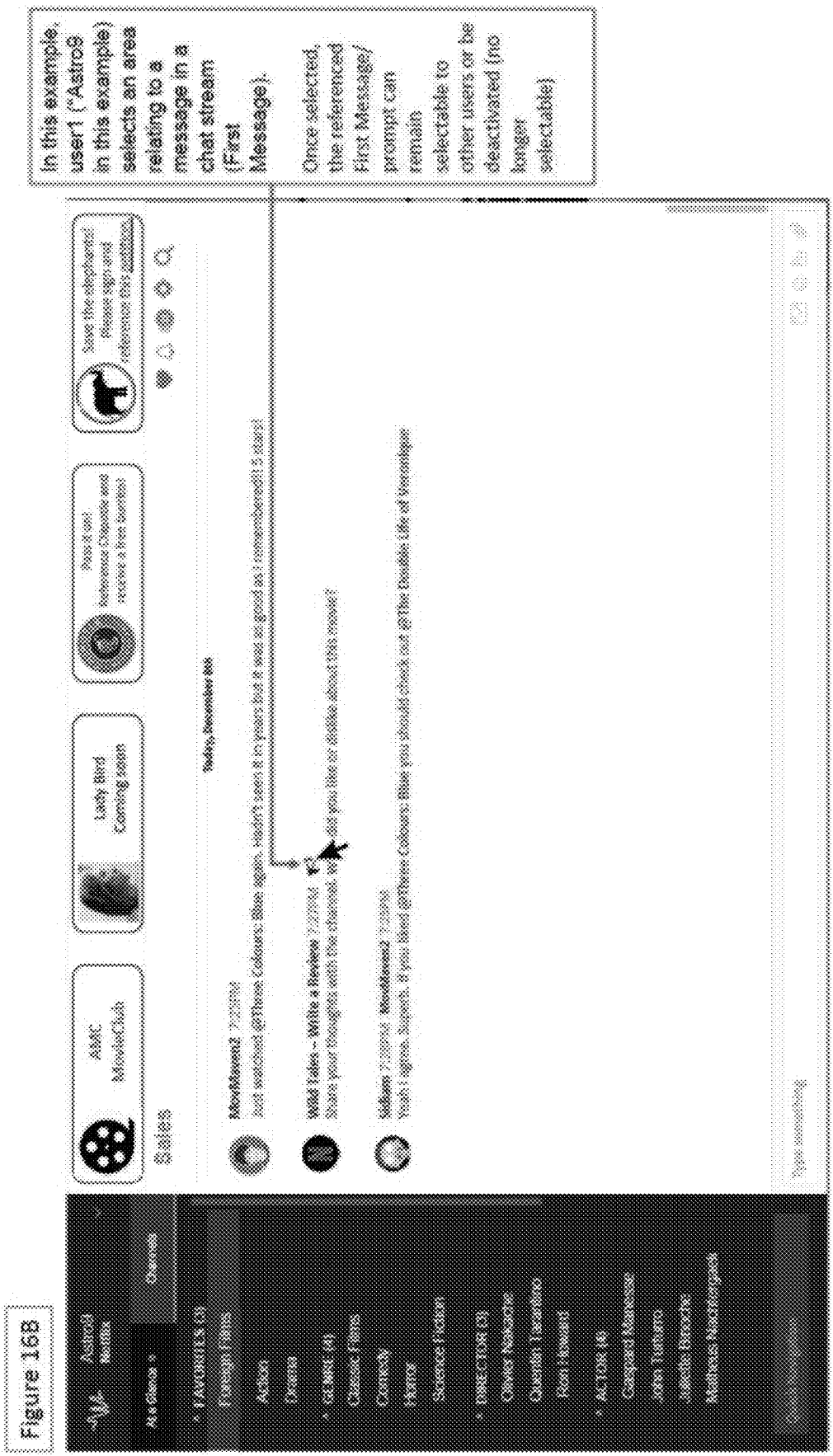

In FIG. 16B, a user (User1-Astro9, for example) is being invited (through a prompt) to provide a review. Again, this figure differs from FIG. 15*b* in that the invitation (prompt) in FIG. 15*b* is located outside of the message stream (near the top of the screen for example). In FIG. 16B the invitation (prompt) is located within the message stream. In FIG. 16B, an image of a bullhorn is being shown as the invitation (prompt) for a user to provide a review, although this is merely exemplary. In a further exemplary embodiment the present invention, selecting an area associated with the prompt that appears in FIG. 16B may initiate the steps for leaving a review. Thus, in FIG. 16B, User1 (Astro9 for example) selects an area associated with a prompt in the 7:27 message (this is exemplary) in the message stream. Once selected, the prompt can remain selectable to other users or may be deactivated. This is merely exemplary.

Figure 16C:
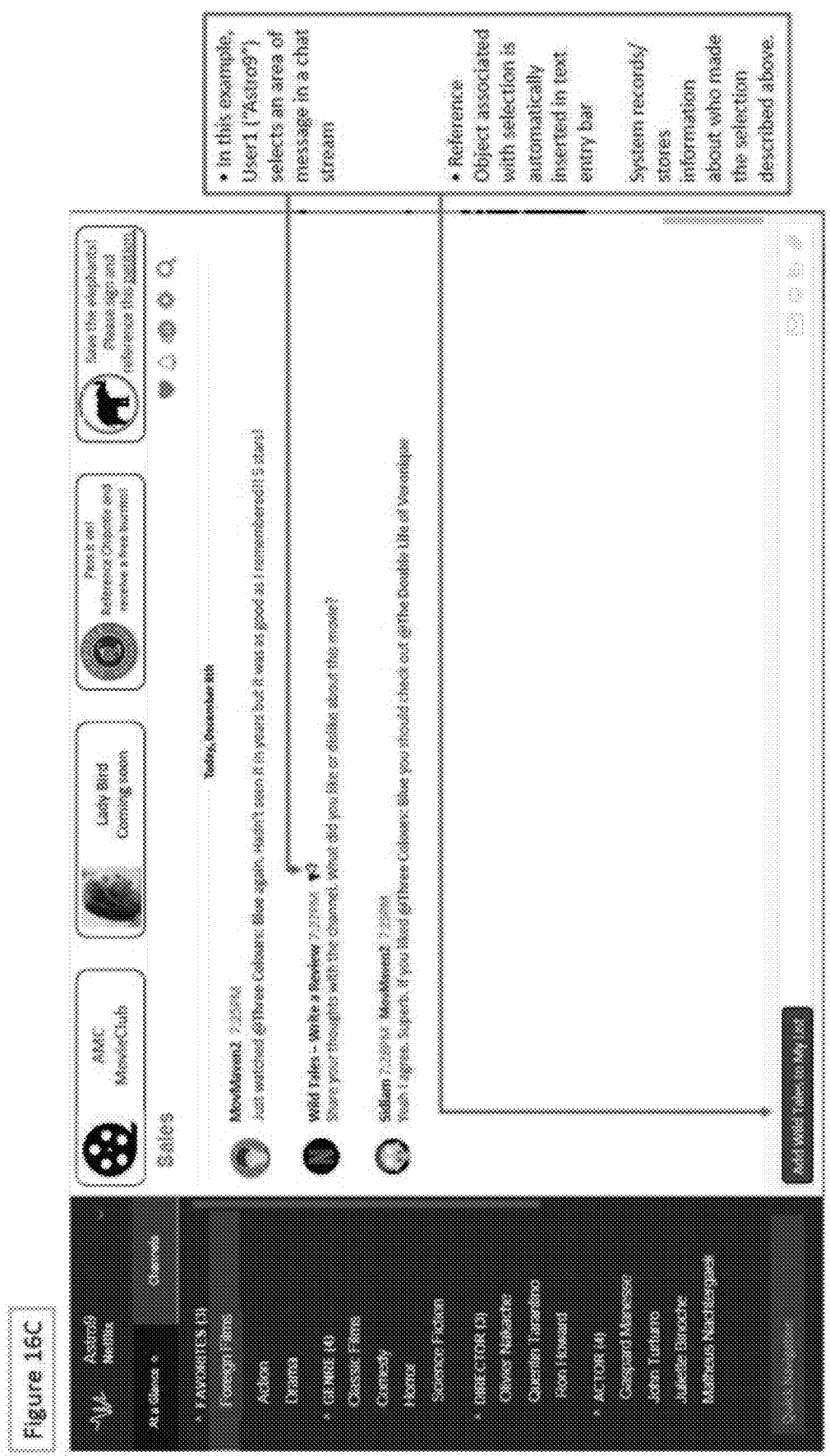

In FIG. 16C, as a result of User1 selecting an area associated with the prompt in the second message, a Reference Object associated with the selection is automatically inserted into the text entry bar (or, for example, inserted after receiving an affirmation to do so). Again, this is merely exemplary as described above with regard to the previous embodiment because in some exemplary embodiments the Reference Object may be inserted directly into the message stream (as part of a Further Message) without first being inserted into the text entry bar. Furthermore, in another exemplary embodiment of the present invention, the optional step is taken of recording the fact that Astro9 has responded to (interacted with) a prompt.

As shown in FIG. 16D, User1 has the option of entering further data in a text entry bar which may be, for example, text, audio, only, file, etc. The further data may be placed into the message entry bar. Again, as explained with regards to the previous exemplary embodiment, the combination of the Reference Object and the further data forms a Further Message that may then be inserted into the current active channel or into another channel.

As shown in FIG. 16E, the Further Message is placed in the message stream of the current channel (or optionally in the message stream of another channel). The Further Message includes a Reference Object, text (or other data constructs, including graphics), and anything else that may be included in a message.

In FIG. 16F, the screen of User2 (MovieMan4), is displayed. As shown in FIG. 16F, MovieMan4 is able to select the (area associated with the) Reference Object. In the exemplary embodiment, selection of the Reference Object causes one or more further actions to occur, namely 1) a further image to be displayed (e.g. the image that appears in FIG. 16F which is a combination of a photo and text); and 2) Wild Tales has been added to User2's movie list. The image that is shown in FIG. 16F is merely exemplary. In a further optional step, the fact that MovieMan4 has selected the Reference Object may be recorded, either through simple detection, or with the use of a cookie (for example).

FIG. 17A through FIG. 17H are screenshots that illustrate a further exemplary embodiment of the present invention.

Figure 17A:
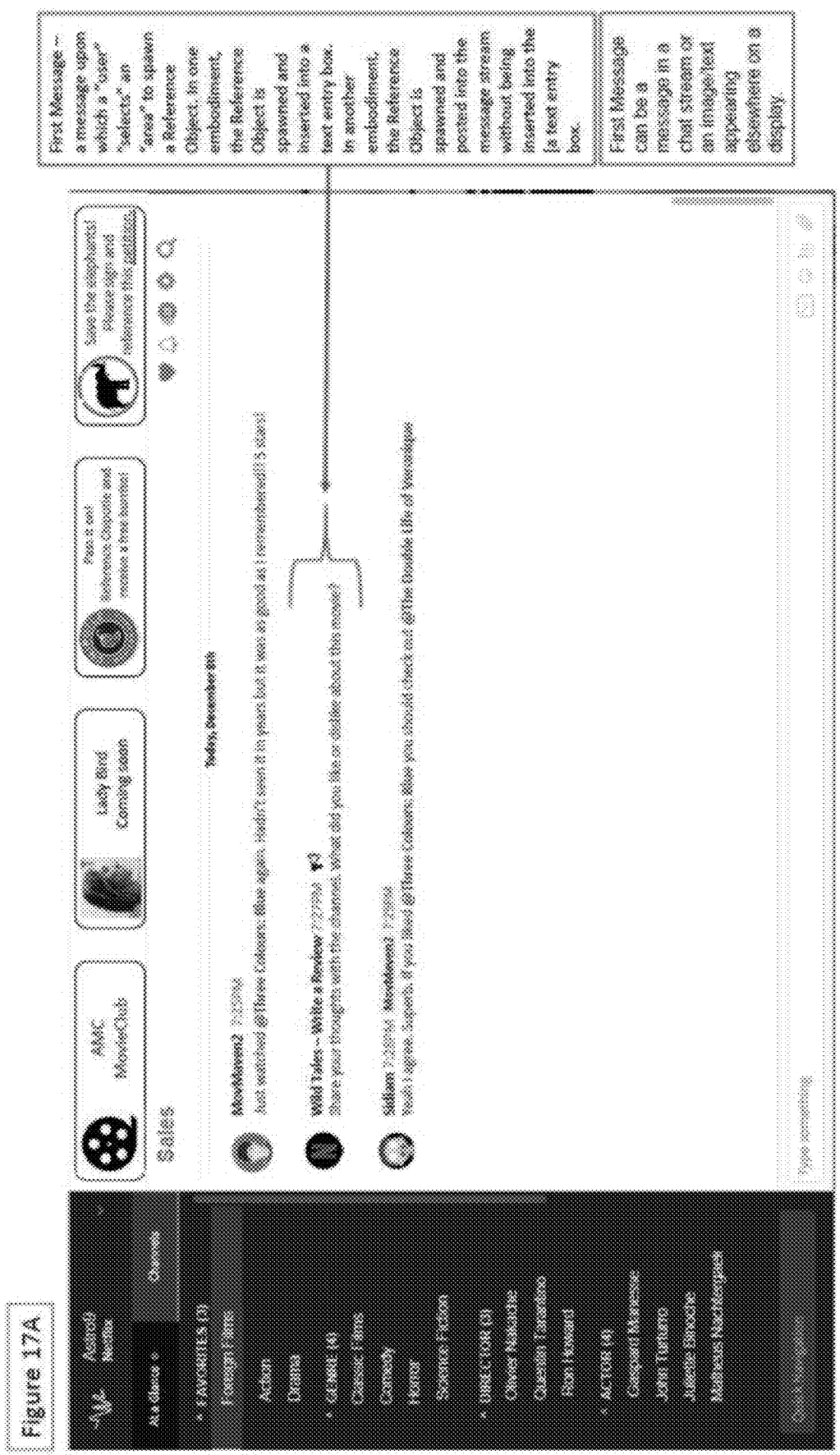

In FIG. 17A, a First Message is a message upon which a "user" "selects" an "area" associated with a prompt to spawn a Reference Object. In one embodiment, the Reference Object is spawned and inserted into a text entry bar. In another embodiment, the Reference Object is spawned and inserted into a text entry bar. In another embodiment, the Reference Object is spawned and posted into the message stream without being inserted into the text entry bar. In this example the First Message can be a message in a chat stream or an image/text appearing elsewhere on a display. Also, in this example, the user does not have the ability to view messages in the message stream, although this is merely exemplary.

Figure 17B:
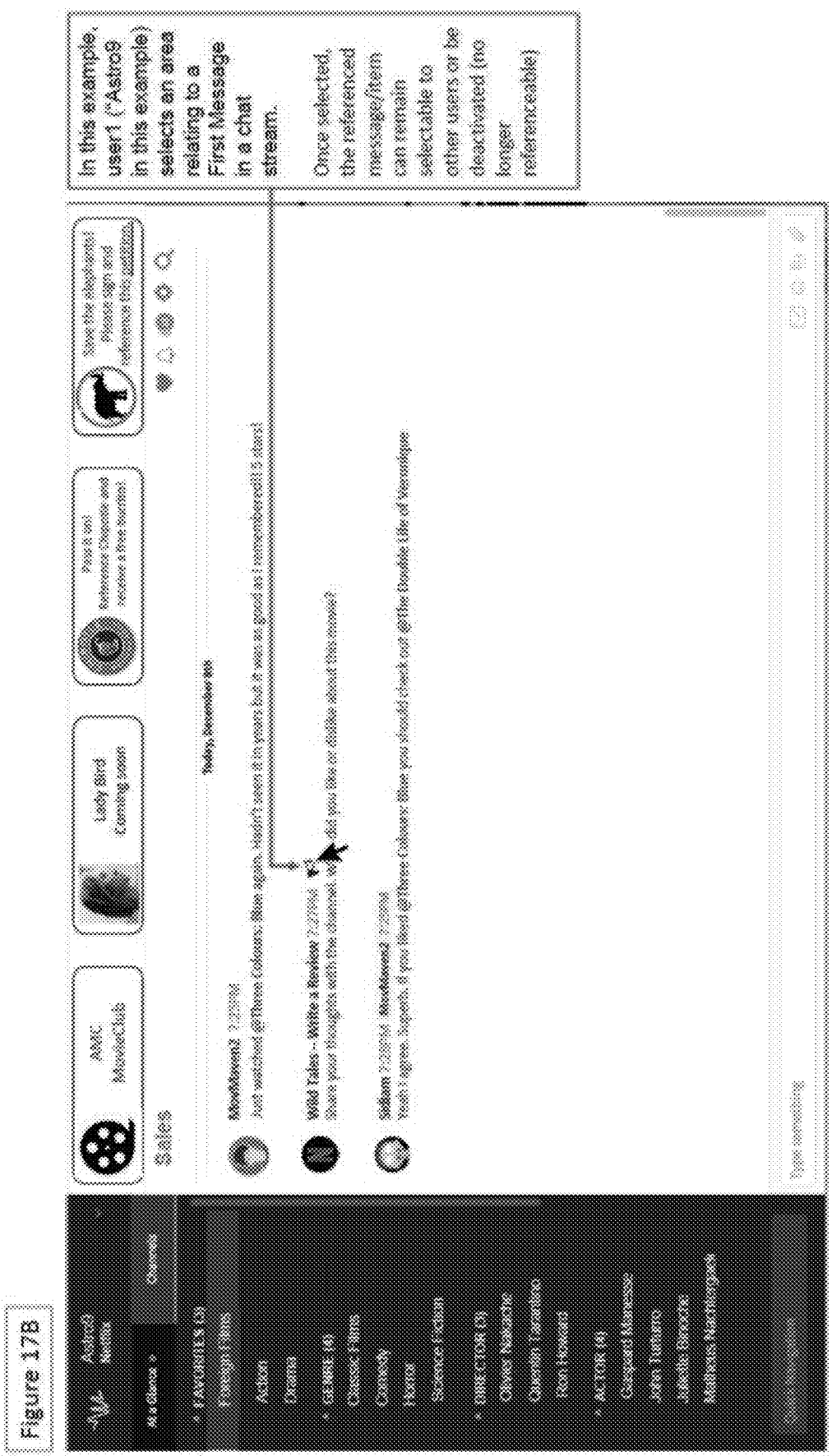

In FIG. 17B, in this example, User1 (Astro9 in this example) selects an area relating to a prompt in a chat stream. Once selected, the area relating to (or associated with) the prompt can remain selectable to other users or be deactivated (no longer selectable).

Figure 17C:
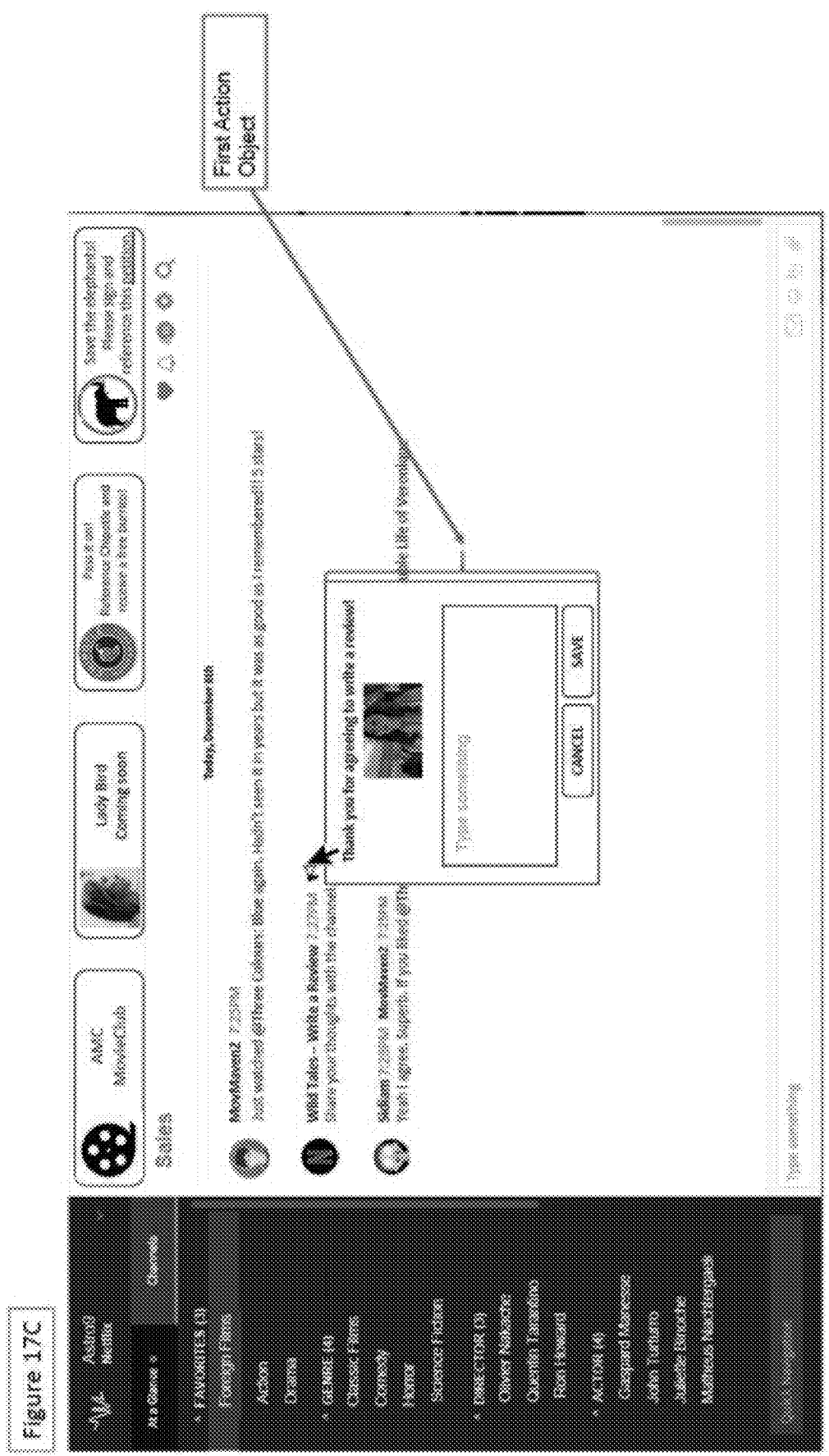

In FIG. 17C, in this example, as a result of the area associated with the prompt being selected, a First Action Object is displayed. This can be a simple "thank you," a counter that records the fact that a selection has been made, or an action that is more complex. In the exemplary embodiment show in this FIG. 17C, the First Action Object includes an image and a data input box along with two buttons that either save the input data or cancel and close the First Display Object. In either case, user information associated with the User that made the selection is recorded. If the input data is saved, then the First Action Object is closed and a Reference Object is inserted in the text entry bar.

Figure 17D:
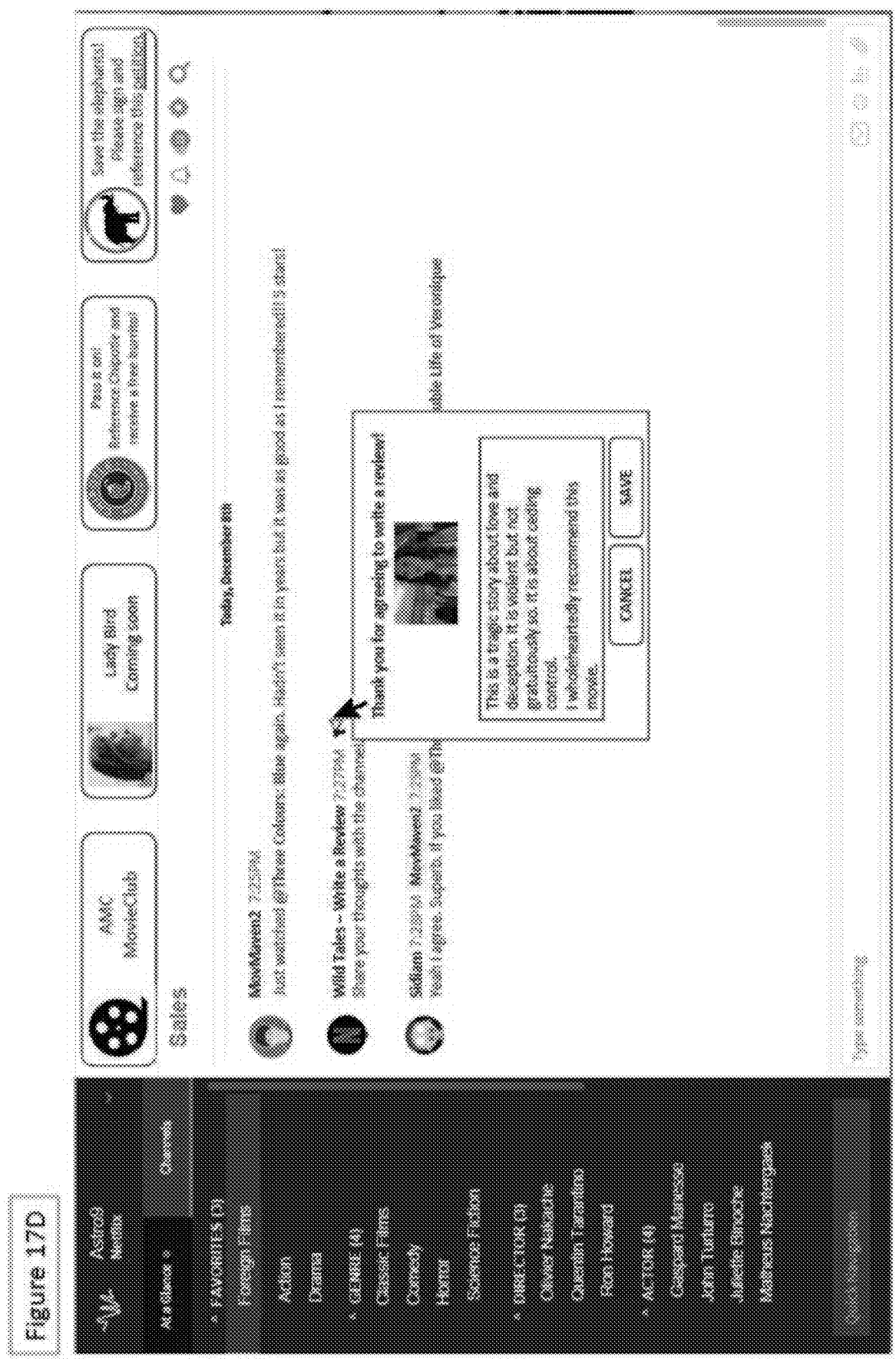

In FIG. 17D, in this example, the data is entered into the data input box of the First Action Object.

Figure 17E:
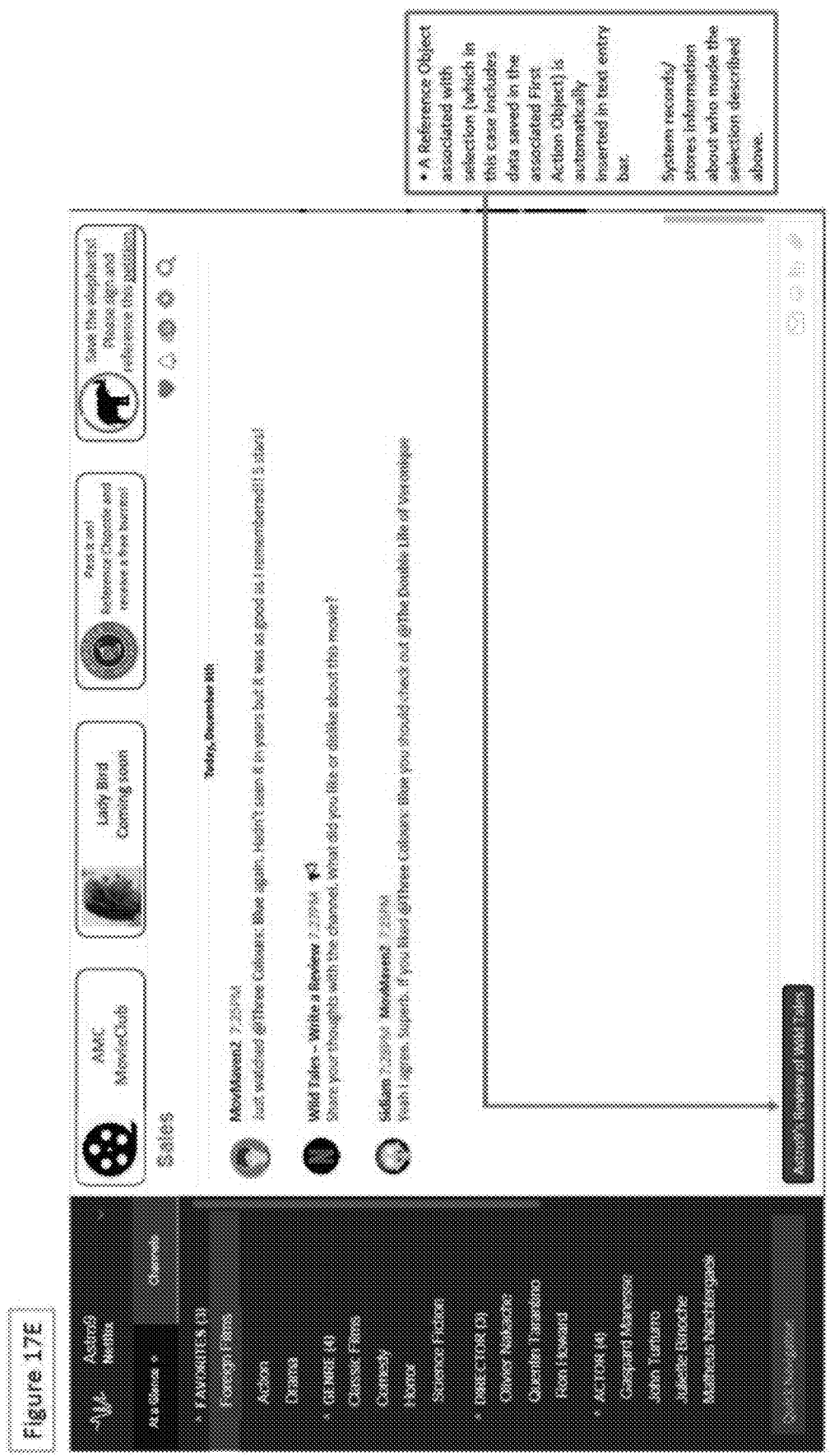

In FIG. 17E, in this example, the Reference Object associated with the selection (which in this case includes data saved in the associated First Action Object) is automatically inserted in the text entry bar. Information about who made the selection described above is recorded/stored.

In FIG. 17F, in this example, User1 enters Text into text entry bar. The text is linked/associated to Reference Object. The user can post the combination (Reference Object+text) into the current active channel or optionally switch to another channel and post in that channel. "Text" means text and/or some other data corresponding to visual data or sound or may also include no data characters (which may be, for example, blank.

In FIG. 17G, in this example, A Further Message is added to the active message stream (or optionally, to a different channel /message stream). A Further Message is a message that is added to a message stream and that includes a Reference Object, Text (or other data constructs, including graphics), and anything else that may be included in a message).

In FIG. 17H User(n) (or in this example User2) is MovieMan4. The fact that User2 selected an area associated with the Reference Object is recorded (through various methods exemplified above). User1's contribution, i.e. the fact that User2 is selecting a Reference Object placed in the message stream by User1, may also be recorded. Subsequent user selection of the Reference Object (i.e. by any User(n)) may also be recorded, optionally along with the User1's and/or User2's contribution i.e. the insertion and/or selection of the Reference Object in the message stream.

FIGS. 18A-18G are screen shots that illustrate a further exemplary embodiment of the present invention.

Figure 18A:
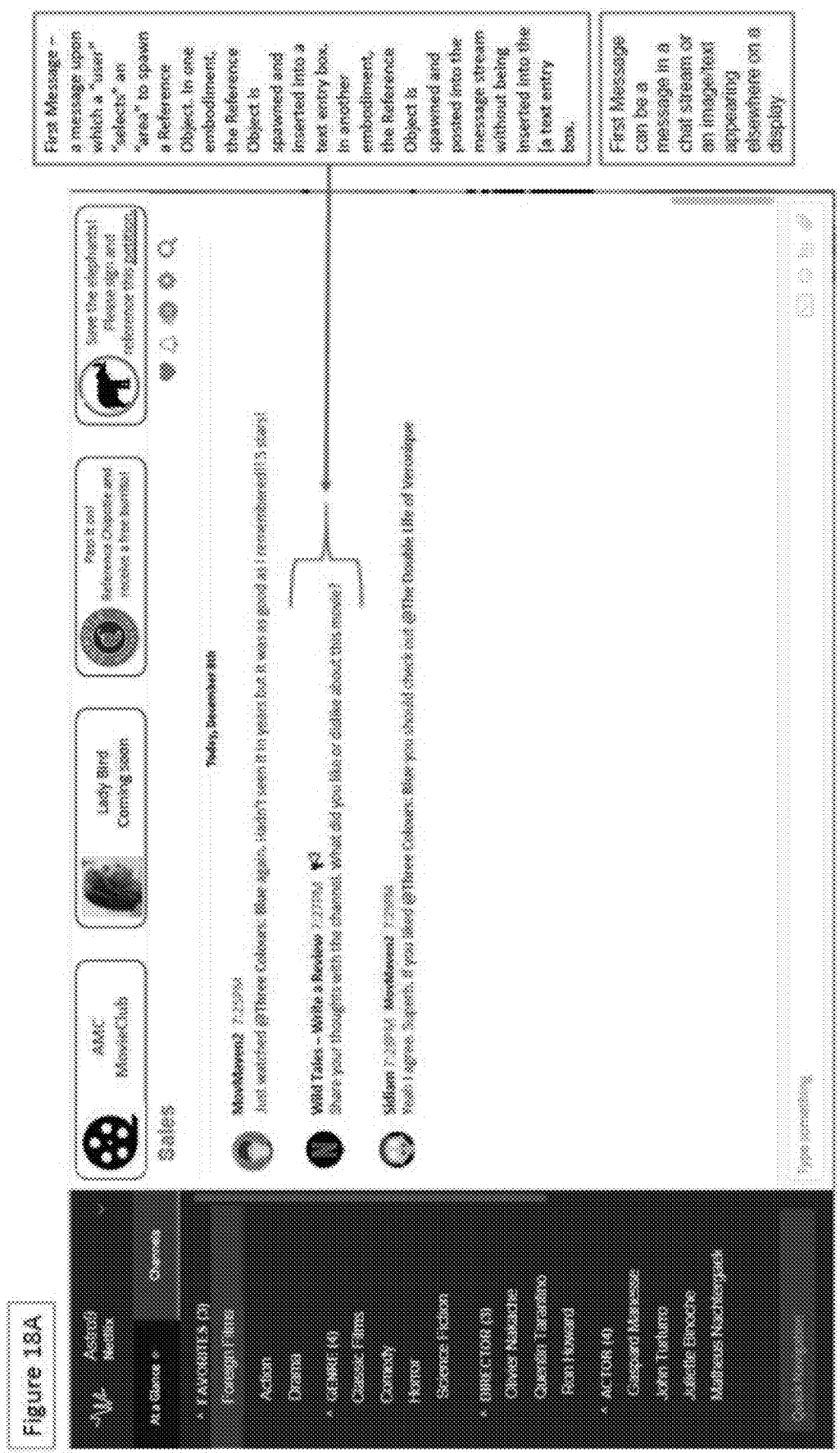

In FIG. 18A, the First Message is a message upon which a "user" "selects" an "area" associated with a prompt to spawn a Reference object. In one embodiment, the Reference Object is spawned and inserted into a text entry box. In another embodiment, the Reference Object is spawned and posted into the message stream without being inserted into the text entry bar. First Message can be a message in a chat stream or an image/text appearing elsewhere on a display.

Figure 18B:
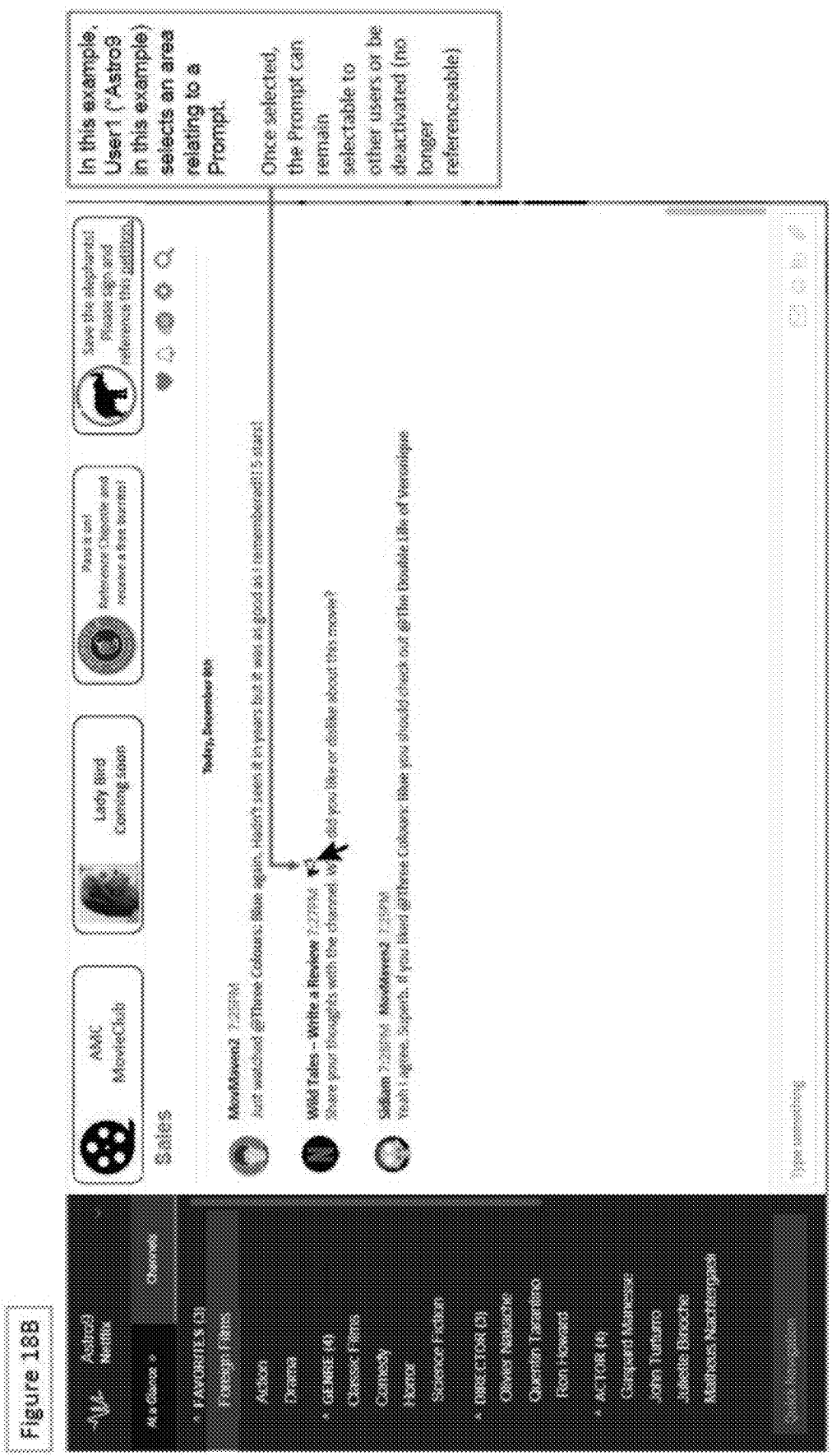
Figure 1B:
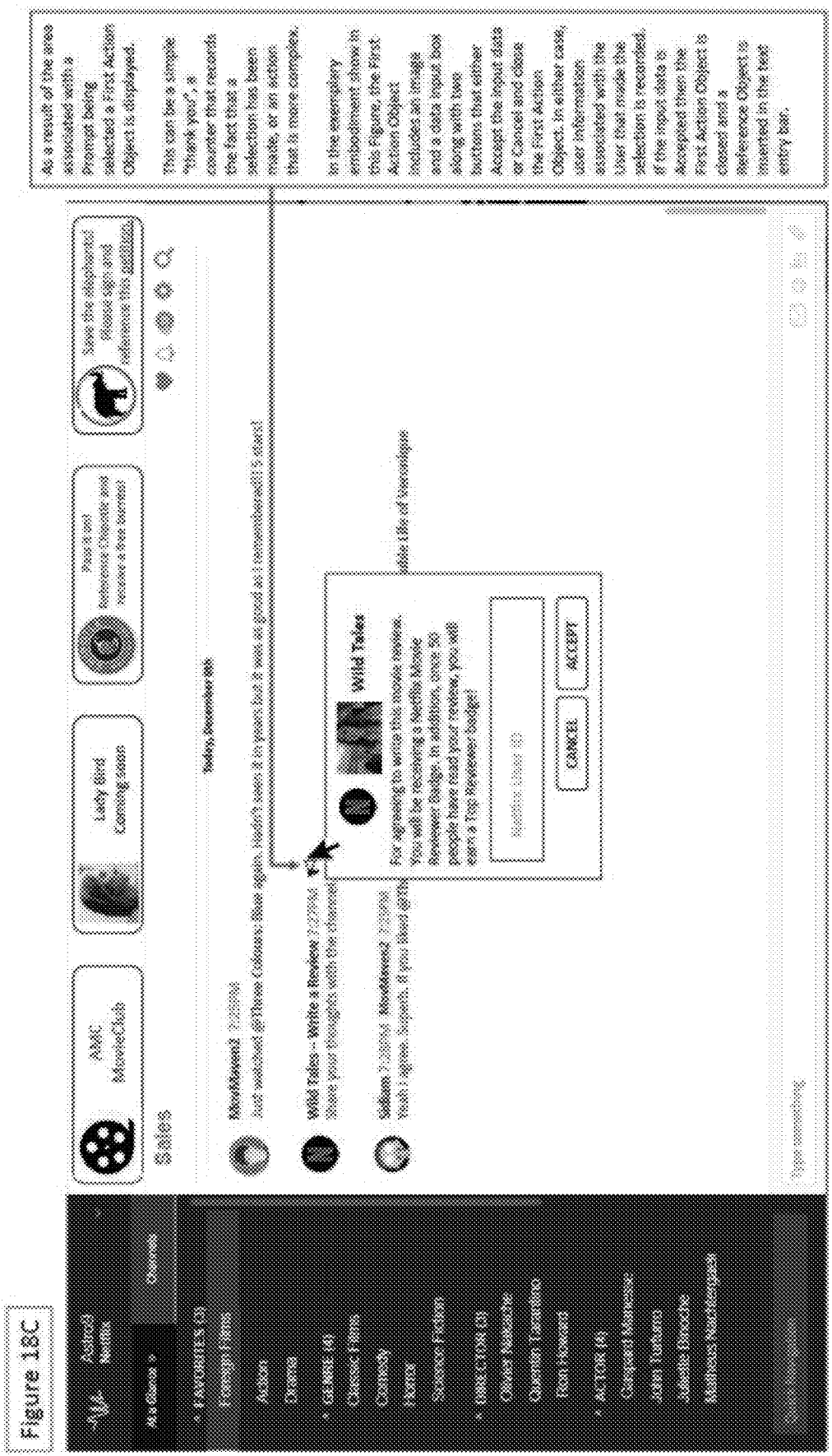

In FIG. 18B, in this example, user1 ("Astro9 in this example) selects an area associated with a prompt. Once the area associated with the prompt is selected, the area associated with the prompt can remain selectable to other users or be deactivated (no longer selectable).

In FIG. 18C, as a result of an area associated with the prompt being selected, a First Action Object is displayed. This can be a simple "thank you", a counter that records the fact that selection has been made, or an action that is more complex. In the exemplary embodiment shown in this Figure, the First Action Object includes an image and a data input box along with two buttons that either Accept the input data or Cancel and close the First Action Object. In either case, user information associated with the User that made the selection is recorded. If the input data is accepted, then the display object is closed and a Reference Object is inserted in the text entry bar.

Figure 18D:
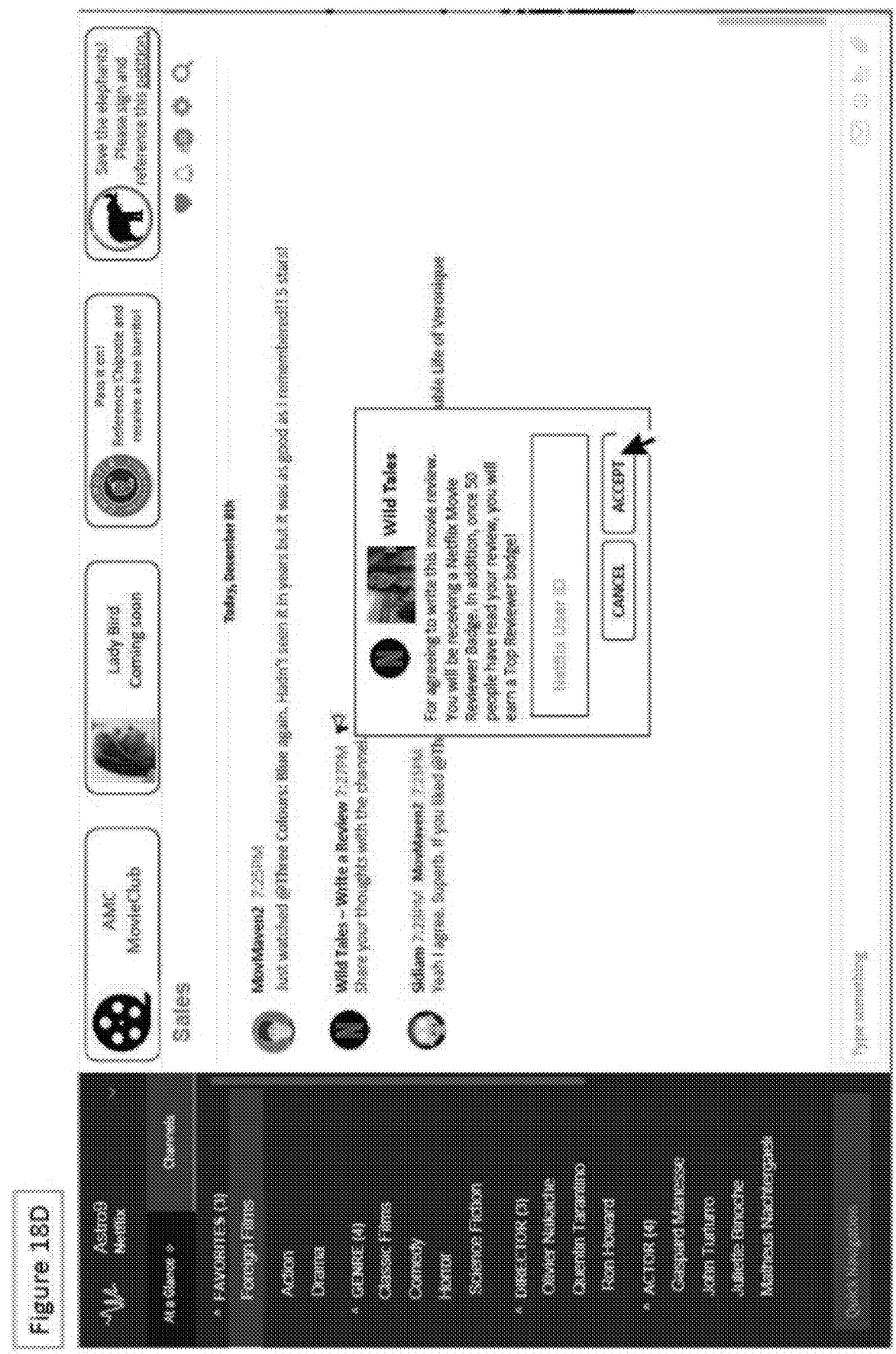

In FIG. 18D, in this example, User1 interacts with the First Action Object.

Figure 18E:
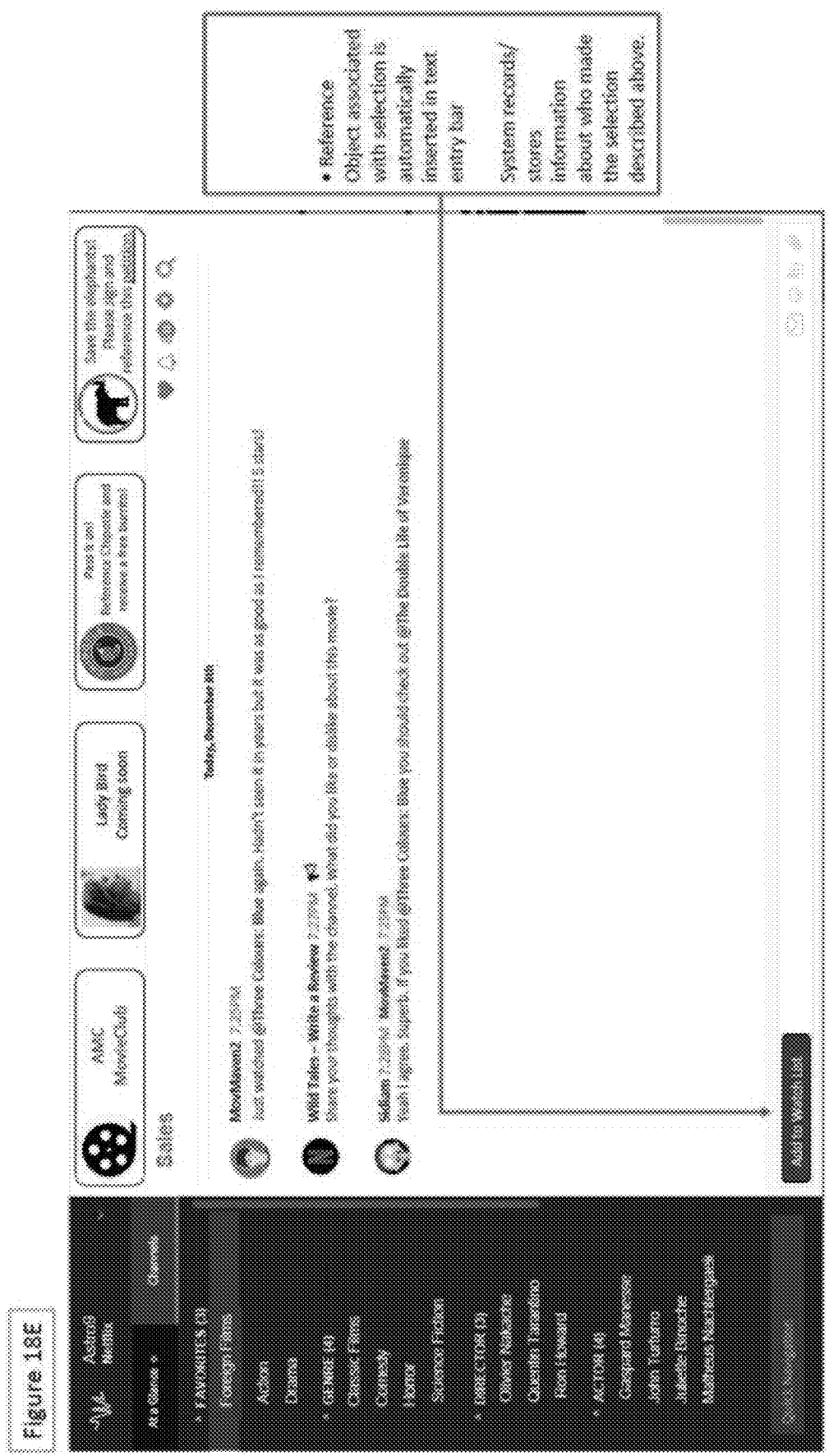

In FIG. 18E, a Reference Object associated with the selection of the prompt is automatically inserted in the text entry bar. Information may be stored, recorded regarding who made the selection as described above.

In FIG. 18F, in this example, User1 enters Text into the text entry bar. The text is linked/associated to the Reference Object. The user can post the combination (Reference Object+text) into the current active channel or optionally switch to another channel and post in that channel. "Text" means text and/or some other data corresponding to visual data or sound or may also include no data characters (which may be, for example, blank).

In FIG. 18G, a Further Message is added to the active message stream (or optionally, to a different channel/message stream). A Further Message is a message that is added to a message stream and that includes a Reference Object, text (or other data constructs, including graphics), ad anything else that may be included in a message.

In FIG. 18H, User(n) is MovieMan4 in this example. Information is recorded/stored regarding any user (and/or inserts or modifies a cookie on the user channel/message stream). In this example the movie "Wild Tales" would be added to the User(n)'s movie list. The fact that User1 posted a message along with a specific Reference Object would be recorded, along with information regarding who subsequently selected an area corresponding to the Reference Object. For example, what would be recorded is that user Astro9 wrote a review and that subsequent users, in response to the review, added the reviewed movie to their Movie List.

FIGS. 19A-19F are screenshots that illustrate a further exemplary embodiment of the present invention.

In FIG. 19A, a First Message is a message upon which a "user" "selects" an "area" associated with a prompt to spawn a Reference Object. In one exemplary embodiment, the Reference Object is spawned and inserted into a text entry bar. In another embodiment, the Reference Object is spawned and posted into the message stream without being inserted into a text entry bar. A First Message can be a message in a chat stream or an image/text appearing elsewhere on a display.

In FIG. 19B, a prompt can be included in a message in a chat stream or included in an image/text on a display appearing on a screen such as from a dropdown menu as shown in this Figure.

In FIG. 19C, in this example, User1 (Astro9) selects "Wild Tales" from a drop-down menu. A Reference Object associated with selection is automatically inserted in the text entry bar. Information about who made the selection described above is recorded (a cookie may alternatively or in addition be modified.)

In FIG. 19D, in this example, User1 enters Text into a text entry bar. The text is linked/associated to a Reference Object. The user can post the combination (Reference Object+Text) into the current active channel or optionally switch to another channel and post in that channel. "Text" means text and/or some other data corresponding to visual data or sound or may also include no data characters (which may be, for example, blank.

In FIG. 19E, a message along with an associated Reference Object is inserted/added into a message stream in a current channel (or optionally if so desired in different channel). Information about who made the selection described is recorded (and/or a cookie is modified as explained above).

In FIG. 19F, a screen of a User(n) MovieMan4 is shown. Information about any User(n) who subsequently clicks on an area associated with the Reference Object is stored/recorded(and/or a cookie is inserted or modified as explained above). A further action may be triggered as a result of the selection. In this example the movie "Wild Tales" is added to the User(n) Movie List. The fact that User1 posted a message along with a specific Reference Object would be recorded (and would be attributed to User1—and to Users(n) if re-referenced) which users subsequently selected an area related to the combined Reference Object and Message combination. For example, it would be recorded that Astro9 wrote a review and that subsequent users, in response to the review, added the reviewed movie to their Movie List.

Figure 20B:
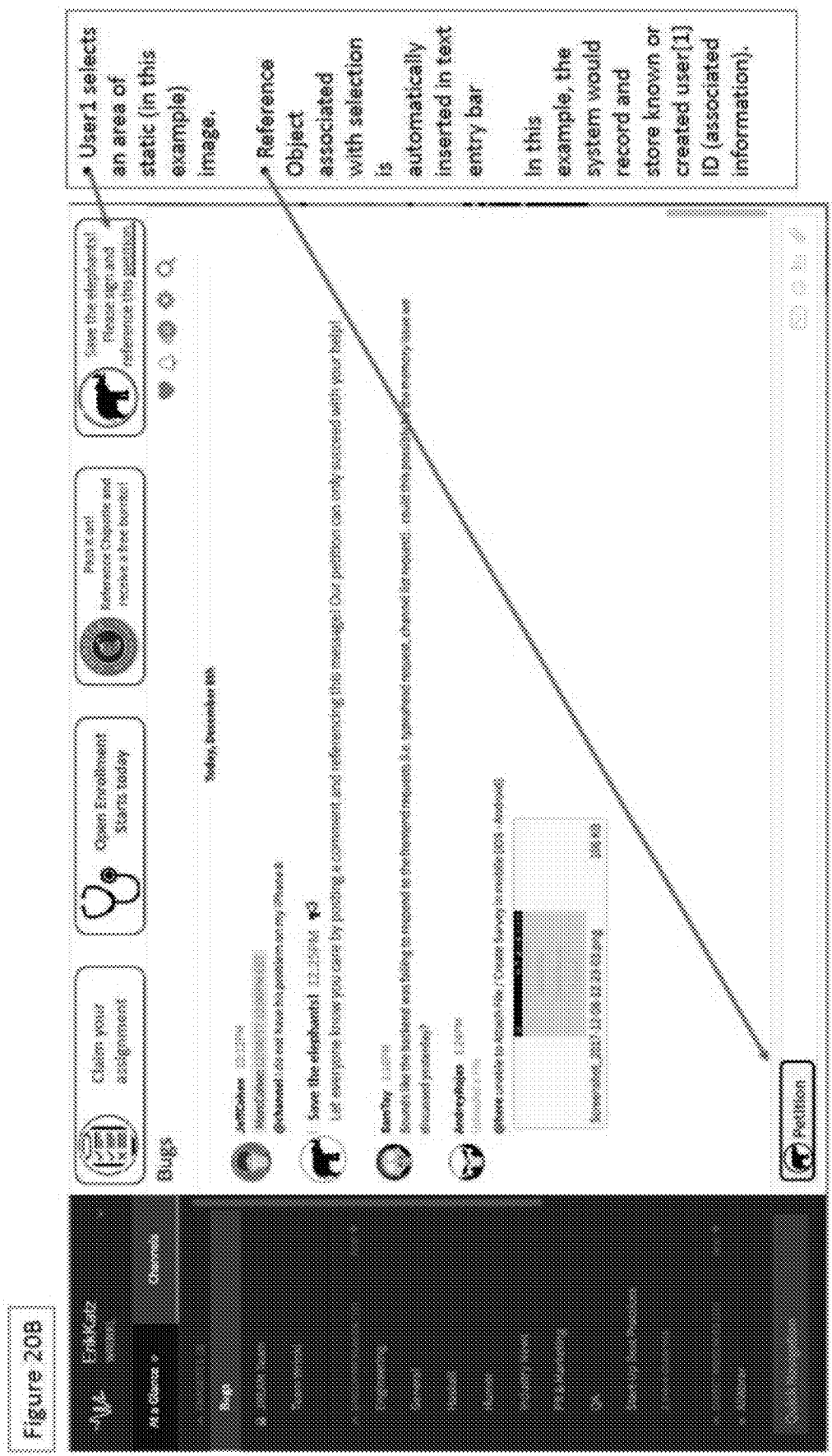

A further exemplary embodiment of present invention is illustrated with the screenshots that appear in FIG. 20A to FIG. 20E. The example shown in these figures relates to a petition, and again this is merely exemplary. As shown in FIG. 20A, a prompt is included in the screen in the upper right-hand corner which invites User2 to sign a petition. While the prompt is shown in FIG. 20A outside of the message stream, in an alternative embodiment of the present invention, the prompt may occur within the message stream. Furthermore, in FIG. 20A, the second message appearing in the message stream invites other users to sign a petition. Note again the optional bullhorn (prompt) that appears with the 12:25 PM message. Clicking (or other forms of selection) of the optional bullhorn(prompt), or an area associated with the optional bullhorn (for example), may also result in initiation of a petition signing process. The initiation of the petition signing process in this example is the insertion of a Reference Object into the text entry bar. As explained below, the Reference Object may be accompanied in the text entry bar with additional data (i.e. text), such as an endorsement or comment. The Reference Object and additional data (and further information such as, for example, the username, time stamp, an avatar of the user that spawned the Reference Object, etc.) then forms a Further Message. Selection of an area associated with the Reference Object in the Further Message results in the Display Object, which in this example is the display of a petition. In an exemplary embodiment, the petition is displayed with the signature of the user that spawned the Reference Object prefilled. Furthermore, while a bullhorn is shown, this is merely exemplary. In a further exemplary embodiment, clicking (or otherwise selecting) other portions of the message may result in a petition signing process being initiated.

In FIG. 20B, as a result of User1 selecting an area (prompt) associated with the initiation of the petition process, a Reference Object associated with the selection is automatically inserted into the text entry bar. This, again, is merely exemplary because in an alternative embodiment, the Reference Object is automatically inserted into the message stream. Optionally, in a further embodiment, a record is made that User1 has initiated the petition process, and such a record may be as a result of detection that User 1 has initiated the petition process, a cookie, etc.

Figure 20C:
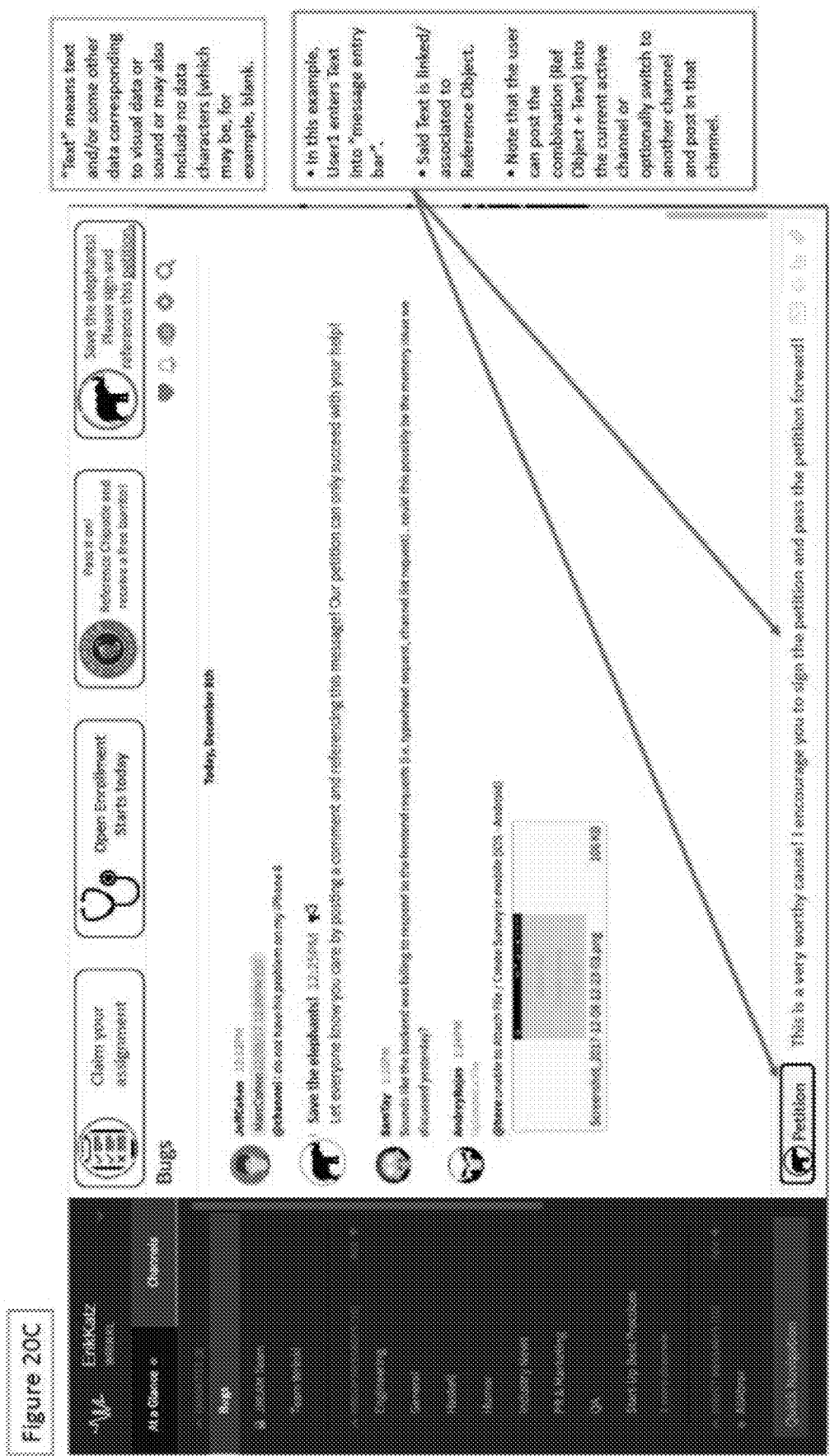

In FIG. 20C, User1 has optionally entered additional data (endorsement or commentary, for example) into the message entry bar. Again, while text is shown, this is merely exemplary.

Figure 20D:
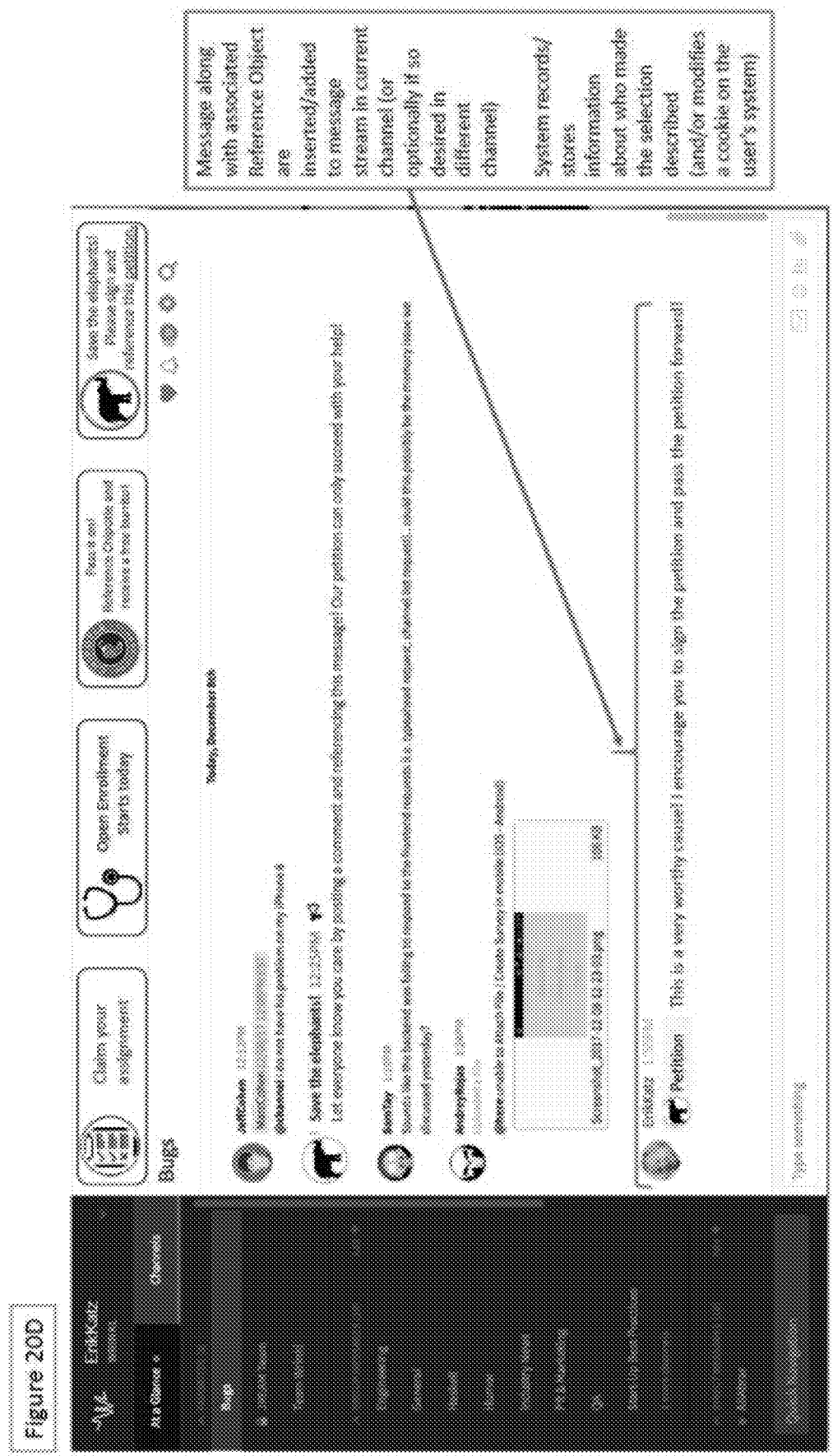

In FIG. 20D, the display object is inserted into the message stream of the current channel (or optionally to the message stream of a different channel).

Figure 20E:
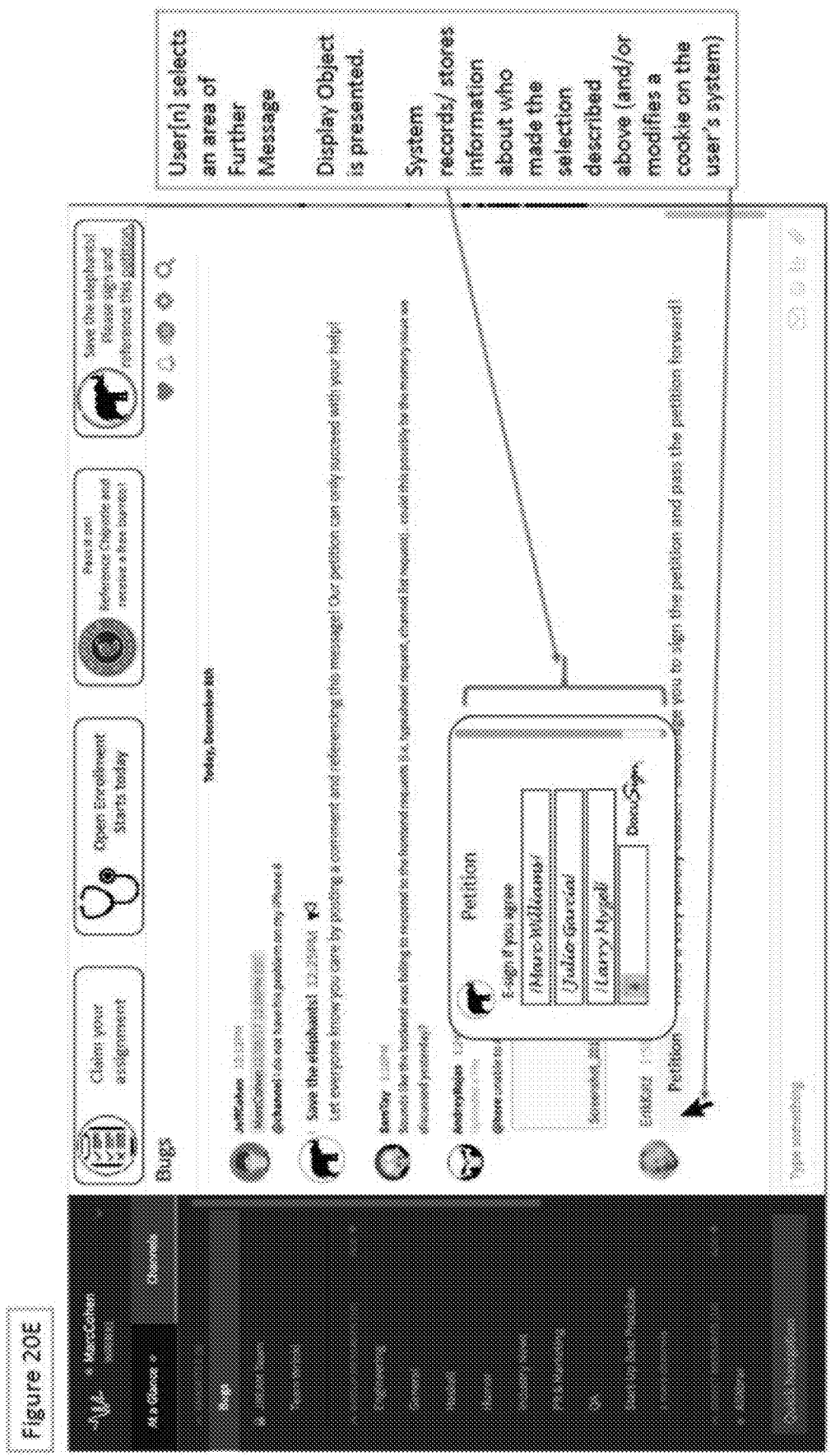

In FIG. 20E, User2 selects an area associated with the Reference Object. As a result of the selection by User2, one or more further actions occur. In the example shown in FIG. 20E, the further action is the display of text entry fields (a petition, for example), although the further action may be some other action (or multiple actions) such as the display of text, the reproduction of sound, etc. In a further exemplary embodiment, information about who made the selection that caused the further action to occur may be stored. The storing of that information may be the result of the further user's actions being detected. The detection may be optionally accomplished by the use of a cookie. Storage may take place in a cloud server, for example.

In a further exemplary embodiment, FIG. 20E illustrates two Reference Objects, one of which may be an Orphan Reference Object. "MarcCohen Dec. 8, 2017 12:06" is a Reference Object, because the Reference Object is associated with user MarcCohen. Reference Object "Petition" may be an example of an Orphan Reference Object because its selection causes a further action to occur (display of a petition form, in this example) without being associated with a user.

In a further exemplary embodiment, FIG. 20E illustrates a first User Reference Object and a second User Reference Object. "MarcCohen Dec. 8, 2017 12:06" is the first User Reference Object—the Reference Object is associated with user MarcCohen. In this example, A second Reference Object "Petition is also a User Reference Object because it's selection causes a Display Object to occur (display of a petition form, in this example) while also being associated with ErikKatz. Thus, in this embodiment, the fact that a Reference Object associated with ErikKatz has been selected is recorded.

FIG. 21 is a screenshot that illustrates a further exemplary embodiment of the present invention. First Message can be a message in a chat stream or an image/text appearing elsewhere on a display. In this example, a Reference Object is spawned as a result of User1 selecting an image (First Message) from a popup menu that appears as a result of the User selecting an icon that appears in the text entry bar.

FIG. 22 is a screenshot that illustrates an exemplary user interface for creating and defining certain rules relating to various messages, images or displays, such as some of the messages described above in the previous figures.

Figure 76:
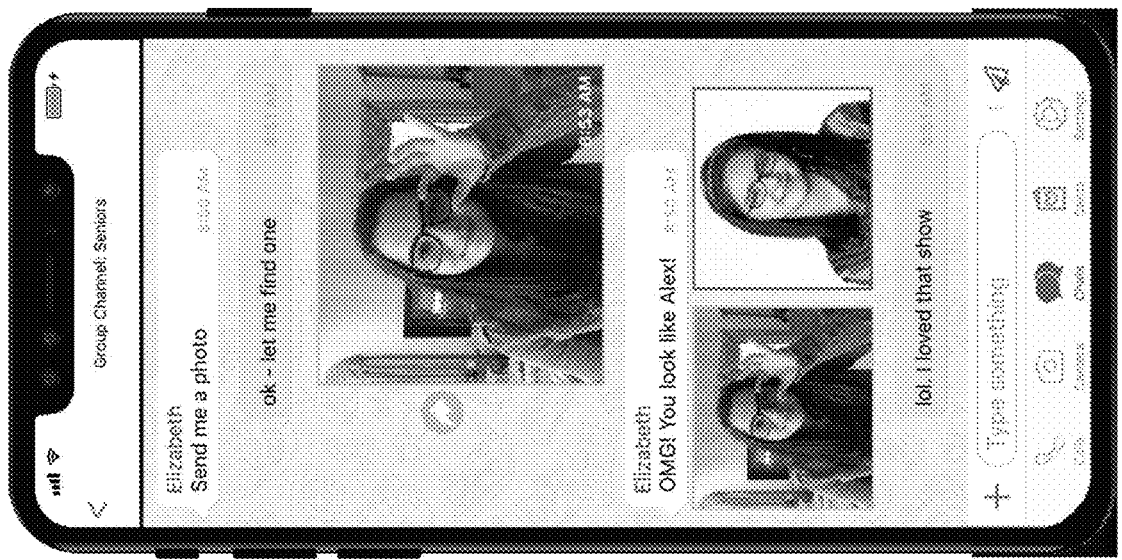

FIGS. 23-76 are illustrative of further exemplary embodiments of the present invention.

Selection Point/Selection Area (a.k.a. Selection Location)—In some embodiments the selection point/area is a location (i.e., for example, (x,y), (x,y,z), (t,x,y,z) coordinates relative to the media). In some embodiments the selection area is something other than a location (e.g., a person, image attribute or a thing). For example, a user could tap on a color or other image attribute to cause the selection of areas that match or are similar (or e.g., opposite) to the specified selected attribute. In some embodiments the user can specify a shape, a person and/or an object (e.g., can of Coke), matches are identified, and the selection area is proposed and/or selected. In some embodiments the user specifies a point (generally) and the application suggests, for example, a selection border area based on algorithmic and/or other considerations. The algorithmic considerations could be, for example, based on color, light contrast, light brightness of the image, positioning, dimensions, tolerances, character spacing, skewing, warping, corner detection, line detection, edge detection, sharpness differences between a selected area and neighboring area/s, based on learned previous behaviors of the user, and/or another set of users, and/or based on past selections, and/or based on facial or other recognition, AI and/or other inferences and/or calculations, etc.

FIG. 23 is a flowchart diagram that illustrates exemplary referencing of an image associated with a message (or other source of images) in accordance with a further exemplary embodiment of the present invention.

At step 1510, one or more previous messages (or images from other sources) are displayed. What is displayed may be referred to as a "selected" or "previous" message, message area/portion, image, image area/portion, etc. In addition, a visual structure to facilitate text or voice entry may be included at this time, later, or not at all. The visual structure may be a text entry bar. As characters are typed using an I/O device, for example, the characters may appear in the text entry bar. After the typing, or other entry, of the message has been completed, in one exemplary embodiment of the present invention, the text entry bar may be optionally hidden, the text may be sent, and the text that was inputted into the text entry bar may be repositioned so that it appears with other messages that have been sent and received. In any event, by displaying the text entry bar, for example, a visual indication is provided to the user that the client device that will transmit the completed message is ready for the completed message to be created.

In an exemplary embodiment, performance of step 1510 corresponds to the display of an image on a first display device.

Step 1520 is a group of steps (1525, 1530, 1535 and 1540) that facilitate the process of an initial image and/or area of an image selection. The user identifies and selects a message or an image element or an area associated with an image element with a message. An indication of the selection is displayed. The user may add content (i.e. a comment) that will be associated with the selected image or area. Adding content may occur, or may be optional now and occur later.

At step 1525, a user taps (or registers a selection via other input mechanism) on an image or area associated with an image associated with a 1st message (or from another source of images). The image being tapped/registered is an image intended by the user to be referenced by a Further message (or simply referenced by a "message" if the message source is not a message stream). In some embodiments, selecting the image element or area associated therewith in the 1st message will cause a change in the display of the selected image element or some other aspect or portion of the 1st message and/or the image element associated with the 1st message. The change in display may be, for example, isolating, highlighting, offsetting, or modifying the image element. In some embodiments the system infers the selection area based on, for example, the placement on the screen of the user's input device (e.g., finger, mouse, stylus). In some embodiments the application will assist the user in specifying the selection area by suggesting, for example, a selection area based on algorithmic and/or other considerations. The algorithmic considerations could, for example, include or be based on color, light contrast, light brightness of the image, positioning, dimensions, tolerances, character spacing, skewing, warping, corner detection, line detection, edge detection, sharpness differences between a selected area and neighboring area/s, based on learned previous behaviors of the user, and/or another set of users, and/or based on past selections, and/or based on facial or other recognition, AI and/or other inferences and/or calculations, etc.

Thus, for example, the above explanation may generally correspond, for example, to receiving selection of at least a portion of an image via the first display device.

At step 1530 the application records the selection and, in some embodiments, the location of the selection. In some embodiments more than one location can be specified and recorded. In some embodiments the selection is a location (e.g., x,y coordinates relative to the image). In some embodiments the selection is something other than a location. For example, a user could tap on a color or other attribute to cause the system to propose a selection area or more than one selection areas that match or are similar (or opposite) to the specified selected attribute. This may be accomplished, for example, by comparing data associated with pixels in a specified area and other areas in an image, and proposing to a user selection of areas where such data matches (or, for example, varies within a predetermined range).

At step 1535 a visual indication of the selection area/areas is displayed. In some embodiments the selected area is indicated by displaying a visible mark in the area of said selection, and/or a border around the selected area/s. Other approaches and methods can be applied to indicate a selected area. In some embodiments a selected area is highlighted by modifying the appearance of the unselected areas by, for example, blurring, dimming or in some other way offsetting the selected area/s. In some embodiments a copy of the image, a thumbnail, an icon, text, or other object is placed in the text entry bar or displayed elsewhere on the screen to indicate a selection.

At optional step 1540, text or other media (e.g., handwriting, image, hyperlink, sticker, etc.) is input. The inputted text or other media is associated with a specified area/s of the selected image.

Optional Step 1545 is a group of steps (1550, 1555, 1560 and 1565) that facilitate the process of an additional selection of an area of an image. An indication of the selection is displayed. The user may optionally add a comment that will be associated with the additional selected area. In some embodiments the application will assist the user in specifying the selection area by suggesting, for example, a selection area based on algorithmic and/or other considerations.

At step 1550, a user gestures, taps or registers a selection via other input mechanism on an additional area associated with the selected image ("additional selection area"). In some embodiments, selecting the image element or area associated therewith will cause a change in the display of the image element, or some other aspect or portion of the 1st message and/or the image element associated with the 1st message by for example, isolating, highlighting, offsetting, or modifying the image element. In some embodiments the system infers the selection area based on, for example, the placement on the screen of the user's input device (e.g., finger, mouse, stylus). In some embodiments the application assists the user in specifying the selection area by suggesting, for example, a selection area based on algorithmic and/or other considerations.

At step 1555 the application records the additional selection area and, in some embodiments, the location of the selection. In some embodiments the additional selection area is a location (e.g., x,y coordinates relative to the image). In some embodiments the additional selection area is something other than a location.

At step 1560 a visual indication of the additional selection area is displayed. In some embodiments the additional selection area is indicated by displaying a visible mark in the area of said selection, and/or a border around the selected area/s. Other approaches and methods can be applied to indicate an additional selected area. In some embodiments an additional selected area is highlighted by modifying the appearance of the unselected areas by, for example, blurring, dimming or in some other way offsetting the selected area/s. In some embodiments a copy of the image, a thumbnail, an icon, text, or other object is placed in the text entry bar or displayed elsewhere on the screen to indicate a selection.

At step 1565, text or other media (e.g., handwriting, image, sticker, etc.) is input—which text or other media is associated with the additional selection area.

When step 1540 is included, step 1565 may be deleted. When step 1565 is included, step 1540 may be deleted. Both steps 1540 and 1565 may be included. Neither of steps 1540 and 1565 may be included.

At optional step 1570, the user is able to create a message that will be included and associated with the further message.

Steps 1565 and/or 1570 may generally correspond to receiving content that is associated with at least the portion of the image for which selection was received. The content and at least portion of the image may be digitally linked. Examples of digital link include a pointer between respective memory locations where content and the image (portion) are stored. Other forms of linkage may include for example physical corresponding addressing, virtual corresponding addressing, and other data storage and retrieval mechanisms.

At step 1575, an instruction is provided allowing the user to cause the transmission of the further message. In some embodiments the user may cause the message to be transmitted to additional, another or other message channel/s. In some embodiments the user may cause the message to be transmitted to a crawl. In some embodiments the user may cause the message to be transmitted to a third party or external application.

As an example, an image (or portion thereof) is transmitted as part of a message from the first display device to the second device.

At step 1580, the further message is displayed. The further message may be displayed in various places including, for example, a client device (first display device) from which the message was transmitted, a client device (second display device) to which the message is transmitted, a device where a message is displayed without being transmitted outside of the device, etc. The further message may then be displayed (along with at least a portion of the selected image and/or object associated with the specified image element), for example, on a client device (second display device). The portion of the further message displayed may be (at least) the portion of the message/image referenced at step 1510. Content (indication, information) associated with the message/image (portion) may also be displayed on the second display device.

At optional step 1585 interaction with the further message is permitted. In some embodiments, selection of an area associated with the specified image or selected areas thereof causes display of the 1st message, a portion of the 1st message, an image associated with the 1st message and/or data associated with the 1st message, etc. In some embodiments the display of the associated message or element thereof, (e.g., image, video) includes an indication of the selected area/s of the image.

Generation of a further message receptive to further user interaction may be accomplished in accordance with a further exemplary embodiment of the present invention. For example, a unique identifier may be assigned to each message and/or element thereof. There are numerous ways to generate unique identifiers, including sequential numbering, numbering based on a system clock, numbering based on a chronological clock, etc. Receptivity of user input associated with an interaction associated with a further message may be initiated by an event that occurs and is detected by software (that is causing or related to the display of the messages on the client device). Put another way, for each of a plurality of known messages that are displayed, an event "listener" is waiting for an interaction with known objects or areas of the message. The known objects or areas of the message waiting for interaction correspond to the previously described "display object" (which for example, when selected, result in display of the first image, message, selection, etc. Various interactions are possible with the message. Exemplary interactions include copy and paste. Other interactions include the exemplary embodiment illustrated in FIG. 23 and described above, but starting with the further message of step 1585 (the further message of step 1585 becomes the message of step 1510 and the steps illustrated in FIG. 23 are subsequently performed). Other interactions include the interactions illustrated in FIGS. 3-13D. This list of further actions is merely exemplary. Further interactions with the "display object" are also contemplated. The above description may also be further described with regard to a display object. It is understood that the display object may be represented by a visual icon with defined borders, or it may be represented by some other visual method, such as text associated with a message or space (i.e. space that appears on a display) that overlaps or is adjacent to a message.

FIGS. 24 through 34 are exemplary screen shots that illustrate exemplary operation of an exemplary embodiment of the present invention.

Figure 24:
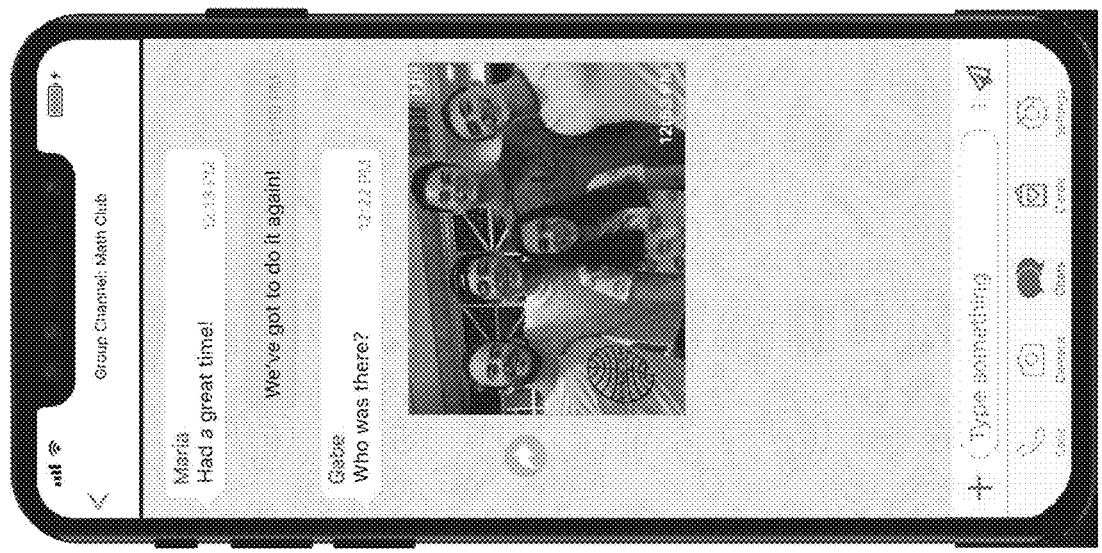

FIG. 24 In this exemplary embodiment a screen displays a plurality of messages in a [continuous, for example] stream of messages in a channel named "Math Club". In this example, the channel is "private" and only specified users are permitted access to this channel. In some embodiments third parties such as advertisers and/or other authorized or sanctioned parties are permitted a certain degree of access to private channels (e.g., an advertiser may have the ability to post (directly or indirectly) a message to a channel but the advertiser may not have the ability to view or access the messages otherwise exchanged between the plurality of users in the channel.)

In this example, a screen displays a portion of a message stream, i.e., a plurality of messages in a channel named "Math Club". Alternatively, a message may be described with regard to this exemplary embodiment, and can be thought of as a container that may include more than just a text message (e.g. text) itself. In some embodiments a message consists of additional elements such as associated metadata (for example, an avatar and/or the date and/or time that a message is posted). In some embodiments a message consists of additional elements such as images, audio, videos and/or other information. In some embodiments a message consists of additional elements such as references to and/or indications associated with one or more prior messages.

In this example the user may scroll up or down to view previous or later messages in the message stream.

Figure 25:
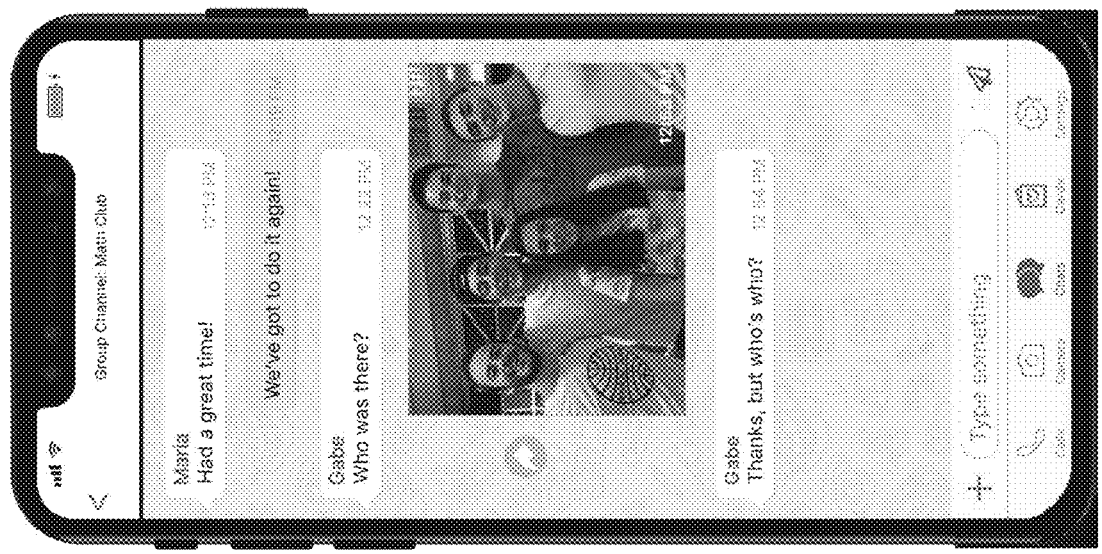

FIG. 25 This exemplary embodiment a screen displays a plurality of messages in a [continuous] stream of messages in a channel named "Math Club". In this example, five messages are displayed and the user may scroll up or down to view previous or later messages in the message stream.

Figure 27:
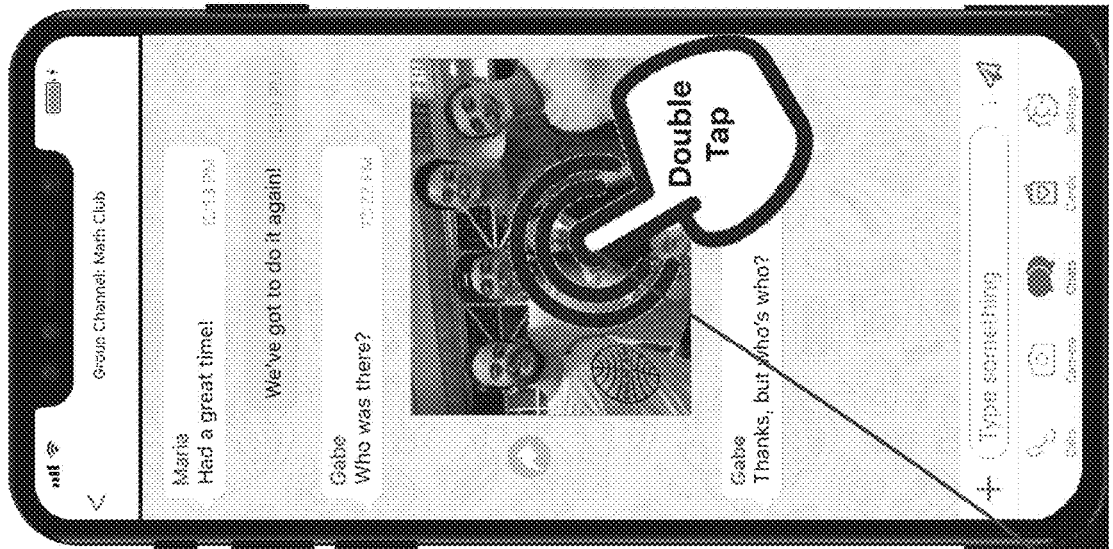
Figure 26:
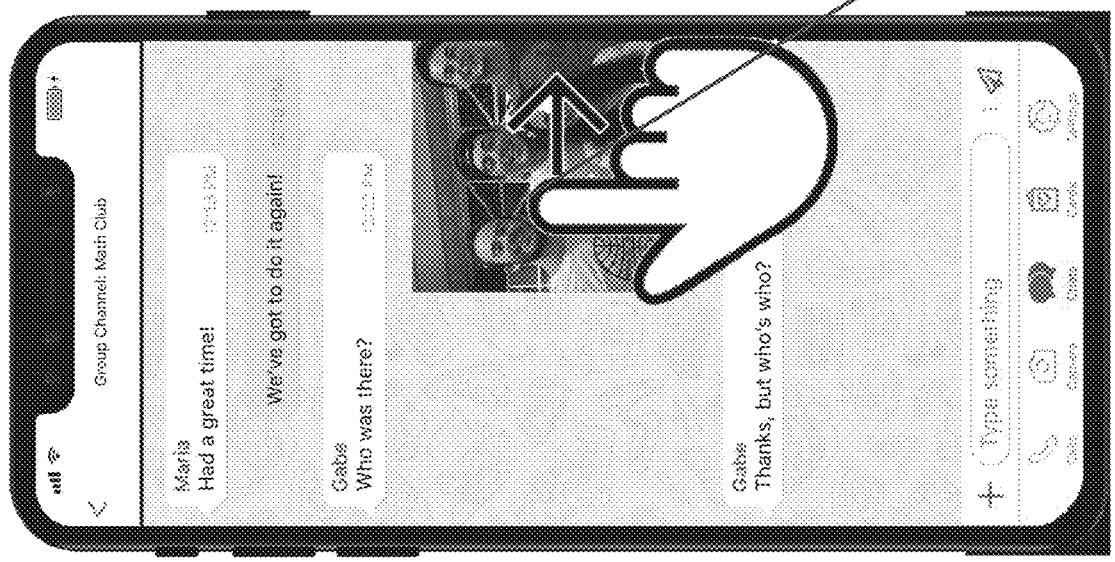

FIG. 26 In this exemplary embodiment a screen displays a plurality of messages in a [continuous, for example] stream of messages in a channel named "Math Club". In this example, the user uses a swipe gesture (1800) to indicate a selection of an image associated with a message. Selection of an image in this example will allow the user to further interact with the selected image. Various approaches to indicate selection can be implemented. FIG. 27 shows one such alternative approach. In FIG. 27, the user indicates selection of the image through use of a double-tap gesture (1804). In some embodiments, the user is able to indicate selection using other techniques such as through use of a mouse, trackpad, light-pen, verbal commands or brain-machine interface.

FIGS. 26 and 27 each show a method of selection that causes a further screen to be displayed in order that the user can further isolate, focus on, and/or interact with the image. In some embodiments, no further screen is caused to be displayed, and the user is able to further interact with the selected image "in-place". In some embodiments, no further screen is caused to be displayed, and the image is enlarged and/or other change of display caused to facilitate a further display of and/or interaction with the selected image "in-place". In some embodiments the selection changes the display of the elements of the screen that are not selected, for example, the non-selected items could become blurred, distorted or altered in some way in order to highlight and/or draw focus. In some embodiments at least a portion of the message and/or image is placed in and/or associated with the messaging system's text entry bar.

Figure 28:
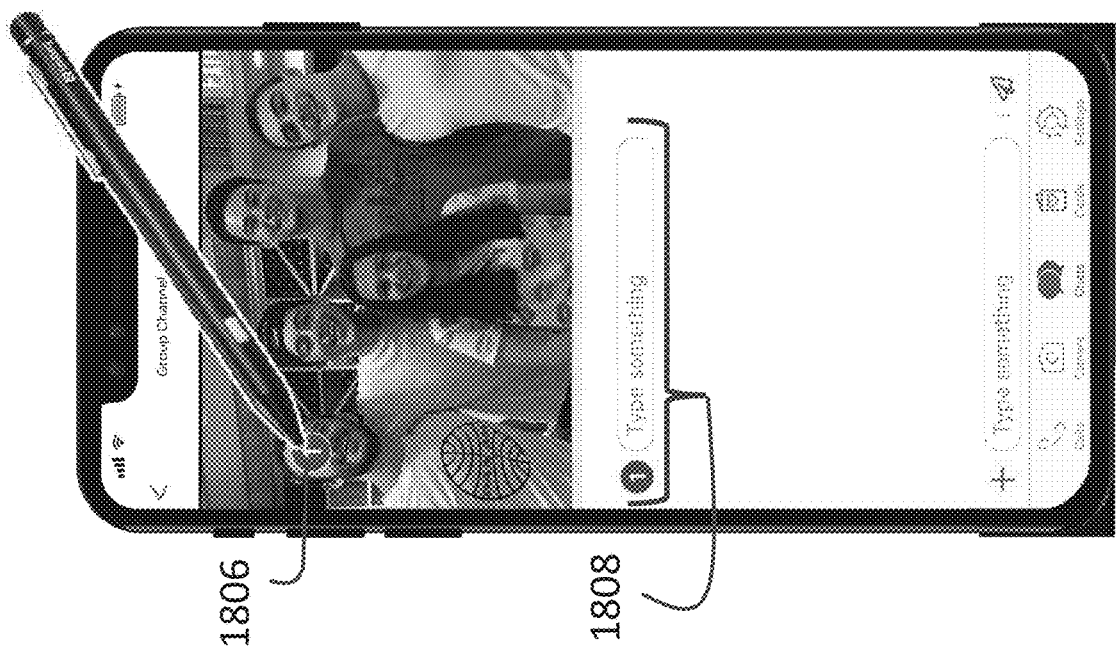

FIG. 28 In this exemplary embodiment, as a result of a message or an element such as an image associated thereto, being selected (as shown in FIG. 26 and FIG. 27), a further screen isolating the associated selected image was caused to be displayed.

In some embodiments, an interaction, such as tapping on the displayed image could enlarge the image and/or allow further actions such as zooming and/or panning.

In this embodiment, the user tapped on a point/area of the image using a stylus which caused an indication of the location of said interaction to be displayed (1806). In this embodiment, a text entry field (1808) is also displayed and associated with the selected area of the image allowing the user to input a comment to be associated with the selected area. In some embodiments the user can draw, write, add text, stickers or other media/information directly onto (i.e., e.g., superimpose) the image. In some embodiments (1806) and (1808) are combined.

In some embodiments the location (coordinates relative to the image for example, (x,y), (x,y,z), or (t,x,y,z) area "tapped" is interpreted by the system/application to be literal. In some embodiments the user specifies a point (generally) and the system/application suggests a selection border area based on algorithmic and/or other considerations. The algorithmic considerations could for example be based on color, light contrast, light brightness of the image, positioning, dimensions, tolerances, character spacing, skewing, warping, corner detection, line detection, sharpness differences between a selected area and neighboring area/s, based on learned previous behaviors of the user, and/or another set of users, and/or based on past selections, and/or based on facial or other recognition, artificial intelligence ("AI"), associated bots, and/or other inferences and/or calculations, etc.

Figure 29:
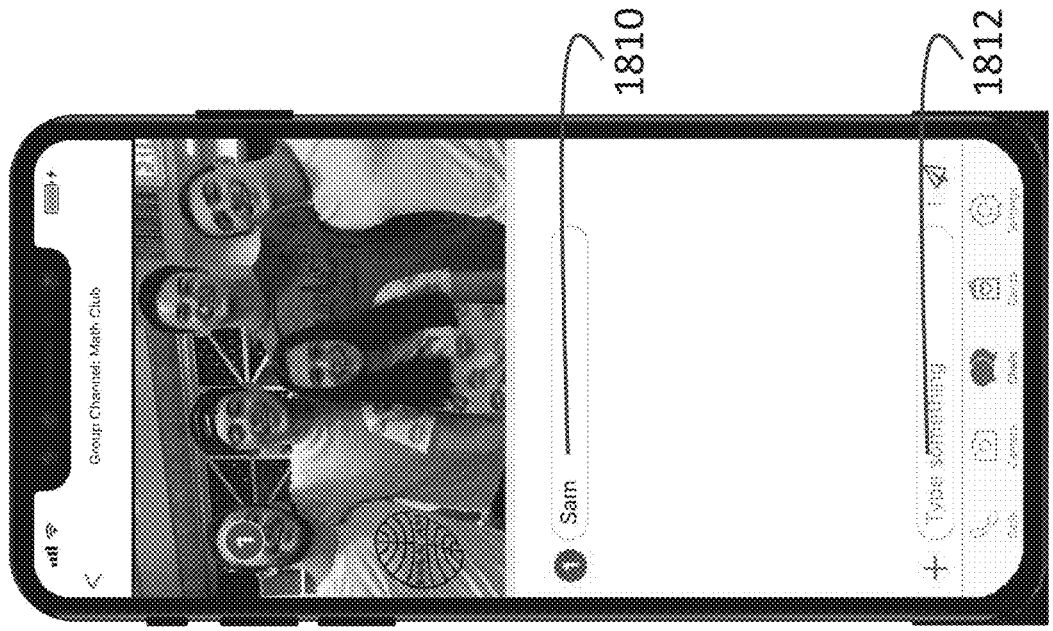

FIG. 29 In this exemplary embodiment, text or other media is input into a text entry field (1810) which text or other media is associated with a specified area/s of the selected image. In this exemplary embodiment the user may specify none, one or more than one area/s associated with the image and/or may solely or in addition to comments related to specified areas of the image, add a note/comment/message (1812) to be included in the transmitted further message.

Figure 30:
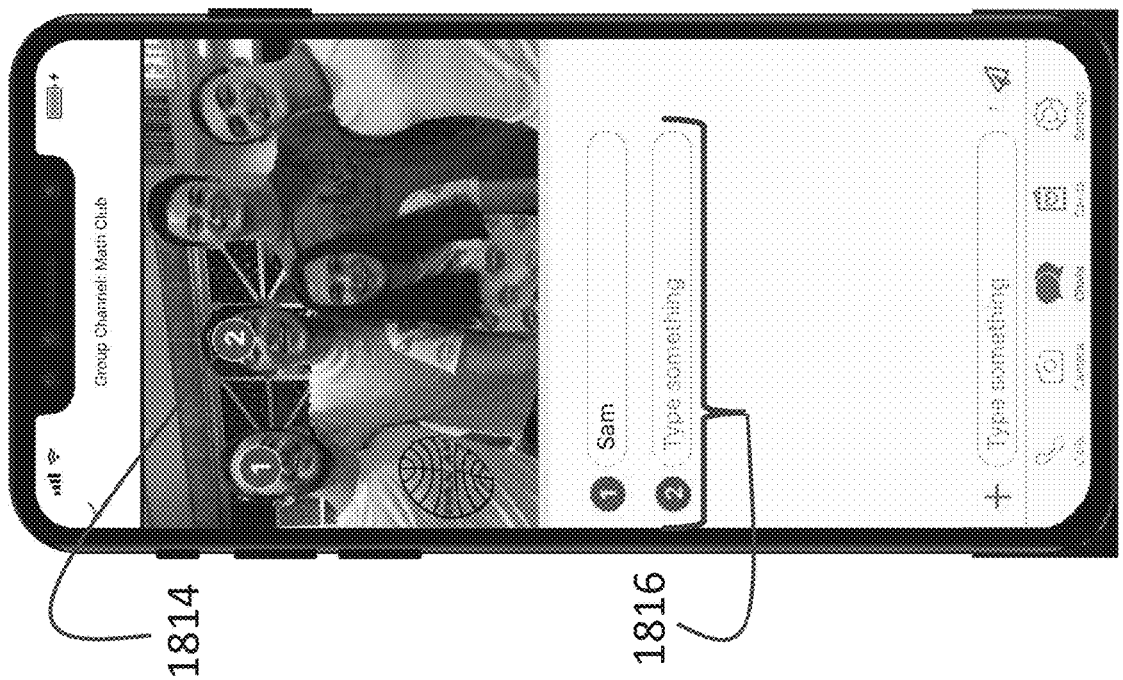

FIG. 30 In this exemplary embodiment, as a result of a message or an element such as an image associated thereto, being selected (as shown in FIG. 26 and FIG. 27), a further screen isolating the associated selected image was caused to be displayed.

In this exemplary embodiment the user may specify none, one or more than one area/s associated with the image In this embodiment, the user tapped on a second point/area of the image which caused an indication of the second location of said interaction to be displayed (1814). In this embodiment, a second text entry field (1816) is also displayed and associated with the second selected area of the image allowing the user to input a comment to be associated with the second selected area. In some embodiments the user can add text, stickers or other media/information directly onto (i.e., superimpose) the image. In some embodiments (1814) and (1816) are combined. In some embodiments the user can add text or other input directly to any visible text entry area and/or directly onto the image itself (for example, through use of a finger, stylus or other input device to, for example, draw, type or write.

Figure 31:
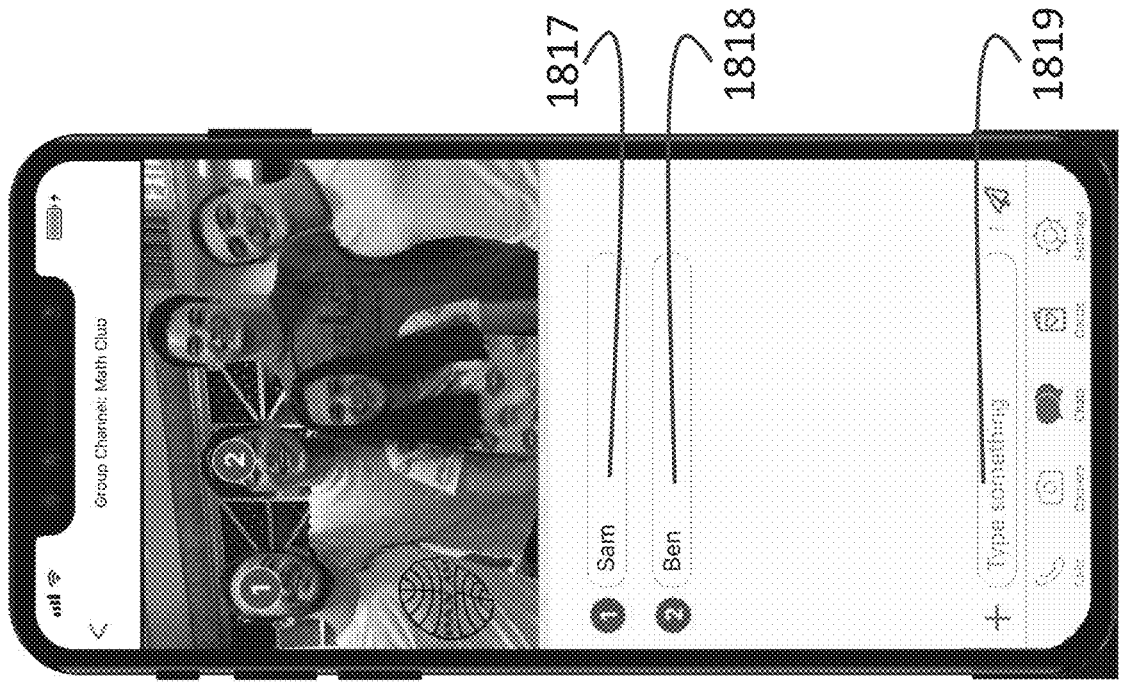

FIG. 31 In this exemplary embodiment, text and/or other media is input into a text entry field (1817 and/or 1818) which text or other media is associated with a specified area/s of the selected image. In this exemplary embodiment the user may specify none, one or more than one area/s associated with the image and/or may solely or in addition to comments related to specified areas of the image, add a note/comment/message (1819) to be included in the transmitted further message.

Figure 32:
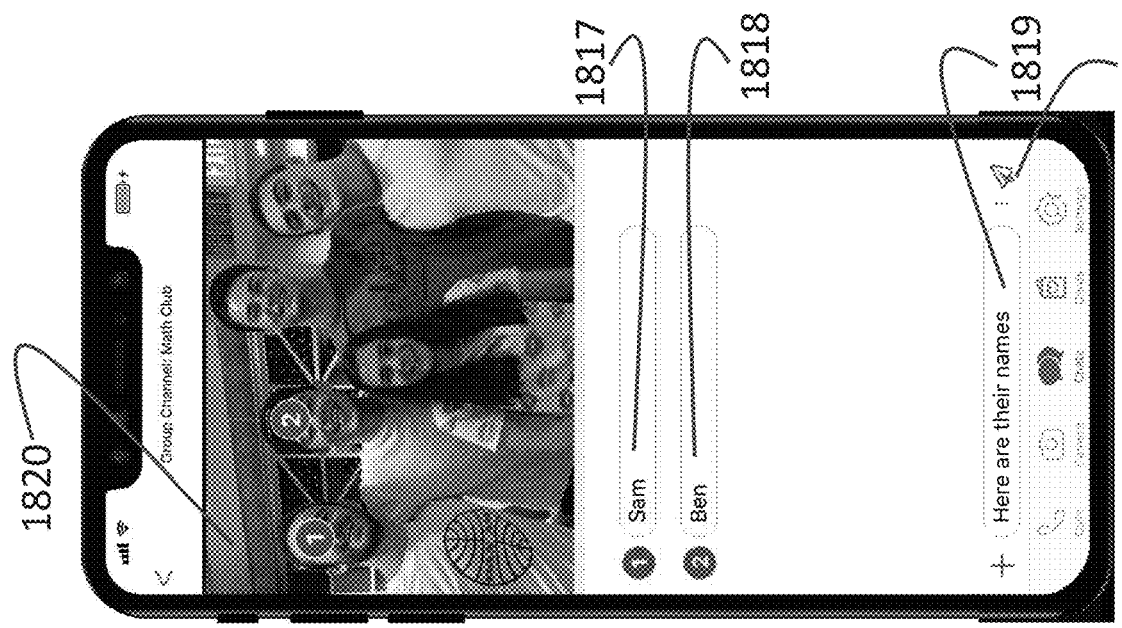

FIG. 32 In this exemplary embodiment, text and/or other media is input into a text entry field (1817 and 1818) which text or other media is associated with a specified area/s of the selected image. In this exemplary embodiment the user may specify none, one or more than one area/s associated with the image and in addition to said comments related to specified areas of the image, added a note/comment/message (1819) to be included in the transmitted further message.

In this exemplary embodiment, tapping on the send icon (1822) causes the further comment (1819), the image (1820), the comments associated with the selected areas of the associated image (1817 & 1818), and certain metadata (e.g., time of transmission) to be transmitted and posted together to the messaging stream (together the further message)

Figure 33:
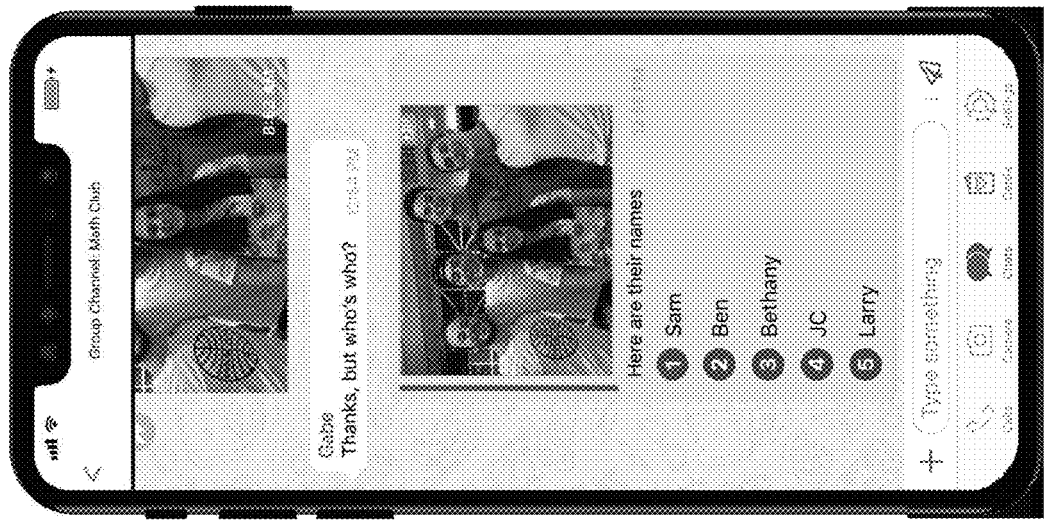

FIG. 33 This exemplary embodiment shows the referenced image included as a part of a message after it has been transmitted.

In this embodiment, at least a portion of an image associated with a selected message that was at least partially displayed earlier in the message stream is displayed (or otherwise referred to) and included with a further message and/or comments associated with a specified area/s of the referenced selected image associated with the earlier posted message.

In this example, the user answers user Gabe's question, "Thanks, but who's who?" by referencing the earlier post that included the image and by adding associated specified indications in combination with associated text (e.g., names associated with the selected points/areas.) In some embodiments both an indication of the selected areas and the associated comments are displayed as part of the posted message. In some embodiments only the comments or the indication of the specified area/s of the image are displayed.

In some embodiments other methods of display are provided, for example toggle to hide/reveal indication and/or comments.

FIG. 34 shows the referenced image included as a part of a message after it has been transmitted.

In this embodiment, at least a portion of an image associated with a message that was at least partially displayed earlier in the message stream is copied (or otherwise referred to) and included with a further message and/or comments associated with a specified area/s of the referenced selected image associated with the earlier posted message.

In this embodiment, tapping an area of the posted message associated with a comment associated with a specified area of the image (1830) causes an indication to appear at the message author's specified point/area and superimposed on the image that corresponds to the selected comment (1832). In some embodiments other approaches to displaying and/or hiding specified areas in association with associated comments can be applied, together or separately.

In some embodiments, tapping on an area associated with the posted message will cause a change of display, for example, the image may be caused to appear, a displayed image (e.g., a thumbnail) may be enlarged, or an image's appearance may be otherwise modified. In some embodiments interaction with the posted message will cause the display to "jump back" to the referenced image or message at for example, its original or most recent occurrence in the message stream. In some embodiments tapping on a point or area of the message will cause the display of (or other form of presentation such as audio output), for example, an advertisement, video, a link or other information that is inferred, calculated, derived or looked-up.

FIGS. 35 through 60 are exemplary screen shots that illustrate exemplary operation of an exemplary embodiment of the present invention.

Figure 35:

FIG. 35 In this exemplary embodiment a screen displays a plurality of messages in a [continuous] stream of messages in a channel named "Photo Club". In this example, only specified users are permitted access to this channel.

In some embodiments the user selects an image element of a displayed message and specifies a point/s and/or area/s of the image which causes the system/application to suggest a bounding border (or borders) based on algorithmic and/or other considerations. The algorithmic considerations could for example be based on color, light contrast, light brightness of the image, positioning, dimensions, tolerances, character spacing, skewing, warping, corner detection, line detection, sharpness differences between a selected area and neighboring area/s, based on learned previous behaviors of the user, and/or another set of users, and/or based on past selections, and/or based on facial or other recognition, artificial intelligence and/or other inferences and/or calculations, etc.

2003 In this example, a screen displays a further message of the plurality of messages in the stream of messages in the channel named "Photo Club". In this example the user may scroll up or down to view previous or later messages in the message stream.

In this example, 2004 is a message that includes metadata (e.g., "JeffC" (2002) the sender of the message and "9:38 AM" (2009) the time the message was sent), an image (the photo shown)(2004) and associated text ("Please lmk what you think of this photo", i.e., a text message (2005)).

In this example, 2006 is a message that includes metadata ("Karen" the sender of the message and "9:43 AM" the time), an image (the photo shown) and associated text ("What can I do to improve this photo?", i.e., a text message).

Figure 36:
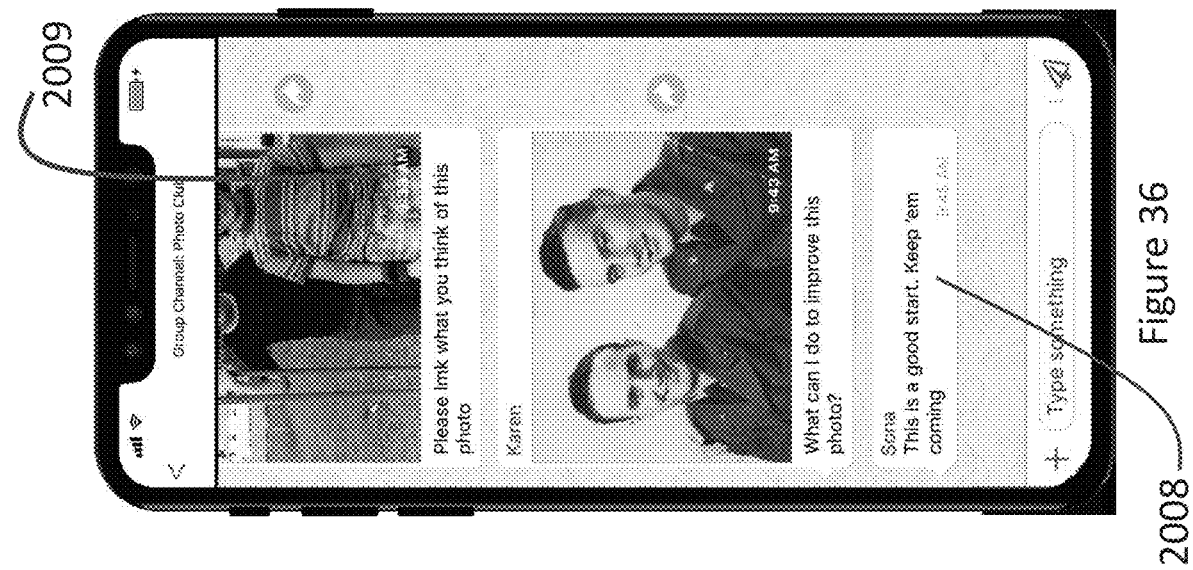

FIG. 36 In this example, 2008 is a message that includes metadata ("Sona" the sender of the message), and associated text ("This is a good start. Keep 'em coming?", i.e., a text message).

Placement: In some embodiments metadata, or other elements such as text, images, videos, audio, gifs, stickers, emojis and/or drawings/doodles, and/or VR, can be overlaid on top of (or otherwise associated with) one or more of the components that comprise a message. In this example, the time the message was posted (2009) is overlaid on top of the image (i.e., e.g., overlaid, included, superimposed or incorporated).

Figure 37:

FIG. 37 In this embodiment a long press on an area (2011) associated with the selected image (2010) causes the display of a screen (FIG. 38) that shows the selected image along with its associated message. In some embodiments, certain constituent elements of the message (e.g., metadata, text, image, audio, video, stickers, etc.) will be or will not be displayed together, at once, or at all.

Figure 38:
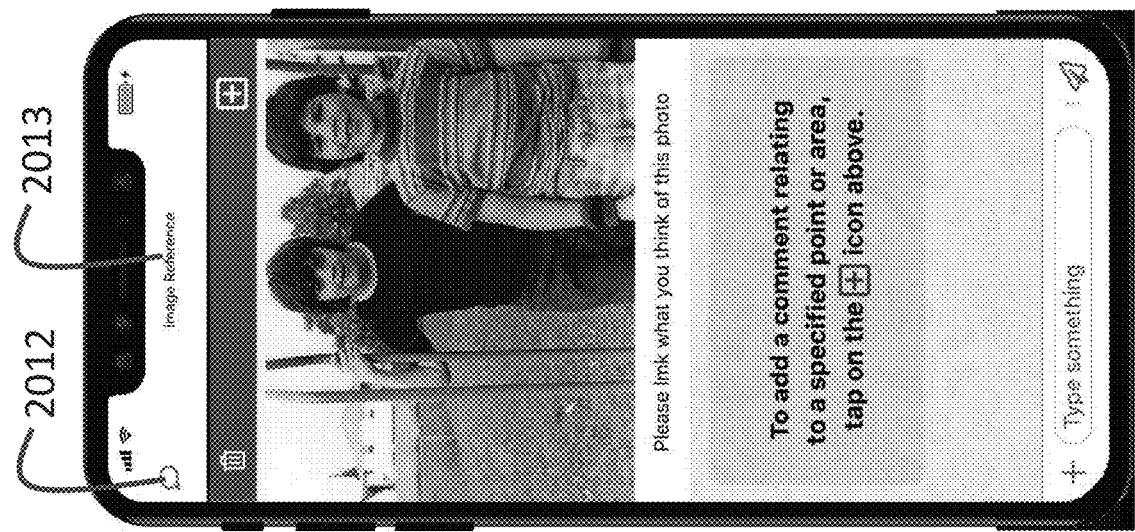

FIG. 38 In this embodiment a long press on an area associated with the selected image (2011) will cause the display of a "Root Media Screen" (FIG. 38) that shows the selected image along with its associated message (if any). In some embodiments other means of indicating selection of a message and/or isolating the selection for further action can be applied. In some embodiments further action can be done "in-place" i.e., no further screen is caused to be displayed. In some embodiments a portion of, or less than (or more than) an entire message, or image can be selected.

In this embodiment a further screen is displayed (FIG. 38), and the image becomes further actionable. In this example, the application ("app") will record each area (point or range of points, e.g., area or areas) selected by the user and will allow the user to input (type, draw, input via voice, etc.) an associated comment/note to be associated with all, and/or each point or area selected.

In this embodiment the user can return to the display of the message stream in the chat channel (e.g., FIG. 37) by tapping on the "chat bubble" icon (2012).

2013 In this embodiment the fact that the user is in the process of referencing a message is indicated by text (2013). In some embodiments an indication can be omitted, or elsewhere such as in an area associated with the text entry bar.

Figure 39:
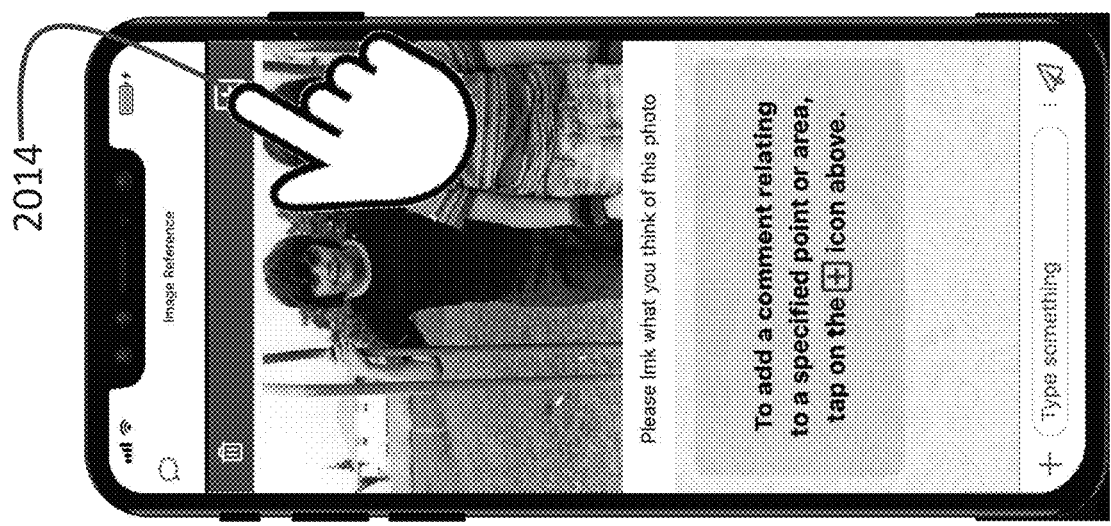

FIG. 39 In this embodiment the user taps the add icon "+" (2014) to enable the functionality of adding a selection point/area and optional comment. In this example, tapping the "+" add icon causes the display of the screen shown as FIG. 40.

Figure 40:
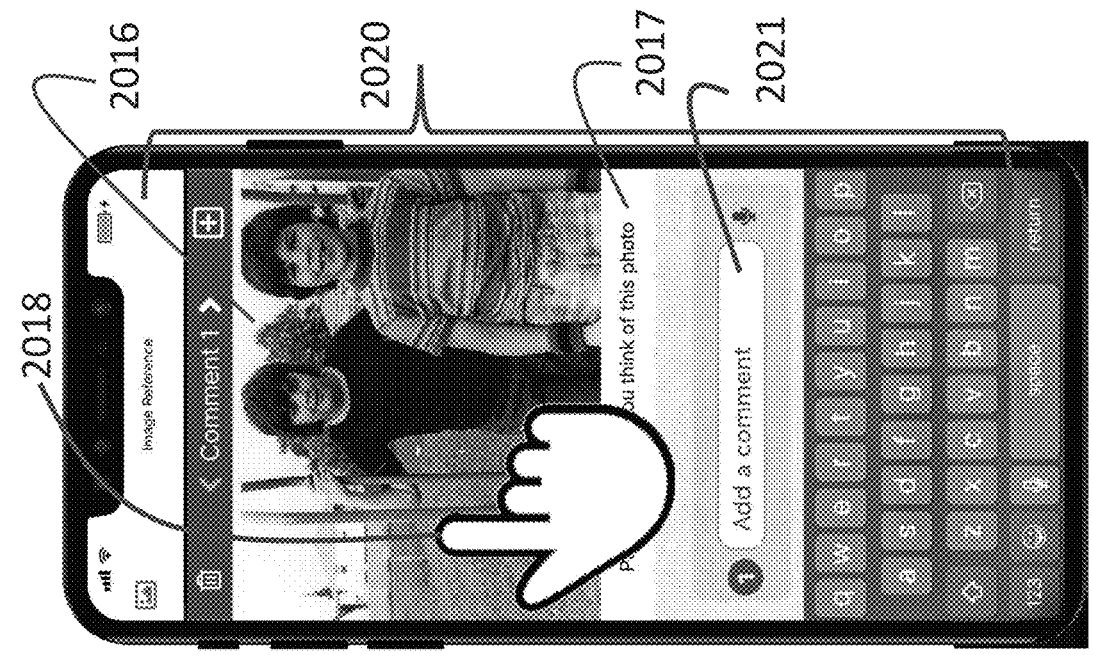

In this embodiment, as a result of the user requesting to add a specification of a point or area (FIG. 39, #2014), a further screen FIG. 40 is displayed, wherein interaction with (at least a portion of) the image (2016) is possible. In this example, the application ("app") will record each area (point or range of points, e.g., area or areas) selected by the user and will allow the user to enter (type, input via voice, etc.) an associated comment/note to be associated with all, and/or each point or area selected. In some embodiments the user is able to manipulate the portion or area of the image that is displayed, for example zoom in and/or pan left/right and/or up/down.

FIG. 40 In this embodiment at least a portion of the original message (2017) associated with the image (2016) is included and displayed during the area selection and comment step. In some embodiments the image or a portion of the image is displayed. In some embodiments other elements and/or information associated with the image is/are displayed alone or in combination with the image. In some embodiments the image can be toggled, i.e., caused to be displayed, superimposed, and/or hidden.

In this embodiment the user uses a touchscreen gesture (2018) to identify and select an area of a displayed image (2017). In this embodiment the user registers his/her selection through use of a single tap gesture on a single point (2018) (technically, a point is an "area" in this example, because the user's fingertip is larger than a single pixel. However, for the purposes of this example we will call the single tap selection a "point"). In this example the application records the location (relative to the image itself) of the tap. In some embodiments a stylus or other input device, interface, or approach can be applied to obtain finer and/or more granular and/or other desired results.

In some embodiments the selection is a location. In some embodiments the selection is something other than a location (i.e., e.g., x,y coordinates). For example, a user could tap on a color or other attribute to cause the selection of areas that match or are similar (or opposite) to the specified selected attribute. In some embodiments the user can select on a shape, a person and/or an item (e.g., can of Coke) and matches will be selected.

In this embodiment, the user is presented with an opportunity to add a comment (2021) that will be associated with the selection location.

Figure 41:
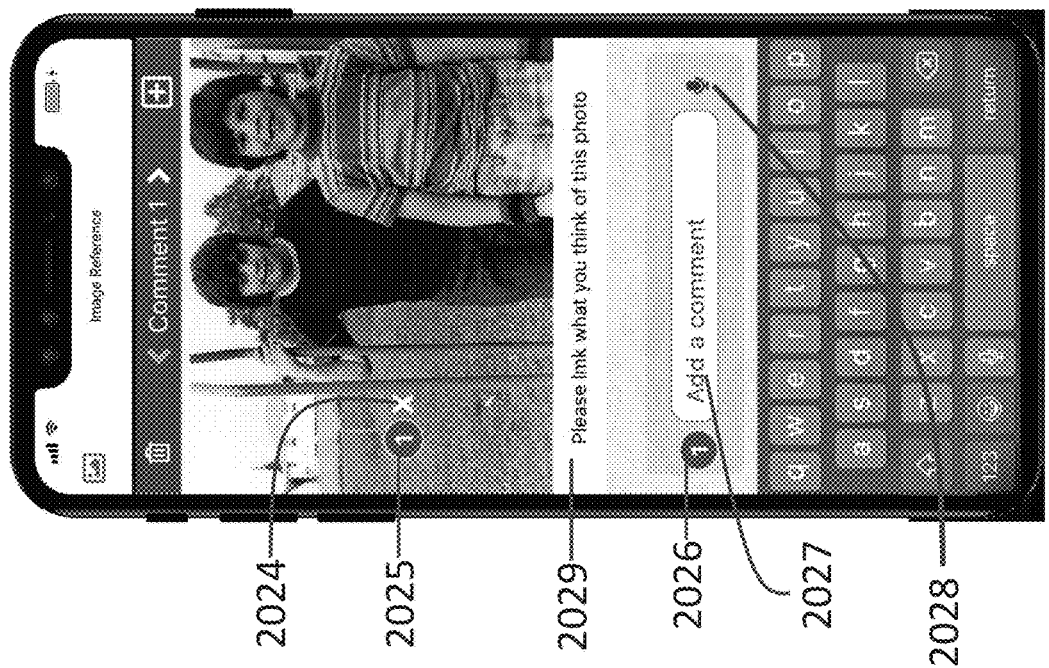

FIG. 41 In this embodiment the user's selection is recorded and an indication is displayed on the screen in an area at, in proximity to, or associated with the user's selection. In some embodiments, such as the one shown here, a user may select more than one point or area.

FIG. 41 In this embodiment the user's selection is indicated by an "X" at or in an area associated with the user's selection ("selection location") (2024). In some embodiments other approaches to indicating selected point/s and/or area/s can be applied (e.g., a flashing shape, an icon, an overlay, an arrow, etc.)

In this embodiment an indication associated with the selection location indication is provided (2025) to assist the user in keeping track of which and how many selection locations have been created.

In this embodiment a corresponding indication (2026) associated with the indication associated with the selection location indication (2024/2025) is provided to reinforce for the user that the comment to be entered (if any) will be associated with a particular selection location (2024 in this example). In some embodiments there is no corresponding location indication because the user can input a comment in direct proximity with the selected area location indication.

2027 In this embodiment the user may add a comment that will be associated with a particular selection location (2024 in this example). In this embodiment the user may tap on the microphone icon (2028) to input a comment by voice.

2029 In this embodiment the original message associated with the image is included and displayed during the area selection and comment step. In some embodiments only the image (or other elements associated with the selected image are displayed)

Figure 42:
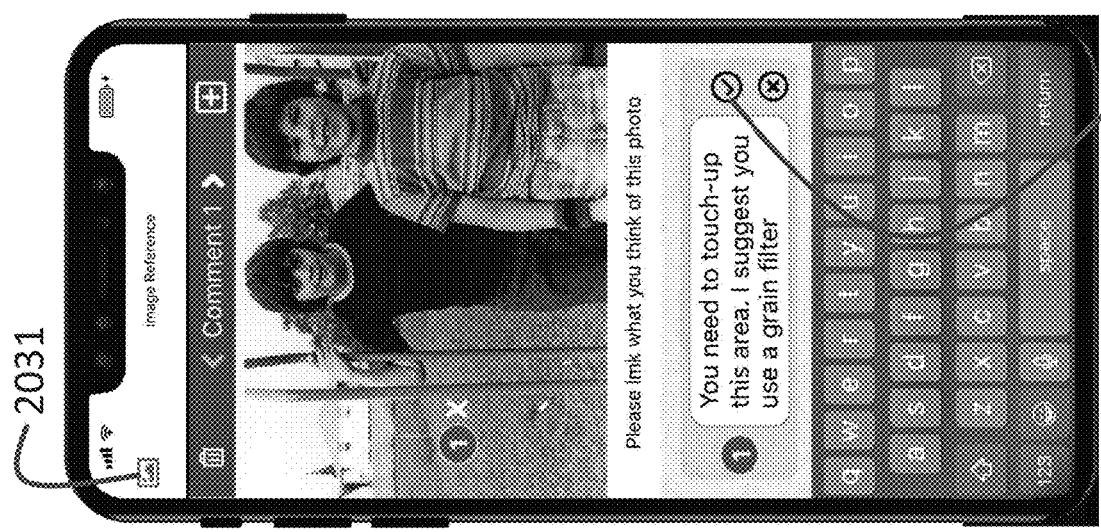

FIG. 42 In this embodiment the user taps on the check circle icon (2030) to indicate completion of the comment entry. In some embodiments other methods are implemented to indicate completion of comment entry.

2031 In this embodiment the user can cause a consolidated display of the "activity to date" (e.g., an updated Root Media Screen) by tapping on the associated form of media icon (an "image" icon in this example). In this example the Root Media Screen is updated and displays the base image along with consolidated indications of selection locations. How and if a Root Media Screen is provided can vary by embodiment.

FIG. 43 In this embodiment the specification of each location selection is facilitated separately. In this example, an indication, in the form of descriptive text (2033) is displayed to help orient the user with regard to where in a possible series of selections the user is. In some embodiments multiple location selections may be grouped together and identified together (e.g., "Group 1 Comment", "Group 2 Comment", etc.)

2034 In this embodiment a darkened check circle icon indicates that comment entry has been completed and/or registered. In some embodiments the comment can be further edited, by for example tapping within the text area or by for example tapping on the check circle icon again.

2036 In this embodiment the user can delete a Selection/Comment by tapping on the trashcan icon.

2038 In this embodiment the user can add a selection area by tapping on the "+" icon.

2039 In this embodiment an "image" icon is displayed to indicate the type of media displayed.

FIG. 44 In some embodiments the user can specify and comment on selection areas in other forms of media such as, for example, audio, 3D images, and/or video. In this example, the user is viewing a video clip and is able to play the video and make selections and comments at any time (t)/point (x,y) during the clip. In this example the user has selected an area (x,y) of the displayed video that is two seconds into the twenty second video (2042).

2041 In this embodiment the user can cause a consolidated display of the "activity to date" (e.g., an updated Root Media Screen) by tapping on the associated form of media icon (a "video" icon in this example). In this example the Root Media Screen is updated and displays the base video along with consolidated indications of selection locations.

In some embodiments the selection is a location (e.g., t,x,y,z coordinates relative to the media). In some embodiments the selection is something other than a location. For example, a user could tap on a color or other attribute to cause the selection of areas that match or are similar (or e.g., opposite) to the specified selected attribute. In some embodiments the user can select on a shape, a person and/or an item (e.g., can of Coke) and matches will be selected. In some embodiments the area selected is calculated/determined/suggested by the app using Artificial Intelligence ("AI").

Figure 45:
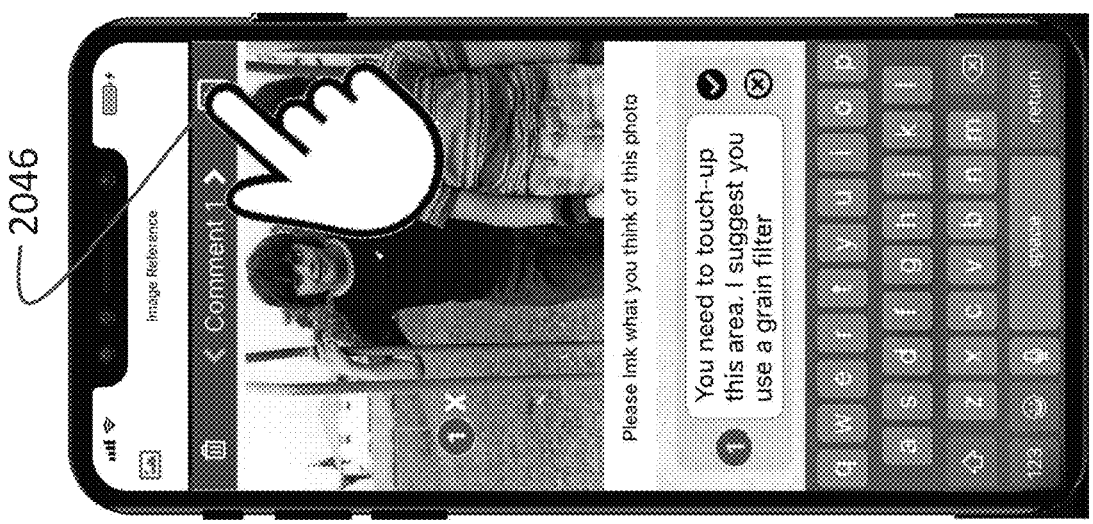

FIG. 45 In some embodiments the user can select a range or area as opposed to or in addition to a point, points or cluster. In this embodiment the user taps the topmost "+" add icon (2046) to add another selection location/comment. In this example, tapping the "+" add icon causes the display of the information shown as 2050. In 2050 the user is permitted to specify another selection area. In this embodiment an indication of a second area being specified is displayed as "Comment 2" (2053). In some embodiments, further interaction with the image is itself sufficient to indicate and initiate a further/another location selection.

Figure 46:
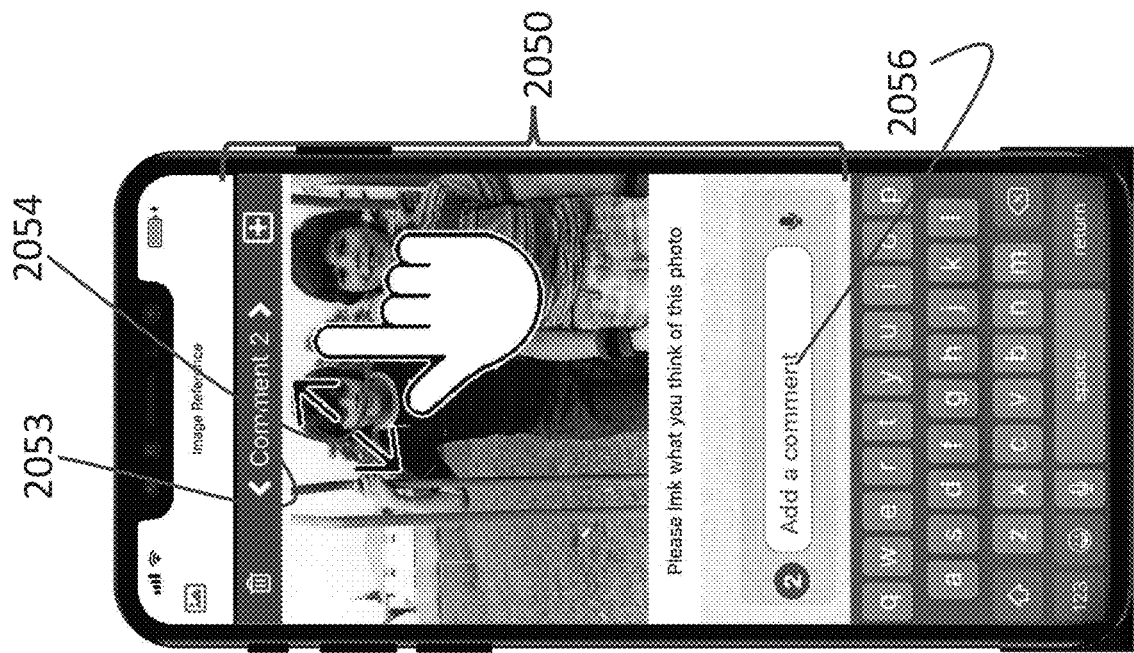

FIG. 46 shows an embodiment where the user is specifying another area of the selected image. In this example, the user is able to specify a selection area by using a spread/pinch gesture (2054). In some embodiments, other means of specification (and input control) such as a keyboard, stylus, joystick, virtual reality, trackpad, brain-machine interface, laser, voice, trackpad and/or mouse can be used.

2056 In this embodiment, the user is presented with an opportunity to add a comment that will be associated with the further selection location. In this embodiment the user is able to associate comments with one or more specified selected areas (and/or with the image/s in the aggregate). In this embodiment "text" entry is the default mode of input.

FIG. 47 In this embodiment location specifications and their associated comments (if any) are input and displayed separately. In some embodiments, comments associated with a specified location can be added, modified or deleted by interacting with the screen e.g., swiping right or left to reveal prior or successive area selections/comments.

In some embodiments other methods of point and/or area selection can be applied such as, for example, a stylus or drawing pad. In some embodiments a user can "draw" the area boundaries directly and the application in some embodiments can "suggest" an enhancement of the drawn selection by attempting to "snap" to the edges of a perceived object outline (i.e., e.g., edge detection).

In some embodiments all or some area selections are specified, indicated and/or displayed simultaneously. In some embodiments display of all or some area selections can be caused to be displayed and/or hidden, for example toggled.

In some embodiments all area selections are specified and indicated separately (e.g., on separate screens, sequentially, etc.). In some embodiments, areas are selected, and associated comments added (or deleted) by swiping right or left and/or up or down to reveal prior or successive selections.

In some embodiments all/any associated comments are input and displayed together.

In this embodiment associated comments are input and displayed separately. In some embodiments, comments associated with a specified area are added (or deleted) by first swiping left or right to reveal and/or create prior or successive specified area selections/comments.

In this embodiment the area selected is indicated by a white boundary (2058). In some embodiments there are other forms of point and/or area selection indication. In some embodiments there is no point or area selection indication.

In this embodiment, the user taps on the microphone icon (2059), in order to facilitate the input a comment by voice.

FIG. 48 in this embodiment the user is shown to be in the process of entering (recording) a comment by voice. In this example, the record icon (2060) is shown in red to indicate that the application is recording.

FIG. 49 In this embodiment the user can cause a consolidated display of the "activity to date" (e.g., an updated Root Media Screen) by tapping on the associated form of media icon (an "image" icon (2064) in this example). In this example the Root Media Screen is updated and displays the base image along with consolidated indications of selection locations (FIG. 50). How and if a Root Media Screen is provided can vary by embodiment.

In this example, the user has recorded an eight second comment/message to be associated with the image (2066)

FIG. 50 In this embodiment the Root Media Screen aggregates and simultaneously displays the specified location areas (2075 and 2076).

In some embodiments all area selections are specified and indicated separately (e.g., on separate screens, sequentially, etc.) In some embodiments, areas are selected, and associated comments added (or deleted) by swiping left or right or up or down to reveal prior or successive selections.

In some embodiments all/any associated comments are not shown on the Root Media Screen. In some embodiments at least a portion of the associated comments are displayed.

In this embodiment the Root Media Screen indicates the total number of selected locations (2072).

In this embodiment the user is able to add a comment to be associated with the image (2074). In other words, in addition to (or instead of) the comments associated with specific selected location areas (if any), the user can include a comment that will be associated with the image.

An indication of a selection point or area can be implemented in many ways, for example, in this embodiment, an indication of a selection point or area is indicated with an "X" as indicated (2076).

In some embodiments there is no indication of the selected point or area.

In some embodiments an indication of selected point or area can be caused to be displayed or hidden through a user action.

Figure 51:
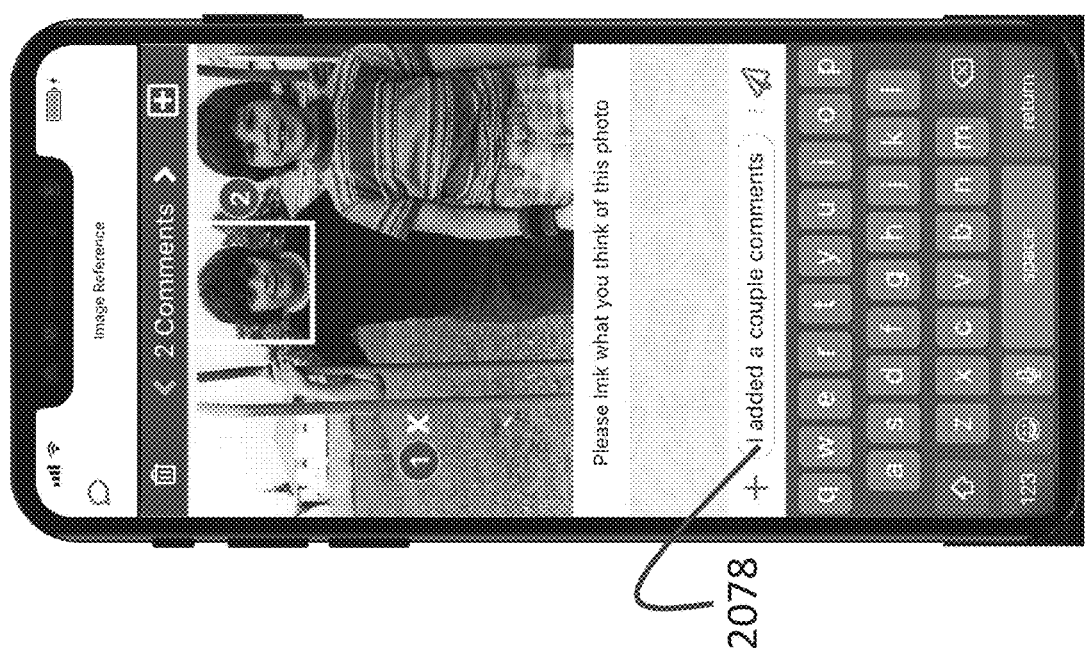

FIG. 51 In this embodiment the user added a comment "I added a couple comments" (2078) to be associated with the image.

In this embodiment the user entered a comment/message (2078) to be associated with the image. Once transmitted/posted to the message stream, it is this comment that will be displayed as a constituent part of the posted message. Comments associated with specified selected areas are subsidiary and appear upon further interaction of a user with the posted message.

Figure 52:
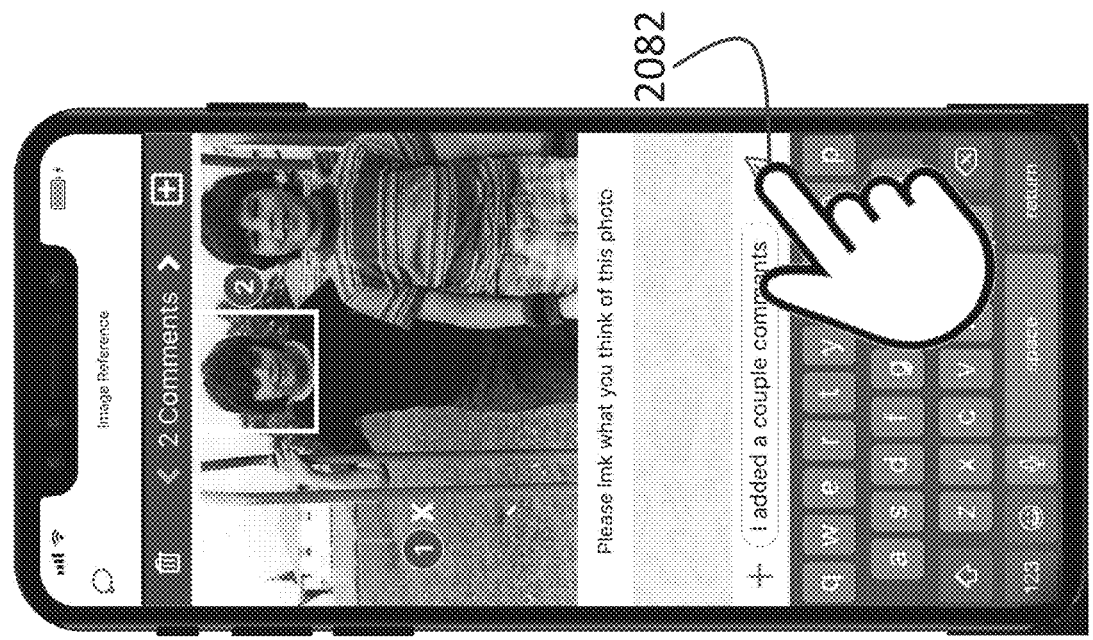
Figure 53:
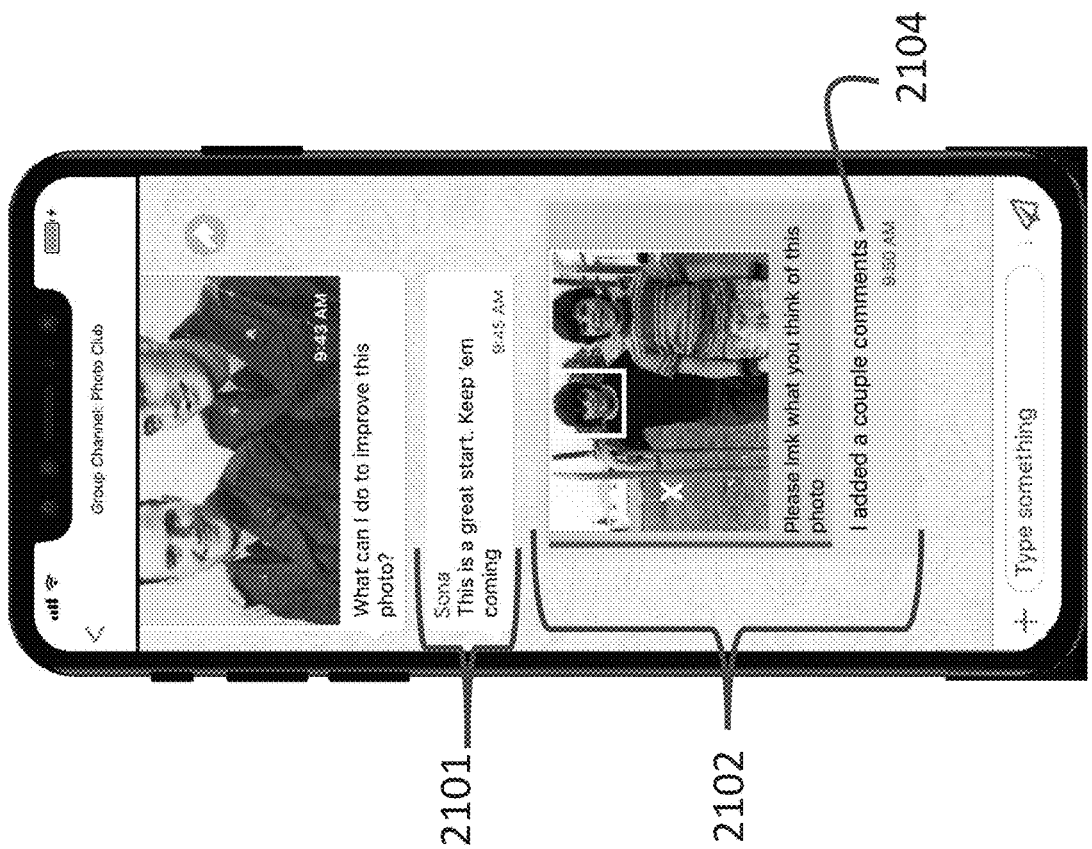
Figure 56:
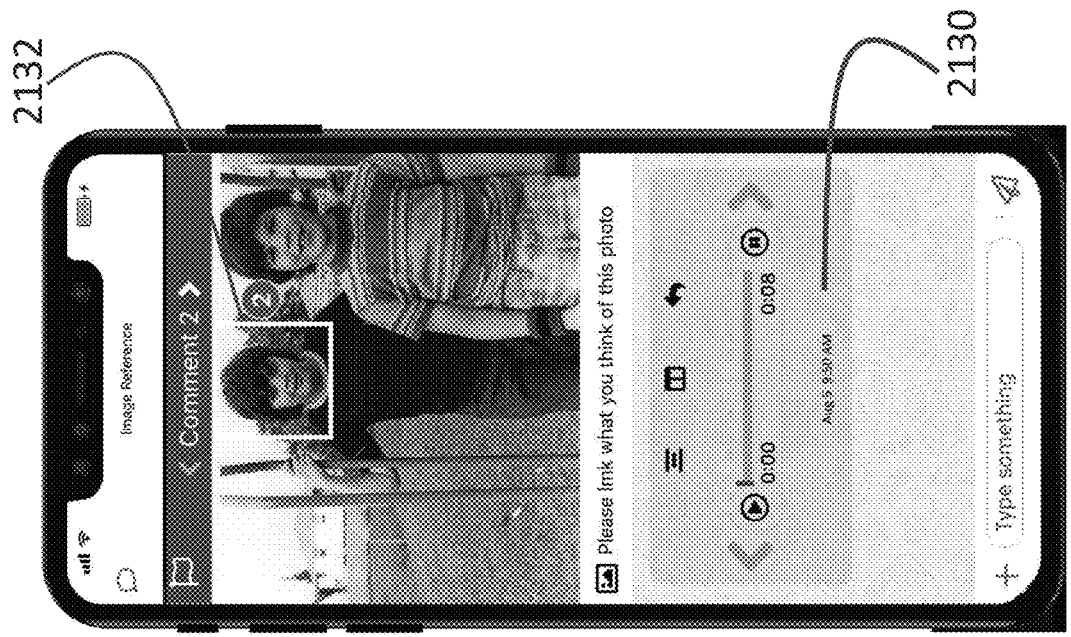

FIG. 52 In this embodiment, tapping on the "airplane" icon (2082) causes the message to be transmitted/posted to the associated (and/or otherwise indicated) message stream (e.g., channel) (e.g., FIG. 53).

FIG. 53 In this embodiment, a portion of the message stream associated with a Group Channel named "Photo Club" is displayed. In this example, the Photo Club channel is a private group channel that consists of a plurality of specified users.

In this embodiment, 2101 is an example of a message.

In this embodiment, 2102 is another example of a message. In this example, the user specified two areas and added a comment associated with each specified area (one text and one audio). The user also added a comment that was associated with the image (2104).

In this embodiment, the message (2102) includes the referenced image. (In some embodiments more than one image could be associated with the message.) This embodiment indicates and displays the specified selected areas of the image. This embodiment includes the time that the message was posted to the message stream and also displays the message associated with the referenced image.

Figure 54:
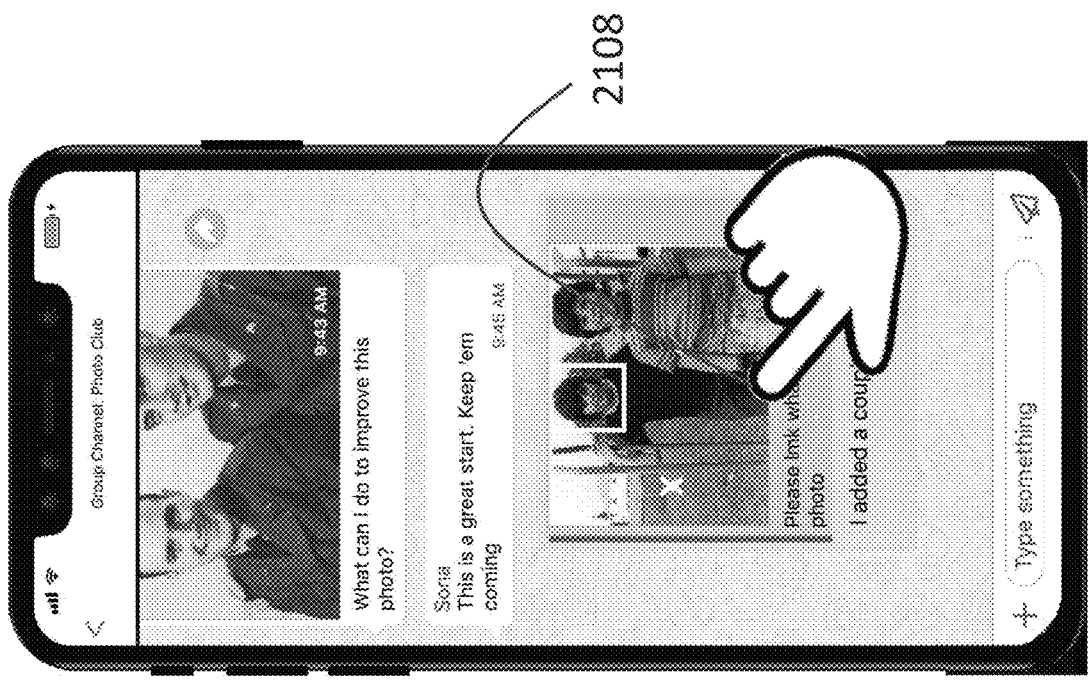
Figure 55:
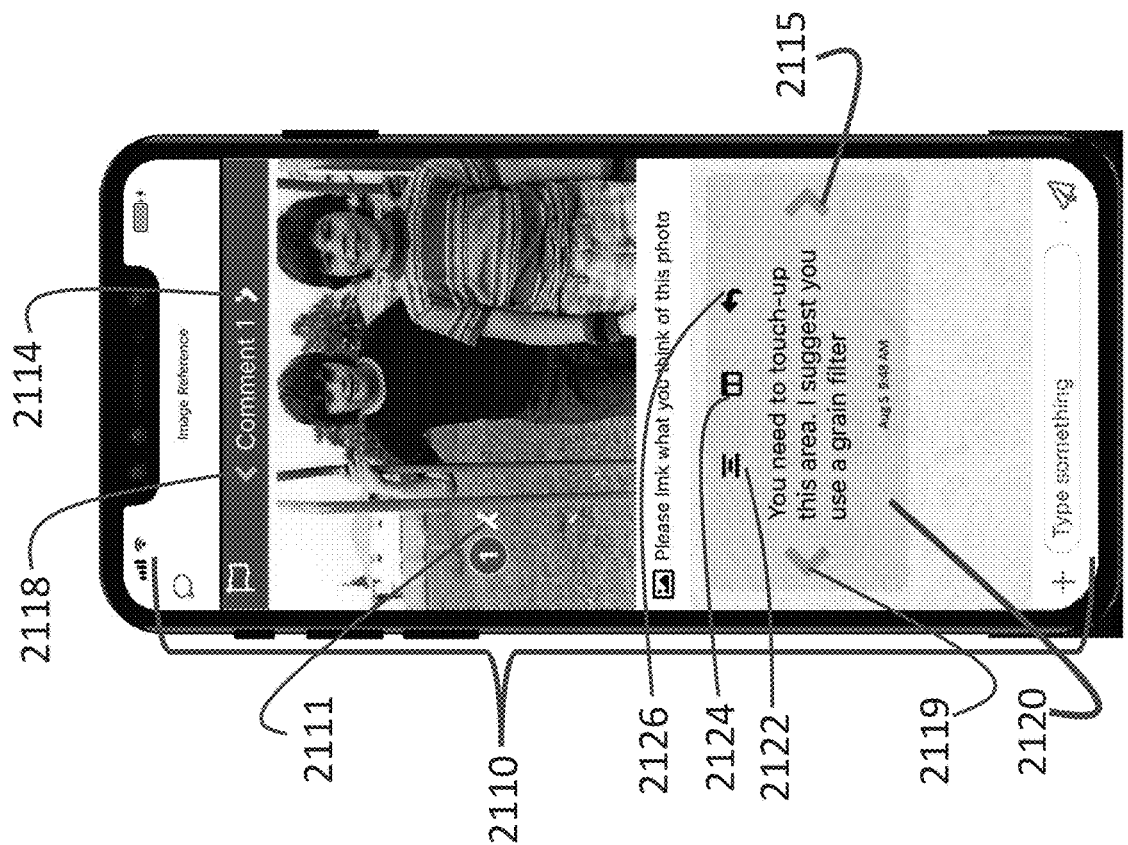

FIG. 54 In this embodiment, tapping on an area associated with the image element of the message (e.g., 2108) causes a focused and enlarged view of the image, and access to the indication of selected locations and associated comments (if any) (FIG. 55). In some embodiments other means of selection can be implemented to cause a further interaction with the image and its associated information, for example, in some embodiments the user may be able to peruse the specified selection locations and associated comments directly from this screen.

FIG. 55 In this embodiment, the user is able to view the specified areas in conjunction with their associated comment (2110).

In some embodiments tapping on the marked selected areas [superimposed] (2111) on the image will update the display to show a comment associated with that selected area.

In this embodiment, tapping on a next icon ">" (2114 or 2115) will cause the application to display the next specified image along with its associated comment (if any).

In this embodiment, tapping on the previous icon "<" (2118 or 2119) will cause the application to display the previous specified image along with its associated comment (if any). Other methods of moving between comments can be implemented.

In this embodiment the comment field (2120) associated with the displayed specified select area (2128) includes a text comment. In this example, the comment field, also includes metadata, which in this example is the date and time the comment was input. In this example the comment field also includes next (2115)/previous(2119) icons used to control which specified area will be displayed. In this example further actions are permitted such as Send this to Crawl (2122), Make this a Sidebar/Thread (2124), Reply to this comment (2126).

In this example, the comment field (2130) associated with the displayed selected specified area (2132) includes an AUDIO comment.

Figure 57:

FIG. 57 In this embodiment, the user taps on the "Send to Crawl" icon (2134) to cause the Send to Crawl detail specification screen (FIG. 58) to appear.

Figure 58:
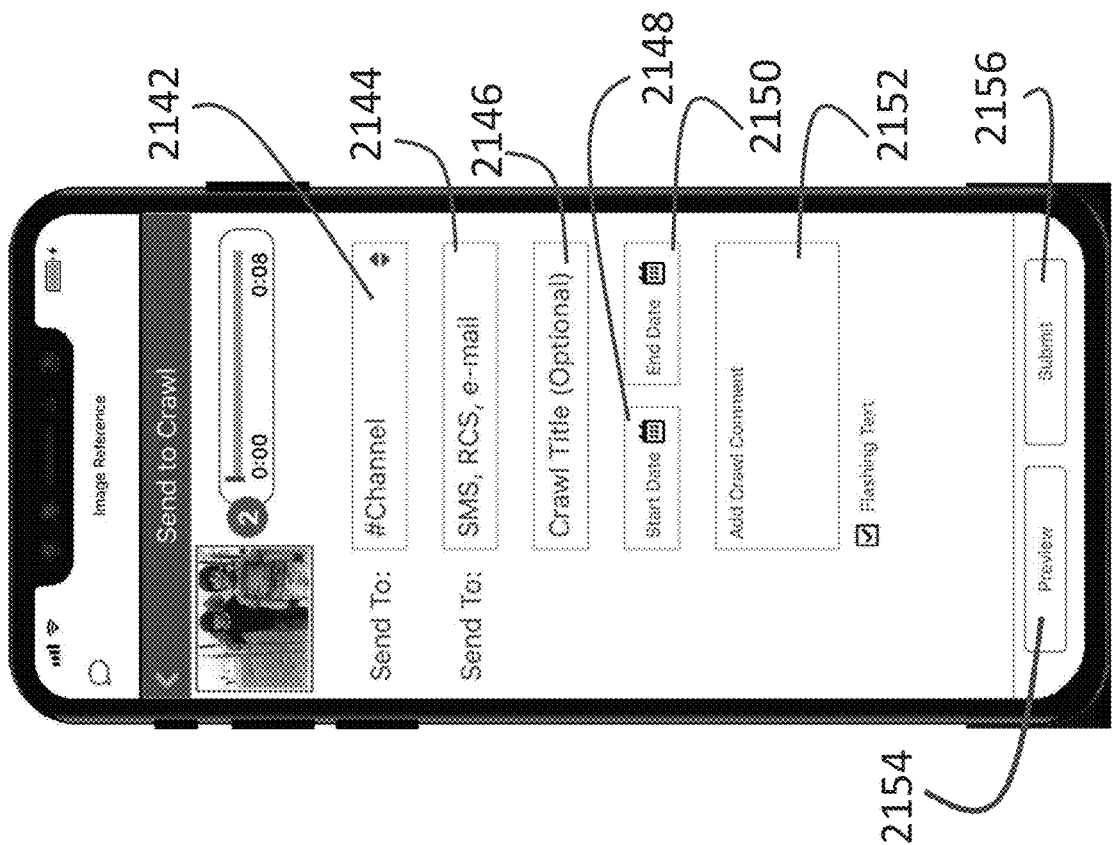

FIG. 58 In this embodiment, Crawls can be linked to and embedded in a single channel, or more than one channel (2142).

2144 In this embodiment, Crawls can be made accessible to external users via email, SMS, RCS, via links, or otherwise 2146 In this embodiment, the user may optionally add a Crawl title.

2148 In this embodiment, the user may optionally add the date when the image and associated comment/s will be added to the Crawl.

2150 In this embodiment, the user may optionally add the date when the image and associated comment/s will be removed from the Crawl.

2152 In this embodiment, the user may optionally add a comment that will be added to the Crawl and associated with the image/comment.

2154 In this embodiment, the user may see a preview of how the specified image/comment will appear in the crawl by tapping on the "Preview" button.

2156 In this embodiment, the user may post the specified image/comment to the Crawl by tapping on the "Submit" button.

Figure 59:
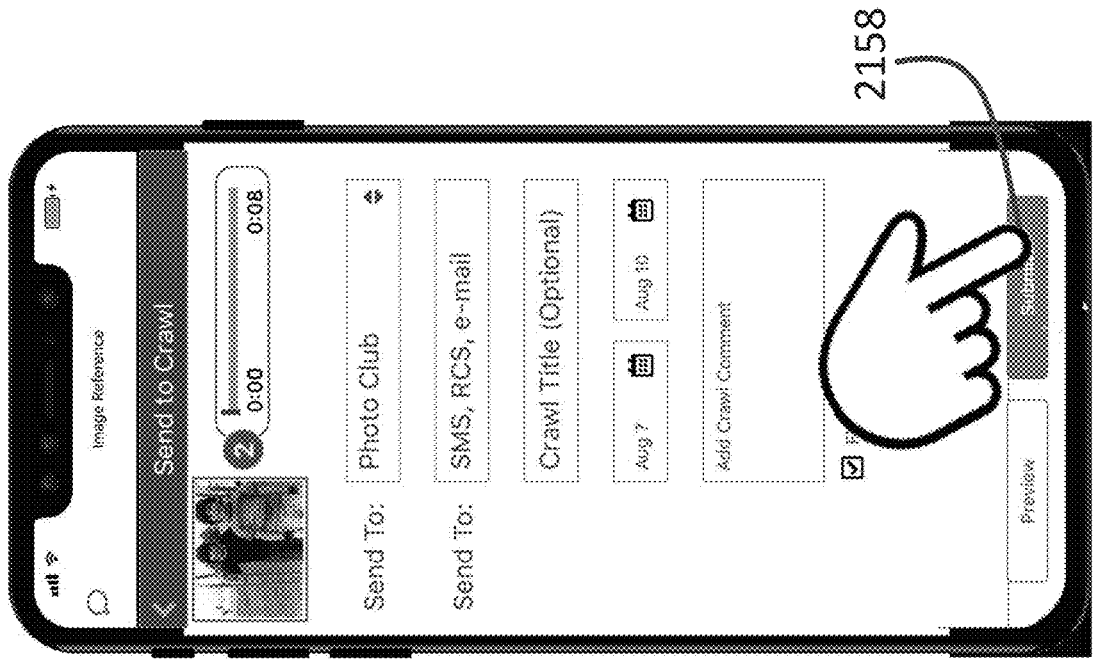

FIG. 59 In this example, the user taps on the Submit button (2158) to cause any rules and/or conditions associated with the specified image and associated comment to be applied. e.g., the date on which to add the specified image and associated comment to the specified Crawl/s.

Figure 60:

FIG. 60 In this embodiment, the specified image/comment appears in the crawl (2160) in the specified channel. In some embodiments a crawl is not associated with a particular channel, for example, a crawl may be applied to the application, a domain or sub-domain more generally. This example shows the Crawl at the top of the screen, with text/graphics flowing—moving—from right to left although the size, placement and nature of movement of the Crawl can vary.

Crawls may be created and sent to one or more channels and/or specified recipients. Crawl messages may be created from within Wrinkl, another application or sent to/from a crawl enabled device via chat, email or other method. Crawls may contain text, graphics, sounds or recorded messages (or any combination thereof). Crawls are notable in that their placement, size and/or movement call elicit special attention or notice. Crawls can be generated as a result of a subscription, membership or affiliation (e.g., based on defined criteria and linked to a twitter account, feed or the like). Text crawls may also be automatically generated based upon certain criteria being met such as, for example, a location or proximity to a person, place, thing or an event, date or time. The crawl can be spawned by other third-party applications as a result of a search being performed, an inquiry made, or a purchase being made. A text crawl can be a reminder, an alert, a message, an advertisement, an award, a receipt, a ticket, or other indication. A hypertext or other link can be embedded in a text crawl. Users may have the option of defining the types and circumstances under which they will accept, view or have the text crawl visible to them. A text crawl may be accompanied by a sound and/or vibration. The text crawl may or may not have automatic movement and may move from left to right or right to left or diagonally or up and done or back and forth or any combination of movement. The text crawl may be able to be enlarged, shrunken, hidden, tagged, named, saved, deleted, forwarded, edited, remain a static size, random size or variable. The text and or graphics can appear in any color or combination of colors. Associated sounds can be varied depending upon the context and/or content and/or originator of the crawl.

FIGS. 61 through 65 are exemplary screen shots that illustrate exemplary operation of an exemplary embodiment of the present invention.

Figure 61:
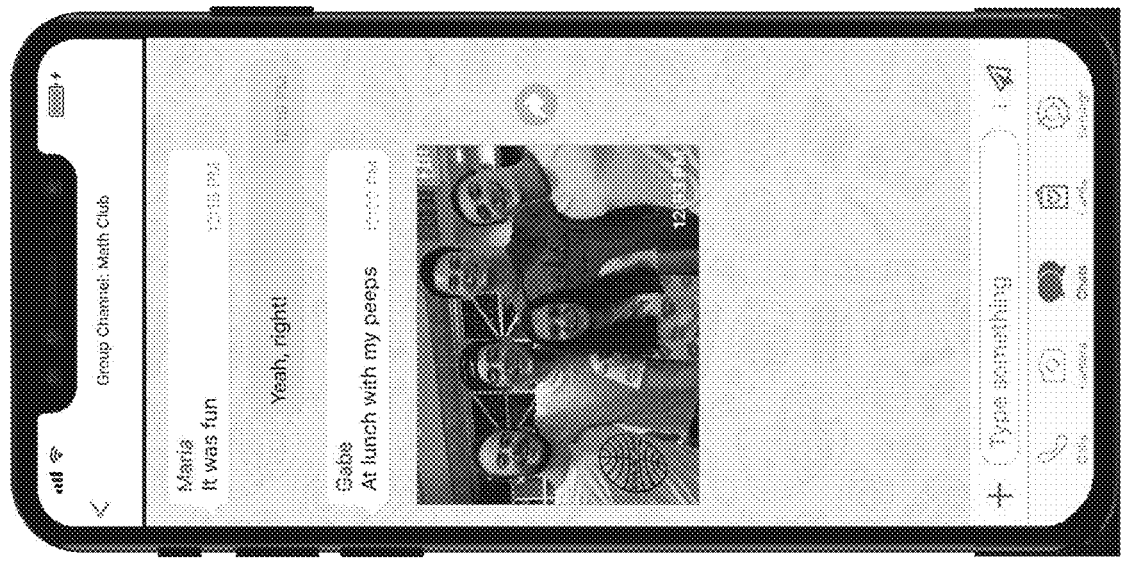

FIG. 61 In this exemplary embodiment a screen displays a plurality of messages in a [continuous, for example] stream of messages in a channel named "Math Club". In this example, the channel is "private" and only specified users are permitted access to this channel. In some embodiments third parties such as advertisers and/or other authorized or sanctioned parties are permitted a certain degree of access to private channels (e.g., an advertiser may have the ability to post (directly or indirectly) a message to a channel but the advertiser may not have the ability to view or access the messages otherwise exchanged between the plurality of users in the channel.)

In this example, a screen displays a portion of a message stream, i.e., a plurality of messages in a channel named "Math Club". A message as applied in this exemplary embodiment, can be thought of as a container that may include more than just a text message (e.g. text) itself. In some embodiments a message consists of additional elements such as associated metadata (for example, an avatar and/or the date and/or time that a message is posted). In some embodiments a message consists of additional elements such as images, audio, videos and/or other information. In some embodiments a message consists of additional elements such as references to and/or indications associated with one or more prior messages.

In this example the user may scroll up or down to view previous or later messages in the message stream.

FIG. 61 This exemplary embodiment a screen displays a plurality of messages in a [continuous] stream of messages in a channel named "Math Club". In this example, four messages are displayed and the user may scroll up or down to view previous or later messages in the message stream.

Figure 62:
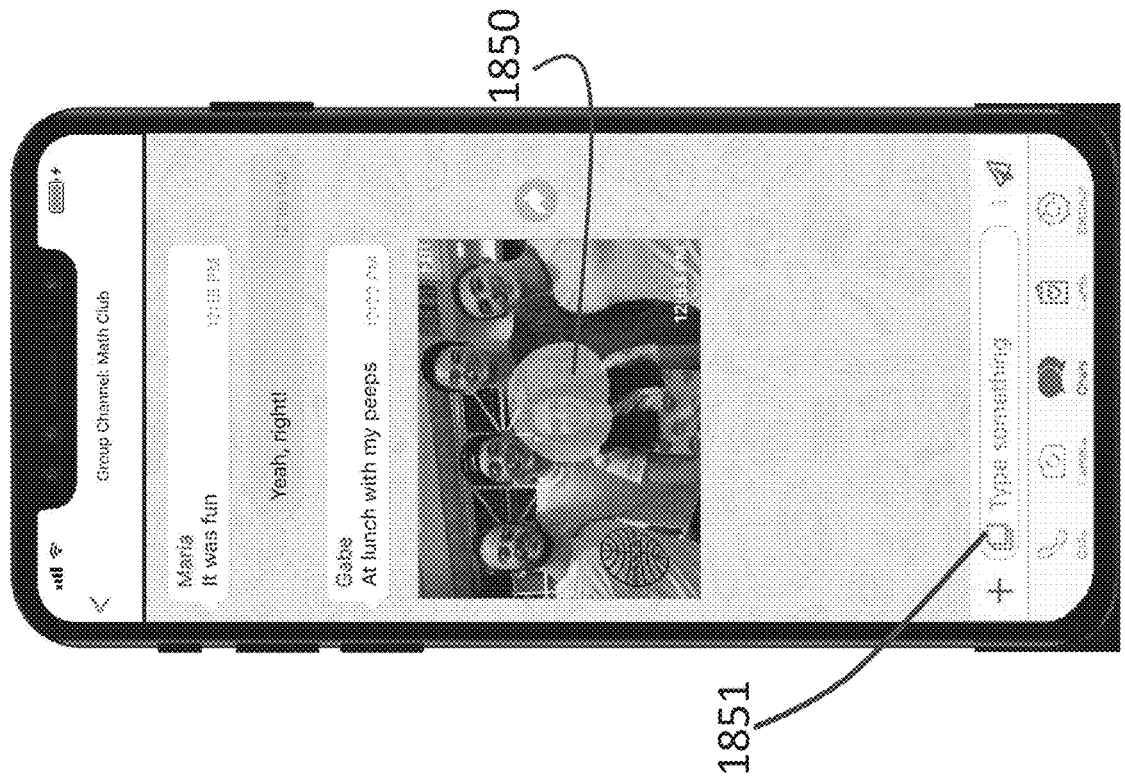
FIGS. 61-65 are exemplary screen shots that illustrate examples of the operation of one or more exemplary embodiments of the present invention.
Figure 63:
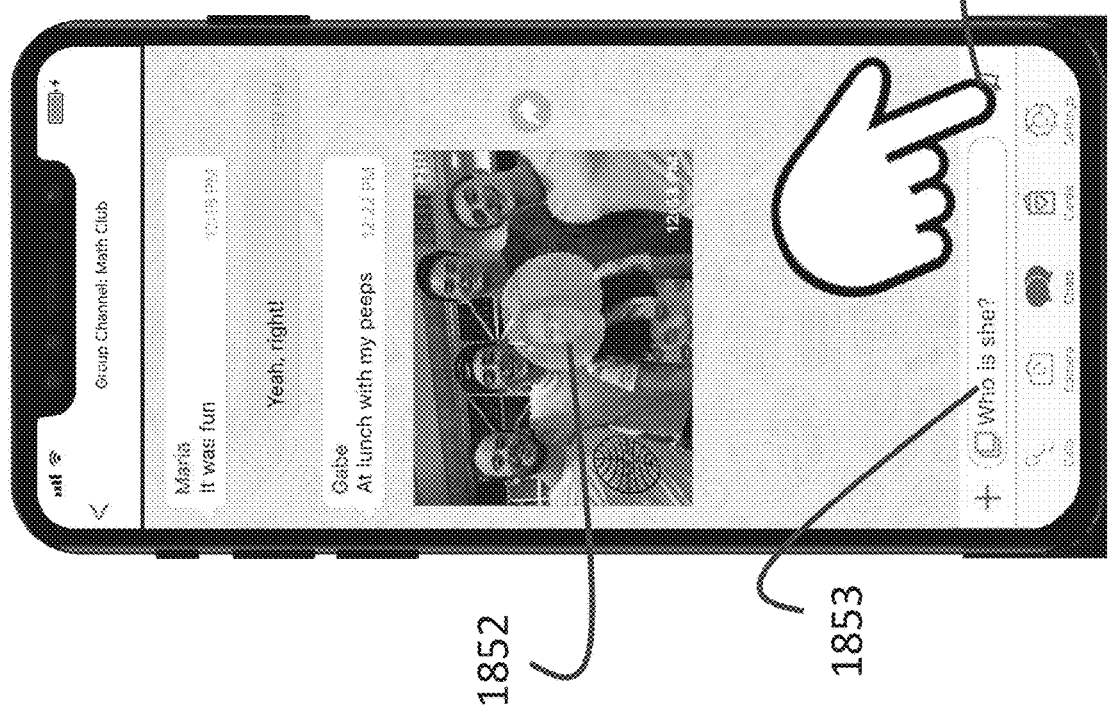

FIG. 62 In this exemplary embodiment a screen displays a plurality of messages in a [continuous] stream of messages in a channel named "Math Club". In this example, a long-press on the touchscreen on an area associated with the intended image in this example allows the user to further interaction with the selected image. Various approaches to indicate selection can be implemented. FIG. 63 shows one such alternative approach. In FIG. 63, the user long presses to initiate interaction with an image associated with a previous message and then optionally specifies a selection area of the image by using his/her finger to rub over the area of an image intended to be specified (1850). In some embodiments, the user is able to indicate selection using other techniques such as through use of a mouse, trackpad, light-pen, verbal commands or brain-machine interface. In some embodiments the system infers the selection area based on the initial placement of the user's finger (or other input device) in combination with the user maintaining pressure on the device touchscreen while dragging it to a further point. In some embodiments, the system assists the user in specifying the selection area.

In some embodiments the user specifies a point (generally) and the application suggests an area selection border area based on algorithmic considerations (i.e., e.g., automatic edge detection using a technique such as Canny edge detection). The algorithmic considerations could for example be based on color differences between the selected area and neighboring area/s, based on learned previous behaviors of the user, and/or another set of users, and/or based on analogous past selections, and/or based on other inferences and/or calculations, etc.

In some embodiments the system infers the selection area based on the initial placement of the user's finger (or other input device) and an indication of the inferred selection area is suggested by the system by displaying an area boundary indicator such as, for example, a white dashed border. Other approaches and methods can be applied to indicate the selection area (if such indication is desired). In some embodiments the user can use their finger, a stylus or other input control mechanism (such as, for example, brain-machine interface, voice, or eye-tracking, etc.) to accept, reject or otherwise further refine the area selection border. In some embodiments more than one area selection area may be specified.

In some embodiments the system infers the selection area based on the initial placement of the user's finger in combination with the user maintaining pressure on the device touchscreen while dragging it to a further point. In some embodiments, an inferred selection area is suggested by displaying a white dashed border. Other approaches and methods can be used to indicate the selection area (if such indication is desired). In some embodiments the unselected areas are blurred, dimmed or in some way offset to assist in conveying what area/s will be matched. In some embodiments the user can use their finger, a stylus or other input control mechanism (such as, for example, voice, eye tracking (using a technique such as Pupil Center Corneal Reflection (PCCR) whereby, near-infrared light is directed towards the center of the eyes (pupil), causing detectable reflections in both the pupil and the cornea. These reflections—the vector between the cornea and the pupil—are tracked by an infrared camera), and/or brain-machine interface) to accept, reject or otherwise further refine the match selection border. In some embodiments more than one match selection point/area may be specified.

In this embodiment more than one indication of the selection is displayed. One indication is the (slight) change in brightness of the image in the area selected (1850). Another indication is the insertion of an icon in the text entry bar (1851).

FIG. 63 In this exemplary embodiment, text or other media is input into a text entry field which text or other media is associated with a specified area/s of the selected image. In this exemplary embodiment the user may specify none, one or more than one further area associated with the selected image and/or may insert a note/comment/message (1853) to be included in the transmitted further message. In some embodiments, the image itself is selected without a further area of the image being specified.

In this exemplary embodiment, tapping on the send icon (1854) causes the further comment (1853) and the image (1852) and certain metadata (e.g., sender, time of transmission) to be transmitted and posted together to the messaging stream (together with the further message)

Figure 64:
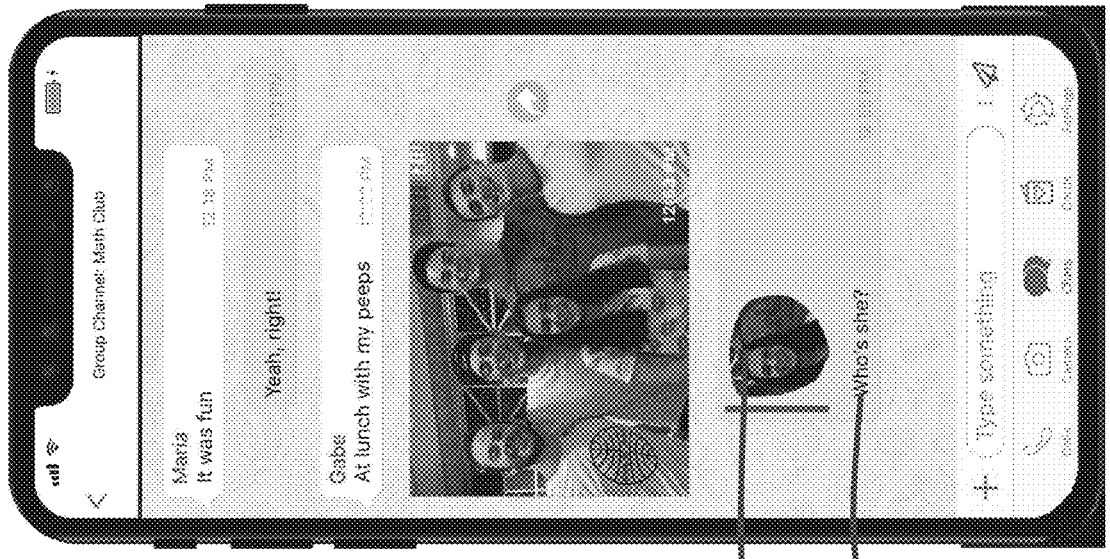

FIG. 64 this exemplary embodiment shows the referenced image included as a part of a message after it has been transmitted.

In this embodiment, at least a portion of an image associated with a selected message that was at least partially displayed earlier in the message stream is displayed (or otherwise referred to) and included with a further message and/or comments associated with a specified area/s of the referenced selected image associated with the earlier posted message.

In this example, the user refers to the included image, which image includes an indication of a specified area, and asks, "Who's she?" In some embodiments both an indication of further selected areas and associated comments are displayed as part of the posted message. In some embodiments only the comments or the indication of the specified area/s of the image are displayed. In some embodiments other methods of display are provided, for example toggle to hide/reveal indication and/or comments.

Figure 65:
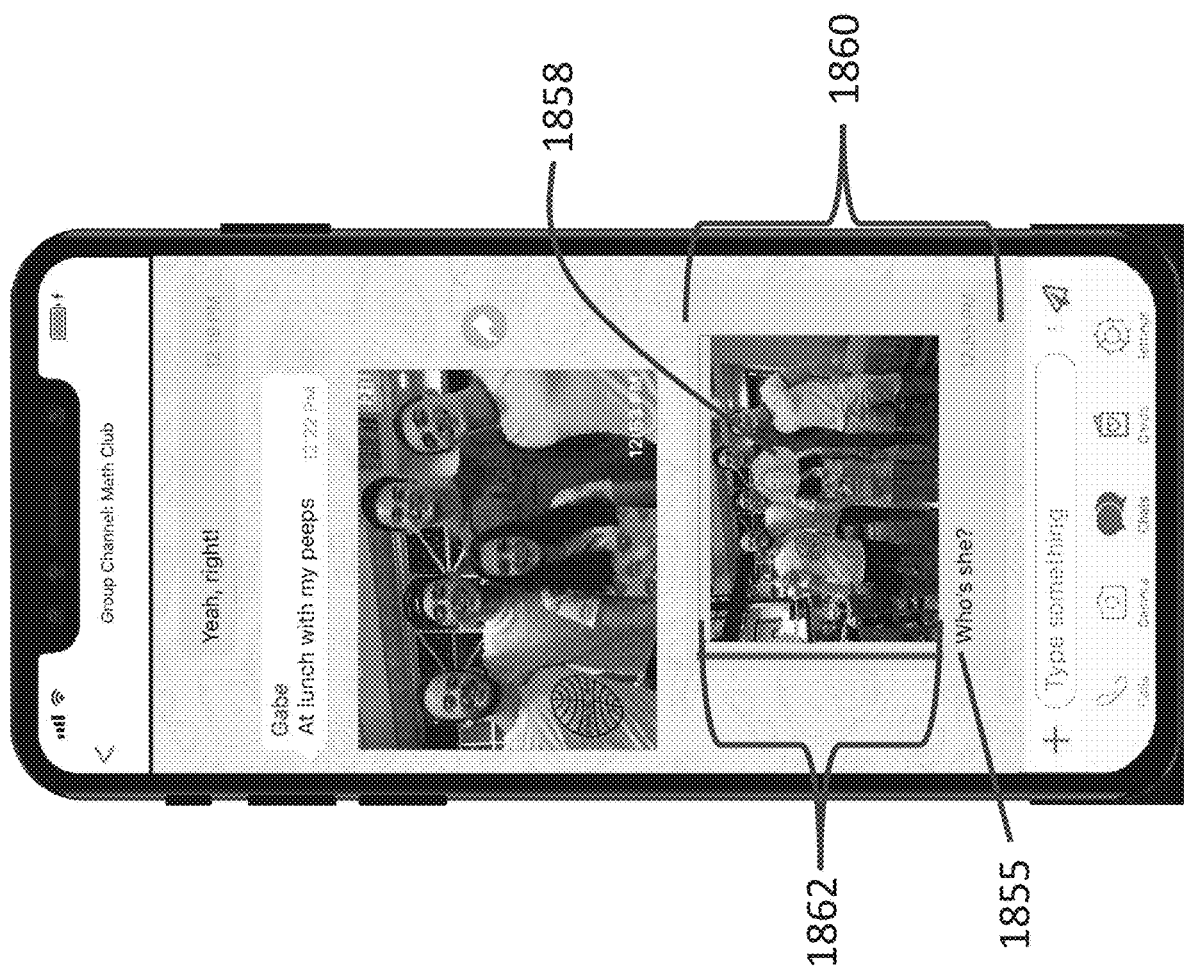

FIG. 65 illustrates an alternative to the embodiment illustrated in FIG. 64. In FIG. 64, and as shown, a portion of the previous image is shown to facilitate identification of the portion of the image associated with the content "Who's she?" Thus, in exemplary FIG. 64, portions of the previous image have been omitted in order to identify the portion of the image associated with the added content. By contrast, in FIG. 65, a portion of the previous image has been indicated with a "greyed out" area, and portions of the previous image have not been deleted. FIG. 64 and FIG. 65 thus illustrate alternative methods for identifying a portion of an image. These illustrations are merely exemplary as other methods for identifying a portion of an image are also contemplated.

FIG. 66A is a flowchart diagram that illustrates exemplary referencing of an image associated with a message in accordance with a further exemplary embodiment of the present invention. At step 1610, previous messages are displayed. In addition, a visual structure to facilitate text or voice entry may be included. The visual structure may be a text entry bar. As characters are typed using an I/O device, for example, the characters may appear in the text entry bar. After the typing, or other entry, of the message has been completed, in one exemplary embodiment of the present invention, the text entry bar may be optionally hidden, the text may be sent, and the text that was inputted into the text entry bar may be repositioned so that it appears with other messages that have been sent and received. In any event, by displaying the text entry bar, for example, a visual indication is provided to the user that the client device that will transmit the completed message is ready for the completed message to be created.

Thus, for example (and generally speaking), a first image may be displayed on a first display device.

In some exemplary embodiments the image (or portion/s thereof) are selected through another method. In one such embodiment a new image is captured, i.e., it had not been previously transmitted into a chat message stream). In this embodiment the user is able to monitor an image in a field of view of a camera of a mobile device and capture module of the mobile device and capture the image with the camera and provide the image from the camera to the application. In this example, a device's camera (directly from within the app or indirectly by being associated with the app) is pointed at a subject and a photo/video/image is captured.

Step 1620 is a group of steps (1625, 1630 and 1635) that facilitate the process of an initial image and/or area of an image selection. The user identifies and selects a message or an image element or an area associated with an image element with a message. An indication of said selection is displayed.

At step 1625, a user taps (or registers a selection via other input mechanism) on an image or area associated with an image associated with a 1st message intended by the user to be referenced by a further message. In some embodiments, selecting the image element or area associated therewith in the 1st message will cause a change in the display of said selected image element or some other aspect or portion of the 1st message and/or the image element associated with the 1st message by for example, isolating, highlighting, offsetting, or modifying the image element. In some embodiments the system infers the selection area based on, for example, the placement on the screen of the user's input device (e.g., finger, mouse, stylus). In some embodiments the application will assist the user in specifying the selection area by suggesting, for example, a selection area based on algorithmic and/or other considerations. The algorithmic considerations could, for example, include or be based on color, light contrast, light brightness of the image, positioning, dimensions, tolerances, character spacing, skewing, warping, corner detection, line detection, edge detection, sharpness differences between a selected area and neighboring area/s, based on learned previous behaviors of the user, and/or another set of users, and/or based on past selections, and/or based on facial or other recognition, AI and/or other inferences and/or calculations, etc.

Thus, for example (generally speaking), selection of at least a portion of the first image is received via the first display device.

At step 1630 the application records the selection and, in some embodiments, the location of the selection. In some embodiments more than one location can be specified and recorded. In some embodiments the selection is a location (e.g., x,y coordinates relative to the image). In some embodiments the selection is something other than a location. For example, a user could tap on a color or other attribute to cause the system to propose a selection area or more than one selection areas that match or are similar (or opposite) to the specified selected attribute.

At step 1635 a visual indication of the selection area/areas is displayed. In some embodiments the selected area is indicated by displaying a visible mark in the area of the selection, and/or a border around the selected area/s. Other approaches and methods can be applied to indicate a selected area. In some embodiments a selected area is highlighted by modifying the appearance of the unselected areas by, for example, blurring, dimming or in some other way offsetting the selected area/s. In some embodiments a copy of the image, a thumbnail, an icon, text, or other object is placed in the text entry bar or displayed elsewhere on the screen to indicate a selection.

Optional Step 1645 is a group of steps (1650, 1655 and 1660) that facilitate the process of an additional selection of an area of an image. An indication of said selection is displayed. In some embodiments the application will assist the user in specifying the selection area by suggesting, for example, a selection area based on algorithmic and/or other considerations.

At step 1650, a user taps (or registers a selection via other input mechanism) on an additional area associated with the selected image ("additional selection area"). In some embodiments, selecting the image element or area associated therewith will cause a change in the display of the image element, or some other aspect or portion of the 1st message and/or the image element associated with the 1st message by for example, isolating, highlighting, offsetting, or modifying the image element. In some embodiments the system infers the selection area based on, for example, the placement on the screen of the user's input device (e.g., finger, mouse, stylus). In some embodiments the application will assist the user in specifying the selection area by suggesting, for example, a selection area based on algorithmic and/or other considerations.

At step 1655 the application records the additional selection area and, in some embodiments, the location of said selection. In some embodiments the additional selection area is a location (e.g., x,y coordinates relative to the image). In some embodiments the additional selection area is something other than a location (e.g., another attribute).

At step 1660 a visual indication of said additional selection area is displayed. In some embodiments the additional selection area is indicated by displaying a visible mark in the area of said selection, and/or a border around the selected area/s. Other approaches and methods can be applied to indicate an additional selected area. In some embodiments an additional selected area is highlighted by modifying the appearance of the unselected areas by, for example, blurring, dimming or in some other way offsetting the selected area/s. In some embodiments a copy of the image, a thumbnail, an icon, text, or other object is placed in the text entry bar or displayed elsewhere on the screen to indicate a selection.

Steps 1650, 1655, and 1660 can be optionally repeated.

Step 1661 is a group of steps (1662, 1664 and 1666) that facilitate the process of search/match criterion specification, search, search refinement, result display and search match selection.

At optional step 1662, the user is able to specify additional search criterion. For example, the user may be seeking examples of matches for the selected image in conjunction with additional specified attributes.

At step 1664, the application performs a search based on the specified selected image and/or selected area/s of the image and/or additional specified attributes (i.e., "content"). In some embodiments the search for matches includes the use of facial and/or other recognition and/or AI techniques. Searching is thus performed for example from an image database with regard to at least one visual feature. Image databases may be custom built or obtained from a public source such as Google Images. At step 1664, matched results are displayed and/or made available for display by the system. In some embodiments the user is able to move between matched results by for example scrolling or swiping to next or previous results. In some embodiments the user is able to further refine the search criterion in order to see further matched results.

Figure 66B:
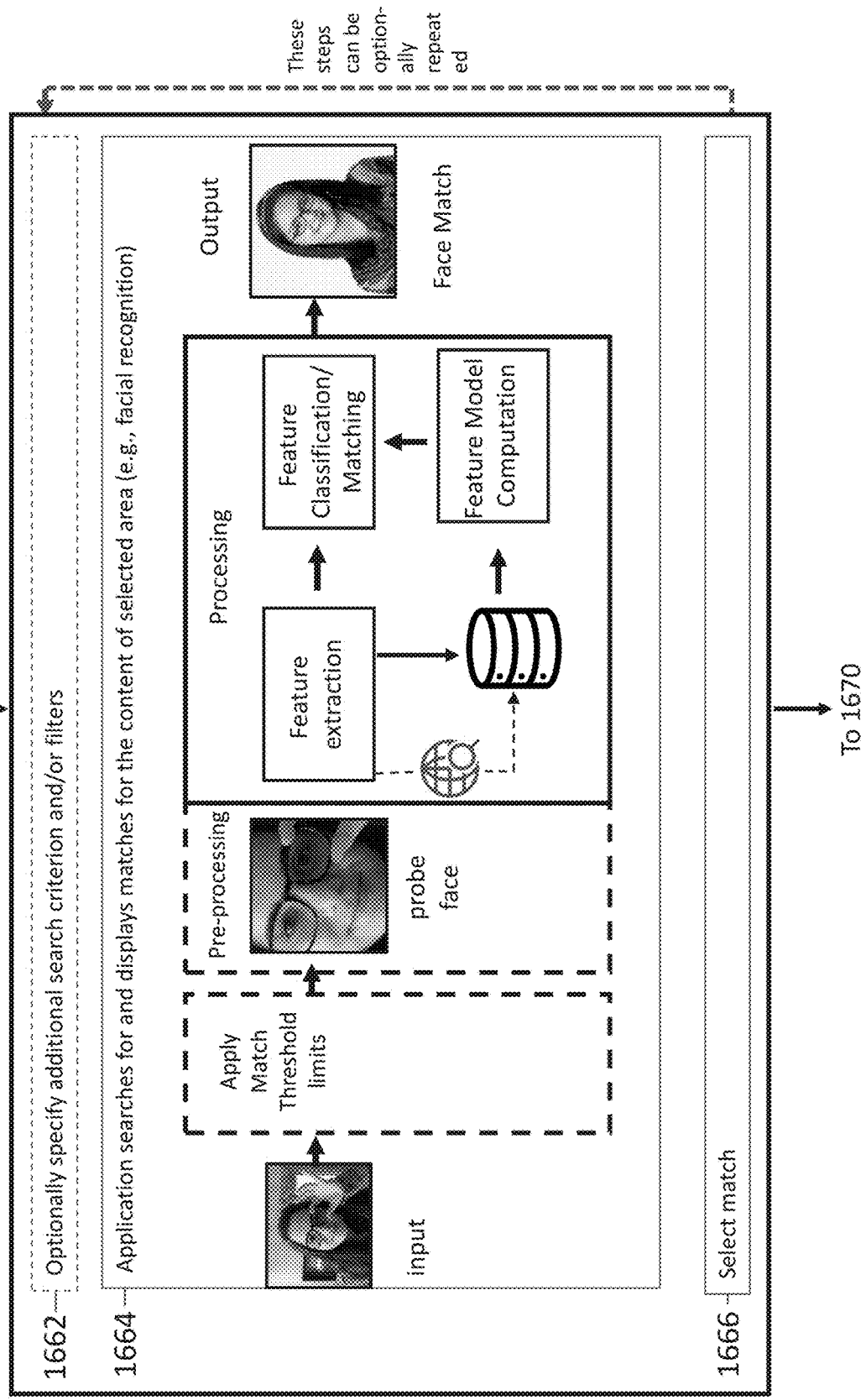

FIG. 66B illustrates in detail step 1664 of FIG. 66A. FIG. 66B illustrates a "Processing" step in which one or more features of a selected image are matched with one or more features from a library of images. In one embodiment, the output of the "Processing" step is a face match that is an image with similarities to the selected image. Mere processing from a library to find images with facial features similar to a selected image is known to one of ordinary skill in the art. Details for finding images based on facial feature similarity are described in U.S. Pat. No. 9,235,782. See also U.S. Pat. No. 7,164,781, U.S. 2013/0247175, U.S. 2008/0080748, and U.S. Pat. No. 7,809,722. All of the above patents and patent applications are hereby incorporated by reference herein for their teachings regarding matching a face in a selected image with further stored facial images (from a database, for example).

FIG. 66B further illustrates optional steps of setting thresholds in accordance with further exemplary embodiments of the present invention. In one exemplary embodiment, a facial image is located in a database that is as close as possible to a selected facial image. In another exemplary embodiment, FIG. 66B illustrates an "Apply Match Threshold Limits" step and a "Pre-processing" step. As a result of the inclusion of these optional steps, a user is permitted to enter a threshold number to indicate how close a match is desired, which threshold effects are considered a match, whether the threshold can be applied in the aggregate or to one or more particular facial features, etc. In particular, the above patent (and patent application) documents describe the ability to assign "scores" to facial images or facial features. Thus, the user may indicate that when searching for a similar facial image occurs, the search should identify images that achieve certain "scores" that the user may enter prior to initiating each search. Thus, for example, among a plurality of potential images, numerical values may be obtained that correspond to amount of similarity between at least one feature and the first image (or portion/feature thereof). Thus the transmitting of the second image includes transmitting one or more of the potential images that include one or more numerical values that are above, below, or equal to a threshold.

Steps 1662, 1664 and 1666 can be optionally repeated.

"Content" of a specified selected area can be identified as a result of, for example, user input or object (character and/or person and/or place) recognition using and/or combining text detection/recognition techniques (e.g., Optical Character Recognition (OCR)) and/or machine learning techniques such as Region-Based Convolutional Neural Networks (R-CNNs) and/or You Only Look Once (YOLO)) possibly combined with, for example, other calculated, derived and/or looked-up information associated with the selected area. For example, if the content of at least a portion of the selected area was a person's face, the system, through use of certain approaches to facial recognition such as geometric and/or photometric techniques and by, for example, applying an algorithm such as Principal Components Analysis (PCA), Linear Discriminant Analysis (LDA), and/or Elastic Bunch Graph Matching (EBGM), may identify and find information associated therewith, including for example, videos, images, contact information, a link to LinkedIn or Facebook, etc. In some embodiments the system recognizes/identifies various possible matches to the "content" with varying levels of algorithmically determined confidence and presents its findings in order of its confidence scoring. In some embodiments the system's recognized matches are displayed as further selectable thumbnail images. In some embodiment the user's interaction with one or more thumbnails causes a refined visual display, said display showing more information associated with the thumbnail selected by the user.

In some embodiments, identification of corresponding images is the result of finding images with certain pixel values. The pixel values may be an average value, a range of values, across an entire image, within a selected portion of an image, within a portion of the image identified using one of the algorithms described above, etc.

In some embodiments the entire image is considered to be selected. In some embodiments an area or portion/s of the image is considered to be selected. In some embodiments selection area boundaries are inferred or algorithmically determined or suggested. In some embodiments the user causes the selection area to be defined through direct user input, using for example a stylus, finger, mouse or trackpad. In some embodiments the inverse, background or opposite of the area/s specified is treated as the area selected.

Various techniques can be applied to identify the content of a selected area (i.e., the specified image or portions thereof) such as hypothesizing a correspondence between a collection of image features and a collection of object features. Then using this to generate a hypothesis about the image or specified area thereof. Then use this hypothesis to generate a rendering of the object (this step a.k.a. "back-projection"). Then compare the rendering of the image (or portion thereof), and, if the two are sufficiently similar, accept the hypothesis.

In some embodiments more than one image (or portions or attributes of an image) can be selected and for example, aggregated and/or combined in some manner (e.g., "stitched" together, overlaid, etc.) to be matched.

At step 1666, the user selects an image that the user may consider to be a preferred match. In some embodiments more than one match can be selected. In some embodiments the match selection is determined by the user. In some embodiments the match selection is determined by the system.

In some embodiments the system identifies more than one match of the "content" of the selected area/s and displays thumbnail images of the "matches" in order of confidence. "Confidence" may refer to a similarity score that is calculated for each image in accordance with the above patents and patent applications that are incorporated by reference herein. In some embodiments the user can cause additional matches to be displayed and/or presented matches to be hidden.

In some embodiments the user selects one of the thumbnails which causes the system to search, look-up, calculate, infer and or derive a further display of information associated with said selection. In some embodiments the further display will include additional refinement options. In some embodiments the further display will display information such as images, videos, links, text or other media associated with the selection. In some embodiments a combination of display elements or interaction options will be presented and/or facilitated. In some embodiments the user can select a thumbnail and later select another thumbnail. In some embodiments, the selection of a thumbnail will cause the thumbnail to be for example, enlarged, highlighted and/or played.

At optional step 1670, the user is able to create a message that will be included and associated with the further message.

Step 1670 may generally and optionally correspond to receiving content that is associated with at least the portion of the image for which selection was received. The content and at least portion of the image may optionally be digitally linked. Examples of digital link include a pointer between respective memory locations where content and the image (portion) are stored. Other forms of linkage may include for example physical corresponding addressing, virtual corresponding addressing, and other data storage and retrieval mechanisms.

At step 1675, an instruction is provided allowing the user to cause the transmission of the further message. In some embodiments the user may cause the message to be transmitted to additional, another or other message channel/s. In some embodiments the user may cause the message to be transmitted to a crawl. In some embodiments the user may cause the message to be transmitted to a third party or external application. In some embodiments, the image (selected as being a "match") is transmitted as part of a message to a second display device.

At step 1680, the further message is displayed. The further message may be displayed in various places including, for example, a client device from which the message was transmitted, a client device to which the message is transmitted, a device where a message is displayed without being transmitted outside of the device, etc. After the further message is displayed (along with an at least a portion of the selected image and/or object associated with the specified image element). Step 1610 may occur on a first display device. Step 1680 may occur on a second display device. An indication may be provided (via inputted text, for example, or other automatically generated means) that the second image is associated with the first image. The second image (the image selected as being a "match") may also be described as having one or more features in common ("feature common") with the first image (the image from which an image that is a "match" is desired).

The first image and the second image may be digitally linked (as previously described "linked" may include various forms of being digitally linked). The indication that the two images are a "match" may be digitally linked to the first image, the second image, or both.

At optional step 1685 interaction with the further message is permitted. In some embodiments, selection of an area associated with the specified image or selected areas thereof causes display of the 1st message, a portion of the 1st message, an image associated with the 1st message and/or data associated with the 1st message, etc. In some embodiments the display of the associated message or element thereof, (e.g., image, video) includes an indication of the selected area/s of the image.

Generation of a further message receptive to further user interaction may be accomplished in accordance with a further exemplary embodiment of the present invention. For example, a unique identifier may be assigned to each message and/or element thereof. There are numerous ways to generate unique identifiers, including sequential numbering, numbering based on a system clock, numbering based on a chronological clock, etc. Receptivity of user input associated with an interaction associated with a further message may be initiated by an event that occurs and is detected by software (that is causing or related to the display of the messages on the client device). Put another way, for each of a plurality of messages that are displayed, an event "listener" is waiting for an interaction with known objects or areas of the message. The known objects or areas of the message waiting for interaction correspond to the previously described "display object" (which for example, when selected, result in display of the previously selected image, message, selection, etc.

Various interactions are possible with the message. Exemplary interactions include copy and paste. Other interactions include the exemplary embodiment illustrated in FIG. 66A and 66B and described above, but starting with the further message of step 1685 (the further message of step 1685 becomes the message of step 1610 and the steps illustrated in FIG. 66A and 66B are subsequently performed). Other interactions include the interactions illustrated in FIGS. 3-13D (i.e. that differ from steps illustrated in FIGS. 66A and 66B). Other interactions with the "display object" are contemplated. This list of further actions is merely exemplary.

The above description has been with regard to a display object. It is understood that the display object may be represented by a visual icon with defined borders, or it may be represented by some other visual method, such as text associated with a message or space (i.e. space that appears on a display) that overlaps or is adjacent to a message.

FIGS. 67 through 76 are exemplary screen shots that illustrate exemplary operation of an exemplary embodiment of the present invention.

Figure 67:
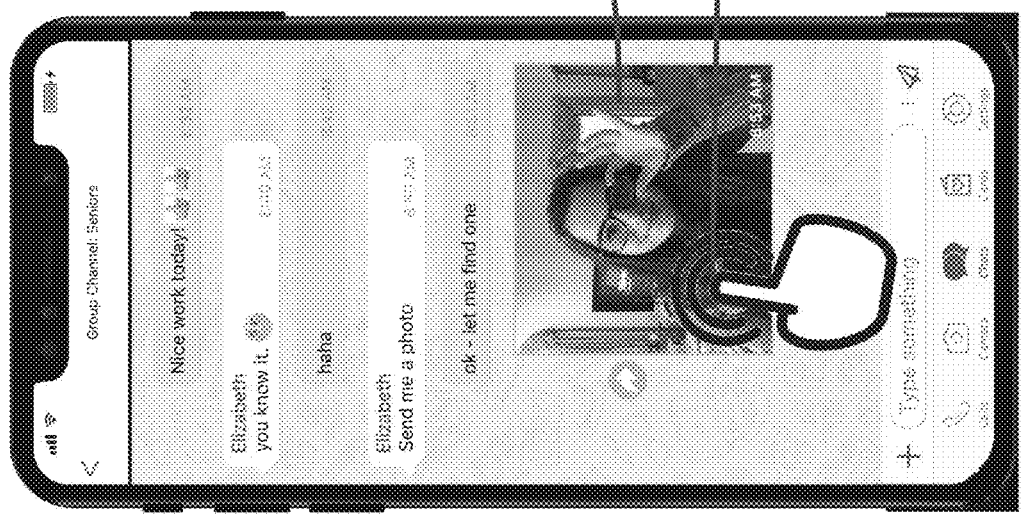

FIG. 67 In this embodiment a long press gesture (2202) is used to indicate the user's selection i.e., this image element of a message (2204) and to ultimately (including, in some embodiments, immediately) cause the display of one or more of information and/or matches.

In some embodiments, in order to identify information and/or image (or portion thereof) matches the content of the entire image is considered. In some embodiments, in order to identify information and/or image (or portion thereof) matches, the contents of an area, portion or portions, and/or other attributes of the image are considered. In some embodiments, one or more "match thresholds" (e.g., upper, lower and/or other match threshold limits/parameters) can be applied by the system that regulate, or effect, the system's determination and display of images and/or information that "match" the contents of a specified area. These "near" match embodiments can be useful in implementations where, for example, the goal of the "match" is to find something (or someone) similar as opposed to identical.

In some embodiments selection area "boundaries" are inferred or algorithmically determined or suggested. In some embodiments the user can cause the selection area to be defined (e.g., tap and drag, double-tap, pinch and expand, right-click/hold and drag mouse, etc.) In some embodiments the inverse, background or opposite of the area/s selected are instead treated as the area to match.

In some embodiments a single step such as simply tapping (selecting) an image or area associated therewith will cause the display of matches. In some embodiments further steps and refinement will cause the display of matches.

In some embodiments more than one image can be selected and for example, aggregated and/or combined to be matched.

In some embodiments more than one image can be selected and for example, individually and/or separately assessed and matched.

Some embodiments have a single screen from which all selection criteria are specified. Some embodiments provide for multiple screens from which specification criteria is ascertained/defined.

Figure 68:
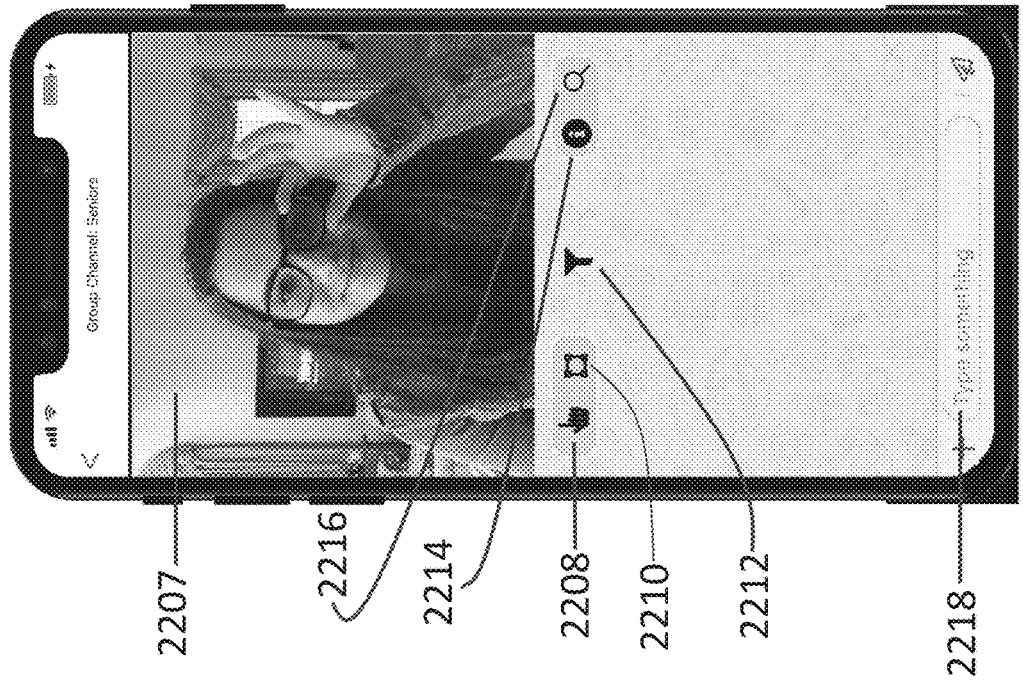
FIGS. 67-76 are exemplary screen shots that illustrate examples of the operation of one or more exemplary embodiments of the present invention.

FIG. 68 In this embodiment the selected image from FIG. 67 is enlarged and displayed in a manner intended to make it easier for the user to specify a point or area to be matched (FIG. 68 #2207). In this embodiment a further set of selection controls is also presented (2208, 2210, 2212, 2214 and 2216).

In this embodiment selection of the "finger pointer" icon (2208) and/or the "area selection" (2210) icons (together or separate) will allow the user to specify a point or points/area or areas in the image that the application will include in its match search. In some embodiments more than a single point/area selection will be allowed. In some embodiments the point/area will be literal, in other embodiments the point/area may be interpreted, inferred or otherwise calculated by the app. For example, if the user indicates selection of a point or area, the application could interpret that area to be a larger or smaller area enclosed by a, for example, inferred, calculated or interpreted boundary. In some embodiments, other factors associated with the selection, such as the background or even areas outside of the selected area) may be considered by the app to determine which area or areas to "select" (i.e., use as the [or a] basis for the match search).

In this embodiment, when selected, the "filter" icon (2212) will cause a criterion selection interface to be displayed. This filter will allow users to refine the aspects or elements of the image that the application will seek to match. In some embodiments more than one match will be found and made available for display to the user.

In this embodiment, when selected, the "information" icon (2214) will cause the display of further information associated with the image or selected portions thereof. Said information may be known, looked-up, inferred, derived and/or calculated. In some embodiments categories of information (via menu or otherwise) will be displayed allowing the user to select and refine the information they wish to view (and/or in some cases, listen to.)

In this embodiment, when selected, the "find matches" icon (2216), a magnifying glass icon in this example, causes the application to initiate its search (and eventual display) of matches. In some embodiments the search may begin in the background even before the "find matches" icon is tapped or otherwise activated/selected.

In this embodiment a text entry bar is provided in which a [text, image, audio, etc.] message can be entered (2218). In this embodiment, a message entered will be associated (in whole or in part) with the ultimately selected match or matches. In some embodiments associated text input is permitted. In some embodiments associated text input is not permitted. In some embodiments whether associated text is permitted or not is resolved by the application/system on a case by cases basis.

Figure 69:
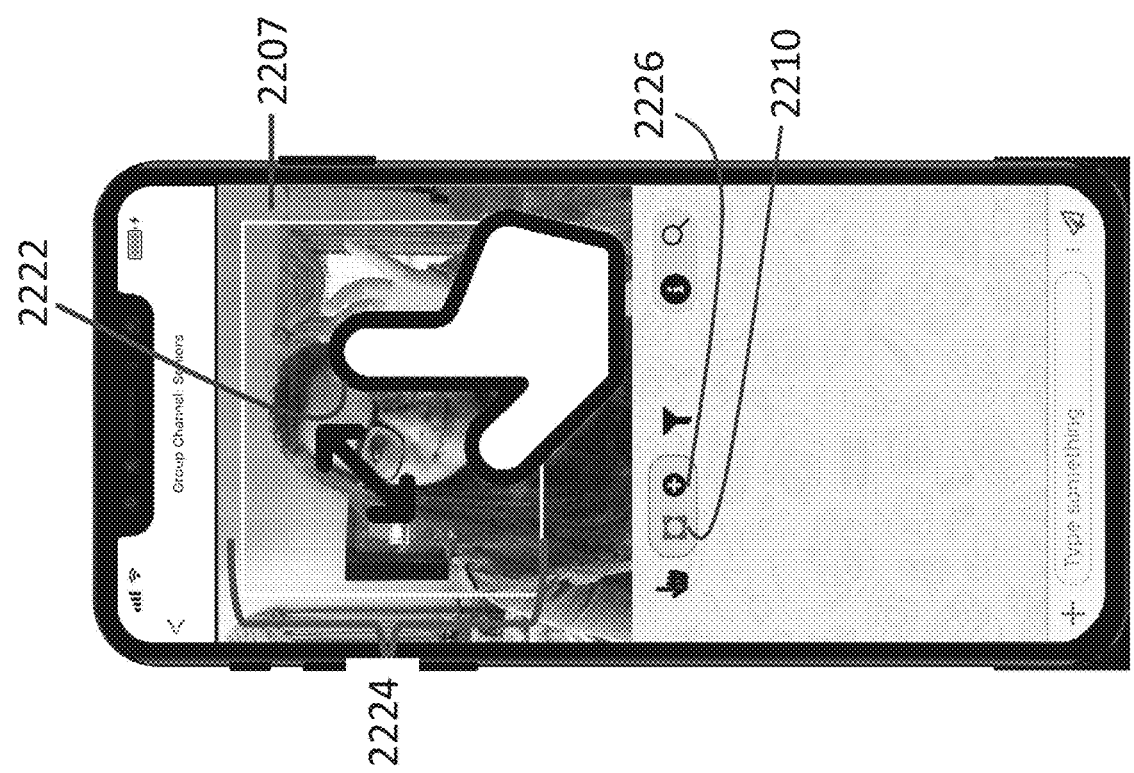

FIG. 69 This screen depicts an exemplary embodiment. In this embodiment the selected image (2207) is enlarged and displayed in a manner intended to make it easier for the user to specify a point or area to be matched.

In this embodiment the user has tapped on the area selection icon (2210) allowing the user to refine the selection area. In this embodiment the user uses a touchscreen gesture to define the desired "match" area (2224). In some embodiments no area refinement is permitted. In some embodiments only one point or area is allowed to be specified. In this embodiment the user is permitted to specify more than one point/area. To do so, after making an initial selection, the user may tap the "+" plus icon (2226) to add another point or area. In some embodiments areas or points may overlap. In some embodiments the area/s or point/s may not overlap. In some embodiments a further, more refined area is determined based on other criterion related to the image (or not) to suggest or assume the borders of a selection. In this embodiment long pressing on the "+" icon will cause it to change to a "−" (minus) icon, which will allow the user to eliminate previous area(s) and/or point selections/specifications.

Figure 70:
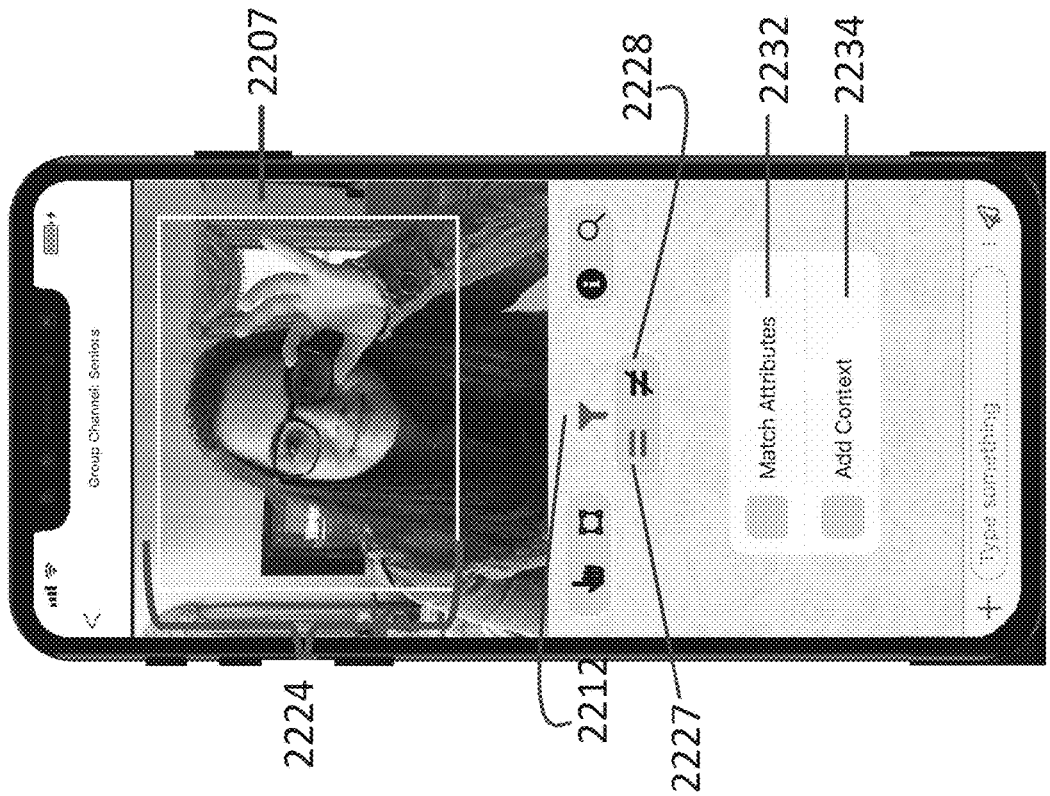

FIG. 70 This screen depicts an exemplary embodiment. In this embodiment the selected image (2207) is enlarged and displayed in a manner intended to make it easier for the user to specify a point or area to be matched.

In this exemplary embodiment the User has tapped on the filter icon (2212) causing a subsidiary menu to be displayed. The subsidiary menu, in this example, shows an "equal to" icon (2226) and a "not equal to" icon (2228). Criterion associated with the equal to icon will be matched. Criterion associated with the "not equal to" icon will be searched, but to the extent possible, in the opposite.

In embodiments that permit the specification of match criterion, the specification can be implemented in any number of ways.

In this exemplary embodiment the user is able to specify "Match Attributes" (2232). In this example, matchable attributes include general categories such as image, video, audio, olfactory and subcategories, for example:

Video: Color, Mood, length, codec, format, author, image quality, subjects, date/time, genre, actors, director, location, etc.
Audio: tempo, length, genre, musician, writer, location, tempo, etc.
Olfactory: olfactory dimension (e.g., fragrant, fruity, minty, woody, pungent, decayed, nutty), intensity, complexity, etc.

In this exemplary embodiment the user is able to "Add Context" (2234). For example, the user may be seeking examples of matches for the selected image in conjunction with additional specified attributes.

For example:
The selected image is a photo of the Statue of Liberty in the summer. The user may wish to add the attribute "snow" to discover images of the Statue of Liberty in with snow.
The selected image is a photo of a friend. The user may wish to find photos of people that "look like" their friend but with added attributes such as associated with an "umbrella" or associated with a "beach" or associated with a date range of "1950-1960".

Figure 71:
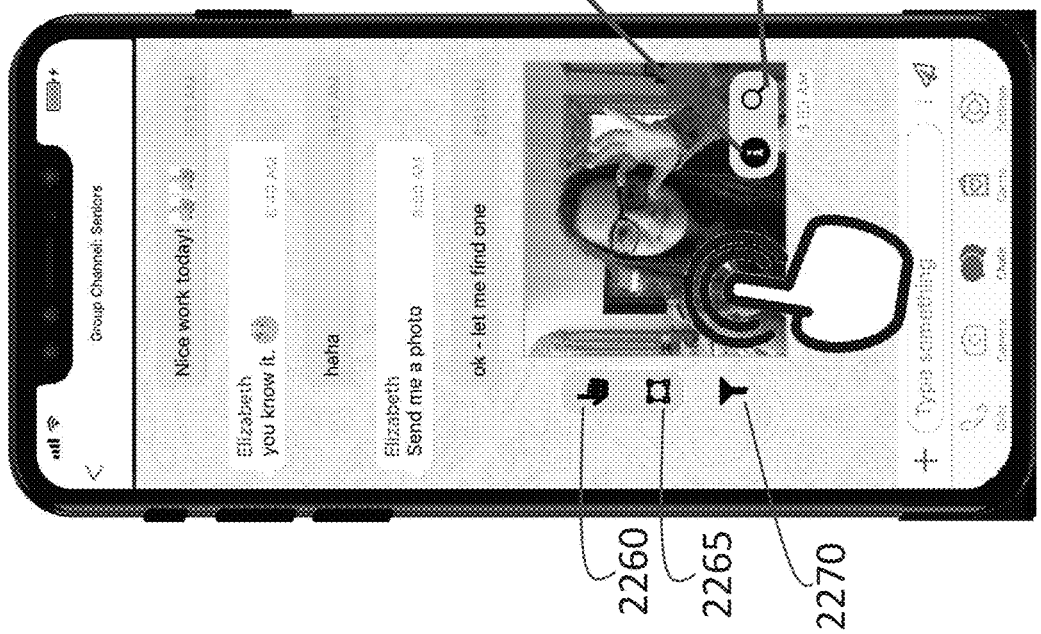

FIG. 71 This screen depicts another example of an exemplary embodiment. In some embodiments feature controls such as 2260, 2265, 2270, 2275 and/or 2280 may be displayed (either before or after an action is taken by the user to initiate the Find Matches search and display functionality)

In this exemplary embodiment selection of the "finger pointer" (2260) icon and/or the "area selection" (2265) icons (together or separate) will allow the user to specify a point/area in the image that the application will include in its match search. In some embodiments more than a single point/area selection will be allowed. In some embodiments the point/area will be literal, in other embodiments the point may be interpreted, inferred or otherwise calculated by the app. For example, if the user indicates selection of a point or area, the application could interpret that area to be a larger or smaller area enclosed by a, for example, inferred, calculated or interpreted boundary. In some embodiments, other factors associated with the selection, such as the background or even areas outside of the selected area) may be considered by the app to determine which area or areas to "select" (i.e., use as the basis for the match search).

In some embodiments the finger pointer or area selector will be used to determine/select an area to exclude from matching. In some embodiments an area may be selected, and a further control will cause the inverse of the area/s selected to become selected.

In some embodiments the user can add desired result display criterion such as find matches that look like this image (or selected portions thereof) but display such matches in conjunction with specified criterion, for example, in association with a location or setting such as a beach and/or wearing a hat, holding an umbrella, in a sportscar . . . or older or younger, or scared, or happy.

In some embodiments a user can seek matches that are the opposite of area or areas of the selected image and based on the optional additional criterion defined.

In this exemplary embodiment, when selected, the "filter" icon (2270) will cause a criterion selection interface to be displayed. This filter will allow users to refine the aspects or elements of the image that the application will seek to match. In some embodiments more than one match will be found and made available for display to the user.

In this exemplary embodiment, when selected, the "information" icon (2275) will cause the display of further information associated with the image or selected portions thereof. In some embodiments, categories of information (via menu or otherwise) will be displayed allowing the user to select and refine the information they wish to view (or in some cases, listen to.)

In this exemplary embodiment, when selected, the "find matches" icon (2280) (magnifying glass in this example) causes the application to initiate its search (and eventual display) of matches. In some embodiments the search may begin in the background even before the "find matches" icon is tapped or otherwise activated/selected.

Figure 72:

FIG. 72 This screen depicts an exemplary embodiment whereby the image (or portion/s thereof) are selected through another method. In this example a new image is captured, i.e., it had not been previously transmitted into a chat message stream). In this embodiment the user is able to monitor an image in a field of view of a camera of a mobile device and capture module of the mobile device and capture the image with the camera and provide the image from the camera to the application.

In this example, a device's camera (directly from within the app or indirectly by being associated with the app) is pointed at a subject and a photo/video/image (and in some cases sound and/or olfactory input) is captured. In this embodiment the user can select a point, points, area and/or areas to be matched. In some embodiments the image is first captured before match criterion is specified.

In some embodiments audio information is captured and matched as opposed to or in addition to visual information. For example, instead of "You really look like . . . ", it could be "You really sound like", etc.

FIG. 72 In this exemplary embodiment, a device capable of sensing, perceiving, collecting and/or capturing olfactory information is shown. This example shows a built-in sensor to help facilitate machine olfaction sensing (2295). Olfactory sensing is described for example in U.S. Pat. No. 9,645,127 which is hereby incorporated by reference. Some embodiments may include (or can be augmented by use of) one or more external sensor devices that can be "connected" directly or indirectly to the application device. In some embodiments olfactory information is captured (or otherwise considered) and matched instead of or in addition to visual and/or audio information. In some embodiments olfactory information is enhanced or refined based on visual or audio information collected at the same time. In some embodiments olfactory information is enhanced or refined based on data input by a user or users. In this exemplary embodiment smells/odors that match the captured or considered olfactory input are compared to a database (local and/or remote) of olfactory information and "matches" presented. Matches can be literal or analogous and presented in the aggregate (this smells like wine) and/or further refined, e.g., "There are traces of coffee, apple and cedar". This exemplary embodiment does not seek to describe a method or apparatus for transmitting actual odors/smells from one person to another via a device but rather as a means to gather, assess, compare and match gathered olfactory information.

In this embodiment selection of the "finger pointer" (2260) icon and/or the "area selection" (2265) icons (together or separate) will allow the user to specify a point/area in the image that the application will include in its match search.

In this embodiment, when selected, the "filter" icon (2270) will cause a criterion selection interface to be displayed. This filter will allow users to refine the aspects or elements of the image (or audio, or olfactory, etc. information) that the application will seek to match. In some embodiments more than one match will be found and made available for display/conveyance to the user.

In this embodiment, when selected, the "information" icon (2275) will cause the display of further information associated with the image or selected portions thereof (or audio, or olfactory, etc. information). In some embodiments, categories of information (via menu or otherwise) will be displayed allowing the user to select and refine the information they wish to view (or in some cases, listen to.)

In this embodiment, when selected, the "find matches" icon (2280) (magnifying glass in this example) causes the application to initiate its search (and eventual display) of matches. In some embodiments the search may begin in the background even before the "find matches" icon is tapped or otherwise activated/selected.

In this embodiment, tapping or holding the capture button/icon (2285) causes the capture of video, photo, olfactory and/or audio information.

In this embodiment, tapping the "X" icon (2290) closes or cancels the photo, video, audio, olfactory capture process.

Figure 74:
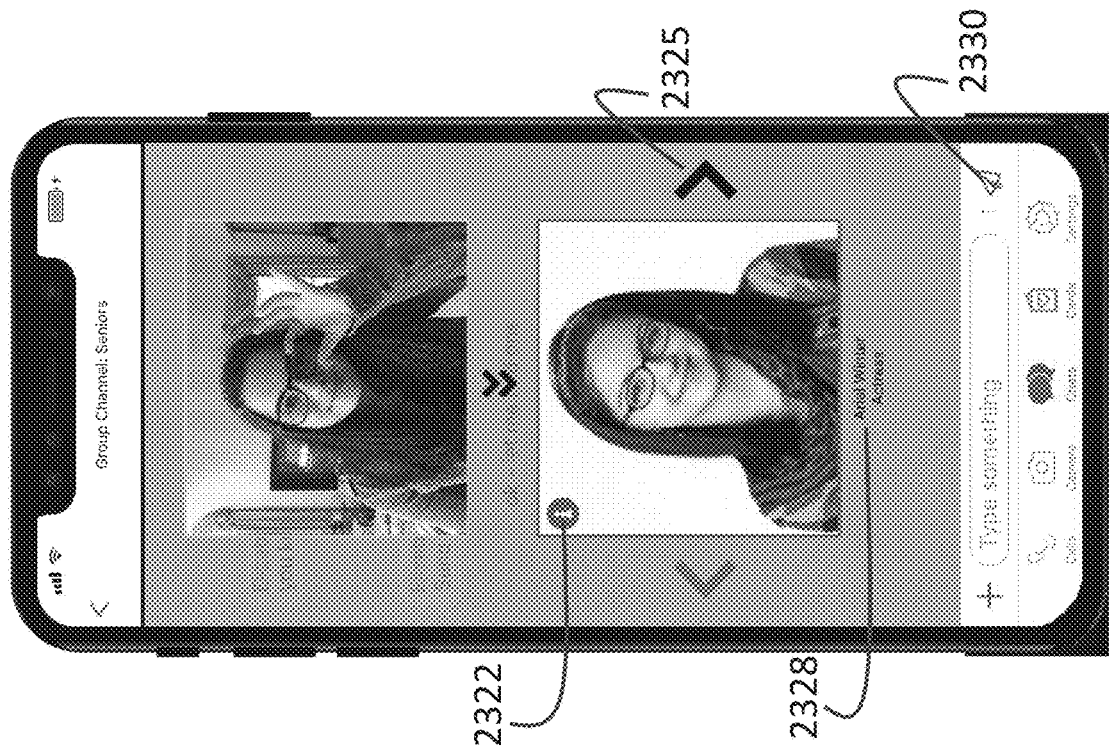
Figure 73:
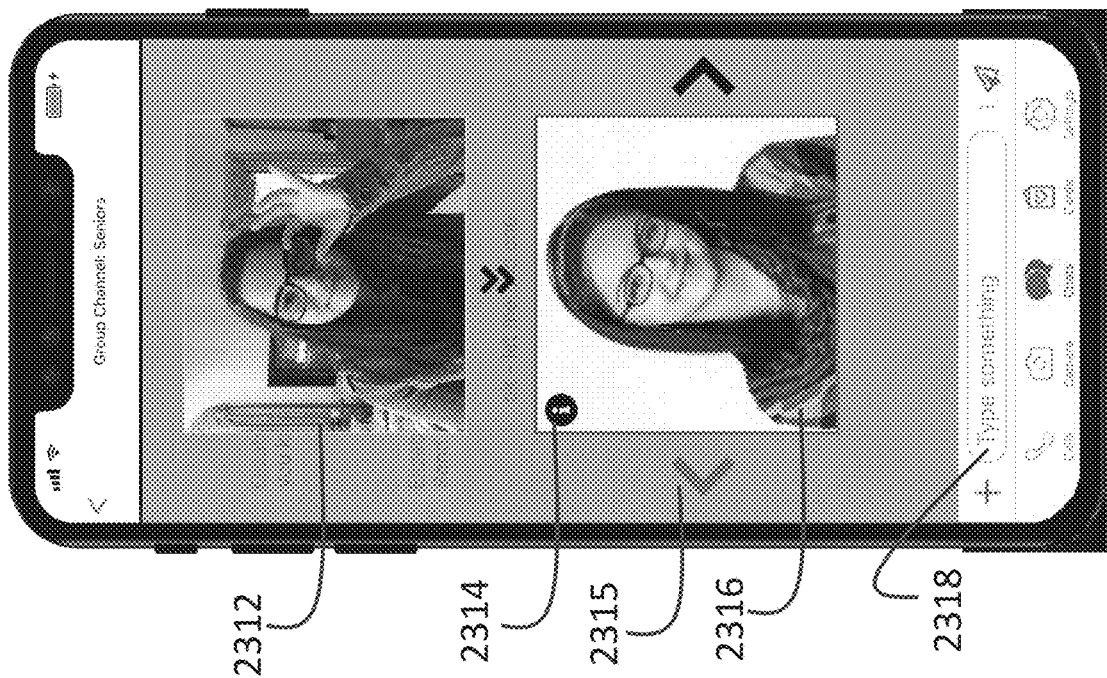

FIG. 73 and FIG. 74 These screens depict an example of an exemplary embodiment that show the results of the matched criteria.

In some embodiments Augmented Reality ("AR") or Artificial Intelligence ("AI") could be applied to improve/alter or enhance match results.

In this example, the application is intended to match specified images and/or specified portions thereof, to people, animals, places and/or objects.

2315 and 2325 In this embodiment the user can tap on the previous icon (2315) or next icon (2325) right to cause the display of additional (if available) matches. In this embodiment the user can optionally swipe left or swipe right to cause the display of previous or additional further (if available) matches.

In this embodiment tapping on the "i" (information") icon (2322) causes the display of additional information (and/or links thereto) associated with the match (for example, as info as shown at 2328). The information can be none, limited or expansive. The additional information can be known (e.g., meta-data), looked-up, inferred, calculated, derived, etc.

In this embodiment, the user can optionally add a message/comment (2318) that will be transmitted to the message stream along with the selected (image) match (i.e., elements of the further message).

In this embodiment, tapping on the send icon (2330) causes the selection and transmission of the further message, i.e., the image displayed at the time along with the optionally added message/comment and other associated information.

In some embodiments, the user may further modify the matched image by adding text, doodles, drawings, stickers, emojis, overlays, audio, and/or add/or change the background and/or apply certain AR effects, etc.

Figure 75:
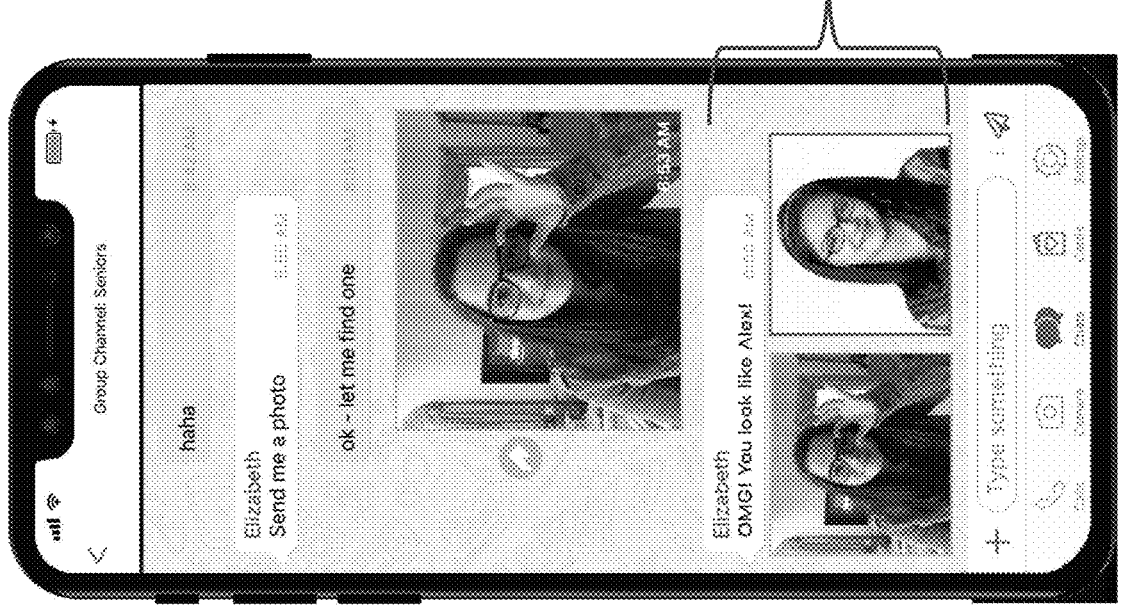

FIG. 75 This screen depicts an example of an exemplary embodiment of a chat message stream wherein the selected image, the selected matched image, and an associated further message are posted into the chat stream together as a further message (2332). In some embodiments, tapping or otherwise indicating selection of an area or object associated the further message, for example on a representation of the referenced image, the image match and/or the further associated message will cause a change in display. In some embodiments. the change of display could be a jump back to the original image (i.e., selected media). In some embodiments. the change of display could be a change of information displayed near or associated with the posted further message. In some embodiments. the change of display could be a toggle between the originally specified image and the matched image or images. In some embodiments more than one matched image (video, audio, etc.) is made available for display.

In some embodiments the application will search databases for matches, for example, locally, peer to peer, and/or external/remote via, for example, Bluetooth®, WIFI, cellular or other connection. What the application is looking to "match" can be defined by the application or the user (or both). For example, in some embodiments the system will search to match "faces". In some embodiments other match criterion could be applied (e.g., physical or meta). For example, find matches for eyes or mouth (or combination). Or find matches for background. Or, find matches for metadata such as time, location or date). In some embodiments the match will be based on the image itself. In some embodiments more than one approach/technique will be combined such as text character recognition and facial recognition. In some embodiments the system will, for example, attempt to identify the selected image or area thereof and then find matches to its inference. For example, the system may apply facial recognition to identify a photo's subject and then find matches for the inferred "recognized" subject. This could be useful in cases where the user wishes to find a good general match as opposed to just a match for the depiction of the person (or animal, or place or thing) in just the one (or more) selected image. In some embodiments the match will be based on an existing photo or image, while in other embodiments the match will be found in [near] real-time based on what the device camera is currently viewing. In some embodiments the system will suggest matches based on for example, differences, opposites or absences, as opposed to sameness.

FIG. 76 illustrates that a responsive message may be sent after receipt of the exemplary message shown in FIG. 75.

The above explanation has included exemplary embodiments to permit a message to reference other data. These embodiments have relied on the use of technology to achieve advantages that are not obtained by the prior art. In particular, by enabling a user to interact with a display, the user is able to select objects or areas on the screen in order to create messages that reference other data, such as other messages. By providing for the ability to select objects and/or areas on a display screen, not only can additional information (such as messages or message portions) be viewed, but other forms of data can be viewed as well. Several of these exemplary embodiments allow (for example) one message (or portion thereof) to be viewed without scrolling up or down from another message to be viewed. The ability to view a first message (or other data) while a second message is in an area of a display that was being viewed allows efficient operation of a computing device without manual searching for the first message. This improvement to the technology of computer devices conveys other benefits as well. For example, the ability to insert the reference object into the text entry box through a single click (or with fewer operations than with other methods) enables information associated with a message to be easily available (i.e. displayable) by reference to another message. Also, for example, the ability to include multiple references to other messages in a single message facilitates commenting and referencing more than one message at the same time without tedious specification and description of more than one message.

In an exemplary embodiment of the present invention a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and steps discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions (e.g., reference generation module) embodying any one or more of the methodologies of functions described herein. The reference generation module may also reside, completely or at least partially, within main memory and/or within processing device during execution thereof by computer system; main memory and processing device also constituting machine-readable storage media. The reference generation module may further be transmitted or received over a network via network interface device.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Various exemplary embodiments are described above. It is understood that exemplary embodiments (or portions thereof) described above may be combined without limitation to yield further exemplary embodiments of the present invention.

The above examples include transmitting data from a first device to a second device. It is understood that the first and/or second device may be receiving data from respective servers, and it is contemplated that transmitting data may be accomplished by transmitting data to/from one or more of the respective servers.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to an apparatus for performing the operations herein. This apparatus may be specially constructed for the required purposes or it may comprise a general purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method of referencing an image, said method comprising the steps of:
   a) displaying said image on a first display device;
   b) receiving selection of a selected portion of said image via said first display device, wherein said selected portion of said image is less than all of said image;
   c) receiving content, wherein said content is associated with and digitally linked to said selected portion of said image for which selection was received;
   d) transmitting said image as part of a message included in a continuous stream of messages from said first display device to a second display device;
   e) displaying at least a portion of said message on said second display device as part of said continuous stream of messages;
   f) displaying said content on said second display device and indicating that said content is associated with said selected portion of said image.

2. A method according to claim 1, wherein step a) includes displaying said image as part of a further message included in said continuous stream of messages on said first display device.

3. A method according to claim 1, wherein said selected portion of said image is identified as said specific portion of said image on said image.

4. A method according to claim 1, wherein step c) includes the step of receiving said content on said first display device while said image is displayed.

5. A method according to claim 1, wherein said selected portion of said image is selected either before or after said content is received.

6. A method according to claim 1, wherein displaying said content in step f) occurs responsive to interaction with said second display device after at least said portion of said message is displayed on said display device.

7. A method according to claim 1, wherein said selected portion of said message is identified as said selected portion of said message on said first display device and on said second display device.

8. Apparatus for referencing an image, said apparatus comprising:
   a memory for storing said image; and
   at least one processor for:
   a) displaying said image on a first display device;
   b) receiving selection a selected portion of said image via said first display device, wherein said selected portion of said image is less than all of said image;
   c) receiving content, wherein said content is associated with and digitally linked to said selected portion of said image for which selection was received;
   d) transmitting said image as part of a message included in a continuous stream of messages from said first display device to a second display device;
   e) displaying at least a portion of said message on said second display device as part of said continuous stream of messages;
   f) displaying said content on said second display device and indicating that said content is associated with said selected portion of said image.

9. Apparatus according to claim 8, wherein said image is displayed on said first display device as part of a further message included in said continuous stream of messages.

10. Apparatus according to claim 8, wherein said selected portion of said image is identified as said specific portion of said image on said image.

11. Apparatus according to claim 8, wherein said content is received on said first display device while said image is displayed.

12. Apparatus according to claim 8, wherein said selected portion of said image is selected either before or after said content is received.

13. Apparatus according to claim 8, wherein displaying of said content on said second display device occurs responsive to interaction with said second display device after at least said portion of said message is displayed on said display device.

14. Apparatus according to claim 8, wherein said selected portion of said message is identified as said selected portion of said message on said first display device and on said second display device.

15. A non-transitory computer readable medium having stored thereon instructions for operating a messaging device, the instructions, when executed by a processor, cause the processor to implement the steps of:
   a) displaying said image on a first display device;
   b) receiving selection of a selected portion of said image via said first display device;
   c) receiving content, wherein said content is associated with and digitally linked to said at least said selected portion of said image for which selection was received;
   d) transmitting said image as part of a message included in a continuous stream of messages from said first display device to a second display device;
   e) displaying at least a portion of said message on said second display device as part of said continuous stream of messages;
   f) displaying said content on said second display device and indicating that said content is associated with said selected portion of said image.

16. A non-transitory computer readable medium according to claim 15, wherein said image is displayed on said first display device as part of a further message included in said continuous stream of messages.

17. A non-transitory computer readable medium according to claim 15, wherein said selected portion of said message is identified as said selected portion of said message on said first display device and on said second display device.

18. A method of offering a second image with at least one feature matched to a first image, said method comprising the steps of:
   a) displaying said first image on a first display device;
   b) receiving selection of at least a portion of said first image that includes said at least one feature via said first display device;
   c) initiating searching for said second image having said at least one feature from among a plurality of potential images;
   d) transmitting said second image as part of a message included in a continuous stream of messages to a second display device;
   e) displaying at least a portion of said second image on said second display device as part of said continuous stream of messages and indicating that at least said portion of said second image is associated with or has said at least one feature matched to said first image;

wherein for ones of said plurality of potential images, numerical values are obtained that correspond to amount of similarity between said at least one feature and said first image, and wherein said transmitting of said second image includes transmitting one or more of said ones of said plurality of images that correspond to said numerical values that are above, below, or equal to a threshold.

19. A method according to claim 18, wherein said first image and said second image are digitally linked on said second display device.

* * * * *